United States Patent
Won et al.

(10) Patent No.: US 10,694,496 B2
(45) Date of Patent: Jun. 23, 2020

(54) METHOD AND APPARATUS FOR TRANSMITTING GROUP MESSAGE TO USER EQUIPMENT (UE)

(71) Applicant: Samsung Electronics Co., Ltd., Suwon-si, Gyeonggi-do (KR)

(72) Inventors: Sung Hwan Won, Seoul (KR); Seonghun Kim, Suwon-si (KR); Donghan Kim, Osan-si (KR); Jinyoung Oh, Seoul (KR); Seunghoon Choi, Suwon-si (KR); Youngwoo Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/936,098

(22) Filed: Nov. 9, 2015

(65) Prior Publication Data

US 2016/0135143 A1   May 12, 2016

Related U.S. Application Data

(60) Provisional application No. 62/076,863, filed on Nov. 7, 2014, provisional application No. 62/086,057, filed
(Continued)

(30) Foreign Application Priority Data

Nov. 4, 2015   (KR) ........................ 10-2015-0154748

(51) Int. Cl.
*H04W 72/00* (2009.01)
*H04W 4/06* (2009.01)
(Continued)

(52) U.S. Cl.
CPC ........... *H04W 72/005* (2013.01); *H04W 4/06* (2013.01); *H04W 12/00* (2013.01); *H04W 12/08* (2013.01);
(Continued)

(58) Field of Classification Search
CPC ............. H04W 52/383; H04W 52/243; H04W 52/367; H04W 72/0413; H04W 72/12;
(Continued)

(56) References Cited

U.S. PATENT DOCUMENTS 9,565,008 B2   2/2017   Ko et al.
9,867,105 B2   1/2018   Lee et al.
(Continued)

FOREIGN PATENT DOCUMENTS

CN   104137635 A   11/2014
CN   104349290 A   2/2015
(Continued)

OTHER PUBLICATIONS

ETSI TS 123 468 V12.2.0 (Sep. 2014).*
(Continued)

*Primary Examiner* — Abdelillah Elmejjarmi
(74) *Attorney, Agent, or Firm* — Jefferson IP Law, LLP

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method and apparatus of a wireless network are disclosed. The method includes transmitting a first request
(Continued)

message to request allocation of a multimedia broadcast multicast service (MBMS) group identifier from a service capability server/application server (SCS/AS) to a service capability exposure function (SCEF), the first request message including an external group identifier and an SCS/AS identifier, and receiving a first response message including the MBMS group identifier from the SCEF to the SCS/AS.

16 Claims, 90 Drawing Sheets

Related U.S. Application Data on Dec. 1, 2014, provisional application No. 62/132,815, filed on Mar. 13, 2015, provisional application No. 62/188,968, filed on Jul. 6, 2015, provisional application No. 62/207,619, filed on Aug. 20, 2015.

(51) Int. Cl.
*H04W 12/08* (2009.01)
*H04W 12/00* (2009.01)
*H04W 52/24* (2009.01)
*H04W 52/36* (2009.01)
*H04W 52/38* (2009.01)
*H04W 72/04* (2009.01)
*H04W 72/12* (2009.01)
*H04L 29/12* (2006.01)

(52) U.S. Cl.
CPC ....... *H04W 52/243* (2013.01); *H04W 52/367* (2013.01); *H04W 52/383* (2013.01); *H04L 61/2069* (2013.01); *H04W 72/042* (2013.01); *H04W 72/0413* (2013.01); *H04W 72/12* (2013.01)

(58) Field of Classification Search
CPC ..... H04W 72/042; H04W 12/08; H04W 4/06; H04W 72/005; H04W 72/00; H04W 12/06; H04W 8/04; H04W 76/02; H04W 76/00; H04L 61/2069
See application file for complete search history.

(56) References Cited

U.S. PATENT DOCUMENTS

| | | | |
|---|---|---|---|
| 9,942,901 B2 | 4/2018 | Chandrasekhar et al. | |
| 10,123,328 B2 | 11/2018 | Sun et al. | |
| 2012/0094681 A1 | 4/2012 | Freda et al. | |
| 2012/0213116 A1 | 8/2012 | Koo et al. | |
| 2013/0007287 A1* | 1/2013 | Chu | H04L 12/189 709/227 |
| 2013/0195013 A1 | 8/2013 | Ahn et al. | |
| 2013/0242738 A1 | 9/2013 | Chang | |
| 2013/0322279 A1 | 12/2013 | Chincholi et al. | |
| 2013/0336156 A1 | 12/2013 | Wei et al. | |
| 2014/0079149 A1 | 3/2014 | Lee et al. | |
| 2014/0087748 A1 | 3/2014 | Hong et al. | |
| 2014/0098761 A1 | 4/2014 | Lee et al. | |
| 2014/0105134 A1 | 4/2014 | Buddhikot et al. | |
| 2014/0112251 A1 | 4/2014 | Kim et al. | |
| 2014/0198663 A1 | 7/2014 | Xu et al. | |
| 2014/0325028 A1 | 10/2014 | Jiang | |
| 2014/0341193 A1 | 11/2014 | Lee et al. | |
| 2014/0355705 A1 | 12/2014 | Chen et al. | |
| 2014/0362940 A1 | 12/2014 | Yue et al. | |
| 2015/0063151 A1 | 3/2015 | Sadek et al. | |
| 2015/0230065 A1* | 8/2015 | Zisimopoulos | H04W 4/08 455/414.1 |
| 2015/0249947 A1 | 9/2015 | Zhang et al. | |
| 2015/0351115 A1 | 12/2015 | Jeon et al. | |
| 2015/0365914 A1 | 12/2015 | Yu et al. | |
| 2016/0006495 A1 | 1/2016 | Kim et al. | |
| 2016/0007138 A1* | 1/2016 | Palanisamy | H04W 4/70 455/41.2 |
| 2016/0007316 A1* | 1/2016 | Vaidya | H04W 64/003 370/312 |
| 2016/0080064 A1 | 3/2016 | Kim et al. | |
| 2016/0088642 A1 | 3/2016 | Yang et al. | |
| 2016/0142981 A1 | 5/2016 | Yi et al. | |
| 2016/0205659 A1 | 7/2016 | Bergman et al. | |
| 2016/0205660 A1 | 7/2016 | Ryu et al. | |
| 2016/0205661 A1 | 7/2016 | Ryu et al. | |
| 2016/0212727 A1 | 7/2016 | Hu et al. | |
| 2016/0286524 A1 | 9/2016 | Griot et al. | |
| 2016/0353440 A1 | 12/2016 | Lee et al. | |
| 2016/0381712 A1 | 12/2016 | Yang et al. | |
| 2017/0019878 A1 | 1/2017 | Hu et al. | |
| 2017/0064670 A1 | 3/2017 | Shen et al. | |
| 2017/0171694 A1 | 6/2017 | Liu et al. | |
| 2017/0238302 A1 | 8/2017 | Futaki | |
| 2017/0245241 A1 | 8/2017 | Yu et al. | |
| 2017/0251342 A1* | 8/2017 | Bhalla | H04W 4/08 |
| 2017/0257845 A1 | 9/2017 | Hu et al. | |
| 2017/0264399 A1 | 9/2017 | Li et al. | |
| 2017/0272895 A1 | 9/2017 | Park et al. | |
| 2017/0279565 A1 | 9/2017 | Han et al. | |
| 2017/0280481 A1 | 9/2017 | Stern-Berkowitz et al. | |
| 2017/0290016 A1 | 10/2017 | Yi et al. | |
| 2017/0303064 A1 | 10/2017 | Park et al. | |
| 2017/0311232 A1 | 10/2017 | Yi et al. | |
| 2017/0311355 A1 | 10/2017 | Yi et al. | |
| 2017/0339667 A1 | 11/2017 | Shen et al. | |
| 2017/0347335 A1 | 11/2017 | Yi et al. | |
| 2017/0374542 A1 | 12/2017 | Ryu et al. | |
| 2018/0007658 A1 | 1/2018 | Shen et al. | |
| 2018/0049157 A1 | 2/2018 | Griot et al. | |
| 2018/0070257 A1 | 3/2018 | Mochizuki et al. | |
| 2018/0152913 A1 | 5/2018 | Hu et al. | |
| 2018/0242246 A1 | 8/2018 | Ryu et al. | |
| 2018/0263015 A1 | 9/2018 | Burbidge et al. | |
| 2018/0368038 A1 | 12/2018 | Reddiboyana et al. | |
| 2019/0037569 A1 | 1/2019 | Lee et al. | |
| 2019/0090152 A1 | 3/2019 | Mochizuki et al. | |
| 2019/0174294 A1 | 6/2019 | Ryu et al. | |

FOREIGN PATENT DOCUMENTS

| | | |
|---|---|---|
| EP | 3 216 238 A1 | 9/2017 |
| KR | 2014-0108793 A | 9/2014 |
| WO | 2012-039588 A2 | 3/2012 |
| WO | 2014-196822 A1 | 12/2014 |
| WO | 2015/012654 A1 | 1/2015 |
| WO | 2015/012666 A1 | 1/2015 |
| WO | 2015/026285 A2 | 2/2015 |
| WO | 2016/073533 A1 | 5/2016 |

OTHER PUBLICATIONS

SA WG2 Meeting #105, S2-143232, Oct. 13-17, 2014.*
3GPP TR 23.769 V1.0.0 (Dec. 2014).*
3GPP TR 23.769 V0.3.1(Oct. 2014).*
Huawei et al., 'Solutions on Message delivery to a group of devices', S2-143232, SA WG2 Meeting #105, Oct. 8, 2014.
ZTE et al., 'Selection of method for delivery of Group Message to group of devices', S2-143017, SA WG2 Meeting #105, Oct. 7, 2014.
Cisco Systems Inc., 'Solution for key issue 5.1', S2-142973, SA WG2 Meeting #105, Oct. 8, 2014.
Interdigital, 'Solution for key issue on SCS/AS Notification/ Request for Group PSM Usage', S2-143328, SA WG2 Meeting #105, Oct. 8, 2014.
LG Electronics, Candidate Solutions for LAA Operation, 3GPP TSG RAN WG1 Meeting #78bis, Oct. 6-10, 2014, R1-144042, Ljubljana, Slovenia.
ZTE, Analysis of LAA Candidate Solutions for Coexistence, 3GPP TSG RAN WG1 Meeting #78bis, Oct. 6-10, 2014, R1-143828, Ljubljana, Slovenia.

(56) References Cited

OTHER PUBLICATIONS

NTT DOCOMO, Inter-operator and Inter-RAT Co-existence Techniques for LAA Using LTE, 3GPP TSG RAN WG1 Meeting #78bis, Oct. 6-10, 2014, R1-144150, Ljubljana, Slovenia.
Alcatel-Lucent, Response to R3-150063 on Paging for MTC, 3GPP TSG-RAN WG3 Meeting #87, Feb. 9-13, 2015, R3-150352, Athens, Greece.
Huawei, Consideration on Paging for MTC, 3GPP TSG-RAN WG3 Meeting #87, Feb. 9-13, 2015, R3-150063, Athens, Greece.
Ericsson, on Rel-13 Paging Enhancements, 3GPP TSG-RAN WG3 Meeting #87, Feb. 9-13, R3-150299, Athens, Greece.
International Search Report dated Apr. 22, 2016, issued in International Application No. PCT/KR2015/012077.
International Search Report dated Jun. 29, 2016, issued in International Application No. PCT/KR2016/002479.
3rd Generation Partnership Project; Technical Specification Group Services and System Aspects; Group based Enhancements; (Release 13), Oct. 2014, 3GPP TR 23.769, V0.3.1, pp. 1-33, Sophia-Antipolis, France, XP050926792.
3rd Generation Partnership Project; Technical Specification Group Core Network and Terminals; Group Communication System Enablers for LTE (GCSE_LTE); MB2 Reference Point; Stage 3 (Release 12), Oct. 2014, 3GPP TS 29.468, V12.0.1, pp. 1-28, Sophia-Antipolis, France, XP050926781.
3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 2015, 3GPP TS 23.401, V13.2.0, pp. 1-313, Sophia-Antipolis, France, XP050927727.
3rd Generation Partnership Project; Technical Specification Group Radio Access Network; Evolved Universal Terrestrial Radio Access (E-UTRA); Radio Resource Control (RRC); Protocol Specification (Release 12), Mar. 2014, 3GPP TS 36.331, V12.1.0, pp. 1-356, Sophia-Antipolis, France, XP050769960.
Samsung, Paging Optimization for Rel-13 Low Complexity MTC, Apr. 20-24, 2015, 3GPP TSG RAN WG2 #89bis, R2-151641, Bratislava, Slovakia.
3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 2016, 3GPP TS 23.401, V13.6.0, Sophia-Antipolis, France, XP051086074.
NTT DOCOMO, Views on PHY Layer Options for LAA DL, Nov. 17-21, 2014, 3GPP TSG RAN WG1 Meeting #79, R1-145107, San Francisco, USA, XP050876139.
European Search Report dated Oct. 6, 2017, issued in the European Application No. 15857338.6-1857 / 3216305.
European Search Report dated Oct. 30, 2017, issued in the European Application No. 16765208.0-1857.
European Search Report dated Nov. 6, 2017, issued in the European Application No. 15866046.4-1857 / 3229520.
European Office Action dated Sep. 11, 2018, issued in the European Application No. 15857338.6.
European Search Report dated Jul. 5, 2018, issued in the European Application No. 16837371.0.
"3 Generation Partnership Project; Technical Specification Group Radio Access Network; Evolved Universal Terrestrial Radio Access (E-UTRA); Physical layer procedures (Release 12)", 3GPP Standard; 3GPP TS 36.213, 3rd Generation Partnership Project (3GPP), Mobile Competence Centre ; 650, Route Des Lucioles ; F-06921 Sophia-Anti Polis Cedex ; France, vol. Ran WG1, No. V12.6.0, Jul. 3, 2015 (Jul. 3, 2015) pp. 6-165, XP050965828.
U.S. Office Action dated Aug. 10, 2018, issued in U.S. Appl. No. 15/555,807.
U.S. Office Action dated Sep. 24, 2018, issued in U.S. Appl. No. 15/753,792.
United States Office Action dated Jan. 10, 2019, issued in U.S. Appl. No. 15/532,491.
United States Office Action dated Feb. 21, 2019, issued in U.S. Appl. No. 15/555,807.
Japanese Office Action dated Apr. 15, 2019, issued in a counterpart Japanese application No. 2017-524424.
Huawei, Hisilicon; Solutions on Message delivery to a group of devices; 3GPP SA WG2 TD; SA WG2 Meeting #105 S2-143771; Oct. 17, 2014; Sapporo, Japan.
U.S. Office Action dated Jul. 18, 2019, issued in a U.S. Appl. No. 15/532,491.
European Office Action dated Apr. 18, 2019, issued in a counterpart European application No. 16837371.0-1215.
Samsung: "Further Details on CSI Reporting Schemes", 3GPP TSG RAN WG1 Meeting #82bis; R1-155507; Sep. 26, 2015; Malmö, Sweden.
U.S. Office Action dated Oct. 4, 2019, issued in U.S. Appl. No. 15/555,807.
U.S. Office Action dated Oct. 30, 2019, issued in U.S. Appl. No. 15/532,491.
European Office Action dated Dec. 17, 2019, issued in a couterpart European application No. 16 765 208.0-1215.
3GPP TSG-RAN WG2#93 [93#30] [LTE/NB-IOT] CR for 36.331 (Huawei) R2-162069 retrieved on Mar. 7, 2016.
U.S. Office Action dated Feb. 14, 2020, issued by U.S. Patent Trademark Office U.S. Appl. No. 15/532,491.
European Office Action dated Mar. 12, 2020, issued in a counterpart European Application No. 15 857 338.6-1215.
U.S. Office Action dated Apr. 13, 2020 issued by U.S. Patent and Trademark Office U.S. Appl. No. 15/555,807.
Chinese Office Action dated Apr. 29, 2020, issued in a counterpart Chinese Application No. 201680015179.5.
3GPP TR 23.769 V13.0.0; "3rd Generation Partnership Project; Technical Specification Group Services and System Aspects; Group based Enhancements (Release 13)", 3GPP Draft; 23769-D00, 3rd Generation Partnership Project (3GPP), Mobile Competence Centre; 650, Route des Lucioles; F-06921 Sophia-Antipolis Cedex; France, Jun. 22, 2015 (Jun. 22, 2015), XP050985901, Retrieved from the Internet: URL:http://www.3gpp.org/ftp/tsg_sa/WG2_Arch/Latest_SA2_Specs/Rel-13/ [retrieved on Jun. 22, 2015].

\* cited by examiner

FIG. 13A
1301 — configure special subframe in case of general cyclic prefix
1302 — #0
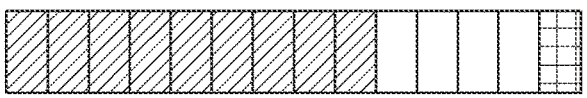
1
2
3
4
1303 — #5
6
7
8
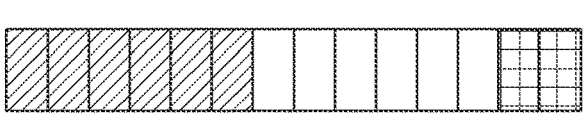
9
 DwPTS   GP   UpPTS
1304        1305       1306

FIG. 13B
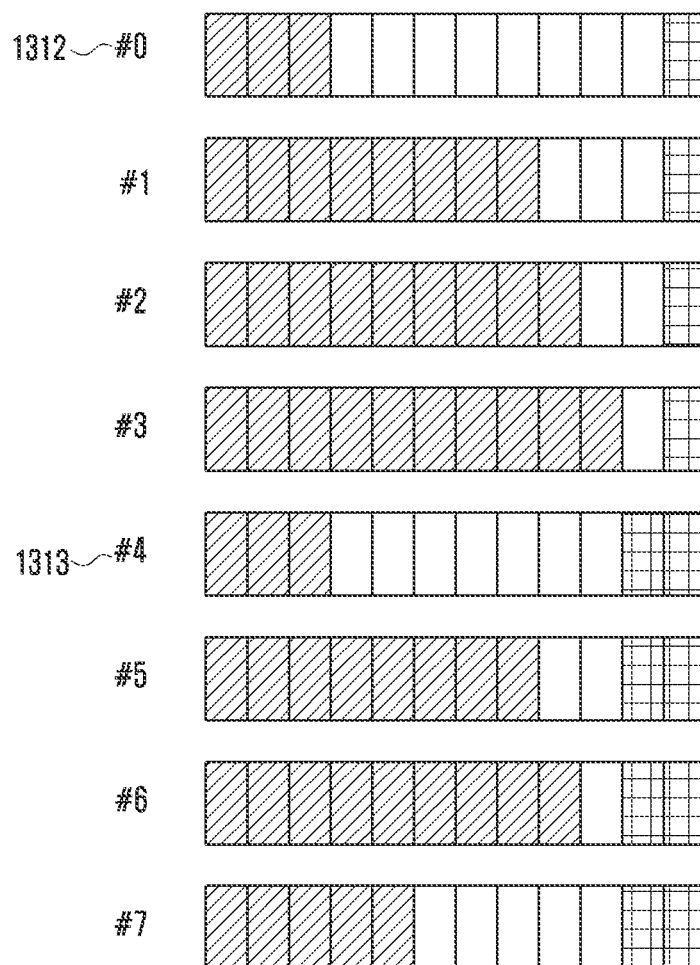
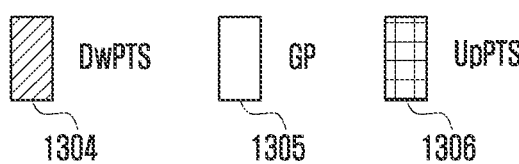

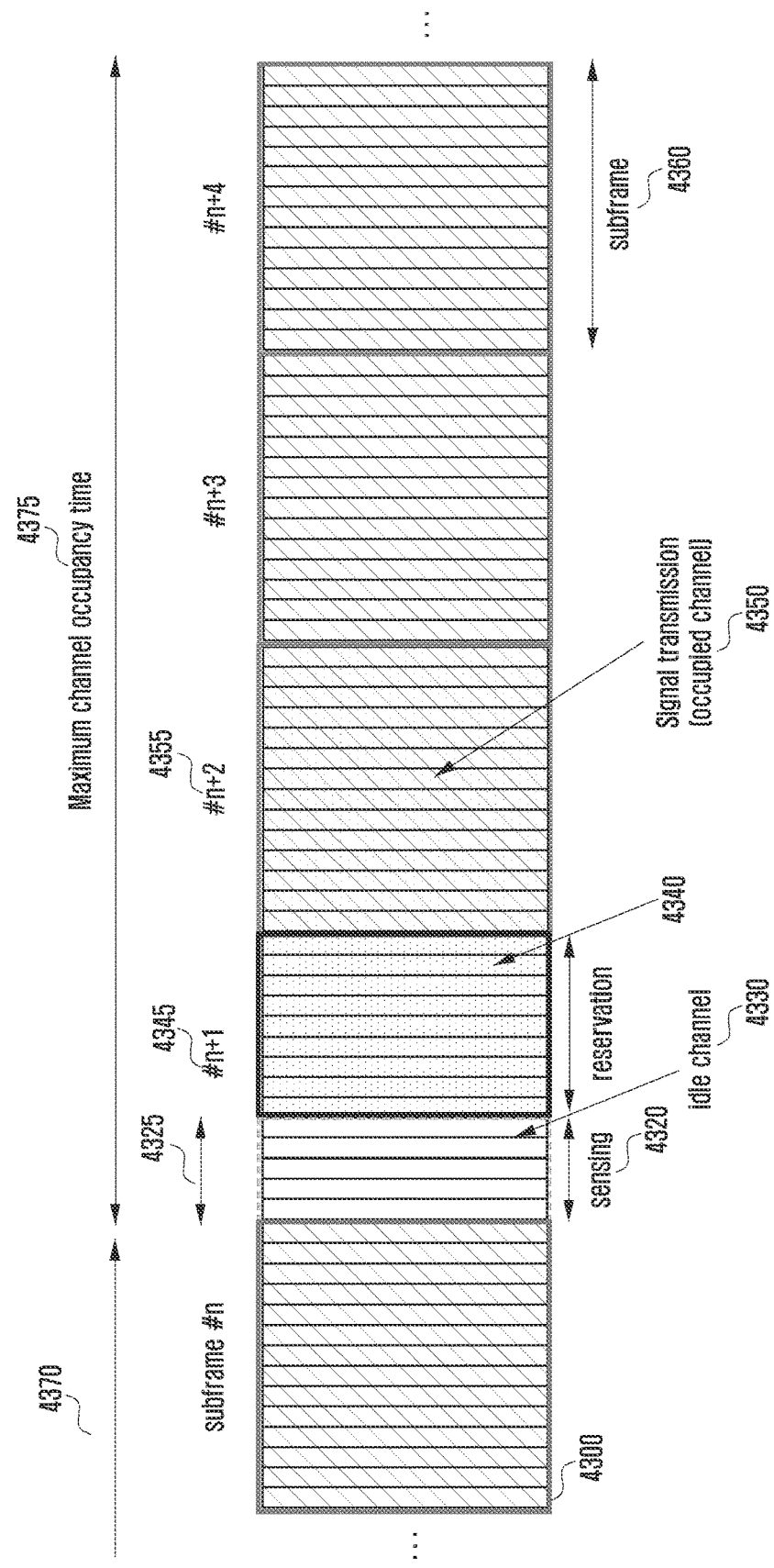

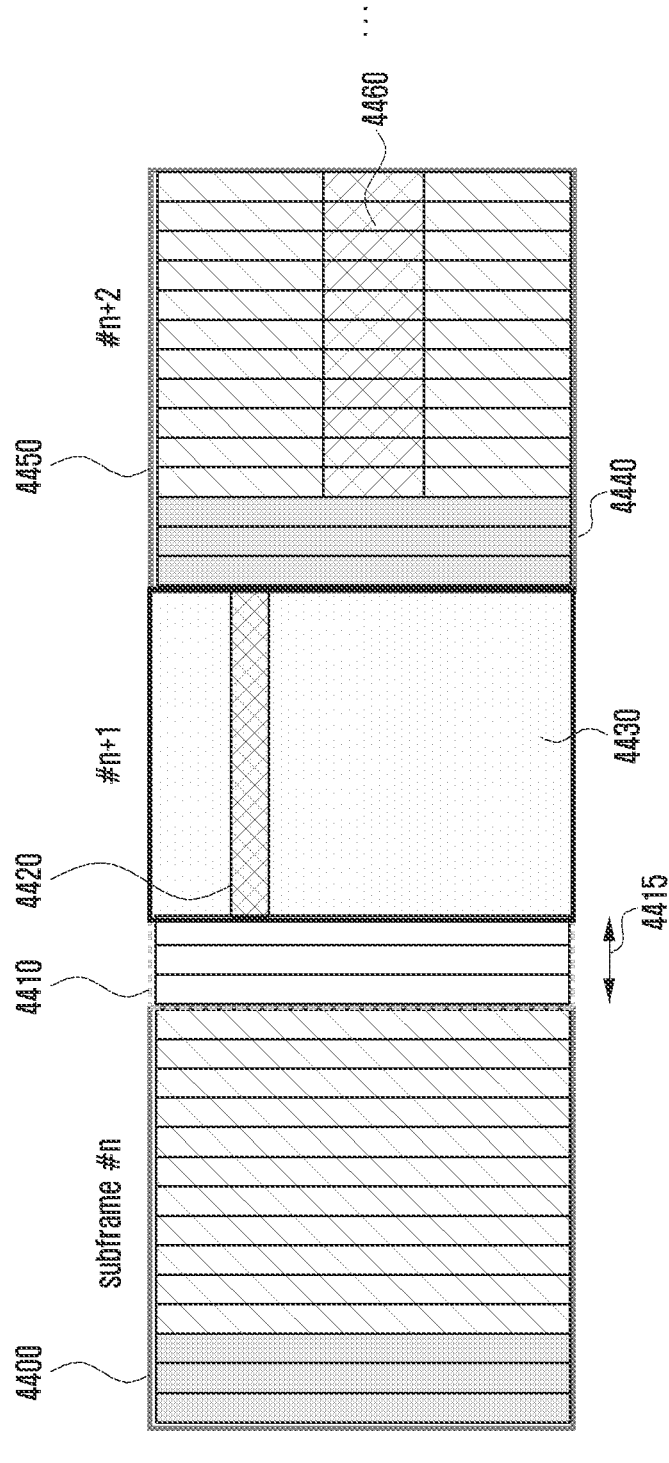

METHOD AND APPARATUS FOR TRANSMITTING GROUP MESSAGE TO USER EQUIPMENT (UE)

CROSS-REFERENCE TO RELATED APPLICATION(S)

This application claims the benefit under 35 U.S.C. § 119(e) of a U.S. Provisional application filed on Nov. 7, 2014 in the U.S. Patent and Trademark Office and assigned Ser. No. 62/076,863, and of a U.S. Provisional application filed on Dec. 1, 2014 in the U.S. Patent and Trademark Office and assigned Ser. No. 62/086,057, and of a U.S. Provisional application filed on Mar. 13, 2015 in the U.S. Patent and Trademark Office and assigned Ser. No. 62/132, 815, and of a U.S. Provisional application filed on Jul. 6, 2015 in the U.S. Patent and Trademark Office and assigned Ser. No. 62/188,968, and of a U.S. Provisional application filed on Aug. 20, 2015 in the U.S. Patent and Trademark Office and assigned Ser. No. 62/207,619, and under 35 U.S.C. § 119(a) of a Korean patent application filed on Nov. 4, 2015 in the Korean Intellectual Property Office and assigned Serial number 10-2015-0154748, the entire disclosure of each of which is hereby incorporated by reference.

TECHNICAL FIELD

The present disclosure relates to a method and an apparatus for transmitting a group message to a user equipment (UE).

BACKGROUND

In order to satisfy a wireless data traffic demand, which is on an increasing trend, after 4th generation (4G) communication system commercialization, an effort for developing an improved $5^{th}$ generation (5G) communication system or pre-5G communication system is being made. For this reason, the 5G communication system or pre-5G communication system has been referred to as a communication system beyond a 4G network or a system post long term evolution (LTE) system. For achieving a high data transmission rate, the 5G communication system considers an implement in a microwave (mmWave) band (e.g., 60 GHz band). In order to ease a path loss of a radio wave and increase a transmission distance in the microwave band, in the 5G communication system, technologies such as a beamforming, a massive multiple input multiple output (MIMO), a full dimensional MIMO (FD-MIMO), an array antenna, an analog beam-forming, a large scale antenna have been discussed. Further, for improving the network of the system, in the 5G communication system, technologies such as an evolved small cell, an advanced small cell, a cloud radio access network (cloud RAN), an ultra-dense network), a device to device (D2D) communication, a wireless backhaul, a moving network, a cooperative communication, a coordinated multi-points (CoMP), and a reception interference cancellation have been developed. In addition, in the 5G system, a Hybrid FSK and QAM modulation (FQAM) and a sliding window superposition coding (SWSC) which are in an advanced coding modulation (ACM) scheme, and a filter bank multi carrier (FBMC), a non-orthogonal multiple access (NOMA) and a sparse code multiple access (SCMA) which are advanced access technologies have been developed.

Meanwhile, Internet has been evolved from a human-centered network in which human generates and consumes information to an Internet of things (IoT) which transmits and receives, and then processes information between distributed components such as things. A big data processing technology through a connection to a cloud server has emerged as an Internet of everything (IoE) technology combined to the IoT technology. To implement the IoT, technology elements such as a sensing technology, wired/wireless communication and network infra, a service interface technology, and a security technology are required so that a technology such as a sensor network for connecting between things, a machine to machine (M2M), and machine type communication (MTC) has been recently studied. In the IoT environment, an Internet technology (IT) service for collecting and analyzing data generated in the connected things to generate the new sense of value to a human's life may be provided. The IoT may be applied to a field such as a smart home, a smart building, a smart city, a smart car or a connected car, a smart grid, a health care, a smart appliance, and an advanced medical service, through convergence and compound between an information technology (IT) and various industries.

Accordingly, various attempts for applying the 5G communication system to an IoT network are made. For example, a 5G communication technology such as a sensor network, an M2M communication, MTC is implemented by a technique such as beaming forming, an MIMO, and an array antenna. An example of the 5G technology and IoT technology fusion may be that a cloud RAN is applied as the big data processing technology as described above.

The above information is presented as background information only to assist with an understanding of the present disclosure. No determination has been made, and no assertion is made, as to whether any of the above might be applicable as prior art with regard to the present disclosure.

SUMMARY

However, when a message is transmitted to multiple user equipments (UEs), a broadcasting resource may be used by considering an efficiency of a resource use. Especially, a group message can be transmitted using a multimedia broadcast multicast service (MBMS) service. In this event, the UE should acquire MBMS related information and a network needs a method and an apparatus for performing this operation since an MBMS bearer should be activated.

Aspects of the present disclosure are to address at least the above-mentioned problems and/or disadvantages and to provide at least the advantages described below. In accordance with an aspect of the present disclosure, a method of a wireless network is provided. The method includes transmitting a first request message to request allocation of a MBMS group identifier from a service capability server/application server (SCS/AS) to a service capability exposure function (SCEF), the first request message including an external group identifier and an SCS/AS identifier, and receiving a first response message including the MBMS group identifier from the SCEF to the SCS/AS.

In accordance with another aspect of the present disclosure, a method of a wireless network is provided. The method includes receiving a first request message to request allocation of an MBMS group identifier from an SCS/AS to an SCEF, the first request message including an external group identifier and an SCS/AS identifier, and transmitting a first response message including the MBMS group identifier from the SCEF to the SCS/AS.

In accordance with another aspect of the present disclosure, an apparatus for a wireless network is provided. The apparatus includes a transceiver configured to transmit and receive signals, and a controller configured to control to the transceiver to transmit a first request message to request allocation of an MBMS group identifier from an SCS/AS to an SCEF, the first request message including an external group identifier and an SCS/AS identifier, and to receive a first response message including the MBMS group identifier from the SCEF to the SCS/AS identifier.

In accordance with another aspect of the present disclosure, an apparatus for a wireless network is provided. The apparatus includes a transceiver configured to transmit and receive signals, and a controller configured to control to the transceiver to receive a first request message to request allocation of an MBMS group identifier from an SCS/AS to an SCEF, the first request message including an external group identifier and an SCS/AS identifier, and to transmit a first response message including the MBMS group identifier from the SCEF to the SCS/AS identifier.

In a method and an apparatus according to an embodiment of the present disclosure, a network can transmit a group message efficiently using resources by applying an MBMS service to a UE.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 13A and 13B are views illustrating special sub-frame configuration according to the 1-8 embodiment of the present disclosure;

FIG. 36 is a view illustrating a case in which a UE receives three CCs in a LTE-A-CA situation and the three CCs are currently included in a licensed band according to an embodiment of the present disclosure;

FIG. 37 is a view illustrating a situation in which a part of CCs is included in a non-licensed band and an operation such as an LTE-A is performed according to an embodiment of the present disclosure;

FIG. 43 is a view illustrating a process of transmitting data or a control signal to a UE according to an embodiment of the present disclosure;

FIG. 44 is a view illustrating the 4-1 embodiment according to an embodiment of the present disclosure;

Throughout the drawings, it should be noted that like reference numbers are used to depict the same or similar elements, features, and structures.

DETAILED DESCRIPTION

Figure 1A:
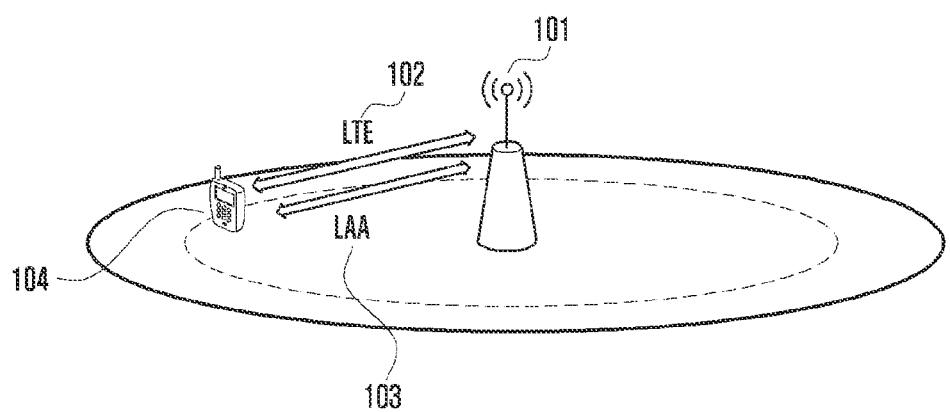
FIGS. 1A and 1B are views illustrating a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, the detailed description of embodiments of the present disclosure is made mainly based on a wireless communication system based on orthogonal frequency division multiplexing (OFDM), particularly $3^{rd}$ Generation Partnership Project (3GPP) evolved universal mobile telecommunications system (UMTS) terrestrial radio access (EUTRA) standard, but the subject matter of the present disclosure can be applied to other communication systems having a similar technical background and channel form after a little modification without departing from the scope of the present disclosure and the above can be determined by those skilled in the art.

The advantages and features of the present disclosure and ways to achieve them will be apparent by making reference to various embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a field programmable gate array (FPGA) or an application specific integrated circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more central processing units (CPUs) within a device or a security multimedia card.

Embodiment 1

In general, a mobile communication system has been developed to provide voice services while guaranteeing the activity of users. However, the mobile communication systems have extended their fields to data services beyond voice communication services, and have now developed to such a level that they can provide high speed data service. However, resource shortages have arisen in the mobile communication systems that presently provide services, and due to users' demands for higher speed services, more developed mobile communication systems are required.

Long term evolution (LTE) Rel-10 in the 3GPP is a technology that embodies high-speed packet-based communication, which has a maximum transmission speed of 1 Gbps. LTE Rel-10 employs a method that extends the number of cells that a UE accesses, and transmits feedback of each cell in only a primary cell (PCell). Also, in LTE Rel-10, all the extended cells for the UE have an identical duplex structure. Therefore, all the cells may have a frequency division duplexing (FDD) structure or a time division duplex (TDD) structure. The TDD structure may be a static TDD structure that maintains an uplink (UL)-downlink (DL) configuration, or may be a dynamic TDD structure in which a UL-DL configuration is changed based on system information, a higher signaling, or a DL common control channel.

LTE Rel-12 enables a UE to simultaneously access both a macro base station (BS) and a small BS that is connected through a non-ideal backhaul. In this instance, the UE employs a method of independently transmitting feedback that is generated in a cell of each BS through a Pcell of the macro BS and a primary SCell (PS cell) in the small BS. Unless otherwise noted, the term, 'Pcell', in the present disclosure indicates a Pcell in the macro BS or a PScell in the small BS. Therefore, in the present disclosure, the term a 'secondary cell (SCell)' indicates the cells that remain after excluding the Pcell of the macro BS or the cells remaining after excluding the PScell of the small cell.

When a single cell that is controlled by the BS has the FDD structure, and a single frequency band is added, it is easy to apply the TDD structure to the single frequency band. This is because two different frequency bands are required for a DL and UL, so as to operate the FDD.

Also, by taking into consideration that the number of licensed bands is limited, such as LTE frequency (unless otherwise noted, LTE includes all advanced technologies of LTE such as LTE-A and the like), a technology of providing an LTE service in an unlicensed band such as 5 GHz band has been studied and is referred to as licensed assisted access (LAA). When LAA is introduced, a method of applying carrier aggregation (CA) in LTE-A and operating an LTE cell in a licensed band as a Pcell, and an LAA cell in an unlicensed band as S cell, is considered. Therefore, in the same manner as LTE-A, feedback that is generated in the LAA cell, which is an Scell, should be transmitted in only a PCell, and FDD or TDD structure may be applied to the LAA cell.

Institute of Electrical and Electronics Engineers (IEEE) 802.11 based Wi-Fi systems currently provide services through the unlicensed band of 5 GHz. To use the unlicensed band of 5 GHz by an LTE system using the LAA technology, the LAA needs to be designed to not affect the Wi-Fi system that currently operates. Therefore, the LAA system may occupy a predetermined channel of an unlicensed band during a predetermined time in the same manner of the Wi-Fi system. After determining that a predetermined channel is not occupied by another system (Wi-Fi or another LAA system) through sensing, the LAA system is able to transmit data through the corresponding channel. In the present disclosure, the maximum time that an LAA cell may occupy a predetermine channel in an unlicensed band is referred to as maximum occupancy time, and the time in which an LAA system executes sensing while not occupying a predetermined channel in an unlicensed band or waits in an idle state is referred to as an idle time.

In this instance, when data exists, of which transmission is not completed in the LAA cell during the maximum occupancy time, it is impossible to transmit the data in the LAA cell during the idle time. Therefore, the transmission of data may be delayed until the next time that the LAA cell occupies a channel, and the amount of data transmitted may be inversely proportional to the delayed time. Therefore, there is a demand for a method that reduces the decrease in the amount of data that is transmitted, caused by a delay time, and completes the transmission of data within maximum occupancy time. Also, there is a demand for a method for transmitting control information such as acknowledgement/negative acknowledgement (ACK/NACK) (hereinafter, A/N or hybrid automatic repeat request (HARQ)-ACK can be mixed) on a control channel that is associated with data transmitted in an LTE cell and an LAA cell by taking into consideration the characteristic of a plurality of cells, such as an LAA cell that is introduced by adding a frequency band of an unlicensed band.

The present disclosure is to provide a method and apparatus for completing the transmission of data in an LAA cell during maximum occupancy time. Further, the present disclosure is to provide a method and apparatus for transmitting control information on a control channel in a frequency aggregation system of an LTE cell and an LAA cell.

According to an embodiment of the present disclosure, transmission and reception of data through LAA cells that use an unlicensed band is completed within a maximum occupancy time and thus, the maximum transmission rate may be increased. When control information on a UL control channel is transmitted in association with DL data in a frequency aggregation system of an LTE cell and an LAA cell, a UL resource may be used for the transmission of data through an optimized UL control format.

Hereinafter, various embodiments of the present disclosure will be described in detail with reference to the accompanying drawings. In describing the present disclosure, a detailed description of related functions or configurations known in the art will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Accordingly, the terms should be defined based on the contents over the whole present specification.

Although various embodiments of the present disclosure are described based on an LTE system and an LTE-A system as an example in the present specification, the present disclosure can be applied without making any adjustment to other communication systems employing BS scheduling.

The OFDM transmission scheme is a data transmission scheme using a multi-carrier, and a kind of multi-carrier modulation (MCM) scheme, in which serially input symbol strings are converted in parallel, and the respective converted symbol strings are modulated with a plurality of mutually orthogonal sub-carriers, that is, a plurality of mutually orthogonal sub-channels, and are then transmitted.

In the OFDM scheme, a modulation signal is located at a second-dimensional resource configured by the time and the frequency. Resources on the time axis are distinguished from each other by different OFDM symbols, which are orthogonal to each other. Resources on the frequency axis are distinguished from each other by different sub-carriers, which are also orthogonal to each other. That is, in the OFDM scheme, by appointing a particular OFDM symbol on the time axis and appointing a particular sub-carrier on the frequency axis, it is possible to indicate one minimum unit resource, which is referred to as a resource element (RE). Different REs are orthogonal even after passing a frequency selective channel. Therefore, signals transmitted through different REs can be received by a receiver without causing interference with each other.

A physical channel is a channel of a physical layer for transmitting a modulation symbol obtained by modulating one or more encoded bit strings. In an orthogonal frequency division multiple access (OFDMA) system, an information string is transmitted by configuring a plurality of physical channels according to the use of the information string or a receiver for receiving the information string. Which RE one physical channel should be located on for transmission should be promised in advance between a transmitter and a receiver, and a rule for the same is referred to as "mapping".

In an OFDM communication system, a DL bandwidth is configured by a plurality of resource blocks (RBs) and each physical RB (PRB) may be configured by 12 sub-carries arranged along the frequency axis and 14 or 12 OFDM symbols arranged along the time axis. The PRB serves as a basic unit for resource allocation.

A reference signal (RS) is a signal that is received from a BS so as to allow a UE to perform channel estimation, and in an LTE communication system, includes a common RS (CRS) and a demodulation RS (DMRS) as one of dedicated RSs.

The CRS may be received by all UEs as a reference signal transmitted through overall DL bandwidth, and is used in a channel estimation, forming feedback information of the UE, or a demodulation of a control channel and a data channel. The DMRS is also a reference signal transmitted through the overall DL bandwidth, is used in the demodulation of the data channel and the channel estimation of a specific UE, and is not used in forming the feedback information of the UE differently from the CRS. Therefore, the DMRS is transmitted through a PRB to be scheduled by a UE.

On the time axis, a sub-frame is configured by two slots each having a length of 0.5 msec, which include a first slot and a second slot. A physical downlink control channel (PDCCH) area, which is a control channel area, and a physical downlink shared channel (PDSCH), which is a data channel area, are divided on the time axis and are then transmitted. Further, an enhanced PDCCH (ePDCCH) area is transmitted in the data channel area. This is intended to rapidly receive and demodulate the control channel signal. Moreover, the PDCCH area is located over the entire DL bandwidth, wherein one control channel is divided into control channels of a smaller unit, which are distributed over the entire DL bandwidth.

The UL is roughly divided into a physical uplink control channel (PUCCH) and a physical uplink shared channel (PUSCH). A response channel to a DL data channel and other feedback information, if there is no data channel, may be transmitted through the control channel, and if there is the data channel, may be transmitted through the data channel.

Hereinafter, the disclosure in which a control channel such as the PDCCH, a physical HARQ indicator channel (PHICH), and the PUCCH is transmitted can be understood as that A/N for data on the control channel and other feedback information are transmitted. The disclosure in which a data channel such as the PDSCH and the PUSCH is transmitted can be understood as that DL or UL data is transmitted on the data channel. Further, an upper signal can be understood as a radio resource control (RRC) signaling (signal) or a higher layer signal.

Figure 1B:
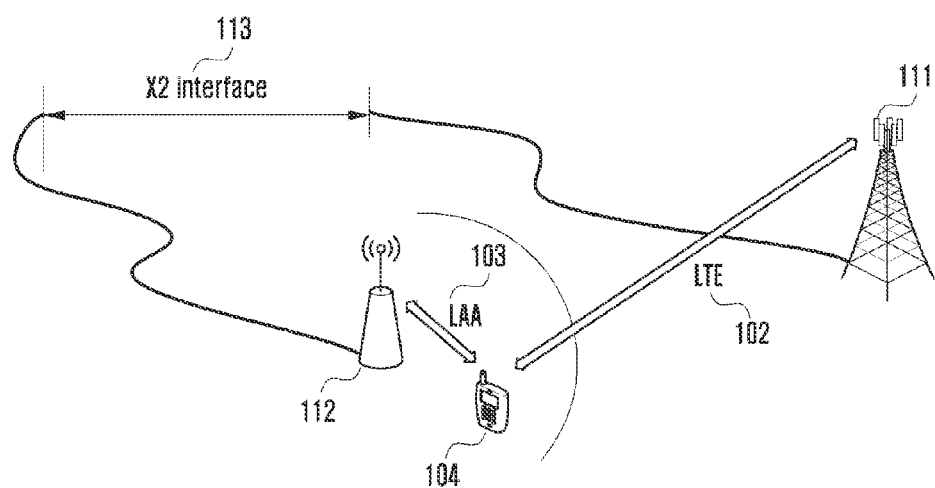

FIGS. 1A and 1B illustrate a communication system to which the present disclosure is applied according to an embodiment of the present disclosure.

Referring to FIGS. 1A and 1B, FIG. 1A shows that an LTE cell 102 and an LAA cell 103 co-exist within a small BS 101 in the network, and the UE 104 transmits/receives data to/from the BS through the LTE cell 102 and the LAA cell 103. In this case, a duplex method of the LTE cell 102 or the LAA cell 103 is not limited. However, the UL transmission is made only through the LTE cell 102 in the case where the LTE cell is the PCell. FIG. 1B shows that a macro LTE BS 111 for a wide coverage and a small LAA BS 112 for the increase in the amount of data transmission are provided, and in this case, a duplex method of the macro LTE BS 111 or the small LAA BS 112 is not limited. However, the UL transmission is made only through the macro LTE BS 111 in the case where the LTE BS is the PCell. At this time, it is assumed that the macro LTE BS 111 and the small LAA BS 112 have ideal backhaul networks. Therefore, the rapid X2 interface 113 between BSs is possible, and even though the UL data is transmitted to only the macro LTE BS 111, the small LAA BS 112 can receive the related control information in real time from the macro LTE BS 111 through the rapid X2 interface 113.

The schemes suggested by the present disclosure can be applied to both the system of FIG. 1A and the system of FIG. 1B.

1-1 Embodiment

Figure 2:
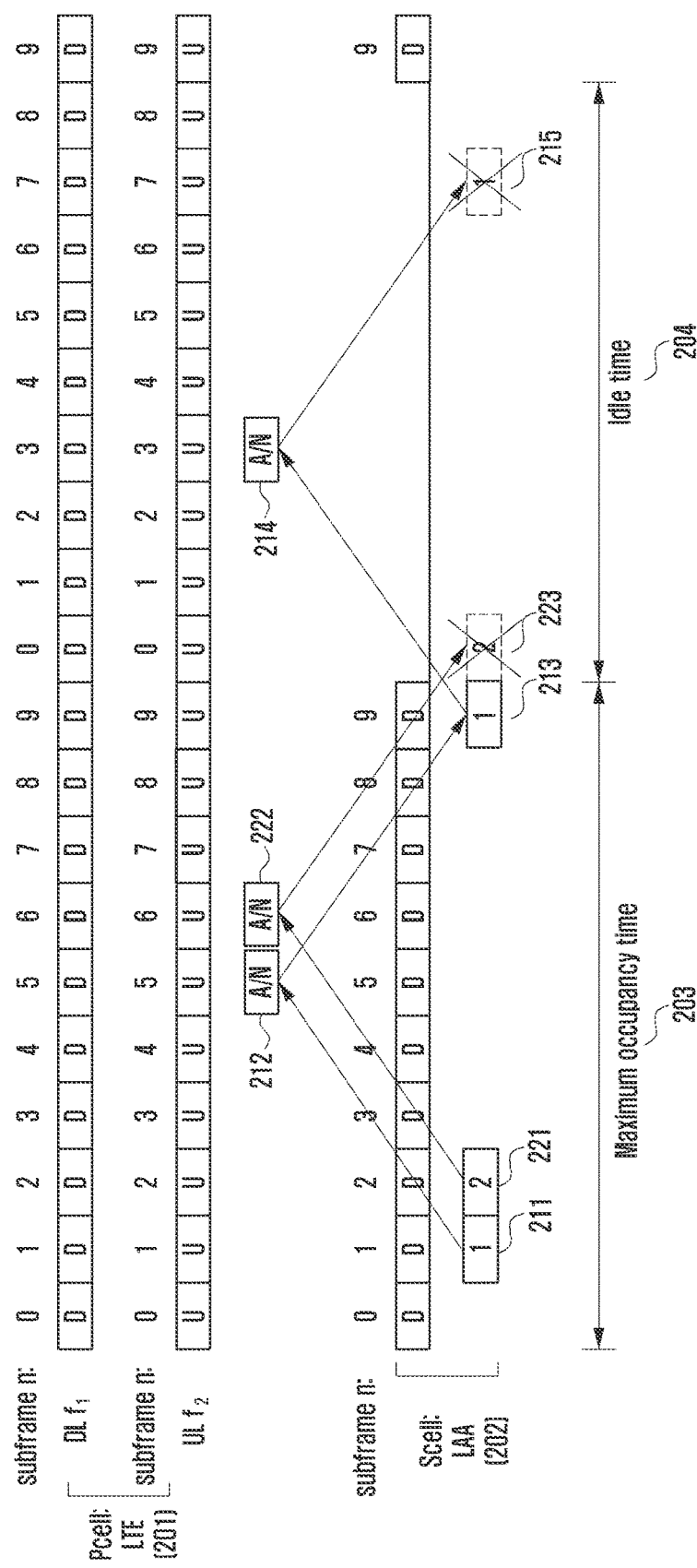
FIG. 2 is a view illustrating a downlink (DL) data transmission method according to the 1-1 embodiment of the present disclosure.

FIG. 2 is a diagram illustrating a method of transmitting DL data according to an embodiment of the present disclosure. The embodiment of FIG. 2 describes a method of transmitting an UL control channel in association with DL data in an LAA by applying an UL control channel transmission timing of an LTE cell.

Referring to FIG. 2, FIG. 2 illustrates the 1-1 embodiment associated with a DL data transmission and an UL control channel transmission.

In FIG. 2, a Pcell 201 is an LTE cell, and uses an FDD scheme. A frequency for DL transmission is f1, and a frequency for UL transmission is f2. An Scell 202 is an LAA cell and uses an FDD scheme. Only a DL transmission through a channel is illustrated in the drawing. A UE obtains DL frequency f1 that is associated with a Pcell while executing a cell search, and obtains UL frequency f2 that is associated with the Pcell by receiving system information from an LTE BS. Also, a frequency and a channel associated with an Scell may be transmitted to a UE through higher information or through system information from an LTE BS or an LAA BS.

In FIG. 2, a PDSCH of the Scell 202, which is an LAA cell, may be scheduled by the Pcell 201, which is an LTE cell, through cross-carrier scheduling, or a PDSCH of the Scell 202, which is an LAA cell, may be scheduled by the Scell 202, which is an LAA cell, through self-scheduling. When the PDSCH of the Scell 202 that is an LAA cell is scheduled by the Pcell 201 that is an LTE cell, through cross-carrier scheduling, a UE is configured through a higher signaling to monitor (blind decoding) a PDCCH/ePDCCH for scheduling a PDSCH transmitted in the Scell 202, which is an LAA cell, in the Pcell 201, which is an LTE cell. Also, when the PDSCH of the Scell 202, which is an LAA cell, is scheduled by the Scell 202 which is an LAA cell, through self-carrier scheduling, a UE is configured through a higher signaling to monitor (blind decoding) a PDCCH/ePDCCH for scheduling a PDSCH transmitted in the Scell 202, which is an LAA cell, in the Scell 202, which is an LAA cell.

When a PDSCH 211 that has a HARQ process number 1 is transmitted in subframe #1 of the Scell 202, an HARQ-ACK 212 with respect to the PDSCH 211 is transmitted in UL subframe #5 of the frequency f2 of the Pcell 201, which is located 4 subframes after subframe #1 based on an UL control channel transmission timing of an LTE FDD cell which is the Pcell 201. The HARQ process number is transmitted to a UE through a downlink control information (DCI) format of the PDCCH/ePDCCH. Start time point Immediately after finishing the maximum occupancy time 203 of the Scell 202, which is an LAA cell, a BS may suspend the transmission of all signals in the Scell 202, which is an LAA cell, and may enter an idle time 204. During the idle time 204, a frequency channel corresponding to the LAA cell 202 may be occupied by another system (Wi-Fi or another LAA system), and an LAA BS may be incapable of using the frequency channel to transmit data. The end time point and start time point, or the start time point and the length of maximum occupancy time 203, may be set in advance by a BS, or the BS may use a variable value by sensing that a Tx signal of another system does not exist in the LAA cell 202. A UE may receive information associated with the start time point and end time point or with the start time point and the length that is associated with the maximum occupancy time 203 from a BS through a higher signaling or system information, and may be aware of the start time point in time and the end time point in time of the maximum occupancy time 203 through the blind detection of a predetermined signal (for example, a synchronization signal such as a CRS, primary synchronization signal (PSS)/secondary synchronization signal (SSS), or the like). The start time point and end time point, or the start time point and the length of the idle time 204, may be set in advance by the BS, and the BS may use a variable value by sensing the existence of a Tx signal of another system in the LAA cell 202. The UE may receive, from the BS, information that is associated with the start time point and end time point, or the start time point and the length of the idle time 204, through a higher signal or system information, and may be aware of the start time point in time and the end time point in time of the idle time 204 through the blind detection of a predetermined signal (for example, a synchronization signal such as an occupancy signal, a predetermined preamble, a predetermined signal, a CRS, a PSS/SSS, or the like).

The HARQ-ACK 214 with respect to the PDSCH 213 having HARQ process number 1 is transmitted in UL subframe #3 of the frequency f2 of the Pcell 201, which is located 4 subframes after the transmission of the PDSCH 213 based on transmission timing of a UL control channel of an LTE FDD cell, which is the Pcell 201. In this instance, when the HARQ-ACK 214 indicates NACK, a PDSCH 215 having HARQ process number 1 may not be retransmitted in subframe #7 of the Scell 202, which is in the idle time 204.

Also, when a PDSCH 221 that has a HARQ process number 2 is transmitted in subframe #2 of the Scell 202, an HARQ-ACK 222 with respect to the PDSCH 221 is transmitted in UL subframe #6 of the frequency f2 of the Pcell 201, which is located 4 subframes after subframe #2 based on a UL control channel transmission timing of an LTE FDD cell, which is the Pcell 201. When the HARQ-ACK 222 indicates NACK, a PDSCH 223 having HARQ process number 2 may not be retransmitted in subframe #9 of the Scell 202, which is in the idle time 204.

As described above, due to a PDSCH that may not be retransmitted in the LAA cell 202, the amount of data transmitted may be decreased and the amount of data transmitted may be inversely proportional to the length of the idle time 204.

1-2 Embodiment

Figure 3:
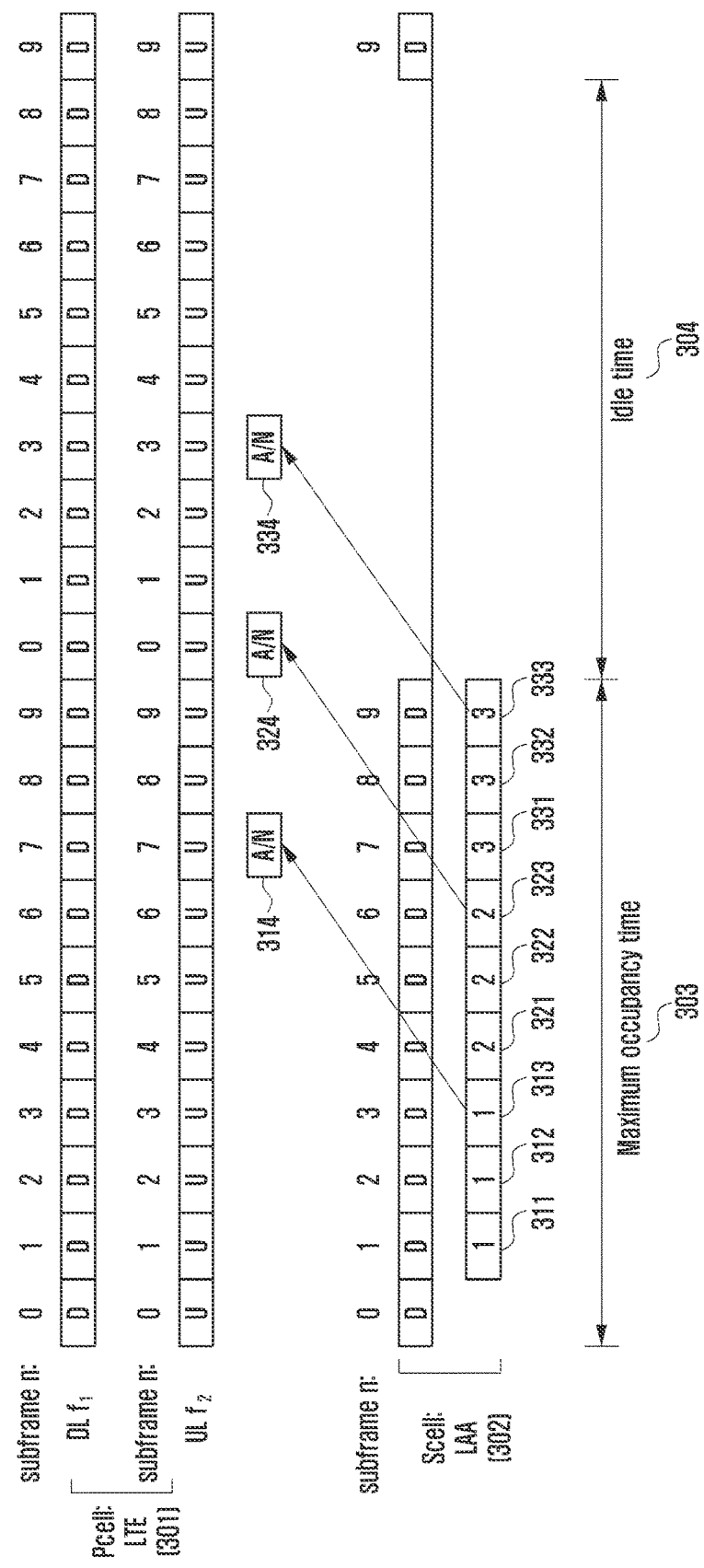
FIG. 3 is a view illustrating a DL data continuous retransmission method according to the 1-2 embodiment of the present disclosure.

FIG. 3 is a diagram illustrating a method of successively retransmitting DL data according to an embodiment of the present disclosure.

Referring to FIG. 3, FIG. 3 describes a method of transmitting a UL control channel in association with the successively retransmitted DL data in an LAA by applying a UL control channel transmission timing of an LTE cell.

Referring to FIG. 3, FIG. 3 illustrates the 1-2 embodiment associated with a DL data transmission and a UL control channel transmission.

In FIG. 3, a Pcell 301 is an LTE cell, and uses an FDD scheme. A frequency for DL transmission is f1, and a frequency for UL transmission is f2. An Scell 302 is an LAA cell and uses an FDD scheme. Only a DL transmission through a channel is illustrated in the drawing. A UE obtains DL frequency f1 associated with a Pcell while executing for a cell search, and obtains UL frequency f2 associated with the Pcell by receiving system information from an LTE BS. Also, a frequency and a channel associated with an Scell may be transmitted to a UE through higher information or system information from an LTE BS or an LAA BS.

In FIG. 3, a PDSCH of the Scell 302, which is an LAA cell, may be scheduled by the Pcell 301, which is an LTE cell, through cross-carrier scheduling, or a PDSCH of the Scell 302, which is an LAA cell, may be scheduled by the Scell 302, which is an LAA cell, through self-scheduling. When the PDSCH of the Scell 302, which is an LAA cell, is scheduled by the Pcell 301, which is an LTE cell, through cross-carrier scheduling, a UE is configured through a higher signaling to monitor (blind decoding) a PDCCH/ePDCCH for scheduling a PDSCH that is transmitted in the Scell 302, which is an LAA cell, in the Pcell 301, which is an LTE cell. Also, when the PDSCH of the Scell 302, which is an LAA cell, is scheduled by the Scell 302, which is an LAA cell, through self-carrier scheduling, a UE is configured through a higher signaling to monitor (blind decoding) a PDCCH/ePDCCH for scheduling a PDSCH transmitted in the Scell 302, which is an LAA cell, in the Scell 302, which is an LAA cell.

In FIG. 3, the successive retransmission of a PDSCH is executed in the LAA cell 302. The successive retransmission indicates that a PDSCH that has an identical HARQ process number is transmitted in each DL subframe. When the successive retransmission is triggered, PDSCHs that have an identical HARQ process number are retransmitted in successive DL subframes. A point in time (a subframe) when the successive retransmission is triggered may be defined to begin from a predetermined subframe based on maximum occupancy time, or may be set by a higher signaling. Information associated with the number of DL subframes, through which PDSCHs that have an identical HARQ process number are to be transmitted, may be transmitted by being set through a predetermined field of a DCI format (for example, a new data indicator (NDI) and an additional one bit, a redundancy version (RV) field, a modulation and coding scheme (MCS) field, or additional two bits) or the like, or may be set through a higher signaling or system information. The BS determines the number of DL subframes where successive retransmission is to be executed, based on a DL transmission history (e.g., MCS, channel quality indicator (CQI) information or the number of times of retransmission) associated with a predetermined UE in the Scell 302, which is an LAA cell, and instructs the UE to execute reception. The allocation of an MCS, a RV, and an RB in the successive retransmission may be dynamically set through a DCI format of a PDCCH/ePDCCH transmitted in each DL subframe, or the allocation of a predetermined MCS, a predetermined RV pattern, or a predetermined RB may be set by a higher signaling or system information, or the allocation of a predetermined MCS, a predetermined RV pattern, or a predetermined RB may be defined in the specification.

FIG. 3 illustrates the case in which a BS triggers the successive retransmission in DL subframe #1 of the LAA cell 302, configures and indicates the successive retransmission through three DL subframes, and the maximum occupancy time is 10 ms (ten subframes). PDSCHs 311, 312, and 313 that have a HARQ process number 1 are successively retransmitted through subframes #1, #2, and #3 in the Scell 302, and a HARQ-ACK 314 with respect to the PDSCHs 311, 312, and 313 in subframes #1, #2, and #3 is transmitted in UL subframe #7 of the frequency f2 of the Pcell 301, located four subframes after the transmission of a PDSCH in the last DL subframe #3 of the successive retransmission, based on the UL control channel transmission timing of the LTE FDD cell of the Pcell 301. The HARQ process number is transmitted to a UE through a DCI format of the PDCCH/ePDCCH. When the HARQ-ACK 314 indicates NACK, the retransmission may be performed by a BS or an initial transmission may be performed by the BS during a subsequent maximum occupancy time.

Subsequently, PDSCHs 321, 322, and 323 that have a HARQ process number 2 are successively retransmitted through subframes #4, #5, and #6 in the Scell 302, and a HARQ-ACK 324 with respect to the PDSCHs 321, 322, and 323 in subframes #4, #5, and #6 is transmitted in UL subframe #0 of the frequency f2 of the Pcell 301, located four subframes after the transmission of a PDSCH in the last DL subframe #6 of the successive retransmission, based on the UL control channel transmission timing of the LTE FDD cell of the Pcell 301. When the HARQ-ACK 324 indicates NACK, the retransmission may be performed by a BS or an initial transmission may be performed by the BS during a subsequent maximum occupancy time.

Subsequently, PDSCHs 331, 332, and 333 that have a HARQ process number 3 are successively retransmitted through subframes #7, #8, and #9 in the Scell 302, and a HARQ-ACK 334 with respect to the PDSCHs 331, 332, and 333 in subframes #7, #8, and #9 are transmitted in UL subframe #3 of the frequency f2 of the Pcell 301, which is located four subframes after the transmission of a PDSCH in the last DL subframe #9 of the successive retransmission based on the UL control channel transmission timing of the LTE FDD cell of the Pcell 301. When the HARQ-ACK 334 indicates NACK, the retransmission may be performed by a BS or an initial transmission may be performed by the BS during a subsequent maximum occupancy time.

Immediately after finishing the maximum occupancy time 303 of the Scell 302, which is an LAA cell, a BS may suspend the transmission of all signals in the Scell 302, which is an LAA cell and may enter an idle time 304. During the idle time 304, a frequency channel corresponding to the LAA cell 302 may be occupied by another system (Wi-Fi or another LAA system), and an LAA BS may be incapable of using the frequency channel for the transmission of data. A start time point and end time point or a start time point and a length of maximum occupancy time 303 may be set in advance by a BS, or the BS may use a variable value by sensing that a Tx signal of another system does not exist in the LAA cell 302. A UE may receive information associated with a start time point and an end time point or a start time point and a length associated with the maximum occupancy time 303 from a BS through a higher signaling or system information, and may be aware of a start time point in time and an end time point in time of the maximum occupancy time 303 through the blind detection of a predetermined signal (for example, a synchronization signal such as a CRS, PSS/SSS, or the like). A start time point and an end time point or a start time point and a length of the idle time 304 may be set in advance by a BS, or the BS may use a variable value by sensing whether a Tx signal exists in the LAA cell 302. The UE may receive, from the BS, information associated with the start time point and end time point, or the start time point and the length of the idle time 304 through a higher signal or system information, and may be aware of a start time point in time and an end time point in time of the idle time 304 through the blind detection of a predetermined signal (for example, a synchronization signal such as an occupancy signal, a predetermined preamble, a predetermined signal, a CRS, a PSS/SSS, or the like).

Through the successive retransmission of FIG. 3, a BS may aggressively transmit DL data to a UE, and the UE executes chase-combining on the successively retransmitted PDSCHs and thus, may increase the rate of successful decoding. Therefore, the transmission of DL data is completed within the maximum occupancy time and thus, the amount of data transmitted may be increased.

Figure 4A:
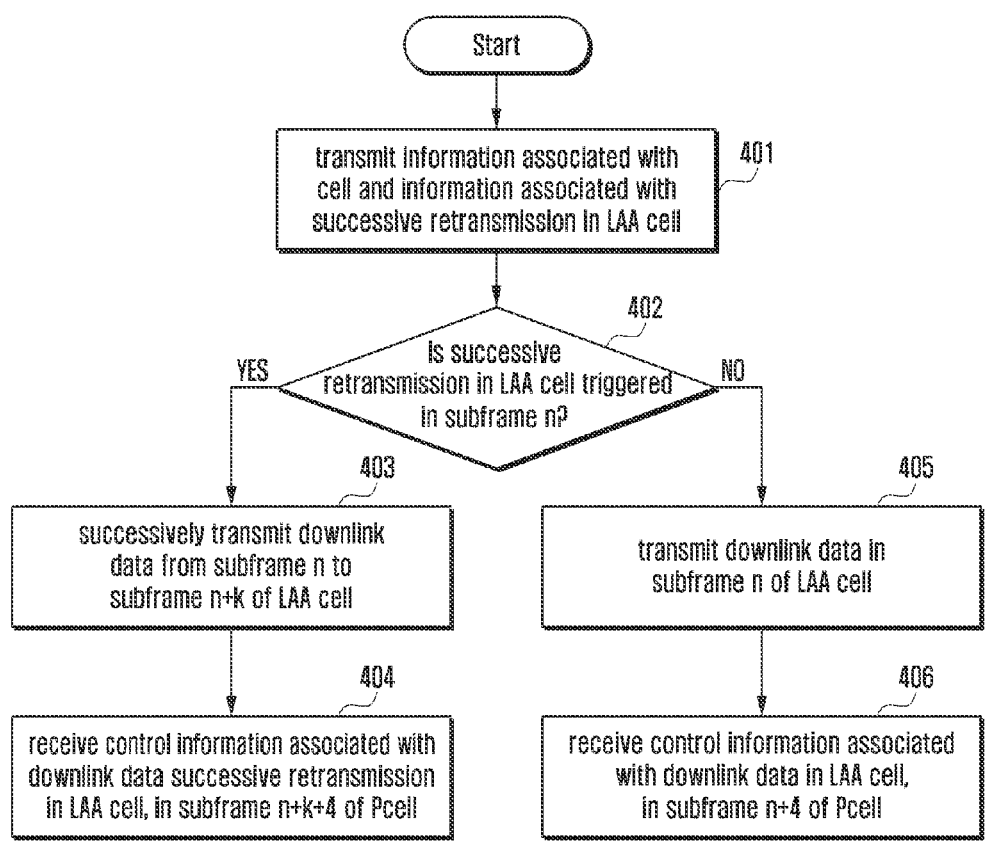
FIGS. 4A and 4B are flowcharts illustrating operations of a base station (BS) and a user equipment (UE) for a DL data continuous retransmission method according to the 1-2 embodiment of the present disclosure.
Figure 4B:
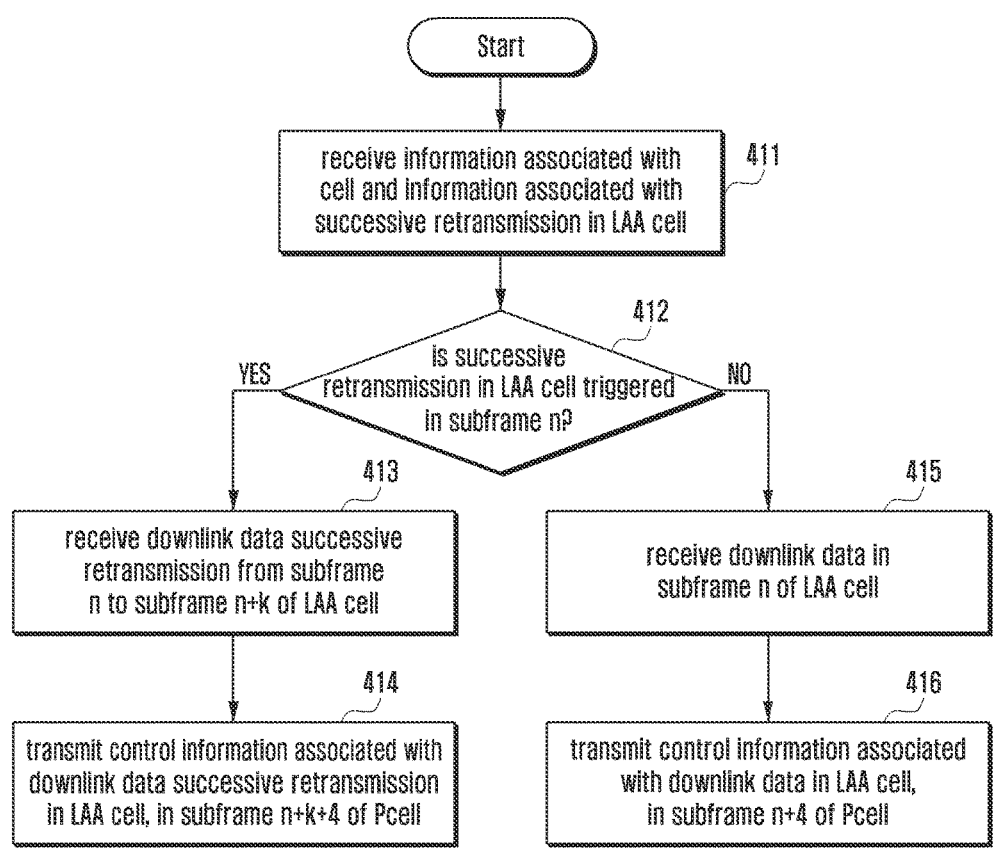

FIGS. 4A and 4B are flowcharts illustrating the operations of a BS and a UE in association with a method of successively transmitting downlink data according to the 1-2 embodiment of the present disclosure. The embodiments of FIG. 4A describes the operations of a BS for executing DL data successive retransmission of FIG. 3. Here, a BS may be an LTE BS or an LAA BS.

Referring to FIGS. 4A and 4B, in operation 401, a BS transmits, to a UE, information associated with an LTE cell (Pcell) and an LAA cell (Scell), and transmits, to the UE, configuration information associated with the successive retransmission in the LAA cell. The information associated with the LTE cell (Pcell) and the LAA cell (Scell) may be UL and DL frequency information when the LTE cell or the LAA cell is a FDD scheme, and may be UL-DL configuration information and special subframe configuration information when the LTE cell or the LAA cell is a TDD scheme. Also, this may be information associated with maximum occupancy time or idle time of the LAA cell. The information associated with the LTE cell and the LAA cell may be transmitted to the UE through system information or higher signaling. The configuration information associated with the successive retransmission in the LAA cell may be a point in time when the successive retransmission is triggered (subframe), information associated with the number of DL subframes through which PDSCHs having an identical HARQ process number are to be transmitted, and information associated with the allocation of an MCS, an RV, and an RB when successive retransmission is executed. The information associated with the successive retransmission in the LAA cell may be transmitted to the UE through system information or higher signaling. In operation 402, the BS determines whether the successive retransmission in the LAA cell is triggered in a subframe n. When it is determined that the successive retransmission in the LAA cell is triggered in the subframe n in operation 402, the BS executes a successive retransmission of DL data from a DL subframe n to a DL subframe n+k of the LAA cell in operation 403. k indicates the number of DL subframes through which PDSCHs that have an identical HARQ process number are to be retransmitted. That is, when the successive retransmission is executed through three successive subframes, k=3. In operation 404, the BS receives control information associated with the DL data successive retransmission in the LAA cell in an UL subframe n+k+4 of the LTE cell, which is a Pcell.

When it is determined that the successive retransmission in the LAA cell is not triggered in the subframe n in operation 402, the BS proceeds with general transmission of DL data in the subframe n of the LAA cell in operation 405. In operation 406, the BS receives control information associated with the DL data of the LAA cell in a UL subframe n+4 of the LTE cell, which is a Pcell.

Subsequently, the embodiments of FIG. 4B describes the operations of a UE for executing DL data successive retransmission of FIG. 3. In operation 411, a UE receives, from a BS, information associated with an LTE cell (Pcell) and an LAA cell (Scell), and receives, from the BS, configuration information associated with the successive retransmission in the LAA cell. Here, the BS may be an LTE BS or an LAA BS. The information associated with the LTE cell (Pcell) and the LAA cell (Scell) may be UL and DL frequency information when the LTE cell or the LAA cell is an FDD, and may be UL-DL configuration information and special subframe configuration information when the LTE cell or the LAA cell is a TDD. Also, this may be information associated with maximum occupancy time or idle time of the LAA cell. The information associated with the LTE cell and the LAA cell may be received from the BS through system information or through higher signaling. The configuration information associated with the successive retransmission in the LAA cell may be a point in time when the successive retransmission is triggered (subframe), information associated with the number of DL subframes through which PDSCHs having an identical HARQ process number are to be transmitted, and information associated with the allocation of an MCS, an RV, and an RB when successive retransmission is executed. The information associated with the successive retransmission in the LAA cell may be received from the BS through system information or higher signaling. In operation 412, the UE determines whether the successive retransmission in the LAA cell is triggered in a subframe n. When it is determined that the successive retransmission in the LAA cell is triggered in the subframe n in operation 412, the UE receives, from the BS, DL data successively retransmitted from a DL subframe n to a DL subframe n+k of the LAA cell in operation 413. k indicates the number of downlink subframes through which PDSCHs that have an identical HARQ process number are to be retransmitted. That is, when the successive retransmission is executed through three successive subframes, k=3. In operation 414, the UE transmits control information associated with the DL data successive retransmission in the LAA cell in a UL subframe n+k+4 of the LTE cell, which is a Pcell. When it is determined that the successive retransmission in the LAA cell is not triggered in the subframe n in operation 412, the UE executes a general reception of DL data from the BS in the subframe n of the LAA cell in operation 415. In operation 416, the UE transmits, to the BS, control information associated with the DL data of the LAA cell in a UL subframe n+4 of the LTE cell, which is a Pcell.

1-3 Embodiment

Figure 5:
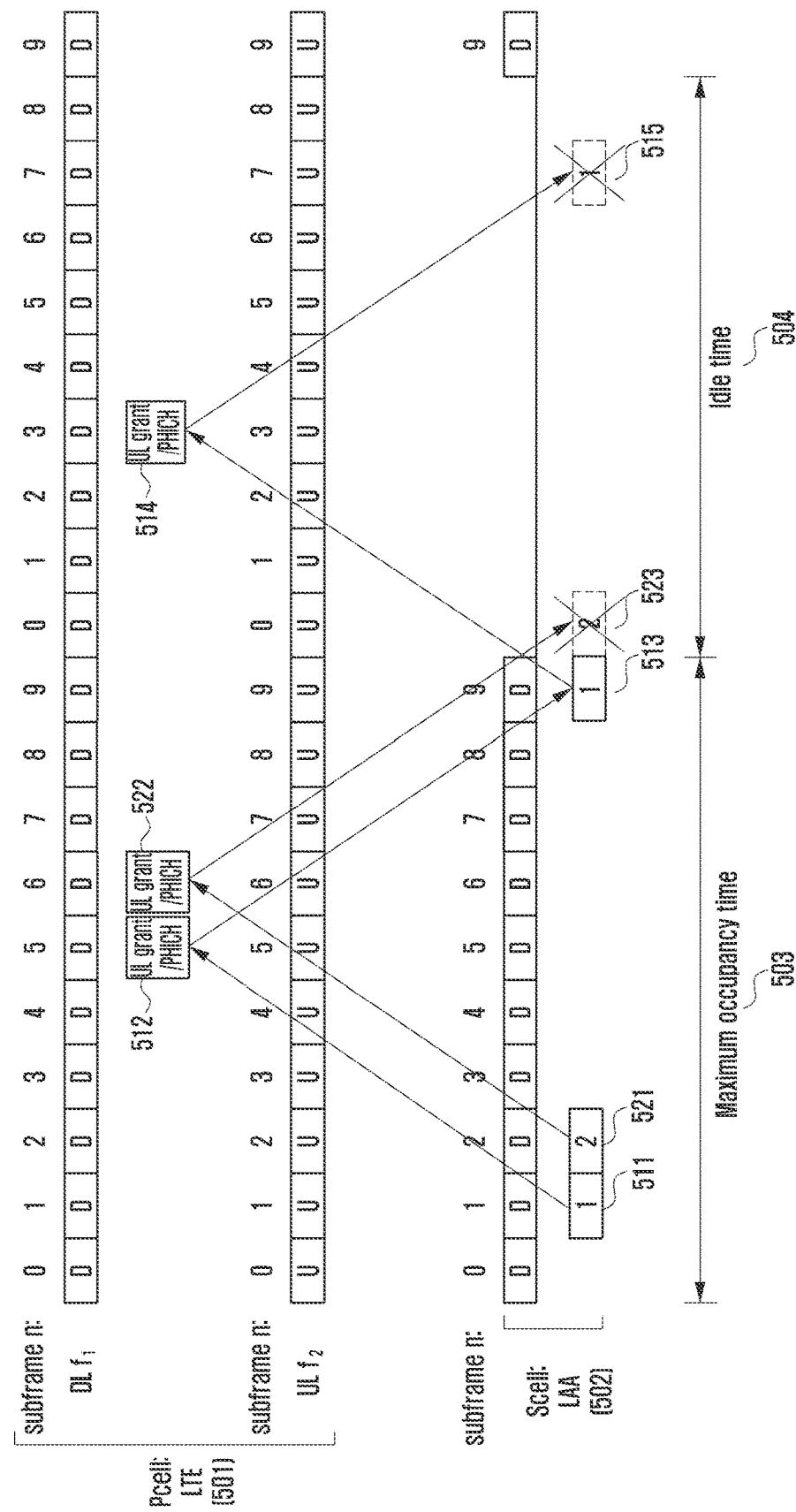
FIG. 5 is a view illustrating an uplink (UL) data transmission method according to the 1-3 embodiment of the present disclosure.

FIG. 5 is a diagram illustrating a method of transmitting UL data according to an embodiment of the present disclosure. The embodiment of FIG. 5 describes a method of transmitting a DL control channel in association with UL data in an LAA by applying a DL control channel transmission timing in an LTE cell.

Referring to FIG. 5, FIG. 5 illustrates a first embodiment associated with a UL data transmission and a DL control channel transmission.

In FIG. 5, a Pcell 501 is an LTE cell, and uses an FDD scheme. The frequency for DL transmission is f1, and the frequency for UL transmission is f2. An Scell 502 is an LAA cell and uses an FDD scheme. Only a UL transmission through a channel is illustrated in the drawing. A UE obtains DL frequency f1 associated with a Pcell while executing a cell search and obtains UL frequency f2 associated with the Pcell by receiving system information from an LTE BS. Also, the frequency and channel associated with an Scell may be transmitted to a UE through higher signaling or system information from an LTE BS or an LAA BS.

In FIG. 5, a PUSCH of the Scell 502, which is an LAA cell, may be scheduled by the Pcell 501, which is an LTE cell, through cross-carrier scheduling, or a PUSCH of the Scell 502, which is an LAA cell, may be scheduled by the Scell 502, which is an LAA cell, through self-scheduling. In the diagram, an unlicensed band channel of an LAA cell that transmits a PDCCH/ePDCCH for self-scheduling is not illustrated because cross-carrier scheduling is assumed. However, it is assumed that an unlicensed band channel of the LAA cell that transmits a DL exists. When the PUSCH of the Scell 502, which is an LAA cell, is scheduled by the Pcell 501, which is an LTE cell, through cross-carrier scheduling, a UE is configured through a higher signaling to monitor (blind decoding) a PDCCH/ePDCCH for scheduling a PUSCH that is transmitted in the Scell 502, which is an LAA cell, in the Pcell 501, which is an LTE cell. Also, when the PUSCH of the Scell 502, which is an LAA cell, is scheduled by the Scell 502, which is an LAA cell, through self-carrier scheduling, a UE is configured through a higher signaling to monitor (blind decoding) a PDCCH/ePDCCH for scheduling a PUSCH that is transmitted in the Scell 502, which is an LAA cell, in the Scell 502, which is an LAA cell.

When a PUSCH 511 that has a HARQ process number 1 is transmitted in subframe #1 of the Scell 502, a UL grant/PHICH 512, which is an HARQ-ACK with respect to the PUSCH 511, is transmitted in DL subframe #5 of the frequency f1 of the Pcell 501, which is located 4 subframes after subframe #1 based on a DL control channel transmission timing of an LTE FDD cell, which is the Pcell 501. Unlike the DL data transmission, in the UL data transmission, the HARQ process number is not separately transmitted to the UE, and may be implicitly determined based on a PUSCH that is transmitted in each subframe. That is, the BS distinguishes a HARQ process number when receiving and decoding PUSCHs that are transmitted from the UE in different subframes. For ease of description, the present disclosure assigns a HARQ process number for each PUSCH transmission, and distinguishes PUSCH transmissions. When the UL grant/PHICH 512 indicates NACK, the PUSCH 513 having HARQ process number 1 may be retransmitted in subframe #9 of the Scell 502. Immediately after finishing the maximum occupancy time 503 of the Scell 502, which is an LAA cell, the BS may suspend the transmission of all signals in the Scell 302, which is an LAA cell, and may enter an idle time 504. During the idle time 504, a frequency channel corresponding to the LAA cell 502 may be occupied by another system (Wi-Fi or another LAA system), and an LAA BS and the UE may be incapable of using the frequency channel for the transmission of data. The start time point and end time point, or the start time point and the length of the maximum occupancy time 503 may be set in advance by the BS, and the BS may use a variable value by sensing that a Tx signal of another system does not exist in the LAA cell 502. The UE may receive, from the BS, information associated with the start time point and end time point, or the start time point and the length of the maximum occupancy time 503, through a higher signal or system information, and may be aware of a start point in time and an end time point in time of the maximum occupancy time 503 through the blind detection of a predetermined signal (for example, a synchronization signal such as a CRS, a PSS/SSS, or the like). That is, in the present disclosure, although an LAA cell is a UL, when it is agreed that a DL transmission is to be executed in a predetermined subframe, like in a TDD cell, and a BS executes the DL transmission of a predetermined signal, a UE may execute blind detection for the maximum occupancy time. The start time point and end time point, or the start time point and the length of the idle time 504 may be set in advance by the BS, and the BS may use a variable value by sensing the existence of a Tx signal of another system in the LAA cell 502. The UE may receive, from the BS, information that is associated with the start time point and end time point, or the start time point and the length of the idle time 504, through a higher signal or system information, and may be aware of a start time point in time and an end time point in time of the idle time 504 through blind detection of a predetermined signal (for example, a synchronization signal such as an occupancy signal, a predetermined preamble, a predetermined signal, a CRS, a PSS/SSS, or the like). That is, in the present disclosure, although an LAA cell is a UL, when it is agreed that a DL transmission is to be executed in a predetermined subframe, like in a TDD cell, and a BS executes the DL transmission of a predetermined signal, a UE may execute blind detection for the idle time.

A UL grant/PHICH 514 with respect to the PUSCH 513 having HARQ process number 1 is transmitted in DL subframe #3 of the frequency f1 of the Pcell 501, which is located 4 subframes after the transmission of the PUSCH 513 based on a DL control channel transmission timing of an LTE FDD cell which is the Pcell 501. In this instance, when the UL grant/PHICH 514 indicates NACK, a PUSCH 515 having HARQ process number 1 may not be retransmitted in subframe #7 of the Scell 502, which is in the idle time 504.

Also, when a PUSCH 521 that has a HARQ process number 2 is transmitted in subframe #2 of the Scell 502, a UL grant/PHICH 522, which is an HARQ-ACK with respect to the PUSCH 521, is transmitted in DL subframe #6 of the frequency f1 of the Pcell 501, which is located 4 subframes after subframe #2 based on a DL control channel transmission timing of an LTE FDD cell, which is the Pcell 501. When the UL grant/PHICH 522 indicates NACK, a PUSCH 523 that has a HARQ process number 2 may not be retransmitted in subframe #9 of the Scell 502, which is in the idle time 504.

As described above, due to a PUSCH that may not be retransmitted in the LAA cell 502, the amount of data transmitted may be decreased and the amount of data transmitted may be inversely proportional to the length of the idle time 504.

1-4 Embodiment

Figure 6:
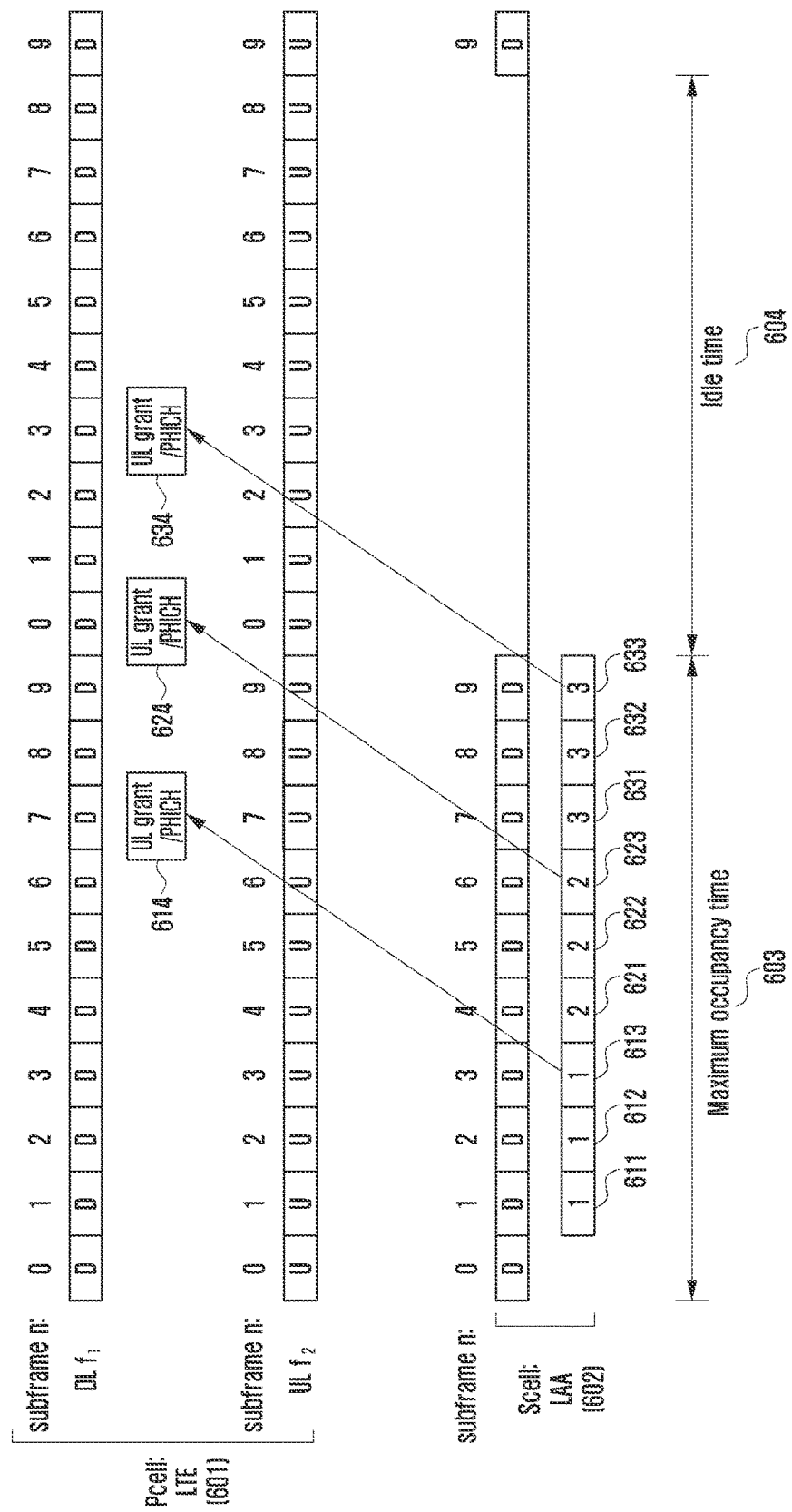
FIG. 6 is a view illustrating a UL data continuous retransmission method according to the 1-4 embodiment of the present disclosure.

FIG. 6 is a diagram illustrating a method of successively retransmitting UL data according to an embodiment of the present disclosure.

Referring to FIG. 6, FIG. 6 describes a method of transmitting a DL control channel in association with the successive retransmission of UL data in an LAA by applying a DL control channel transmission timing of an LTE cell.

Referring to FIG. 6, FIG. 6 illustrates the 1-4 embodiment associated with a UL data transmission and a DL control channel transmission.

In FIG. 6, a Pcell 601 is an LTE cell, and uses an FDD scheme. A frequency for DL transmission is f1, and a frequency for UL transmission is f2. An Scell 602 is an LAA cell and uses an FDD scheme. Only a UL transmission through a channel is illustrated in the drawing. A UE obtains DL frequency f1 that is associated with a Pcell while executing a cell search, and obtains UL frequency f2 that is associated with the Pcell by receiving system information from an LTE BS. Also, a frequency and a channel associated with an Scell may be transmitted to a UE through higher signaling or system information from an LTE BS or an LAA BS.

In FIG. 6, a PUSCH of the Scell 502, which is an LAA cell, may be scheduled by the Pcell 601, which is an LTE cell, through cross-carrier scheduling, or a PUSCH of the Scell 602, which is an LAA cell, may be scheduled by the Scell 602, which is an LAA cell, through self-scheduling. In the diagram, an unlicensed band channel of an LAA cell that transmits a PDCCH/ePDCCH for self-scheduling is not illustrated, since cross-carrier scheduling is assumed. However, it is assumed that an unlicensed band channel of the LAA cell that transmits a DL exists. When the PUSCH of the Scell 602, which is an LAA cell, is scheduled by the Pcell 601, which is an LTE cell, through cross-carrier scheduling, a UE is configured, through a higher signaling, to monitor (blind decoding) a PDCCH/ePDCCH for scheduling a PUSCH transmitted in the Scell 602, which is an LAA cell, in the Pcell 601, which is an LTE cell. Also, when the PUSCH of the Scell 602, which is an LAA cell, is scheduled by the Scell 602, which is an LAA cell, through self-carrier scheduling, a UE is configured through a higher signaling to monitor (blind decoding) a PDCCH/ePDCCH for scheduling a PUSCH transmitted in the Scell 602, which is an LAA cell, in the Scell 602, which is an LAA cell.

In FIG. 6, the successive retransmission of a PUSCH is executed in the LAA cell 602. The successive retransmission indicates that a PUSCH that has an identical HARQ process number is transmitted in each UL subframe. When the successive retransmission is triggered, PUSCHs that have an identical HARQ process number are retransmitted in successive UL subframes. Unlike the DL data transmission, in the UL data transmission, the HARQ process number is not separately transmitted to the UE, and may be implicitly determined based on a PUSCH transmitted in each subframe. That is, the BS distinguishes a HARQ process number when receiving and decoding PUSCHs transmitted from the UE in different subframes. For ease of description, the present disclosure assigns a HARQ process number for each PUSCH transmission, and distinguishes PUSCH transmissions. A point in time (a subframe) when the successive retransmission is triggered may be defined to begin from a predetermined subframe based on maximum occupancy time, or may be set by a higher signaling. Alternatively, the successive retransmission may be triggered by defining a point in time when a UL grant that schedules the successive retransmission of a PUSCH is transmitted, or may be set to be triggered by a higher signaling. Information associated with the number of UL subframes through which PUSCHs that have an identical HARQ process number are to be transmitted may be transmitted by being set in a predetermined field of a DCI format (for example, NDI and an additional one bit, two bits in a MCS/RV field or additional two bits) or the like, or may be set through a higher signaling or system information. The BS determines the number of UL subframes where successive retransmission is to be executed, based on a UL transmission history associated with a predetermined UE in the Scell 602, which is an LAA cell, and instructs the UE to execute the transmission. The allocation of an MCS/RV and an RB in the successive retransmission may be set through a DCI format of a PDCCH/ePDCCH, which schedules a PUSCH that is transmitted in a first UL subframe of the successive retransmission and is located four subframes before the first UL subframe, or the allocation of a predetermined MCS, a predetermined RV pattern, or a predetermined RB may be set by a higher signaling or system information, or the allocation of a predetermined MCS, a predetermined RV pattern, or a predetermined RB may be defined in the specification.

FIG. 6 illustrates an embodiment when the BS configures and indicates, for the UE, a successive retransmission in successive three UL subframes from a predetermined UL subframe of the LAA cell 602, and the maximum occupancy time is 10 ms (ten subframes).

In DL subframe #7 of the LTE cell 601, that is, a subframe located four subframes before subframe #1 of the LAA cell 602, a PUSCH for a successive retransmission is scheduled through a UL grant, and the successive retransmission may be triggered as described above. PUSCHs 611, 612, and 613 having HARQ process number 1 are successively retransmitted through subframes #1, #2, and #3 in the Scell 602, and a UL grant/PHICH 614, which is a HARQ-ACK with respect to the PUSCHs 611, 612, and 613 in subframes #1, #2, and #3 is transmitted in DL subframe #7 of the frequency f1 of the Pcell 601, located four subframes after the transmission of a PUSCH in the last UL subframe #3 of the successive retransmission based on the DL control channel transmission timing of the LTE FDD cell of the Pcell 601. When the UL grant/PHICH 614 indicates NACK, the transmission may be indicated by the BS or the initial transmission may be indicated by the BS during a subsequent maximum occupancy time.

In DL subframe #0 of the LTE cell 601, that is, a subframe located four subframes before subframe #4 of the LAA cell 602, a PUSCH for successive retransmission is scheduled through UL grant. PUSCHs 621, 622, and 623 that have a HARQ process number 2 are successively retransmitted through subframes #4, #5, and #6 in the Scell 602, and a UL grant/PHICH 624, which is a HARQ-ACK with respect to the PUSCHs 621, 622, and 623 in subframes #4, #5, and #6 is transmitted in DL subframe #0 of the frequency f1 of the Pcell 601, located four subframes after the transmission of a PUSCH in the last UL subframe #6 of the successive retransmission based on the DL control channel transmission timing of the LTE FDD cell of the Pcell 601. When the UL grant/PHICH 624 indicates NACK, the transmission may be performed by the BS or the initial transmission may be performed by the BS during a subsequent maximum occupancy time.

In DL subframe #3 of the LTE cell 601, that is, a subframe located four subframes before subframe #7 of the LAA cell 602, a PUSCH for successive retransmission is scheduled through UL grant. PUSCHs 631, 632, and 633 that have a HARQ process number 3 are successively retransmitted through subframes #7, #8, and #9 in the Scell 602, and a UL grant/PHICH 634, which is a HARQ-ACK with respect to the PUSCHs 631, 632, and 633 in subframes #7, #8, and #9 is transmitted in DL subframe #3 of the frequency f1 of the Pcell 601, located four subframes after the transmission of a PUSCH in the last UL subframe #9 of the successive retransmission based on the DL control channel transmission timing of the LTE FDD cell of the Pcell 601. When the UL grant/PHICH 634 indicates NACK, the transmission may be performed or the initial transmission may be performed by the BS during a subsequent maximum occupancy time.

Immediately after finishing the maximum occupancy time 603 of the Scell 602, which is an LAA cell, the BS suspends the transmission of all signals in the Scell 602, which is an LAA cell, and enters the idle time 604. During the idle time 604, a frequency channel corresponding to the LAA cell 602 may be occupied by another system (Wi-Fi or another LAA system), and an LAA BS may be incapable of using the frequency channel for the transmission of data. The start time point and end time point, or the start time point and the length of the maximum occupancy time 603 may be set in advance by the BS, and the BS may use a variable value by sensing that a Tx signal of another system does not exist in the LAA cell 602. The UE may receive, from the BS, information associated with the start time point and end time point, or the start time point and the length of the maximum occupancy time 603, through a higher signal or system information, and may be aware of a start time point in time and an end time point in time of the maximum occupancy time 603 through the blind detection of a predetermined signal (for example, a synchronization signal such as a CRS, a PSS/SSS, or the like). That is, in the present disclosure, although an LAA cell is a UL, when it is agreed that a DL transmission in a predetermined subframe, like in a TDD cell, and a BS executes the DL transmission of a predetermined signal, a UE may execute blind detection for the maximum occupancy time. The start time point and end time point, or the start time point and the length of the idle time 604 may be set in advance by the BS, and the BS may use a variable value by sensing the existence of a Tx signal of another system in the LAA cell 602. The UE may receive, from the BS, information associated with the start time point and end time point, or the start time point and the length of the idle time 604, through a higher signal or system information, and may be aware of a start time point in time and an end time point in time of the idle time 604 through the blind detection of a predetermined signal (for example, a synchronization signal such as an occupancy signal, a predetermined preamble, a predetermined signal, a CRS, a PSS/SSS, or the like). That is, in the present disclosure, although an LAA cell is a UL, when it is agreed that a DL transmission is to be executed in a predetermined subframe, like in a TDD cell, and a BS executes the DL transmission of a predetermined signal, a UE may execute blind detection for the idle time.

Through the successive retransmission of FIG. 6, a BS may aggressively instruct a UE to transmit UL data, and the BS executes chase-combining on the successively retransmitted PDSCHs and thus, may increase a rate of successful decoding data. Therefore, the transmission of UL data is completed within the maximum occupancy time and, thus, the amount of data transmitted may be increased.

Figure 7A:
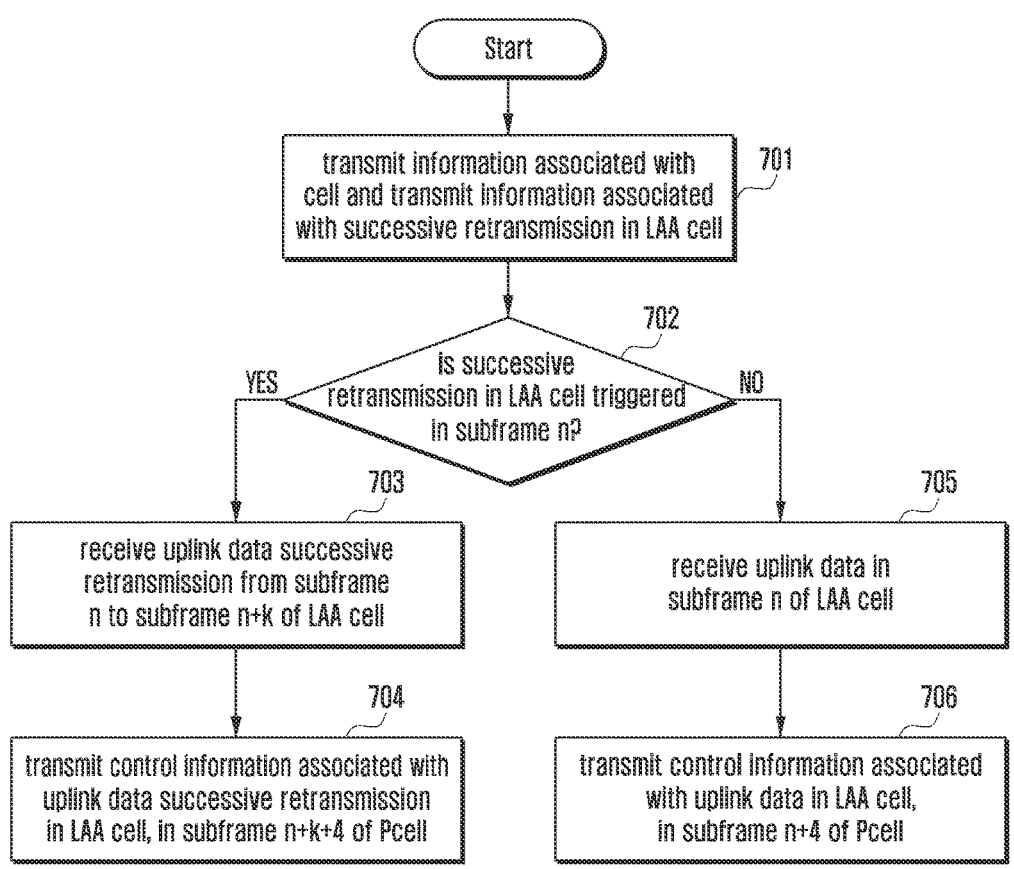
FIGS. 7A and 7B are flowcharts illustrating operations of a BS and a UE for a data continuous retransmission method according to the 1-4 embodiment of the present disclosure.
Figure 7B:
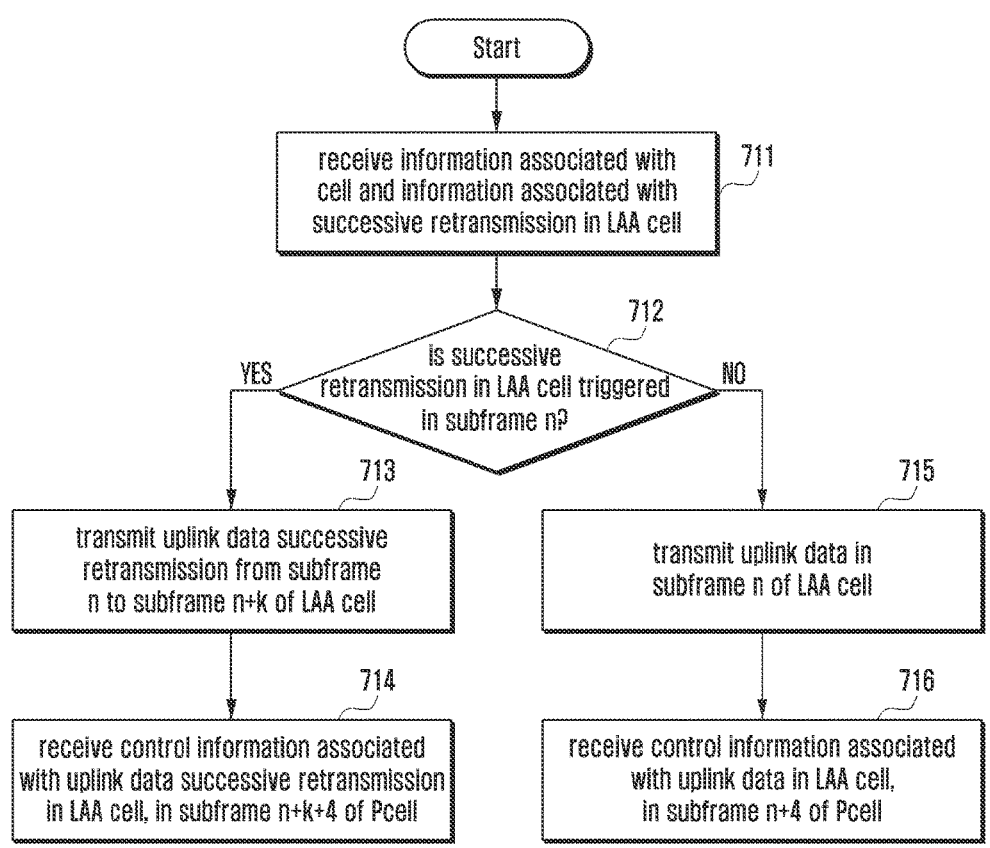

FIGS. 7A and 7B are flowcharts illustrating the operations of a BS and a UE in association with a method of successively transmitting UL data according to the 1-4 embodiment of the present disclosure. The embodiments of FIG. 7A describes the operations of a BS for executing UL data successive retransmission of FIG. 6. Here, a BS may be an LTE BS or an LAA BS.

Referring to 7A and 7B, in operation 701, a BS transmits, to a UE, information associated with an LTE cell (Pcell) and an LAA cell (Scell), and transmits, to the UE, configuration information associated with the successive retransmission in the LAA cell. The information associated with the LTE cell (Pcell) and the LAA cell (Scell) may be UL and DL frequency information when the LTE cell or the LAA cell is an FDD scheme, and may be UL-DL configuration information and special subframe configuration information when the LTE cell or the LAA cell is a TDD scheme. Also, the information may be information associated with the maximum occupancy time or idle time of an LAA cell. The information associated with the LTE cell and the LAA cell may be transmitted to the UE through system information or higher signaling. The configuration information associated with the successive retransmission in the LAA cell may be a point in time when the successive retransmission is triggered (subframe), a point in time when a UL grant that schedules the successive retransmission is transmitted, information associated with the number of UL subframes through which PUSCHs that have an identical HARQ process number are to be transmitted, and information associated with the allocation of an MCS/RV, and an RB when successive retransmission is executed. The information associated with the successive retransmission in the LAA cell may be transmitted to the UE through system information or higher signaling. In operation 702, the BS determines whether the successive retransmission in the LAA cell is triggered in a subframe n. When it is determined that the successive retransmission in the LAA cell is triggered in the subframe n in operation 702, the BS receives UL data successively retransmitted from a UL subframe n to a UL subframe n+k of the LAA cell in operation 703. The scheduling (transmission of UL grant) by a BS with respect to the UL data is based on the method described in FIG. 6. k indicates the number of UL subframes through which PDSCHs that have an identical HARQ process number are to be retransmitted. That is, when the successive retransmission is executed through three successive subframes, k=3. In operation 704, the BS transmits control information associated with the UL data successive retransmission in the LAA cell in a DL subframe n+k+4 of the LTE cell, which is a Pcell.

When it is determined that the successive retransmission in the LAA cell is not triggered in the subframe n in operation 702, the BS proceeds with general reception with respect to UL data in the subframe n of the LAA cell in operation 705. The scheduling by the BS with respect to the UL data is transmitted in a DL subframe n−4 of the LTE cell. In operation 706, the BS transmits control information associated with the UL data of the LAA cell in a DL subframe n+4 of the LTE cell, which is a Pcell.

Subsequently, the various embodiments of FIG. 7B describes the operations of a UE for executing UL data successive retransmission of FIG. 6. In operation 711, a UE receives, from a BS, information associated with an LTE cell (Pcell) and an LAA cell (Scell), and receives, from the BS, configuration information associated with the successive retransmission in the LAA cell. Here, a BS may be an LTE BS or an LAA BS. The information associated with the LTE cell (Pcell) and the LAA cell (Scell) may be UL and DL frequency information when the LTE cell or the LAA cell is an FDD scheme, and may be UL-DL configuration information and special subframe configuration information when the LTE cell or the LAA cell is a TDD. Also, the information may be information associated with the maximum occupancy time or idle time of an LAA cell. The information associated with the LTE cell and the LAA cell may be transmitted to the UE through system information or higher signaling. The configuration information associated with the successive retransmission in the LAA cell may be a point in time when the successive retransmission is triggered (subframe), a point in time when a UL grant that schedules the successive retransmission is transmitted (subframe), information associated with the number of UL subframes through which PUSCHs that have an identical HARQ process number are to be transmitted, and information associated with the allocation of an MCS/RV, and an RB when successive retransmission is executed. The information associated with the successive retransmission in the LAA cell may be received from the BS through system information or higher signaling.

In operation 712, the UE determines whether the successive retransmission in the LAA cell is triggered in a subframe n. When it is determined that the successive retransmission in the LAA cell is triggered in the subframe n in operation 712, the UE successively transmits, to the BS, UL data from a UL subframe n to a UL subframe n+k of the LAA cell in operation 713. The reception of scheduling (transmission of UL grant) by the BS with respect to the UL data is based on the method described in FIG. 6. k indicates the number of UL subframes through which PDSCHs that have an identical HARQ process number are to be retransmitted. That is, when the successive retransmission is executed through three successive subframes, k=3. In operation 714, the UE receives control information associated with the UL data successive retransmission in the LAA cell in a DL subframe n+k+4 of the LTE cell, which is a Pcell.

When it is determined that the successive retransmission in the LAA cell is not triggered in the subframe n in operation 712, the UE executes a general transmission of UL data to the BS in the subframe n of the LAA cell in operation 715. The scheduling by the BS with respect to the UL data is received in a DL subframe n−4 of an LTE cell. In operation 716, the UE receives, from the BS, control information associated with the UL data of the LAA cell in a DL subframe n+4 of the LTE cell, which is a Pcell.

Subsequently, when an UL control channel is transmitted in association with a section where DL data cannot be transmitted during an idle time in an Scell, which is an LAA cell, a method of transmitting the UL control channel using a UL control format that considers only UL control information (UCI) associated with DL data in a Pcell, which is an LTE cell, will be described with reference to FIGS. 8, 9 and 10.

1-5 Embodiment

Figure 8:
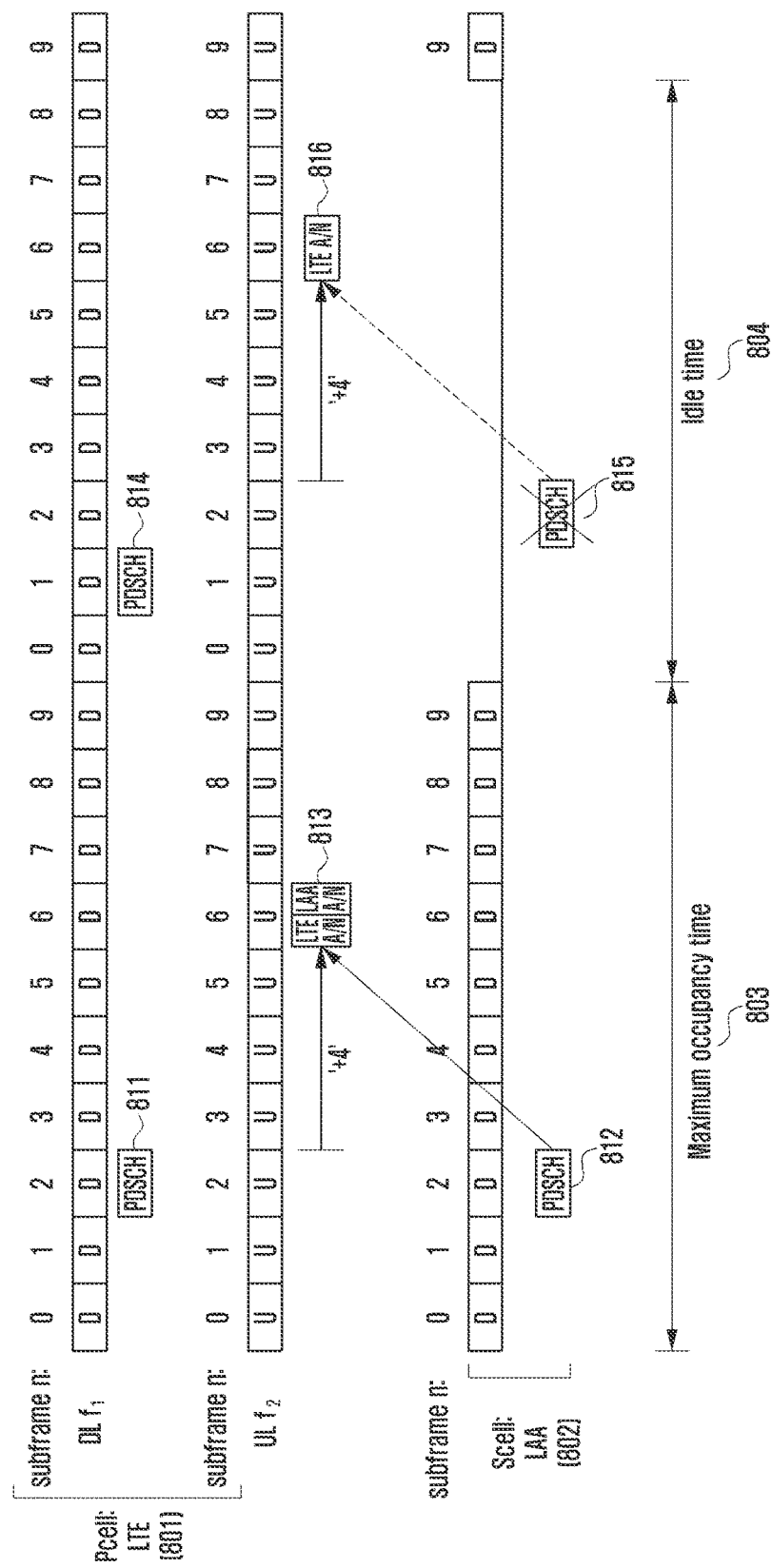
FIG. 8 is a view illustrating an uplink control information (UCI) transmission method for DL data according to the 1-5 embodiment of the present disclosure.

FIG. 8 is a diagram illustrating a method of transmitting UCI in association with DL data according to the 1-5 embodiment of the present disclosure. In FIG. 8, a Pcell 801 is an LTE cell, and uses an FDD scheme. A frequency for DL transmission is f1, and a frequency for UL transmission is f2. An Scell 802 is an LAA cell and uses an FDD scheme. Only a DL transmission through a channel is illustrated in the drawing. A UE obtains the DL frequency f1 that is associated with a Pcell while executing a cell search, and obtains the UL frequency f2 that is associated with the Pcell by receiving system information from an LTE BS. Also, the frequency and channel associated with an Scell may be transmitted to a UE through higher signaling or system information from an LTE BS or an LAA BS.

Referring to FIG. 8, a PDSCH of the Scell 802, which is an LAA cell, may be scheduled by the Pcell 801 which is an LTE cell, through cross-carrier scheduling, or a PDSCH of the Scell 802, which is an LAA cell, may be scheduled by the Scell 802, which is an LAA cell, through self-scheduling. When the PDSCH of the Scell 802, which is an LAA cell, is scheduled by the Pcell 801, which is an LTE cell, through cross-carrier scheduling, a UE is configured through a higher signaling to monitor (blind decoding) a PDCCH/ePDCCH for scheduling a PDSCH that is transmitted in the Scell 802, which is an LAA cell, in the Pcell 801, which is an LTE cell. Also, when the PDSCH of the Scell 802, which is an LAA cell, is scheduled by the Scell 802, which is an LAA cell, through self-carrier scheduling, a UE is configured through a higher signaling to monitor (blind decoding) a PDCCH/ePDCCH for scheduling a PDSCH that is transmitted in the Scell 802, which is an LAA cell, in the Scell 802, which is an LAA cell.

Referring to FIG. 8, the case will be described, in which a total of two cells, which are the Pcell and the Scell, are configured for the UE, and the UE is set through a higher signaling to use PUCCH format 1b with channel selection, and thus, the UE transmits a HARQ-ACK through PUCCH format 1b with channel selection. When a PDSCH 812 is transmitted in subframe #2 of the LAA cell 802, a HARQ-ACK with respect to the PDSCH 812 is transmitted in UL subframe #6 of frequency f2 of the Pcell 801, which is located four subframes after the transmission of the PDSCH 812, based on a UL control channel transmission timing of the LTE FDD cell. Also, when a PDSCH 811 is transmitted in subframe #2 of the LTE cell 801, a HARQ-ACK with respect to the PDSCH 811 may be transmitted, together with the HARQ-ACK with respect to the PDSCH 812, in UL subframe #6 of frequency f2 of the Pcell 801, which is located four subframes after the transmission of the PDSCH 811, by using PUCCH format 1b channel selection as shown in the diagram 813. The operation of transmitting the PDSCH 812 may be executed only within the maximum occupancy time 803 of the LAA cell 802, and may not be executed in the idle time 804. Immediately after finishing the maximum occupancy time 803 of the Scell 802, which is an LAA cell, the BS suspends the transmission of all signals in the Scell 802, which is an LAA cell, and enters the idle time 804. During the idle time 804, a frequency channel corresponding to the LAA cell 802 may be occupied by another system (Wi-Fi or another LAA system), and an LAA BS may be incapable of using the frequency channel for the transmission of data. The start time point and end time point, or the start time point and the length of the maximum occupancy time 803, may be transmitted through system information or higher signaling and then be set in advance by the BS, and may be transmitted as L1 signal (hereinafter, it may be understood as a physical control signal) to the UE. Also, the BS may use a variable value by sensing that a Tx signal of another system does not exist in the LAA cell 802. The BS may previously transmit and configure the length of the maximum occupancy time 803 through the higher signaling or the L1 signal, may transmit the start time point to the UE through the L1 signal, and the UE may sense may be aware of a start time point in time and an end time point in time of the maximum occupancy time 803 through blind detection of a predetermined signal (for example, a signal such as CRS and a PSS/SSS, a signal for adjusting synchronization as an initial signal which is firstly sent when occupying the LAA frequency channel), a signal for configuring an automatic gain control (AGC), or a signal for measuring a channel). The UE may be aware of when the BS has completed the occupancy of the frequency channel of the LAA cell using the length of the maximum occupancy time 803 and the start time point. The UE may receive, from the BS, information that is associated with the start time point and end time point, or the start time point and information on the length or the length of the maximum occupancy time 803, through a higher signal, system information, or the L1 signal, and be aware of a start time point and an end time point in time of the maximum occupancy time 803 through the blind detection of a predetermined signal (for example, a signal such as CRS and a PSS/SSS, a signal for adjusting synchronization as an initial signal which is firstly sent when occupying the LAA frequency channel), a signal for configuring an AGC, or a signal for measuring a channel). The UE may be aware of when the BS has completed the occupancy of the frequency channel of the LAA cell using the length of the maximum occupancy time 803 and the start time point. The start time point and the end time point or the start time and the length of the idle time 804 may be previously configured through the system information, the higher signaling, or the L1 signal, and the BS may sense use a variable value by sensing the existence of a Tx signal of another system in the LAA cell 802. The UE may receive, from the BS, information that is associated with the start time point and end time point, or the start time point and information on the length or the length of the idle time 804, through a higher signal or system information, and may be aware of a start time point in time and an end time point in time of the idle time 804 through the blind detection of a predetermined signal (for example, a synchronization signal such as an occupancy signal, a predetermined preamble, a predetermined signal, a CRS, a PSS/SSS, or the like).

Subsequently, within the idle time 804 of the LAA cell 802, when a PDSCH 814 of LTE cell 801 is transmitted in subframe #2, a HARQ-ACK with respect to the PDSCH 814 is transmitted in subframe #6 of a UL subframe f2 of the Pcell 801, which is located four subframes after the transmission of the PDSCH 814. In this instance, subframe #2 of the LAA cell 802 is in the idle time 804 and, thus, a PDSCH 815 may not be transmitted. Therefore, in UL subframe #6 of frequency f2 of the Pcell 801, only the HARQ-ACK with respect to the PDSCH 814 of the LTE cell 801 is transmitted using PUCCH format 1a/1b, as shown in the diagram 816.

In this instance, with reference to FIG. 8, there is a difference from the case in which only LTE FDD cells or LTE TDD cells coexist. In the case in which only two LTE FDD cells or two LTE TDD cells coexist, when a UL control channel is transmitted in a UL subframe, a transmission may need to be executed using a UL control channel format in each UL subframe. For example, in LTE Re-10, when format 1b with channel selection is set to be used, a UL control channel is transmitted by always using format 1b with channel selection in each UL subframe, irrespective of PDSCH scheduling. However, in the situation in which the PDSCH 815 cannot be transmitted in the LAA cell 802 due to the idle time 804 of the LAA cell 802, a BS and a UE may agree to use a simple PUCCH transmission format such as PUCCH format 1a or 1b, and in this instance, the UE transmits, through PUCCH format 1a/1b, only a HARQ-ACK with respect to PDSCHs which are transmitted in the LTE cell 801. Therefore, the complexity of UL control channel reception in an UL subframe of the LTE Pcell 801 within the idle time 804 of the LAA cell 802 may be reduced, and UL control channel transmission resources configured for format 1b with channel selection may be used for another purpose, such as for the transmission of UL data.

In another example, in a situation in which the PDSCH 815 should be transmitted in the LAA cell 802 by the idle time 804 of the LAA cell 802, the UE may transmit PUCCH format 1b with channel selection by mapping DTX/NACK for the HARQ-ACK of the LAA cell 802.

1-6 Embodiment

Figure 9:
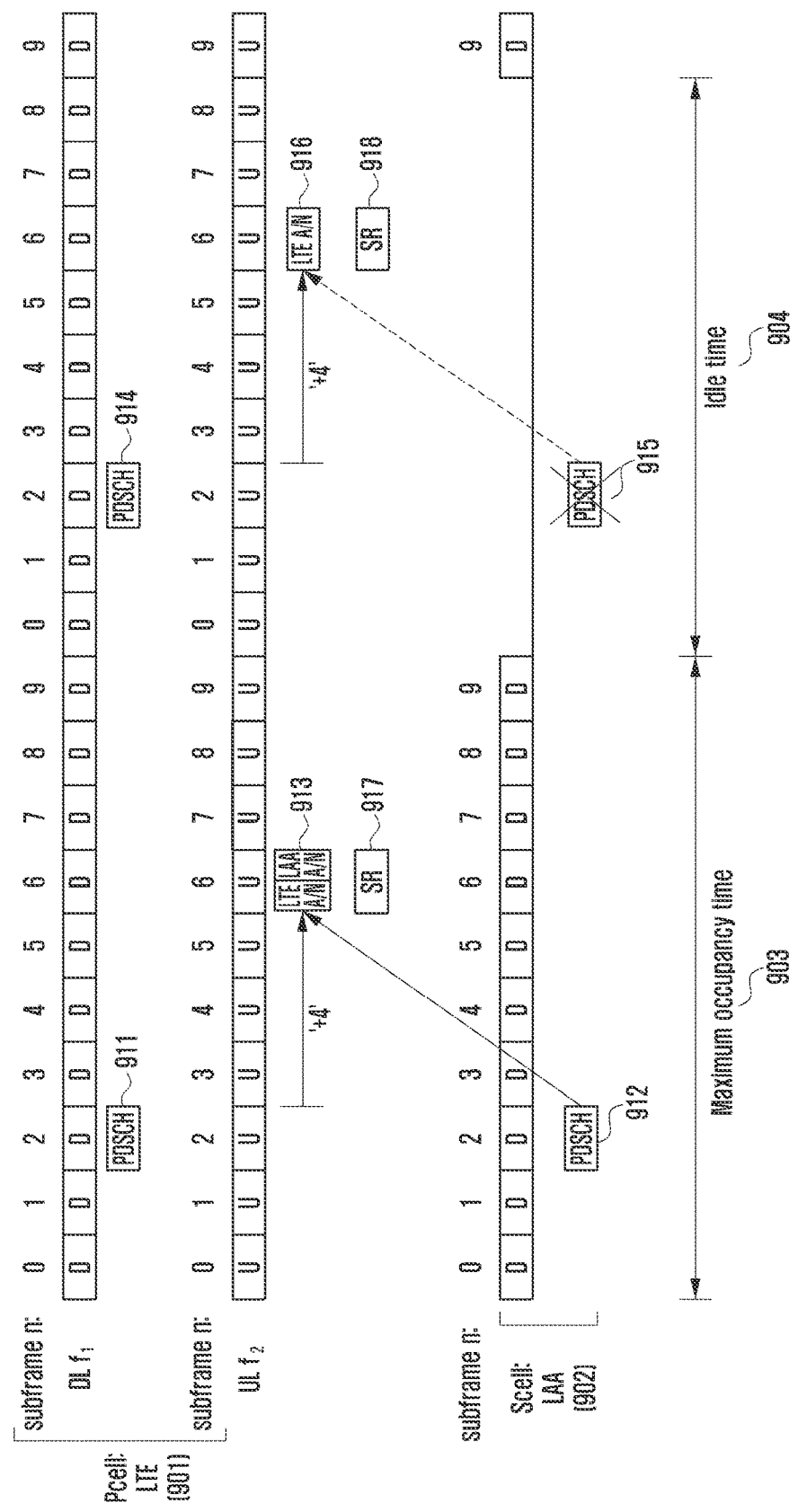
FIG. 9 is a view illustrating a UCI transmission method for DL data according to the 1-6 embodiment of the present disclosure.

FIG. 9 is a view illustrating a UCI transmission method for DL data according to the 1-6 embodiment of the present disclosure. In FIG. 9, a Pcell 901 is an LTE cell, and uses an FDD scheme. A frequency for DL transmission is f1, and a frequency for UL transmission is f2. An Scell 902 is an LAA cell and uses an FDD scheme. Only a DL transmission through a channel is illustrated in the FIG. 9. A UE obtains the DL frequency f1 that is associated with a Pcell while executing a cell search, and obtains the UL frequency f2 that is associated with the Pcell by receiving system information from an LTE BS. Also, the frequency and channel associated with an Scell may be transmitted to a UE through higher signaling or system information from an LTE BS or an LAA BS.

Referring to FIG. 9, a PDSCH of the Scell 902, which is an LAA cell, may be scheduled by the Pcell 901 which is an LTE cell, through cross-carrier scheduling, or a PDSCH of the Scell 902, which is an LAA cell, may be scheduled by the Scell 902, which is an LAA cell, through self-scheduling. When the PDSCH of the Scell 902, which is an LAA cell, is scheduled by the Pcell 901, which is an LTE cell, through cross-carrier scheduling, a UE is configured through a higher signaling to monitor (blind decoding) a PDCCH/ePDCCH for scheduling a PDSCH that is transmitted in the Scell 902, which is an LAA cell, in the Pcell 901, which is an LTE cell. Also, when the PDSCH of the Scell 902, which is an LAA cell, is scheduled by the Scell 902, which is an LAA cell, through self-carrier scheduling, a UE is configured through a higher signaling to monitor (blind decoding) a PDCCH/ePDCCH for scheduling a PDSCH that is transmitted in the Scell 902, which is an LAA cell, in the Scell 902, which is an LAA cell.

Referring to FIG. 9, the case will be described, in which a total of two cells, which are the Pcell and the Scell, are configured for the UE, and the UE is set through a higher signaling to use PUCCH format 1b with channel selection, and thus, when the UE transmits a HARQ-ACK through PUCCH format 1b with channel selection, the UE simultaneously transmits the HARQ-ACK and a scheduling request (SR) in the UL subframe of the Pcell. Herein, when there is UL data to be transmitted by the UE, the SR is for requesting UL transmission resources for transmitting the UL data to the BS, and resources which the UE requires to transmit the SR are previously configured as a transmission period, a transmission offset, and a transmission resource through the higher signal.

When a PDSCH 912 is transmitted in subframe #2 of the LAA cell 902, a HARQ-ACK with respect to the PDSCH 912 is transmitted in UL subframe #6 of frequency f2 of the Pcell 901, which is located four subframes after the transmission of the PDSCH 912, based on an UL control channel transmission timing of the LTE FDD cell. Also, when a PDSCH 911 is transmitted in subframe #2 of the LTE cell 901, a HARQ-ACK with respect to the PDSCH 911 may be transmitted, together with the HARQ-ACK with respect to the PDSCH 912, in UL subframe #6 of frequency f2 of the Pcell 901, which is located four subframes after the transmission of the PDSCH 911, by using PUCCH format 1b channel selection as shown in the diagram 913. In this event, the UE may be configured to transmit an SR 917 from the BS through the higher signaling in UL subframe #6 of the Pcell 901. The UE should simultaneously transmit the HARQ-ACK and the SR 917 in the UL subframe of the Pcell 901. A method of simultaneously transmitting the HARQ-ACK and the SR 917 is a method in which when all the Pcell and Scell are in the FDD scheme, the HARQ-ACKs in each cell are spatial bundled and are transmitted through the PUCCH format 1b, the PUCCH format 1b is transmitted on SR previously transmission resources which are configured as the higher signaling for the SR transmission from the BS so that the HARQ-ACK and the SR are simultaneously transmitted. While, even though the UE determines only the HARQ-ACK of one code word as an NACK because the HARQ-ACK is spatial bundled, the NACK is transmitted after the spatial bundling so that retransmission for all code words occurs. For example, when a transmission mode in which all the Pcell and the Scell transmit the two code words is configured through the higher signaling, in a case in which the UE determines, as the result of the PDSCH decoding result, a first code word of the Pcell as the ACK, a second code word of the Pcell as the NACK, a first code word of the Scell as the ACK, and a second code word of the Scell as the ACK, the UE spatial bundles the ACK and the NACK which are the HARQ-ACKs of the Pcell, to be mapped with the PUCCH format 1b as the NACK, and the HARQ-ACKs spatial bundle the ACK and ACK to be mapped with the PUCCH format 1b as the ACK, and then theses are transmitted to the SR transmission resources. Therefore, even though the first code word of the Pcell has been successfully decoded, the BS determines the first code word as the NACK such that a retransmission for the PDSCH is performed. Therefore, when the PUCCH format 1b with channel selection and the SR are simultaneously transmitted, it is causing a demerit in which the retransmission occurs by information loss for the HARQ-ACK.

Meanwhile, the operation of transmitting the PDSCH 912 may be executed only within the maximum occupancy time 903 of the LAA cell 902, and may not be executed in the idle time 804. Immediately after finishing the maximum occupancy time 903 of the Scell 902, which is an LAA cell, the BS suspends the transmission of all signals in the Scell 902, which is an LAA cell, and enters the idle time 904. During the idle time 904, a frequency channel corresponding to the LAA cell 902 may be occupied by another system (Wi-Fi or another LAA system), and an LAA BS may be incapable of using the frequency channel for the transmission of data. The BS may previously transmit and configure the length of the maximum occupancy time 903 through the higher signaling or the L1 signal, may transmit the start time point to the UE through the L1 signal, and the UE may sense may be aware of a start time point in time and an end time point in time of the maximum occupancy time 903 through blind detection of a predetermined signal (for example, a signal such as CRS and a PSS/SSS, a signal for adjusting synchronization as an initial signal which is firstly sent when occupying the LAA frequency channel), a signal for configuring an AGC, or a signal for measuring a channel). The UE may be aware of when the BS has completed the occupancy of the frequency channel of the LAA cell using the length of the maximum occupancy time 903 and the start time point. The UE may receive, from the BS, information that is associated with the start time point and end time point, or the start time point and information on the length or the length of the maximum occupancy time 903, through a higher signal, system information, or the L1 signal, and be aware of a start time point and an end time point in time of the maximum occupancy time 903 through the blind detection of a predetermined signal (for example, a signal such as CRS and a PSS/SSS, a signal for adjusting synchronization as an initial signal which is firstly sent when occupying the LAA frequency channel), a signal for configuring an AGC, or a signal for measuring a channel). The UE may be aware of when the BS has completed the occupancy of the frequency channel of the LAA cell using the length of the maximum occupancy time 903 and the start time point. The start time point and the end time point or the start time and the length of the idle time 904 may be previously configured through the system information, the higher signaling, or the L1 signal, and the BS may sense use a variable value by sensing the existence of a Tx signal of another system in the LAA cell 902. The UE may receive, from the BS, information that is associated with the start time point and end time point, or the start time point and information on the length or the length of the idle time 904, through a higher signal or system information, and may be aware of a start time point in time and an end time point in time of the idle time 904 through the blind detection of a predetermined signal (for example, a synchronization signal such as an occupancy signal, a predetermined preamble, a predetermined signal, a CRS, a PSS/SSS, or the like).

Subsequently, within the idle time 904 of the LAA cell 902, when a PDSCH 814 is transmitted in subframe #2 of LTE cell 901, a HARQ-ACK with respect to the PDSCH 814 is transmitted in subframe #6 of a UL subframe f2 of the Pcell 901, which is located four subframes after the transmission of the PDSCH 914. In this instance, subframe #2 of the LAA cell 902 is in the idle time 904, and thus, the PDSCH 915 may not be transmitted. Therefore, in UL subframe #6 of frequency f2 of the Pcell 901, only the HARQ-ACK with respect to the PDSCH 914 of the LTE cell 901 is calculated as a HARQ-ACK payload size and applied to PUCCH format 3, and the PUCCH format 3 is transmitted as shown in the diagram 916. In this event, the UE may be configured to transmit an SR 918 from the BS through the higher signaling in UL subframe #6 of the Pcell 901. The UE should simultaneously transmit the HARQ-ACK and the SR 918 in the UL subframe of the Pcell 901. A method of simultaneously transmitting the HARQ-ACK and the SR 918 is a method in which the PDSCH 915 may not be transmitted because the Scell corresponds to the idle time, only the HARQ-ACK for the PDSCH 914 of the Pcell is transmitted through the PUCCH format 1a/1b, the BS previously transmits the PUCCH format 1a/1b on SR transmission resources which has been configured as the higher signaling for the SR transmission so that the HARQ-ACK and the SR are simultaneously transmitted. Since the HARQ-ACK is intactly transmitted through the PUCCH format 1a/1b, there is no loss for the HARQ-ACK information. Therefore, when the PUCCH format 1b with channel selection and the SR are simultaneously transmitted, it is causing a demerit in which the retransmission occurs by information loss for the HARQ-ACK.

Accordingly, in FIG. 9, there is a difference from the case where only LTE FDD cells or LTE TDD cells coexist. In the case where two LTE FDD cells or LTE TDD cells coexist, when the SR and the HARQ-ACK is simultaneously transmitted in a UL subframe, the information loss for the HARQ-ACK is accepted and the method of transmitting the HARQ-ACK and the SR are transmitted together becomes to be used. However, in the case in which the PDSCH 915 may not be transmitted in the LAA cell 902 due to the idle time 904 of the LAA cell 902, when the SR and the HARQ-ACK are simultaneously transmitted, the BS and the UE may use a method of transmitting a simple transmission format such as the PUCCH format 1a or the PUCCH format 1b on the SR transmission resources configured through the higher signaling. In this event, the UE transmits only HARQ-ACKs for PDSCHs transmitted in the LTE cell 901 on the SR transmission resources, which is configured through the higher signaling, through the PUCCH format 1a/1b. Therefore, the information loss of the HARQ-ACK by the simultaneous transmission of the HARQ-ACK and the SR in the UL subframe of the LTE Pcell 901 within the idle time 904 in the LAA cell 902 is removed and a transmission is possible without the loss of the HARQ-ACK and the SR.

1-7 Embodiment

Figure 10:
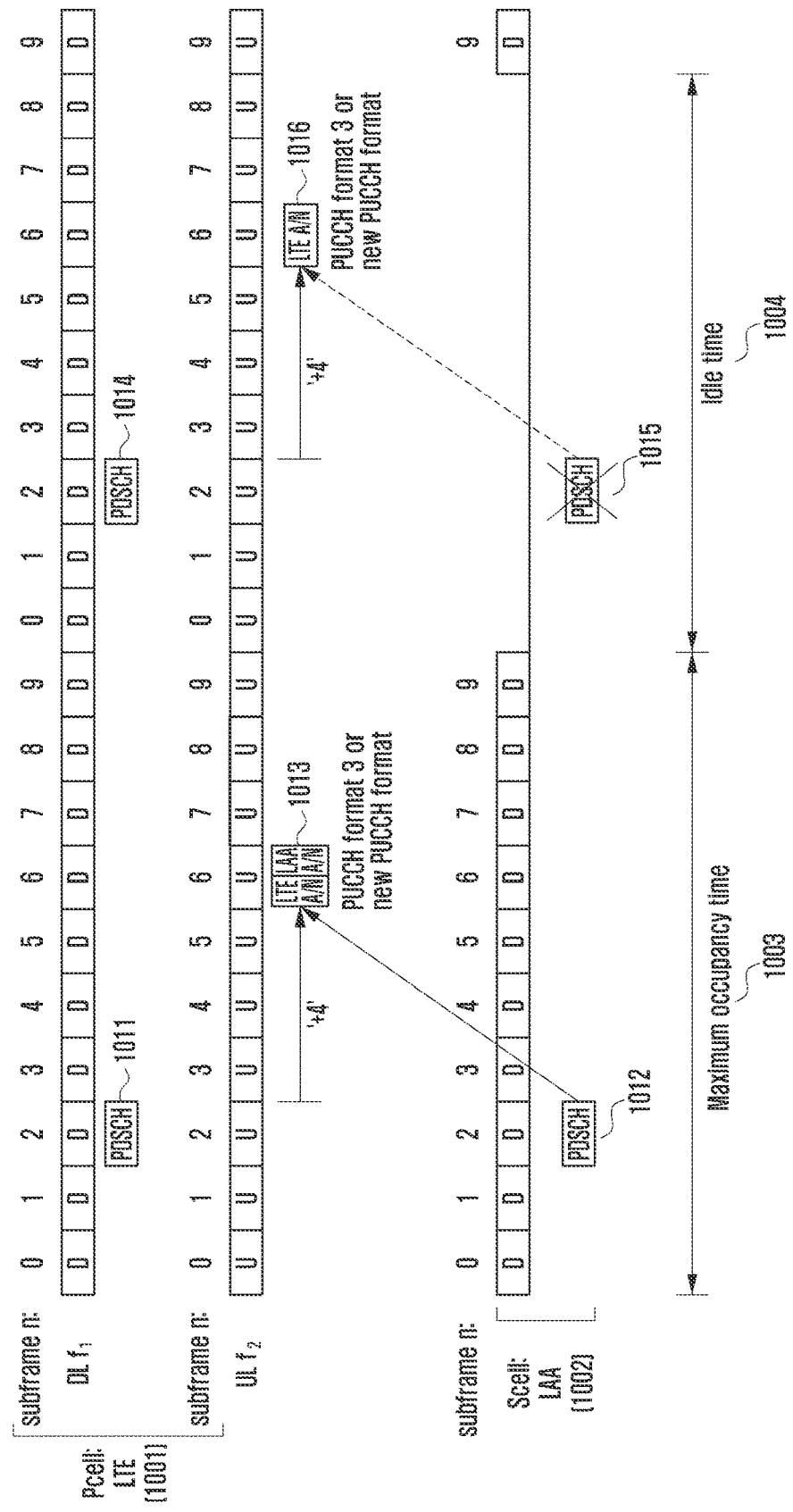
FIG. 10 is a view illustrating a UCI transmission method for DL data according to the 1-7 embodiment of the present disclosure.

FIG. 10 is a view illustrating a UCI transmission method for DL data according to the 1-7 embodiment of the present disclosure. In FIG. 10, a Pcell 1001 is an LTE cell, and uses an FDD scheme. A frequency for DL transmission is f1, and a frequency for UL transmission is f2. An Scell 1002 is an LAA cell and uses an FDD scheme. Only a DL transmission through a channel is illustrated in the FIG. 9. A UE obtains the DL frequency f1 that is associated with a Pcell while executing a cell search, and obtains the UL frequency f2 that is associated with the Pcell by receiving system information from an LTE BS. Also, the frequency and channel associated with an Scell may be transmitted to a UE through higher signaling or system information from an LTE BS or an LAA BS.

Referring to FIG. 10, a PDSCH of the Scell 1002, which is an LAA cell, may be scheduled by the Pcell 1001 which is an LTE cell, through cross-carrier scheduling, or a PDSCH of the Scell 1002, which is an LAA cell, may be scheduled by the Scell 1002, which is an LAA cell, through self-scheduling. When the PDSCH of the Scell 1002, which is an LAA cell, is scheduled by the Pcell 1001, which is an LTE cell, through cross-carrier scheduling, a UE is configured through a higher signaling to monitor (blind decoding) a PDCCH/ePDCCH for scheduling a PDSCH that is transmitted in the Scell 1002, which is an LAA cell, in the Pcell 1001, which is an LTE cell. Also, when the PDSCH of the Scell 1002, which is an LAA cell, is scheduled by the Scell 1002, which is an LAA cell, through self-carrier scheduling, a UE is configured through a higher signaling to monitor (blind decoding) a PDCCH/ePDCCH for scheduling a PDSCH that is transmitted in the Scell 1002, which is an LAA cell, in the Scell 1002, which is an LAA cell.

Referring to FIG. 10, the case will be described, in which a total N of cells (N is larger than or equal to 2. In the embodiment of the present disclosure, a case in which N is 2 will be described), which are the Pcell and the Scell, are configured for the UE, and the UE is set through a higher signaling to use a PUCCH format 3 or a new PUCCH format, and thus, when the UE transmits a HARQ-ACK through the PUCCH format 3 or the new PUCCH format. The new PUCCH format may be for supporting an HARQ-ACK transmission which is larger than maximum 22 bits supported by the PUCCH format 3 or may be PUCCH format 3 based PUCCH format. When a PDSCH 1012 is transmitted in subframe #2 of the LAA cell 1002, a HARQ-ACK with respect to the PDSCH 1012 is transmitted in UL subframe #6 of frequency f2 of the Pcell 1001, which is located four subframes after the transmission of the PDSCH 1012, based on a UL control channel transmission timing of the LTE FDD cell. Also, when a PDSCH 1011 is transmitted in subframe #2 of the LTE cell 1001, a HARQ-ACK with respect to the PDSCH 1011 is calculated as a payload size, together with the HARQ-ACK with respect to the PDSCH 1012, in UL subframe #6 of frequency f2 of the Pcell 1001, which is located four subframes after the transmission of the PDSCH 1011 and is applied to the PUCCH format 3 or the new PUCCH format, and the PUCCH format is transmitted as shown in the diagram 1013. The HARQ-ACK payload size refers to the total number of bits of the HARQ-ACK to be transmitted.

The operation of transmitting the PDSCH 1012 may be executed only within the maximum occupancy time 1003 of the LAA cell 1002, and may not be executed in the idle time 804. Immediately after finishing the maximum occupancy time 1003 of the Scell 1002, which is an LAA cell, the BS suspends the transmission of all signals in the Scell 1002, which is an LAA cell, and enters the idle time 1004. During the idle time 1004, a frequency channel corresponding to the LAA cell 1002 may be occupied by another system (Wi-Fi or another LAA system), and an LAA BS may be incapable of using the frequency channel for the transmission of data. The start time point and end time point, or the start time point and the length of the maximum occupancy time 1003, may be transmitted through system information or higher signaling and then be set in advance by the BS, and may be transmitted as L1 signal (hereinafter, it may be understood as a physical control signal) to the UE. Also, the BS may use a variable value by sensing that a Tx signal of another system does not exist in the LAA cell 1002. The BS may previously transmit and configure the length of the maximum occupancy time 1003 through the higher signaling or the L1 signal, may transmit the start time point to the UE through the L1 signal, and the UE may sense may be aware of a start time point in time and an end time point in time of the maximum occupancy time 1003 through blind detection of a predetermined signal (for example, a signal such as CRS and a PSS/SSS, a signal for adjusting synchronization as an initial signal which is firstly sent when occupying the LAA frequency channel, a signal for configuring an AGC, or a signal for measuring a channel). The UE may be aware of when the BS has completed the occupancy of the frequency channel of the LAA cell using the length of the maximum occupancy time 1003 and the start time point. The UE may receive, from the BS, information that is associated with the start time point and end time point, or the start time point and information on the length or the length of the maximum occupancy time 1003, through a higher signal, system information, or the L1 signal, and be aware of a start time point and an end time point in time of the maximum occupancy time 1003 through the blind detection of a predetermined signal (for example, a signal such as CRS and a PSS/SSS, a signal for adjusting synchronization as an initial signal which is firstly sent when occupying the LAA frequency channel), a signal for configuring an AGC, or a signal for measuring a channel). The UE may be aware of when the BS has completed the occupancy of the frequency channel of the LAA cell using the length of the maximum occupancy time 1003 and the start time point. The start time point and the end time point or the start time and the length of the idle time 1004 may be previously configured through the system information, the higher signaling, or the L1 signal, and the BS may sense use a variable value by sensing the existence of a Tx signal of another system in the LAA cell 1002. The UE may receive, from the BS, information that is associated with the start time point and end time point, or the start time point and information on the length or the length of the idle time 1004, through a higher signal or system information, and may be aware of a start time point in time and an end time point in time of the idle time 1004 through the blind detection of a predetermined signal (for example, a synchronization signal such as an occupancy signal, a predetermined preamble, a predetermined signal, a CRS, a PSS/SSS, or the like). Subsequently, within the idle time 1004 of the LAA cell 1002, when a PDSCH 1014 of LTE cell 1001 is transmitted in subframe #2, a HARQ-ACK with respect to the PDSCH 1014 is transmitted in subframe #6 of a UL subframe f2 of the Pcell 1001, which is located four subframes after the transmission of the PDSCH 1014. In this instance, subframe #2 of the LAA cell 1002 is in the idle time 1004 and, thus, a PDSCH 1015 may not be transmitted. Therefore, in UL subframe #6 of frequency f2 of the Pcell 1001, only the HARQ-ACK with respect to the PDSCH 1014 of the LTE cell 1001 is calculated as the payload size and is applied to the PUCCH format 3 or the new PUCCH format, and the PUCCH format is transmitted as shown in the diagram 1016.

In this instance, there is a difference from the case where only LTE FDD cells or LTE TDD cells coexist. In the case where two LTE FDD cells or LTE TDD cells coexist, when a UL control channel is transmitted in a UL subframe, the HARQ-ACK payload size is calculated by multiplexing PUCCH format 3 or new PUCCH format, the number of transport blocks (TBs) based on the transmission mode of the cells, and the number of cells for which CA is configured (in the case of CA of TDD cells, a bundling window size is additionally multiplied), the payload size is applied to the PUCCH format 3 and the new PUCCH format, and the PUCCH format 3 and the new PUCCH format is transmitted. Therefore, the HARQ-ACK payload size applied to the PUCCH format 3 and the new PUCCH format is not changed for each subframe. However, in the situation in which the PDSCH 1015 cannot be transmitted in the LAA cell 802 due to the idle time 1004 of the LAA cell 1002, the UE may not use HARQ ACKs with respect to PDSCHs that cannot be transmitted in subframes within the idle time 1004 of the LAA cell 1002 when calculating a HARQ-ACK payload size, and applies, to the PUCCH format 3 and the new PUCCH format, a payload size that is calculated using the PDSCHs that are transmitted in the LTE cell 1001, and executes a transmission. The above description applies the payload size that is calculated using the PDSCHs that are transmitted in the LTE cell 1001 by assuming that only the LTE cell 1001 and the LAA cell 1002, which is two cells, exist. However, when two or more LTE cells and LAA cells are used, a payload size that is calculated in association with PDSCHs that may be transmitted in an LAA cell within maximum occupancy time and another LTE cell needs to be applied to the PUCCH format 3 and the new PUCCH format. Therefore, when two or more cells are used, only for the LAA cells where a PDSCH cannot be transmitted since it is an idle time, HARQ-ACKs with respect to PDSCHs that cannot be transmitted may not be used for calculating a HARQ-ACK payload size. For the LAA cells where a PDSCH can be transmitted since it is in maximum occupancy time, a payload size that is calculated using the HARQ-ACKs with respect to PDCSCHs that can be transmitted may be applied to the PUCCH format 3 and the new PUCCH format, the PUCCH format 3 and the new PUCCH format may be transmitted.

Therefore, when the UE uses the PUCCH format 3 and the new PUCCH format to which an optimized HARQ-ACK payload size is applied in the subframe, the reception performance of the BS may be secured and a UE Tx power may be reduced. Also, although FIG. 10 has been described from the perspective of the case in which the LAA cell 1002 is an FDD, the UL control format transmission method of FIG. 10 may be equally applied to the case of a TDD.

For another example, in a situation in which the PDSCH 1015 in the LAA cell 1002 may be not transmitted by the idle time 1004 in the LAA cell 1002, the UE maps DTX/NACK for the HARQ-ACKs of the LAA cell 1002 corresponding to the Scell, maps the HARQ-ACK according to a decoding result with respect to the PDSCHs which can be transmitted in other LAA cells and other LTE cells which are within the maximum occupancy time, and transmits a transmission of the PUCCH format 3 or the new PUCCH format applied to a payload size calculated with respect to the PDSCHs which can be transmitted in other LAA cell or other LTE cells as well as DTX/NACK according to the number of the decode word of the PDSCH depending on the transmission mode of the LAA cell 1002.

Figure 11A:
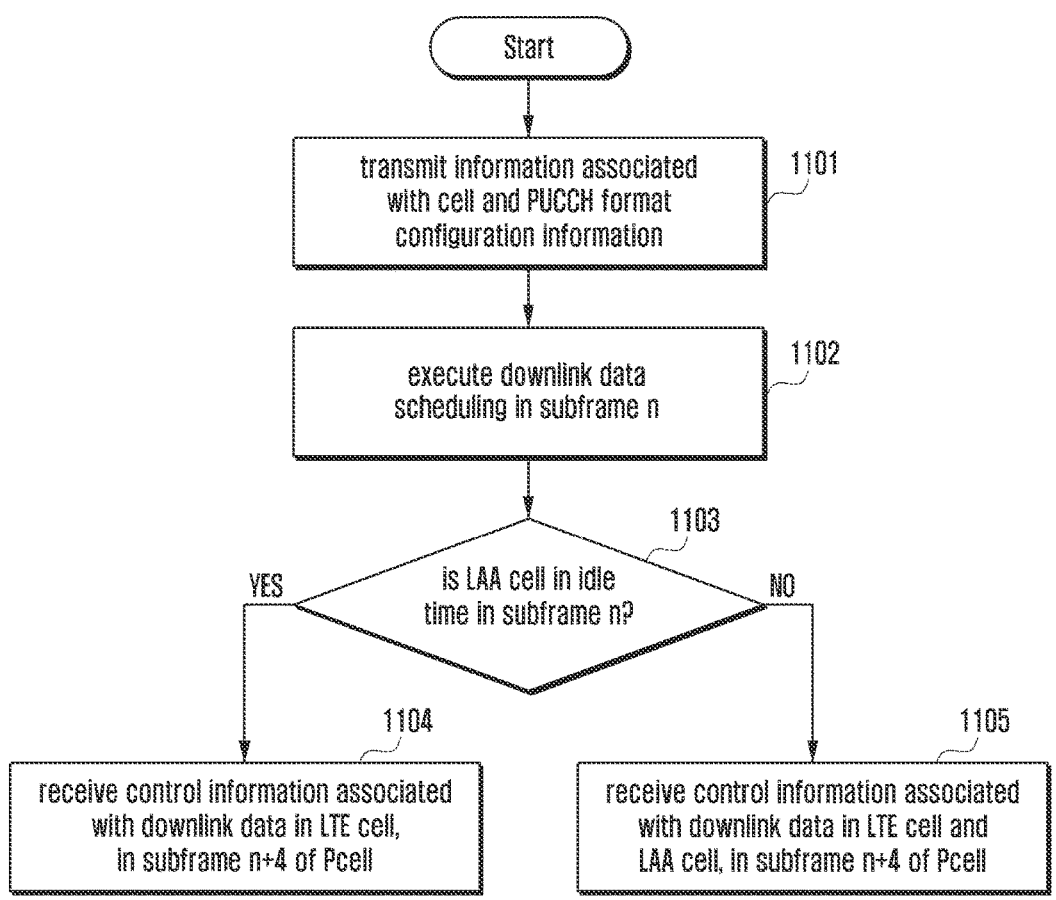
FIGS. 11A and 11B are flowcharts illustrating operations of a BS and a UE for a UCI transmission method for DL data according to the 1-5 and 1-7 embodiments of the present disclosure.
Figure 11B:
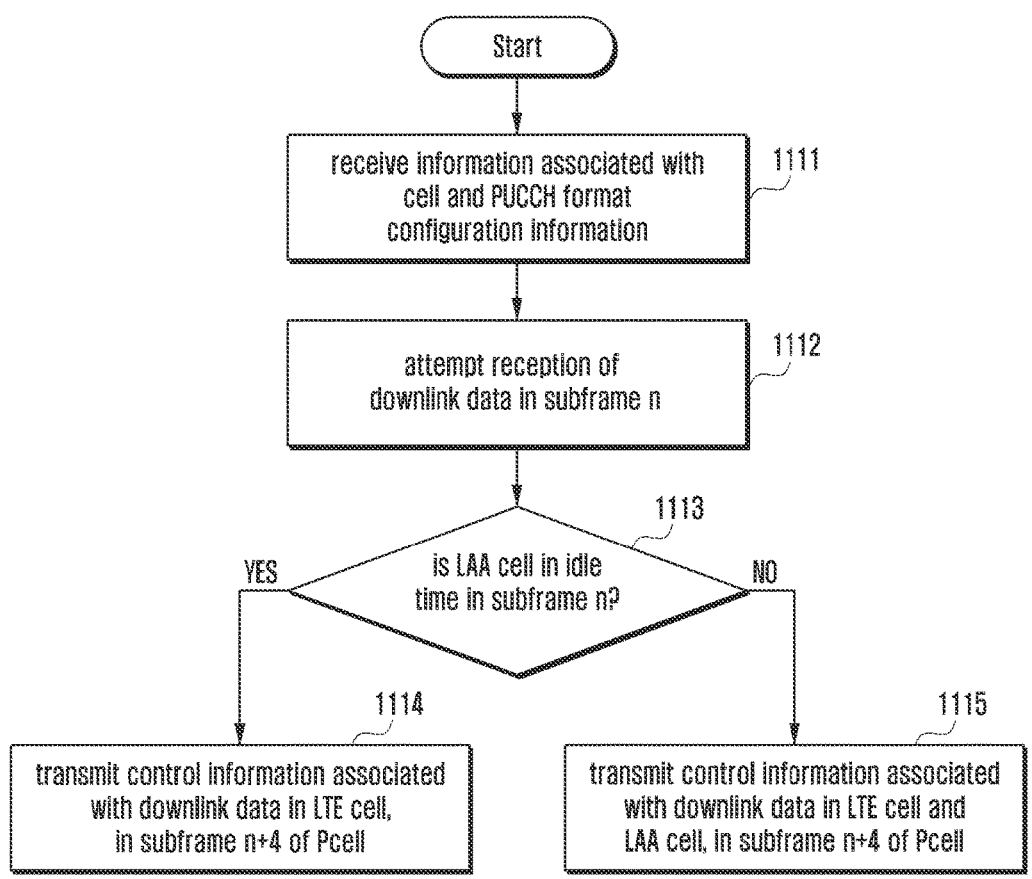

FIGS. 11A and 11B are flowcharts illustrating operations of a BS and an UE for a UCI transmission method for DL data according to the 1-5 and 1-7 embodiments of the present disclosure. When a UL control channel, with respect to DL data of an LTE cell and an LAA cell, is transmitted in FIGS. 8 and 10, the operations of a BS and a UE for applying a UL control channel format, according to an embodiment of the present disclosure, will be described through each flowchart of FIGS. 9A and 9B.

Referring to FIG. 11A, the operations of a BS will be described. Here, a BS may be an LTE BS or an LAA BS.

In operation 1101, the BS transmits, to the UE, information associated with an LTE cell (Pcell) and an LAA cell (Scell), and transmits configuration information associated with a PUCCH format 3 or a new PUCHH format to be used when the UE transmits UCI associated with the reception of DL data in two cells. The information associated with the LTE cell (Pcell) and the LAA cell (Scell) may be UL and DL frequency information when the LTE cell or the LAA cell is an FDD scheme, and may be UL-DL configuration information and special subframe configuration information when the LTE cell or the LAA cell is a TDD scheme. Also, the information may be information associated with the maximum occupancy time or idle time of an LAA cell. The information associated with the LTE cell and the LAA cell may be transmitted to the UE through system information, higher information, and L1 information. In operation 1102, the BS determines scheduling that is associated with the DL data in the LTE cell and the LAA cell in subframe #n for the UE. In operation 1103, the BS determines whether the LAA cell in subframe #n is in an idle time. When it is determined that the LAA cell in subframe #n is in the idle time in operation 1103, the BS receives control information associated with DL data in the LTE cell, in subframe #(n+4) of the LTE cell (Pcell) in operation 1104. In this instance, when the BS transmits, to the UE, configuration information that indicates the use of PUCCH format 1b with channel selection, the BS assumes the reception of PUCCH format 1a/1b, and receives only control information associated with DL data in the LTE cell. In operation 1101, when the BS transmits, to the UE, configuration information indicating the use of PUCCH format 3 and new PUCCH format, the BS assumes the reception of PUCCH format 3 and new PUCCH format to which a HARQ-ACK payload size associated with the PDSCHs in an LTE cell or the PDSCHs in only the LAA cells within maximum occupancy time in subframe #n is applied, and receives only control information associated with DL data in LTE cell or in the LAA cells within maximum occupancy time in subframe #n. When it is determined that the LAA cell in subframe #n is not in the idle time in operation 1103, the BS receives control information associated with DL data in the LTE cell together with control information associated with DL data in the LAA cell, in subframe #(n+4) of the LTE cell (Pcell) in operation 1105. In this instance, when the BS transmits, to the UE, configuration information that indicates the use of PUCCH format 1b with channel selection in operation 1101, the BS assumes the reception of PUCCH format 1b with channel selection, and receives the control information associated with DL data in the LTE cell and the control information associated with DL data in the LAA cell. When the BS transmits, to the UE, configuration information indicating the use of PUCCH format 3 or new PUCCH format in operation 1101, the BS assumes the reception of PUCCH format 3 or new PUCCH format to which a HARQ-ACK payload size of an LTE cell and an LAA cell within maximum occupancy time in subframe #n is applied, and receives all the control information associated with DL data in LTE cell and in the LAA cells within maximum occupancy time in subframe #n.

Referring to FIG. 11B, the operations of a UE will be described.

In operation 1111, the UE receives, from the BS, information associated with an LTE cell (Pcell) and an LAA cell (Scell), and receives configuration information associated with a PUCCH format (PUCCH format 3, new PUCCH format or PUCCH format 1b with channel selection) to be used when the UE transmits UCI associated with the reception of DL data in two cells. The information associated with the LTE cell (Pcell) and the LAA cell (Scell) may be UL and DL frequency information when the LTE cell or the LAA cell is an FDD scheme, and may be UL-DL configuration information and special subframe configuration information when the LTE cell or the LAA cell is a TDD scheme. Also, the information may be information associated with the maximum occupancy time or idle time of an LAA cell. The information associated with the LTE cell and the LAA cell may be received from the BS through system information, higher information, or L1 information. In operation 1112, the UE attempts to receive DL data in the LTE cell and the LAA cell in subframe #n. In operation 1113, the UE determines whether the LAA cell in subframe #n is in an idle time. When it is determined that the LAA cell in subframe #n is in the idle time in operation 1113, the UE transmits, to the BS, control information associated with DL data in the LTE cell in subframe #(n+4) of the LTE cell (Pcell) in operation 1114. In this instance, when the UE receives, from the BS, configuration information that indicates the use of PUCCH format 1b with channel selection, the UE transmits PUCCH format 1a/1b by including only control information associated with DL data in the LTE cell. In operation 1111, when the UE receives, from the BS, the configuration information indicating the use of PUCCH format 3 or new PUCCH format, the UE transmits a preconfigured PUCCH format 3 to which a HARQ-ACK payload size associated with PDSCHs of the LTE cell or PDSCHs of only the LAA cell within maximum occupancy time in subframe #n is applied. When it is determined that the LAA cell in subframe #n is not in the idle time in operation 1113, the UE transmits control information associated with DL data in the LTE cell together with control information associated with DL data in the LAA cell, in subframe #(n+4) of the LTE cell (Pcell) in operation 1115. In this instance, when the UE receives, from the BS, configuration information that indicates the use of PUCCH format 1b with channel selection in operation 1111, the UE transmits, to the BS, the control information associated with DL data in the LTE cell and the control information associated with DL data in the LAA cell through PUCCH format 1b with channel selection. In operation 1111, when the UE receives, from the BS, the configuration information indicating the use of PUCCH format 3, the UE transmits, to the BS, PUCCH format 3 to which a HARQ-ACK payload size associated with PDSCHs of the LTE cell and the LAA cell within maximum occupancy time in subframe #n is applied.

Figure 11C:
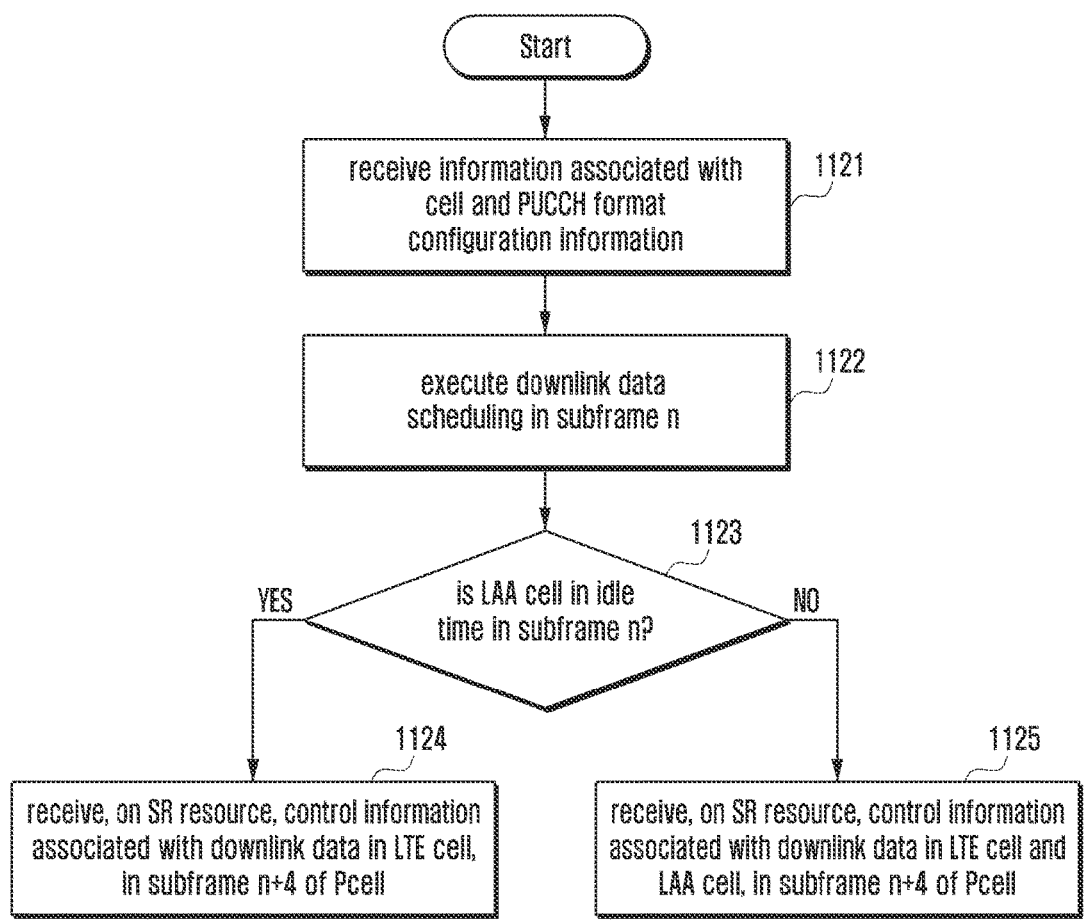
FIGS. 11C and 11D are flowcharts illustrating operations of a BS and a UE for a method for simultaneously transmitting UCI for DL data and a scheduling request (SR) according to the 1-6 embodiment of the present disclosure.
Figure 11D:
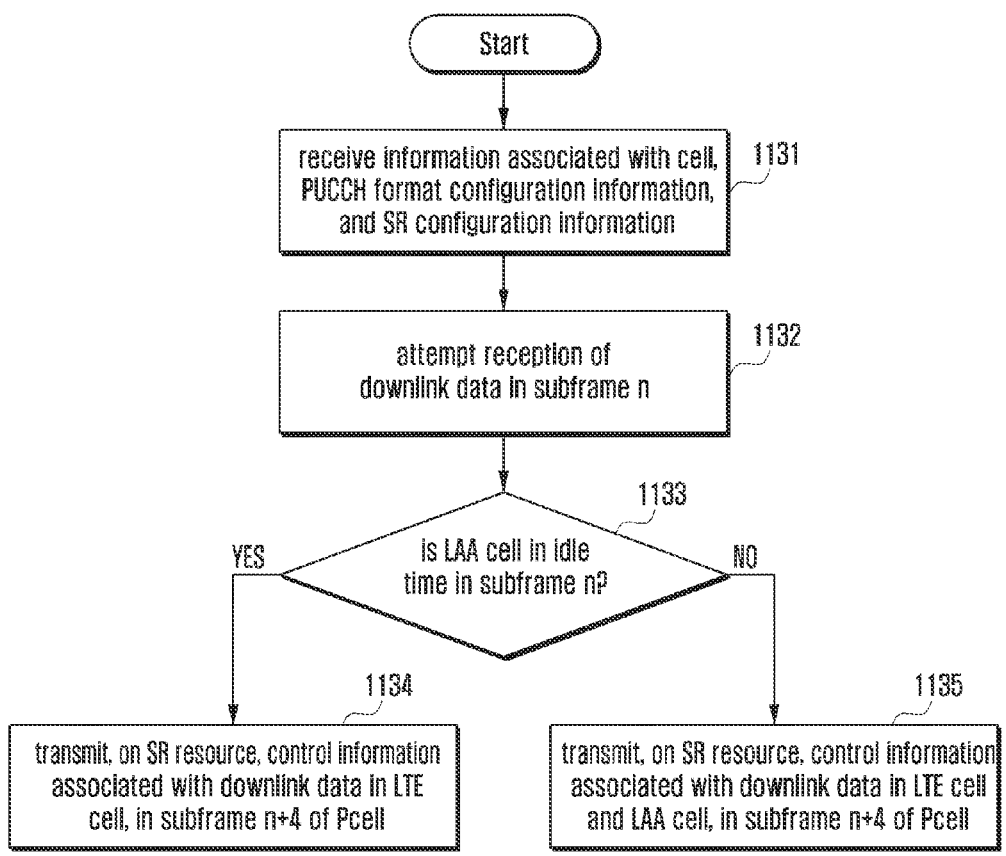

FIGS. 11C and 11D are flowcharts illustrating operations of a BS and an UE for a method for simultaneously transmitting UCI for DL data and a scheduling request (SR) according to the 1-6 embodiment of the present disclosure. When a UL control channel, with respect to DL data of an LTE cell and an LAA cell, is transmitted in FIG. 9, the operations of a BS and a UE for applying a UL control channel format to simultaneously transmit an HARQ-ACK and an SR, according to an embodiment of the present disclosure, will be described through each flowchart of FIGS. 11C and 11D.

Referring to FIG. 11C, the operations of a BS will be described. Here, a BS may be an LTE BS or an LAA BS.

In operation 1121, the BS transmits, to the UE, information associated with an LTE cell (Pcell) and an LAA cell (Scell), and transmits configuration information associated with a PUCCH format (PUCCH format 3 or PUCHH format 1b with channel selection) to be used, and transmits configuration information associated with a resource (a subframe or frequency resource) to be used when the UE transmits SR, when the UE transmits UCI associated with the reception of DL data in two cells. The information associated with the LTE cell (Pcell) and the LAA cell (Scell) may be UL and DL frequency information when the LTE cell or the LAA cell is an FDD scheme, and may be UL-DL configuration information and special subframe configuration information when the LTE cell or the LAA cell is a TDD scheme. Also, the information may be information associated with the maximum occupancy time or idle time of an LAA cell. The information associated with the LTE cell and the LAA cell may be transmitted to the UE through system information, higher information, or L1 information and SR configuration information is transmitted to the UE through the higher signaling. In operation 1122, the BS determines scheduling that is associated with the DL data in the LTE cell and the LAA cell in subframe #n for the UE. In operation 1123, the BS determines whether the LAA cell in subframe #n is in an idle time. When it is determined that the LAA cell in subframe #n is in the idle time in operation 1123, the BS receives, on the SR resources, control information associated with DL data in the LTE cell, in subframe #(n+4) of the LTE cell (Pcell) in operation 1124. In this instance, when the BS transmits, to the UE, configuration information that indicates the use of PUCCH format 1b with channel selection in operation 1121, the BS assumes the reception of PUCCH format 1a/1b, and receives only control information associated with DL data in the LTE cell. In operation 1121, when the BS transmits, to the UE, configuration information indicating the use of PUCCH format 1b with channel selection, the BS assumes the reception of PUCCH format 1a/1b on the SR resources, and receives control information for the DL data of the LTE cell, control information for the DL data of the LAA cell, and SR. In operation 1124, the BS may determine that there is the UL data to be transmitted by the UE and the UE requests UL resources which can transmit the UL data through the SR transmission.

When it is determined that the LAA cell in subframe #n is not in the idle time in operation 1123, the UE receives, on the SR resources, control information associated with DL data in the LTE cell together with control information associated with DL data in the LAA cell, in subframe #(n+4) of the LTE cell (Pcell) in operation 1125. In this instance, when the UE receives, from the BS, configuration information that indicates the use of PUCCH format 1b with channel selection in operation 1121, the BS assumes the reception of PUCCH format 1b on the SR resources, receives control information for the DL data of the LTE cell, control information for the DL data of the LAA cell, and SR, together. In operation 1125, the UE has the UL data to be transmitted by the UE and the BS may determine that the UE requests UL resources which can transmit the UL data through the SR transmission.

Referring to FIG. 11D, the operations of a UE will be described.

In operation 1131, the UE receives, from the BS, information associated with an LTE cell (Pcell) and an LAA cell (Scell), and receives configuration information associated with a PUCCH format (PUCCH format 3 or PUCCH format 1b with channel selection) to be used, and transmits configuration information associated with a resource (a subframe or frequency resource) to be used when the UE receives SR, when the UE transmits UCI associated with the reception of DL data in two cells. When the UE transmits UCI associated with the reception of DL data in two cells. The information associated with the LTE cell (Pcell) and the LAA cell (Scell) may be UL and DLDLDL frequency information when the LTE cell or the LAA cell is an FDD scheme, and may be UL-DL configuration information and special subframe configuration information when the LTE cell or the LAA cell is a TDD scheme. Also, the information may be information associated with the maximum occupancy time or idle time of an LAA cell. The information associated with the LTE cell and the LAA cell may be received from the BS through system information, higher information, or L1 information, and SR configuration information is transmitted to the UE through the higher signaling. In operation 1132, the UE attempts to receive DL data in the LTE cell and the LAA cell in subframe #n. In operation 1133, the UE determines whether the LAA cell in subframe #n is in an idle time. When it is determined that the LAA cell in subframe #n is in the idle time in operation 1113, the UE transmits, to the BS, control information associated with DL data in the LTE cell in subframe #(n+4) of the LTE cell (Pcell) on the SR resources in operation 1134. In this instance, when the UE receives, from the BS, configuration information that indicates the use of PUCCH format 1b with channel selection in operation 1311 and receives configuration information indicating an SR transmission in the subframe #(n+4), the UE transmits, on the SR resources, PUCCH format 1a/1b by including only control information associated with DL data in the LTE cell. In operation 1134, the UE has UL data to be transmitted and may request UL resource which can transmit the UL data to the BS through the SR transmission. When it is determined that the LAA cell in subframe #n is not in the idle time in operation 1133, the UE transmits, on the SR resources, control information associated with DL data in the LTE cell together with control information associated with DL data in the LAA cell, in subframe #(n+4) of the LTE cell (Pcell) in operation 1135. In this instance, when the UE receives, from the BS, configuration information that indicates the use of PUCCH format 1b with channel selection in operation 1131, the UE transmits, to the BS, the control information associated with DL data in the LTE cell and the control information associated with DL data in the LAA cell through PUCCH format 1b with channel selection on the SR resources. In operation 1131, when the UE receives, from the BS, the configuration information indicating the use of PUCCH format 1b with channel selection, the UE transmits, to the BS, the control information associated with DL data in the LTE cell and the control information associated with DL data in the LAA cell through PUCCH format 1b on the SR resources. In operation 1135, the UE has the UL data to be transmitted and the UE may request, to the BS, UL resources which can transmit the UL data through the SR transmission.

1-8 Embodiment

Subsequently, when a UL control channel is transmitted in association with a section where DL data cannot be transmitted during a maximum occupancy time in an Scell, which is an LAA cell, a method of transmitting the UL control channel using an UL control format that considers only UCI associated with DL data in a Pcell, which is an LTE cell, will be described with reference to FIG. 12.

Figure 12:
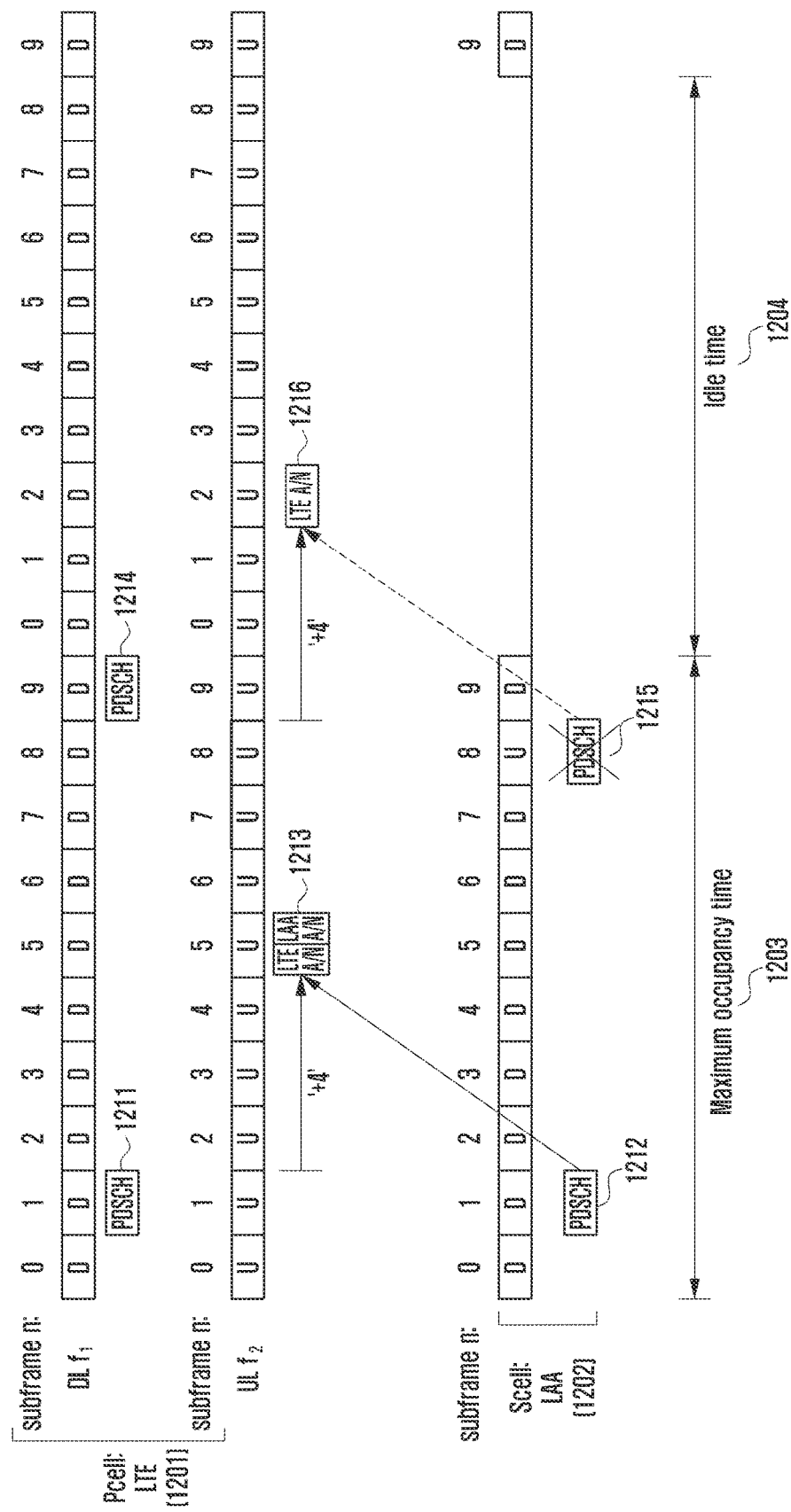
FIG. 12 is a view illustrating a UCI transmission method for DL data according to the 1-8 embodiment of the present disclosure.

FIG. 12 is a diagram illustrating a method of transmitting UCI in association with DL data according to the 1-8 embodiment of the present disclosure. In FIG. 12, a Pcell 1201 is an LTE cell, and uses an FDD scheme. A frequency for DL transmission is f1, and a frequency for UL transmission is f2. An Scell 1202 is an LAA cell and uses a TDD scheme, and a division for the DL subframe and the UL subframe may use a scheme same as existing TDD UL-DL configuration. Division information of a new DL subframe and UL subframe differing may be used. A UE obtains the DL frequency f1 that is associated with a Pcell while executing a cell search, and obtains the UL frequency f2 that is associated with the Pcell by receiving system information from an LTE BS. Also, the frequency and channel associated with an Scell may be transmitted to a UE through higher signaling or system information from an LTE BS or an LAA BS. Further, the UE may obtain configuration representing the division for the UL subframe and the DL subframe in the Scell through the higher signaling and the L1 signal.

Referring to FIG. 12, a PDSCH of the Scell 1202, which is an LAA cell, may be scheduled by the Pcell 1201 which is an LTE cell, through cross-carrier scheduling, or a PDSCH of the Scell 1202, which is an LAA cell, may be scheduled by the Scell 1202, which is an LAA cell, through self-scheduling. When the PDSCH of the Scell 1202, which is an LAA cell, is scheduled by the Pcell 1201, which is an LTE cell, through cross-carrier scheduling, a UE is configured through a higher signaling to monitor (blind decoding) a PDCCH/ePDCCH for scheduling a PDSCH that is transmitted in the Scell 1202, which is an LAA cell, in the Pcell 1201, which is an LTE cell. Also, when the PDSCH of the Scell 1202, which is an LAA cell, is scheduled by the Scell 1202, which is an LAA cell, through self-carrier scheduling, a UE is configured through a higher signaling to monitor (blind decoding) a PDCCH/ePDCCH for scheduling a PDSCH that is transmitted in the Scell 1202, which is an LAA cell, in the Scell 1202, which is an LAA cell.

The case will be firstly described, in which a total of two cells, which are the Pcell and the Scell, are configured for the UE, and the UE is set through a higher signaling to use PUCCH format 1b with channel selection, and thus, the UE transmits a HARQ-ACK through PUCCH format 1b with channel selection. When a PDSCH 1212 is transmitted in subframe #1 of the LAA cell 1202, a HARQ-ACK with respect to the PDSCH 1212 is transmitted in UL subframe #5 of frequency f2 of the Pcell 1201, which is located four subframes after the transmission of the PDSCH 1212, based on a UL control channel transmission timing of the LTE FDD cell. Also, when a PDSCH 1211 is transmitted in subframe #1 of the LTE cell 1201, a HARQ-ACK with respect to the PDSCH 1211 may be transmitted, together with the HARQ-ACK with respect to the PDSCH 1212, in UL subframe #5 of frequency f2 of the Pcell 1201, which is located four subframes after the transmission of the PDSCH 1211, by using PUCCH format 1b channel selection as shown in the diagram 1213. The operation of transmitting the PDSCH 1212 may be executed only within the maximum occupancy time 1203 of the LAA cell 1202, and may not be executed in the idle time 1204. During the idle time 1204, a frequency channel corresponding to the LAA cell 1202 may be occupied by another system (Wi-Fi or another LAA system), and an LAA BS may be incapable of using the frequency channel for the transmission of data. The start time point and end time point, or the length of the maximum occupancy time 1203, may be transmitted and configured through system information or higher signaling and then be set in advance by the BS, and may be transmitted to the UE through L1 signal. Also, the BS may use a variable value by sensing that a Tx signal of another system does not exist in the LAA cell 1202. The BS may previously transmit and configure the length of the maximum occupancy time 1203 through the higher signaling or the L1 signal, may transmit the start time point to the UE through the L1 signal, and the UE may sense may be aware of a start time point of the maximum occupancy time 1203 through blind detection of a predetermined signal (for example, a signal such as CRS and a PSS/SSS, a signal for adjusting synchronization as an initial signal which is firstly sent when occupying the LAA frequency channel, a signal for configuring an AGC, or a signal for measuring a channel). The UE may be aware of when the BS has completed the occupancy of the frequency channel of the LAA cell using the length of the maximum occupancy time 1203 and the start time point. The UE may receive, from the BS, information that is associated with the start time point and end time point, or the start time point and information on the length or the length of the maximum occupancy time 1203, through a higher signal, system information, or the L1 signal, and be aware of a start time point and an end time point in time of the maximum occupancy time 1203 through the blind detection of a predetermined signal (for example, a signal such as CRS and a PSS/SSS, a signal for adjusting synchronization as an initial signal which is firstly sent when occupying the LAA frequency channel, a signal for configuring an AGC, or a signal for measuring a channel). The UE may be aware of when the BS has completed the occupancy of the frequency channel of the LAA cell using the length of the maximum occupancy time 1203 and the start time point. The start time point and the end time point or the start time and the length of the idle time 1204 may be previously configured through the system information, the higher signaling, or the L1 signal, and the BS may sense use a variable value by sensing the existence of a Tx signal of another system in the LAA cell 1202. The UE may receive, from the BS, information that is associated with the start time point and end time point, or the start time point and information on the length or the length of the idle time 1204, through a higher signal, system information, or the L1 signal, and may be aware of a start time point in time and an end time point in time of the idle time 1204 through the blind detection of a predetermined signal (for example, a synchronization signal such as an occupancy signal, a predetermined preamble, a predetermined signal, a CRS, a PSS/SSS, or the like).

Subsequently, within the maximum occupancy time 1203 of the LAA cell 1202, when a PDSCH 1214 of LTE cell 1201 is transmitted in subframe #8, a HARQ-ACK with respect to the PDSCH 1214 is transmitted in subframe #2 of a UL subframe f2 of the Pcell 1201, which is located four subframes after the transmission of the PDSCH 1214. In this instance, subframe #8 of the LAA cell 1202 is in the idle time 1204 and, thus, a PDSCH 1215 may not be transmitted. Therefore, in UL subframe #2 of frequency f2 of the Pcell 1201, only the HARQ-ACK with respect to the PDSCH 1214 of the LTE cell 1201 is transmitted using PUCCH format 1a/1b, as shown in the diagram 1216.

In this instance, with reference to FIG. 12, there is a difference from the case in which only LTE FDD cells or LTE TDD cells coexist. In the case in which only two LTE FDD cells or two LTE TDD cells coexist, when a UL control channel is transmitted in a UL subframe, a transmission may need to be executed using a UL control channel format in each UL subframe. For example, in LTE Re-10, when PUCCH format 1b with channel selection is set to be used, a UL control channel is transmitted by always using PUCCH format 1b with channel selection in each UL subframe, irrespective of PDSCH scheduling. However, when the LAA cell 1202 within the maximum occupancy time 1203 is a subframe in which the PDSCH 1215 is cannot scheduled, since the PDSCH 1215 cannot be transmitted in the LAA cell 1202, a BS and a UE may agree to use a simple transmission format such as PUCCH format 1a or 1b, and in this instance, the UE transmits, through PUCCH format 1a/1b, only a HARQ-ACK with respect to PDSCHs which are transmitted in the LTE cell 1201. Therefore, the complexity of UL control channel reception in a UL subframe of the LTE Pcell 1201, in which the HARQ-ACK is transmitted, may be reduced when the LAA cell 1202 within the maximum occupancy time 1203 is a subframe in which the PDSCH 1215 is cannot scheduled, and UL control channel transmission resources configured for PUCCH format 1b with channel selection may be used for another purpose, such as for the transmission of UL data.

In another example, when the LAA cell 1202 within the maximum occupancy time 1203 is a UL subframe, in a situation in which the PDSCH cannot be scheduled in the LAA cell 1202, the UE may transmit PUCCH format 1b with channel selection by mapping DTX/NACK for the HARQ-ACK of the LAA cell 1202 corresponding to the Scell.

Even though a case in which the LAA cell within the maximum occupancy time is the subframe in which the PDSCH cannot be scheduled and is the UL subframe has been an example, the embodiment can be applied to a case of the subframe in which the PDSCH cannot be schedule. Special subframes in which the PDSCH cannot be scheduled will be described in FIG. 13.

Referring to FIG. 12, the case will be described, in which a total of two cells, which are the Pcell and the Scell, are configured for the UE, and the UE is set through a higher signaling to use PUCCH format 1b with channel selection, and thus, when the UE transmits a HARQ-ACK through PUCCH format 1b with channel selection, the UE simultaneously transmits the HARQ-ACK and an SR in the UL subframe of the Pcell. Herein, when there is UL data to be transmitted by the UE, the SR is for requesting UL transmission resources for transmitting the UL data to the BS, and resources which the UE requires to transmit the SR are previously configured as a transmission period, a transmission offset, and a transmission resource through the higher signal.

When a PDSCH 1212 is transmitted in subframe #1 of the LAA cell 1202, a HARQ-ACK with respect to the PDSCH 1212 is transmitted in UL subframe #5 of frequency f2 of the Pcell 1201, which is located four subframes after the transmission of the PDSCH 1212, based on a UL control channel transmission timing of the LTE FDD cell. Also, when a PDSCH 1211 is transmitted in subframe #1 of the LTE cell 1201, a HARQ-ACK with respect to the PDSCH 1211 may be transmitted, together with the HARQ-ACK with respect to the PDSCH 1212, in UL subframe #5 of frequency f2 of the Pcell 1201, which is located four subframes after the transmission of the PDSCH 1211, by using PUCCH format 1b channel selection as shown in the diagram 1213. In this event, the UE may be configured to transmit an SR from the BS through the higher signaling in UL subframe #5 of the Pcell 1201. The UE should simultaneously transmit the HARQ-ACK and the SR in the UL subframe of the Pcell 1201. A method of simultaneously transmitting the HARQ-ACK and the SR is a method in which when all the Pcell and Scell are in the FDD scheme, the HARQ-ACKs in each cell are spatial bundled and are transmitted through the PUCCH format 1b, the PUCCH format 1b is transmitted on SR previously transmission resources which are configured as the higher signaling for the SR transmission from the BS so that the HARQ-ACK and the SR are simultaneously transmitted. While, even though the UE determines only the HARQ-ACK of one code word as an NACK because the HARQ-ACK is spatial bundled, the NACK is transmitted after the spatial bundling so that retransmission for all code words occurs. For example, when a transmission mode in which all the Pcell and the Scell transmit the two code words is configured through the higher signaling, in a case in which the UE determines, as the result of the PDSCH decoding result, a first code word of the Pcell as the ACK, a second code word of the Pcell as the NACK, a first code word of the Scell as the ACK, and a second code word of the Scell as the ACK, the UE spatial bundles the ACK and the NACK which are the HARQ-ACKs of the Pcell, to be mapped with the PUCCH format 1b as the NACK, and the HARQ-ACKs spatial bundle the ACK and ACK to be mapped with the PUCCH format 1b as the ACK, and then theses are transmitted to the SR transmission resources. Therefore, even though the first code word of the Pcell has been successfully decoded, the BS determines the first code word as the NACK such that a retransmission for the PDSCH is performed. Therefore, when the PUCCH format 1b with channel selection and the SR are simultaneously transmitted, it is causing a demerit in which the retransmission occurs by information loss for the HARQ-ACK.

Meanwhile, the operation of transmitting the PDSCH 1212 may be executed only within the maximum occupancy time 1203 of the LAA cell 1202, and may not be executed in the idle time 1204. During the idle time 1204, a frequency channel corresponding to the LAA cell 1202 may be occupied by another system (Wi-Fi or another LAA system), and an LAA BS may be incapable of using the frequency channel for the transmission of data. The BS may previously transmit and configure the length of the maximum occupancy time 1203 through the higher signaling or the L1 signal, may transmit the start time point to the UE through the L1 signal, and the UE may sense may be aware of a start time point in time and an end time point in time of the maximum occupancy time 1203 through blind detection of a predetermined signal (for example, a signal such as CRS and a PSS/SSS, a signal for adjusting synchronization as an initial signal which is firstly sent when occupying the LAA frequency channel, a signal for configuring an AGC, or a signal for measuring a channel). The UE may be aware of when the BS has completed the occupancy of the frequency channel of the LAA cell using the length of the maximum occupancy time 1203 and the start time point. The UE may receive, from the BS, information that is associated with the start time point and end time point, or the start time point and information on the length or the length of the maximum occupancy time 1203, through a higher signal, system information, or the L1 signal, and be aware of a start time point and an end time point in time of the maximum occupancy time 1203 through the blind detection of a predetermined signal (for example, a signal such as CRS and a PSS/SSS, a signal for adjusting synchronization as an initial signal which is firstly sent when occupying the LAA frequency channel, a signal for configuring an AGC, or a signal for measuring a channel). The UE may be aware of when the BS has completed the occupancy of the frequency channel of the LAA cell using the length of the maximum occupancy time 1203 and the start time point. The start time point and the end time point or the start time and the length of the idle time 1204 may be previously configured through the system information, the higher signaling, or the L1 signal, and the BS may sense use a variable value by sensing the existence of a Tx signal of another system in the LAA cell 1202. The UE may receive, from the BS, information that is associated with the start time point and end time point, or the start time point and information on the length or the length of the idle time 1204, through a higher signal, system information, or the L1 signal, and may be aware of a start time point in time and an end time point in time of the idle time 1204 through the blind detection of a predetermined signal (for example, a synchronization signal such as an occupancy signal, a predetermined preamble, a predetermined signal, a CRS, a PSS/SSS, or the like).

Subsequently, within the maximum occupancy time 1203 of the LAA cell 1202, when a PDSCH 1214 of LTE cell 1201 is transmitted in subframe #8, a HARQ-ACK with respect to the PDSCH 1214 is transmitted in subframe #2 of a UL subframe f2 of the Pcell 1201, which is located four subframes after the transmission of the PDSCH 1214. In this instance, subframe #8 of the LAA cell 1202 is in the idle time 1204 and, thus, a PDSCH 1215 may not be transmitted. Therefore, in UL subframe #2 of frequency f2 of the Pcell 1201, only the HARQ-ACK with respect to the PDSCH 1214 of the LTE cell 1201 is transmitted using PUCCH format 1a/1b, as shown in the diagram 1216. In this event, the UE may be configured to transmit an SR from the BS through the higher signaling in UL subframe #2 of the Pcell 1201. The UE should simultaneously transmit the HARQ-ACK and the SR in the UL subframe of the Pcell 1201. A method of simultaneously transmitting the HARQ-ACK and the SR is a method in which the PDSCH 1215 may not be transmitted because the Scell corresponds to the idle time, only the HARQ-ACK for the PDSCH 1214 of the Pcell is transmitted through the PUCCH format 1a/1b, the BS previously transmits the PUCCH format 1a/1b on SR transmission resources which has been configured as the higher signaling for the SR transmission so that the HARQ-ACK and the SR are simultaneously transmitted. Since the HARQ-ACK is intactly transmitted through the PUCCH format 1a/1b, there is no loss for the HARQ-ACK information. Therefore, when the PUCCH format 1b with channel selection and the SR are simultaneously transmitted, retransmission by information loss for the HARQ-ACK does not occur.

Accordingly, there is a difference from the case where only LTE FDD cells or LTE TDD cells coexist. In the case where two LTE FDD cells or LTE TDD cells coexist, when the SR and the HARQ-ACK is simultaneously transmitted in an UL subframe, the information loss for the HARQ-ACK is accepted and the method of transmitting the HARQ-ACK and the SR are transmitted together becomes to be used. However, when the LAA cell 1202 within the maximum occupancy time is a subframe in which the PDSCH 1215 is cannot scheduled, since the PDSCH 1215 cannot be transmitted in the LAA cell 1202, a BS and a UE may agree to use a simple transmission format such as PUCCH format 1a or 1b, and in this instance, the UE transmits, through PUCCH format 1a/1b, only a HARQ-ACK with respect to PDSCHs which are transmitted in the LTE cell 1201. Therefore, when the LAA cell 1202 within the maximum occupancy time 1203 is a subframe in which the PDSCH 1215 is cannot scheduled, the information loss of the HARQ-ACK by the simultaneous transmission of the HARQ-ACK and the SR in the UL subframe of the LTE Pcell 1201, in which the HARQ-ACK is transmitted, is removed, and the HARQ-ACK and the SR can be transmitted without the loss.

Even though a case in which the LAA cell within the maximum occupancy time is the subframe in which the PDSCH cannot be scheduled and is the UL subframe has been an example, the embodiment can be applied to a case of the subframe in which the PDSCH cannot be schedule. Special subframes in which the PDSCH cannot be scheduled will be described in FIG. 13.

Subsequently, the case will be described, in which a total N of cells (N is larger than or equal to 2. In the embodiment of the present disclosure, a case in which N is 2 will be described), which are the Pcell and the Scell, are configured for the UE, and the UE is set through a higher signaling to use a PUCCH format 3 or a new PUCCH format, and thus, when the UE transmits a HARQ-ACK through the PUCCH format 3 or the new PUCCH format. The new PUCCH format may be for supporting an HARQ-ACK transmission which is larger than maximum 22 bits supported by the PUCCH format 3 or may be PUCCH format 3 based PUCCH format. When a PDSCH 1212 is transmitted in subframe #1 of the LAA cell 1202, a HARQ-ACK with respect to the PDSCH 1212 is transmitted in UL subframe #5 of frequency f2 of the Pcell 1201, which is located four subframes after the transmission of the PDSCH 1012, based on a UL control channel transmission timing of the LTE FDD cell. Also, when a PDSCH 1211 is transmitted in subframe #1 of the LTE cell 1201, a HARQ-ACK with respect to the PDSCH 1211 is calculated as a payload size, together with the HARQ-ACK with respect to the PDSCH 1212, in UL subframe #5 of frequency f2 of the Pcell 1201, which is located four subframes after the transmission of the PDSCH 1211 and is applied to the PUCCH format 3 or the new PUCCH format, and the PUCCH format is transmitted as shown in the diagram 1213. The HARQ-ACK payload size refers to the total number of bits of the HARQ-ACK to be transmitted.

The operation of transmitting the PDSCH 1212 may be executed only within the maximum occupancy time 1203 of the LAA cell 1202, and may not be executed in the idle time 1204. Immediately after finishing the maximum occupancy time 1203 of the Scell 1202, which is an LAA cell, the BS suspends the transmission of all signals in the Scell 1202, which is an LAA cell, and enters the idle time 1204. During the idle time 1204, a frequency channel corresponding to the LAA cell 1202 may be occupied by another system (Wi-Fi or another LAA system), and an LAA BS may be incapable of using the frequency channel for the transmission of data. The start time point and end time point, or the start time point and the length of the maximum occupancy time 1203, may be transmitted through system information or higher signaling and then be set in advance by the BS, and may be transmitted as L1 signal to the UE. Also, the BS may use a variable value by sensing that a Tx signal of another system does not exist in the LAA cell 1202. The BS may previously transmit and configure the length of the maximum occupancy time 1203 through the higher signaling or the L1 signal, may transmit the start time point to the UE through the L1 signal, and the UE may sense may be aware of a start time point in time and an end time point in time of the maximum occupancy time 1203 through blind detection of a predetermined signal (for example, a signal such as CRS and a PSS/SSS, a signal for adjusting synchronization as an initial signal which is firstly sent when occupying the LAA frequency channel), a signal for configuring an AGC, or a signal for measuring a channel). The UE may be aware of when the BS has completed the occupancy of the frequency channel of the LAA cell using the length of the maximum occupancy time 1203 and the start time point. The UE may receive, from the BS, information that is associated with the start time point and end time point, or the start time point and information on the length or the length of the maximum occupancy time 1203, through a higher signal, system information, or the L1 signal, and be aware of a start time point and an end time point in time of the maximum occupancy time 1203 through the blind detection of a predetermined signal (for example, a signal such as CRS and a PSS/SSS, a signal for adjusting synchronization as an initial signal which is firstly sent when occupying the LAA frequency channel), a signal for configuring an AGC, or a signal for measuring a channel). The UE may be aware of when the BS has completed the occupancy of the frequency channel of the LAA cell using the length of the maximum occupancy time 1203 and the start time point. The start time point and the end time point or the start time and the length of the idle time 1204 may be previously configured through the system information, the higher signaling, or the L1 signal, and the BS may sense use a variable value by sensing the existence of a Tx signal of another system in the LAA cell 1202. The UE may receive, from the BS, information that is associated with the start time point and end time point, or the start time point and information on the length or the length of the idle time 1204, through a higher signal, system information, or the L1 signal, and may be aware of a start time point in time and an end time point in time of the idle time 1204 through the blind detection of a predetermined signal (for example, a synchronization signal such as an occupancy signal, a predetermined preamble, a predetermined signal, a CRS, a PSS/SSS, or the like).

Subsequently, within the maximum occupancy time 1203 of the LAA cell 1202, when a PDSCH 1214 of LTE cell 1201 is transmitted in subframe #8, a HARQ-ACK with respect to the PDSCH 1214 is transmitted in subframe #2 of a UL subframe f2 of the Pcell 1201, which is located four subframes after the transmission of the PDSCH 1214. In this instance, subframe #8 of the LAA cell 1202 is the UL subframe and, thus, a PDSCH 1215 may not be scheduled. Therefore, in UL subframe #2 of frequency f2 of the Pcell 1201, only the HARQ-ACK with respect to the PDSCH 1214 of the LTE cell 1201 is calculated as the payload size and is applied to the PUCCH format 3 or the new PUCCH format, and the PUCCH format is transmitted as shown in the diagram 1216.

In this instance, there is a difference from the case where only LTE FDD cells or LTE TDD cells coexist. In the case where two LTE FDD cells or LTE TDD cells coexist, when a UL control channel is transmitted in a UL subframe, the HARQ-ACK payload size is calculated by multiplexing PUCCH format 3 or new PUCCH format, the number of TBs based on the transmission mode of the cells, and the number of cells for which CA is configured (in the case of CA of TDD cells, a bundling window size is additionally multiplied), the payload size is applied to the PUCCH format 3 and the new PUCCH format, and the PUCCH format 3 and the new PUCCH format is transmitted. Therefore, the HARQ-ACK payload size applied to the PUCCH format 3 and the new PUCCH format is not changed for each subframe. However, in the situation in which the LAA cell 1202 is a subframe in which the PDSCH 1215 cannot be scheduled, since the PDSCH 1215 cannot be transmitted in the LAA cell 1202, the UE may not use HARQ-ACKs in subframes, which is within the maximum occupancy time in the LAA cell in which the PDSCH 1215 cannot be transmitted, and HARQ ACKs with respect to PDSCHs that cannot be transmitted in subframes within the idle time 1004 of the LAA cell 1202 when calculating a HARQ-ACK payload size, and applies, to the PUCCH format 3 and the new PUCCH format, a payload size that is calculated using the PDSCHs that are transmitted in the LTE cell 1201, and executes a transmission. The above description applies, to the PUCCH format 3 or the new PUCCH format, the payload size that is calculated using the PDSCHs that are transmitted in the LTE cell 1201 by assuming that only the LTE cell 1201 and the LAA cell 1202, which is two cells, exist. When two or more LTE cells and LAA cells are used, a payload size is applied to the PUCCH format 3 or the new PUCCH format, in association with PDSCHs having a subframe in which the PDSCH is scheduled, and PDSCHs which can be transmitted in other LTE cells among an LAA cells within the maximum occupancy time.

Therefore, when two or more cells are used, HARQ-ACKs with respect to PDSCHs which cannot be transmitted of the LAA cell in which the PDSCH cannot be transmitted in the idle time and the LAA cells having the subframes in which the PDSCH cannot be transmitted within the maximum occupancy time are not applied to HARQ-ACK payload size, and the calculated payload size is applied to the PUCCH format 3 and the new PUCCH format the using HARQ-ACKs with respect to PDSCHs which cannot be transmitted of the LTE cell or LAA cell having subframes in which the PDSCH can be transmitted within the maximum occupancy time.

Therefore, when the UE uses the PUCCH format 3 and the new PUCCH format to which an optimized HARQ-ACK payload size is applied in the subframe, the reception performance of the BS may be secured and a UE Tx power may be reduced. Also, although FIG. 12 has been described from the perspective of the case in which the LAA cell 1202 is an FDD, the UL control format transmission method of FIG. 12 may be equally applied to the case of a TDD.

For another example, since the PDSCH 1215 is a subframe in which the PDSCH cannot be scheduled in the LAA cell 1202 within the maximum occupancy time 1203, in a situation in which the PDSCH 1215 cannot be transmitted in the LAA cell 1202, the UE maps DTX/NACK for the HARQ-ACKs of the LAA cell 1202 corresponding to the Scell, maps the HARQ-ACK according to a decoding result with respect to the PDSCHs which can be transmitted in other LAA cells and other LTE cells which are within the maximum occupancy time, and transmits a transmission of the PUCCH format 3 or the new PUCCH format applied to a payload size calculated with respect to the PDSCHs which can be transmitted in other LAA cell or other LTE cells as well as DTX/NACK according to the number of the decode word of the PDSCH depending on the transmission mode of the LAA cell 1202.

Even though a case in which the LAA cell within the maximum occupancy time is the subframe in which the PDSCH cannot be scheduled and is the UL subframe has been an example, the embodiment can be applied to a case of the subframe in which the PDSCH cannot be schedule. Special subframes in which the PDSCH cannot be scheduled will be described in FIGS. 13A and 13B.

FIGS. 13A and 13B are views illustrating special subframe configuration according to the 1-8 embodiment of the present disclosure.

A special subframe configuration, in which a length of a downlink pilot time slot (DwPTS) 1304, a length of a guard period (GP) 1305, and a length of an uplink pilot time slot (UpPTS) 1306 in a special subframe which is defined in the LTE are defined, is defined as 10 special subframe configuration (in FIG. 13A) and 8 special subframe configuration (in FIG. 13B) according to whether a cyclic prefix applied in a DL corresponds to a normal cyclic prefix or an extended cyclic prefix.

Whether the cyclic prefix applied in a DL corresponds to the normal cyclic prefix or the extended cyclic prefix may be obtained through a reception and a decoding of a synchronization signal transmitted from a cell by the UE. In special subframe configuration 1301 supporting the normal cyclic prefix in the DL, #0 (1302) and #5 (1303) includes a DwPTS of 3 OFDM symbol and PDSCH cannot be scheduled so that the PDSCH cannot be ideally transmitted. Also, in special subframe configuration 1311 supporting the extended cyclic prefix in the DL, #0 (1312) and #5 (1303) includes a DwPTS of 3 OFDM symbol and PDSCH cannot be scheduled so that the PDSCH cannot be ideally transmitted. Therefore, when the normal cyclic prefix is applied and the special subframe configuration is #0 (1302) or #5 (1303) in the DL, the embodiment of FIG. 12 may be applied, and when the extended cyclic prefix is applied and the special subframe configuration is #0 (1312) and #4 (1313) in the DL, the embodiment of FIG. 12 may be applied.

Figure 14A:
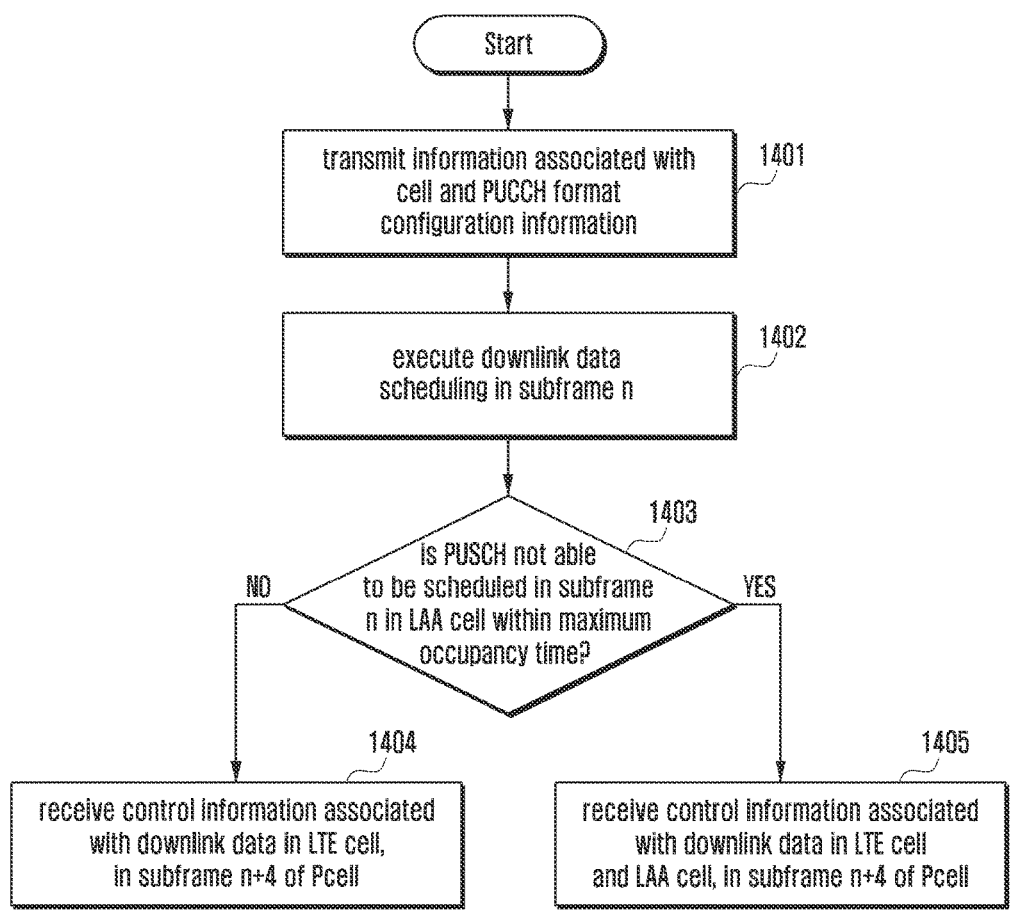
FIGS. 14A and 14B are flowcharts illustrating operations of a BS and a UE for a UCI transmission method for DL data according to the 1-8 embodiment of the present disclosure.
Figure 14B:
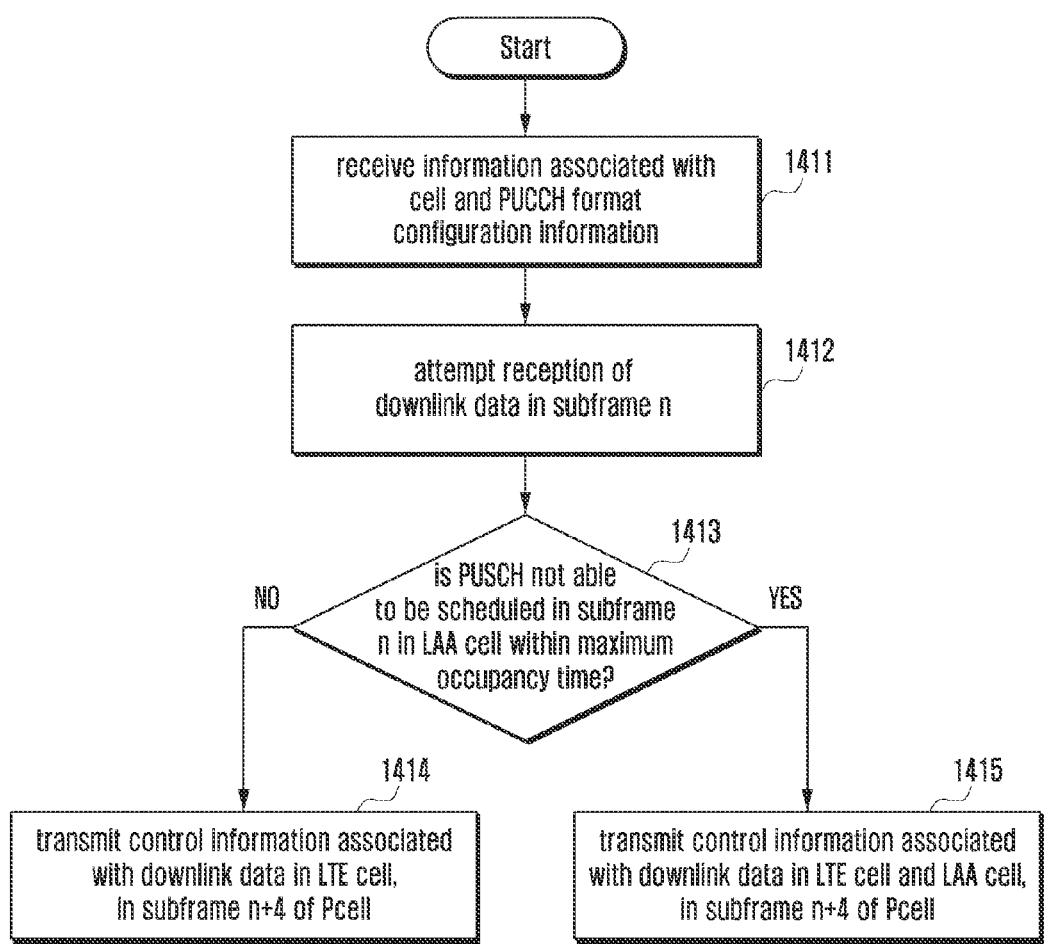

FIGS. 14A and 14B are flowcharts illustrating operations of a BS and a UE for an UCI transmission method for DL data according to the 1-8 embodiment of the present disclosure. When the UL control channel for the DL of the LTE cell and the LAA cell is transmitted in FIG. 12, in particular, a format of the UL control channel is the PUCCH format 1b with channel selection, the PUCCH format 3, or the new PUCCH format, an order of FIGS. 14A and 14B may be applied. An operation of a BS and a UE for applying the UL control channel format according to the embodiment of the present disclosure will be described through a flowchart for each of FIGS. 14A and 14B.

Referring to FIG. 14A, the operations of a BS will be described. Here, a BS may be an LTE BS or an LAA BS.

In operation 1401, the BS transmits, to the UE, information associated with an LTE cell (Pcell) and an LAA cell (Scell), and transmits configuration information associated with a PUCCH format 3 or a new PUCHH format to be used when the UE transmits UCI associated with the reception of DL data in two cells. The information associated with the LTE cell (Pcell) and the LAA cell (Scell) may be UL and DL frequency information when the LTE cell or the LAA cell is an FDD scheme, and may be UL-DL configuration information and special subframe configuration information when the LTE cell or the LAA cell is a TDD scheme. Also, the information may be information associated with the maximum occupancy time or idle time of an LAA cell. The information associated with the LTE cell and the LAA cell may be transmitted to the UE through system information, higher information, and L1 information. In operation 1402, the BS determines scheduling that is associated with the DL data in the LTE cell and the LAA cell in subframe #n for the UE. Next, in operation 1403, the BS determines whether the PDSCH cannot be fundamentally transmitted because the PDSCH cannot be scheduled in subframe #n of the LAA cell is in the maximum occupancy time. When it is determined that the PDSCH cannot be fundamentally transmitted because the PDSCH cannot be scheduled in subframe #n of the LAA cell in operation 1403, the BS receives control information associated with DL data in the LTE cell, in subframe #(n+4) of the LTE cell (Pcell) in operation 1404. In this instance, when the BS transmits, to the UE, configuration information that indicates the use of PUCCH format 1b with channel selection, the BS assumes the reception of PUCCH format 1a/1b, and receives only control information associated with DL data in the LTE cell. In operation 1401, when the BS transmits, to the UE, configuration information indicating the use of PUCCH format 3 and new PUCCH format, the BS assumes the reception of PUCCH format 3 and new PUCCH format to which a HARQ-ACK payload size associated with the PDSCHs in an LTE cell or the PDSCHs in only the LAA cells within maximum occupancy time in subframe #n is applied, and receives only control information associated with DL data in LTE cell or in the LAA cells within maximum occupancy time in subframe #n. When it is determined that the LAA cell in subframe #n is not in the idle time in operation 1403, the BS receives control information associated with DL data in the LTE cell together with control information associated with DL data in the LAA cell, in subframe #(n+4) of the LTE cell (Pcell) in operation 1405. In this instance, when the BS transmits, to the UE, configuration information that indicates the use of PUCCH format 1b with channel selection in operation 1401, the BS assumes the reception of PUCCH format 1b with channel selection, and receives the control information associated with DL data in the LTE cell and the control information associated with DL data in the LAA cell. When the BS transmits, to the UE, configuration information indicating the use of PUCCH format 3 or new PUCCH format in operation 1401, the BS assumes the reception of PUCCH format 3 or new PUCCH format to which a HARQ-ACK payload size of an LTE cell and an LAA cell within maximum occupancy time in subframe #n is applied, and receives all the control information associated with DL data in LTE cell and in the LAA cells within maximum occupancy time in subframe #n.

Referring to FIG. 14B, the operations of a UE will be described.

In operation 1411, the UE receives, from the BS, information associated with an LTE cell (Pcell) and an LAA cell (Scell), and receives configuration information associated with a PUCCH format (PUCCH format 3, new PUCCH format or PUCCH format 1b with channel selection) to be used when the UE transmits UCI associated with the reception of DL data in two cells. The information associated with the LTE cell (Pcell) and the LAA cell (Scell) may be UL and DL frequency information when the LTE cell or the LAA cell is an FDD scheme, and may be UL-DL configuration information and special subframe configuration information when the LTE cell or the LAA cell is a TDD scheme. Also, the information may be information associated with the maximum occupancy time or idle time of an LAA cell. The information associated with the LTE cell and the LAA cell may be received from the BS through system information, higher information, or L1 information. In operation 1412, the UE attempts to receive DL data in the LTE cell and the LAA cell in subframe #n. Next, in operation 1413, the BS determines whether the PDSCH cannot be fundamentally transmitted because the PDSCH cannot be scheduled in subframe #n of the LAA cell is in the maximum occupancy time. When it is determined that the PDSCH cannot be fundamentally transmitted because the PDSCH cannot be scheduled in subframe #n of the LAA cell in operation 1413, the BS receives control information associated with DL data in the LTE cell, in subframe #(n+4) of the LTE cell (Pcell) in operation 1414. In this instance, when the UE receives, from the BS, configuration information that indicates the use of PUCCH format 1b with channel selection, the UE transmits PUCCH format 1a/1b by including only control information associated with DL data in the LTE cell. In operation 1411, when the UE receives, from the BS, the configuration information indicating the use of PUCCH format 3 or new PUCCH format, the UE transmits a preconfigured PUCCH format 3 to which a HARQ-ACK payload size associated with PDSCHs of the LTE cell or PDSCHs of only the LAA cell within maximum occupancy time in subframe #n is applied. When it is determined that the LAA cell in subframe #n is not in the idle time in operation 1413, the UE transmits control information associated with DL data in the LTE cell together with control information associated with DL data in the LAA cell, in subframe #(n+4) of the LTE cell (Pcell) in operation 1415. In this instance, when the UE receives, from the BS, configuration information that indicates the use of PUCCH format 1b with channel selection in operation 1411, the UE transmits, to the BS, the control information associated with DL data in the LTE cell and the control information associated with DL data in the LAA cell through PUCCH format 1b with channel selection. In operation 1411, when the UE receives, from the BS, the configuration information indicating the use of PUCCH format 3, the UE transmits, to the BS, PUCCH format 3 to which a HARQ-ACK payload size associated with PDSCHs of the LTE cell and the LAA cell within maximum occupancy time in subframe #n is applied.

Figure 14C:
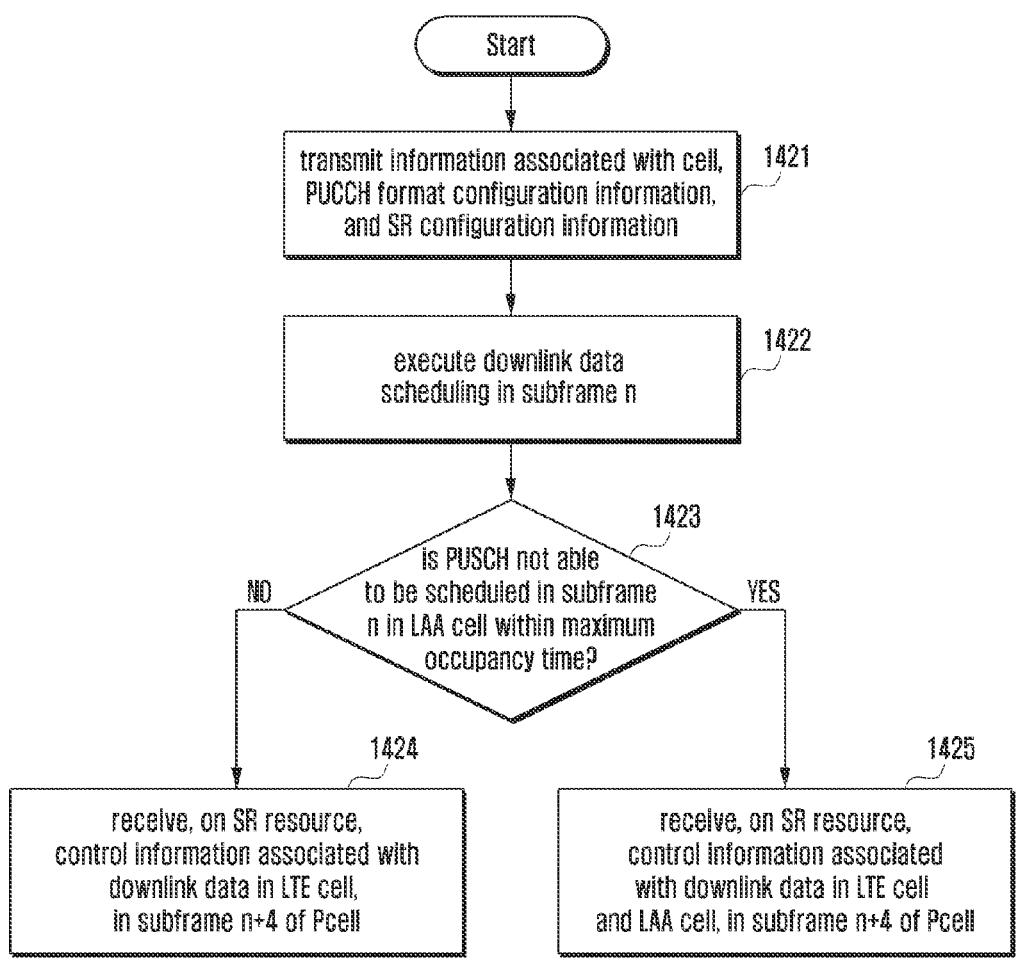
FIGS. 14C and 14D are flowcharts illustrating operations of a BS and a UE for a method for simultaneously transmitting UCI for DL data and an SR according to the 1-8 embodiment of the present disclosure.
Figure 14D:
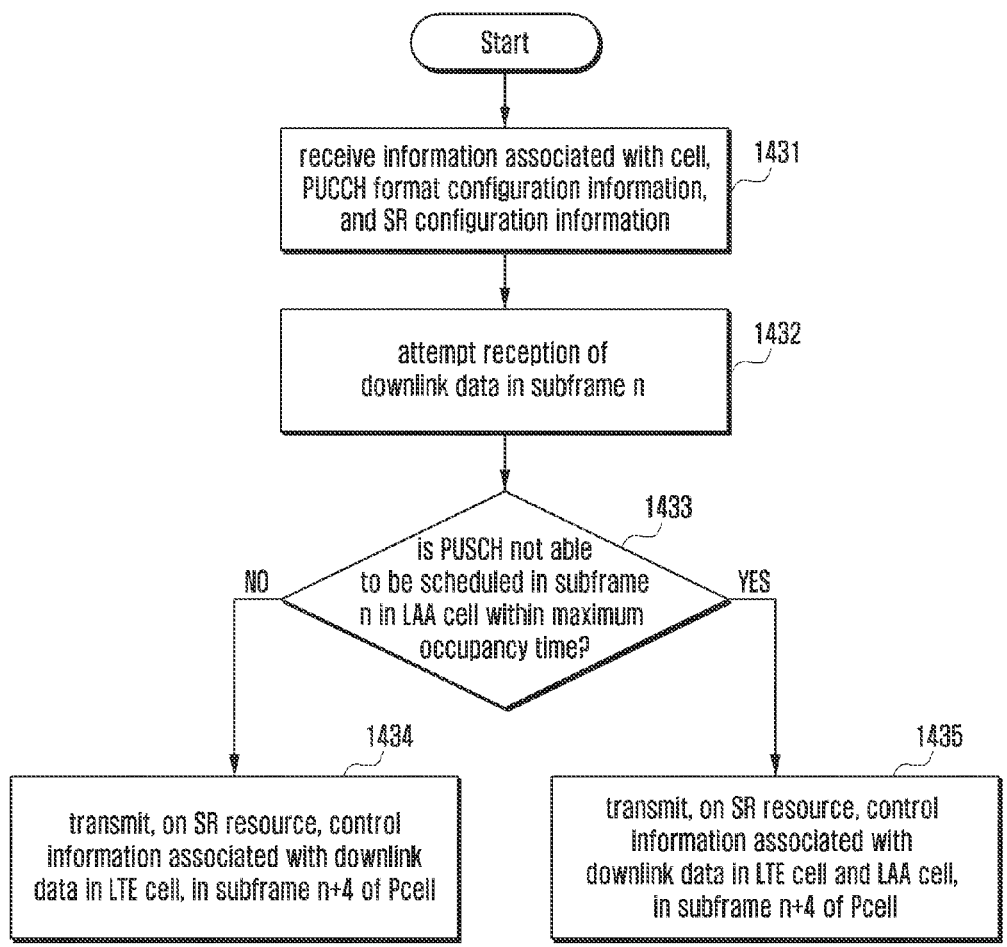

FIGS. 14C and 14D are flowcharts illustrating operations of a BS and an UE for a method for simultaneously transmitting UCI for DL data and an SR according to the 1-8 embodiment of the present disclosure. When a UL control channel, with respect to DL data of an LTE cell and an LAA cell, is transmitted in FIG. 12, the operations of a BS and a UE for applying a UL control channel format to simultaneously transmit an HARQ-ACK and an SR, according to the 1-8 embodiment of the present disclosure, will be described through each flowchart of FIGS. 14C and 14D.

Referring to FIG. 14C, the operations of a BS will be described. Here, a BS may be an LTE BS or an LAA BS.

In operation 1421, the BS transmits, to the UE, information associated with an LTE cell (Pcell) and an LAA cell (Scell), and transmits configuration information associated with a PUCCH format (PUCCH format 3 or PUCHH format 1b with channel selection) to be used, and transmits configuration information associated with a resource (a subframe or frequency resource) to be used when the UE transmits SR, when the UE transmits UCI associated with the reception of DL data in two cells. The information associated with the LTE cell (Pcell) and the LAA cell (Scell) may be UL and DL frequency information when the LTE cell or the LAA cell is an FDD scheme, and may be UL-DL configuration information and special subframe configuration information when the LTE cell or the LAA cell is a TDD scheme. Also, the information may be information associated with the maximum occupancy time or idle time of an LAA cell. The information associated with the LTE cell and the LAA cell may be transmitted to the UE through system information, higher information, or L1 information and SR configuration information is transmitted to the UE through the higher signaling. In operation 1422, the BS determines scheduling that is associated with the DL data in the LTE cell and the LAA cell in subframe #n for the UE. Next, in operation 1423, the BS determines whether the PDSCH cannot be fundamentally transmitted because the PDSCH cannot be scheduled in subframe #n of the LAA cell is in the maximum occupancy time. When it is determined that the PDSCH cannot be fundamentally transmitted because the PDSCH cannot be scheduled in subframe #n of the LAA cell in operation 1423, the BS receives control information associated with downlink data in the LTE cell, in subframe #(n+4) of the LTE cell (Pcell) in operation 1424. In this instance, when the BS transmits, to the UE, configuration information that indicates the use of PUCCH format 1b with channel selection in operation 1421, the BS assumes the reception of PUCCH format 1a/1b, and receives only control information associated with DL data in the LTE cell. In operation 1421, when the BS transmits, to the UE, configuration information indicating the use of PUCCH format 1b with channel selection, the BS assumes the reception of PUCCH format 1a/1b on the SR resources, and receives control information for the DL data of the LTE cell, control information for the DL data of the LAA cell, and SR. In operation 1424, the BS may determine that there is the UL data to be transmitted by the UE and the UE requests UL resources which can transmit the UL data through the SR transmission.

When it is determined that the LAA cell in subframe #n is not in the idle time in operation 1423, the UE receives, on the SR resources, control information associated with DL data in the LTE cell together with control information associated with DL data in the LAA cell, in subframe #(n+4) of the LTE cell (Pcell) in operation 1425. In this instance, when the UE receives, from the BS, configuration information that indicates the use of PUCCH format 1b with channel selection in operation 1421, the BS assumes the reception of PUCCH format 1b on the SR resources, receives control information for the DL data of the LTE cell, control information for the DL data of the LAA cell, and SR, together. In operation 1425, the UE has the UL data to be transmitted by the UE and the BS may determine that the UE requests UL resources which can transmit the UL data through the SR transmission.

Referring to FIG. 14D, the operations of a UE will be described.

In operation 1431, the UE receives, from the BS, information associated with an LTE cell (Pcell) and an LAA cell (Scell), and receives configuration information associated with a PUCCH format (PUCCH format 3 or PUCCH format 1b with channel selection) to be used, and transmits configuration information associated with a resource (a subframe or frequency resource) to be used when the UE receives SR, when the UE transmits UCI associated with the reception of DL data in two cells. When the UE transmits UCI associated with the reception of DL data in two cells. The information associated with the LTE cell (Pcell) and the LAA cell (Scell) may be UL and DL frequency information when the LTE cell or the LAA cell is an FDD scheme, and may be UL-DL configuration information and special subframe configuration information when the LTE cell or the LAA cell is a TDD scheme. Also, the information may be information associated with the maximum occupancy time or idle time of an LAA cell. The information associated with the LTE cell and the LAA cell may be received from the BS through system information, higher information, or L1 information, and SR configuration information is transmitted to the UE through the higher signaling. In operation 1432, the UE attempts to receive DL data in the LTE cell and the LAA cell in subframe #n. Next, in operation 1433, the BS determines whether the PDSCH cannot be fundamentally transmitted because the PDSCH cannot be scheduled in subframe #n of the LAA cell is in the maximum occupancy time. When it is determined that the PDSCH cannot be fundamentally transmitted because the PDSCH cannot be scheduled in subframe #n of the LAA cell in operation 1433, the BS receives control information associated with DL data in the LTE cell, in subframe #(n+4) of the LTE cell (Pcell) in operation 1434. In this instance, when the UE receives, from the BS, configuration information that indicates the use of PUCCH format 1b with channel selection in operation 1431 and receives configuration information indicating an SR transmission in the subframe #(n+4), the UE transmits, on the SR resources, PUCCH format 1a/1b by including only control information associated with DL data in the LTE cell. In operation 1434, the UE has UL data to be transmitted and may request UL resource which can transmit the UL data to the BS through the SR transmission. When it is determined that the LAA cell in subframe #n is not in the idle time in operation 1433, the UE transmits, on the SR resources, control information associated with DL data in the LTE cell together with control information associated with DL data in the LAA cell, in subframe #(n+4) of the LTE cell (Pcell) in operation 1435. In this instance, when the UE receives, from the BS, configuration information that indicates the use of PUCCH format 1b with channel selection in operation 1431, the UE transmits, to the BS, the control information associated with DL data in the LTE cell and the control information associated with DL data in the LAA cell through PUCCH format 1b with channel selection on the SR resources. In operation 1431, when the UE receives, from the BS, the configuration information indicating the use of PUCCH format 1b with channel selection, the UE transmits, to the BS, the control information associated with DL data in the LTE cell and the control information associated with DL data in the LAA cell through PUCCH format 1b on the SR resources. In operation 1435, the UE has the UL data to be transmitted and the UE may request, to the BS, UL resources which can transmit the UL data through the SR transmission.

Figure 15:
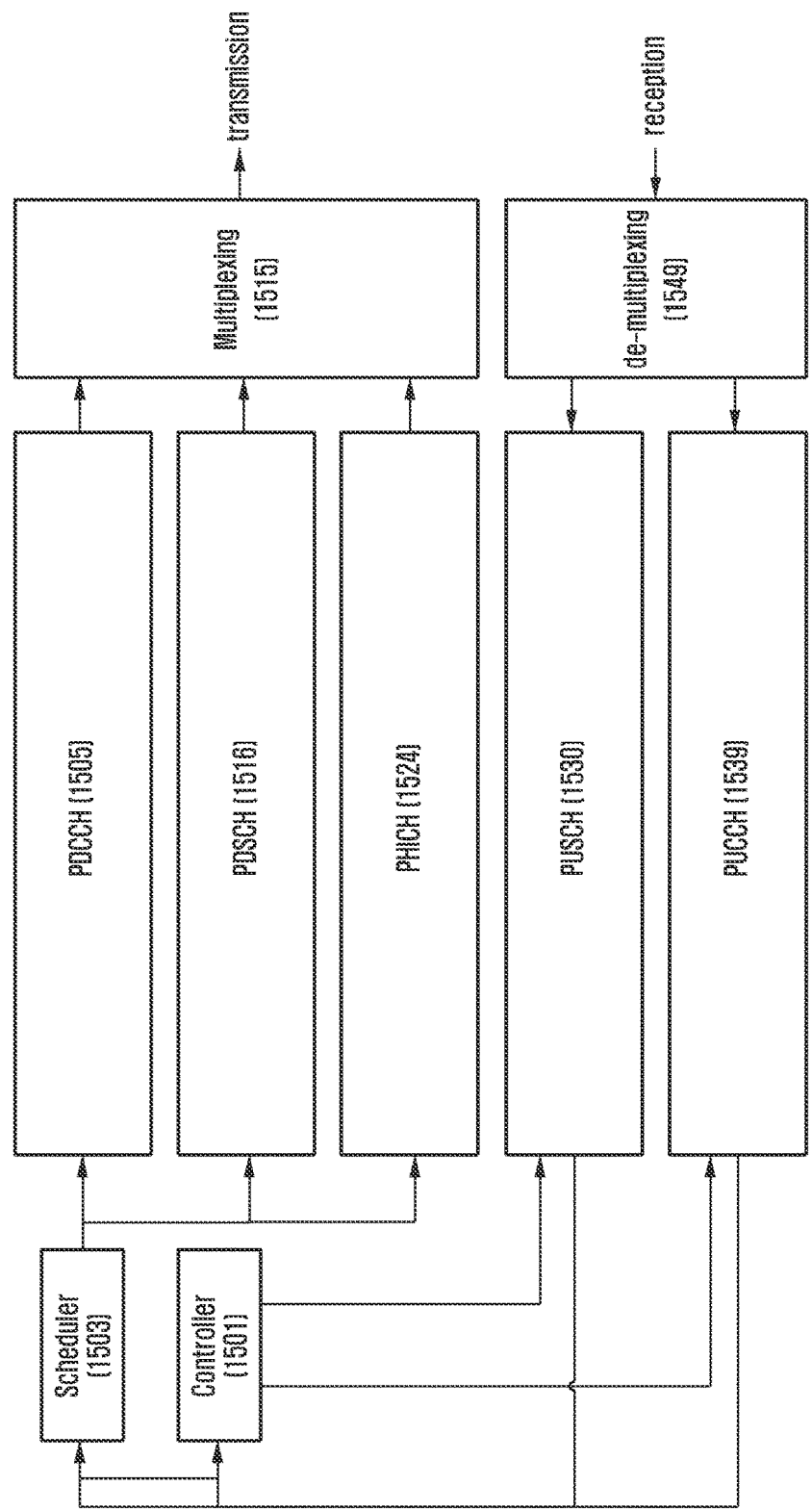
FIG. 15 is a view illustrating a BS device according to embodiments of the present disclosure.

FIG. 15 is a diagram illustrating a BS device according to various embodiments of the present disclosure. Here, a BS may be an LTE BS or an LAA BS. Referring to FIG. 15, the BS may be formed of a transmitting unit that is configured to include a PDCCH block 1505, a PDSCH block 1516, a PHICH block 1524, and a multiplexer 1515; a receiving unit that is configured to include a PUSCH block 1530, a PUCCH block 1539, and a de-multiplexer 1549; a controller that controls data successive retransmission, a transmission/reception timing of DL/UL HARQ-ACK after data successive retransmission, a HARQ-ACK payload size, and a PUCCH transmission format; and a scheduler 1503. Here, the data successive retransmission includes PDSCH successive retransmission and PUSCH successive retransmission. The transmission/reception timing of a DL/UL HARQ-ACK after data successive retransmission includes a PUCCH transmission timing associated with PDSCH transmission, a PUSCH transmission timing associated with UL grant transmission, and a UL grant/PHICH transmission timing associated with PUSCH transmission. The PUCCH transmission format includes all of PUCCH format 1b with channel selection, PUCCH format 3, and PUCCH format 1a/1b. The HARQ-ACK payload size indicates the number of HARQ-ACK bits to be applied to PUCCH format 3. Although a plurality of transmitting units and receiving units (excluding a PUCCH block) may be used for transmission/reception in a plurality of cells, for ease of description, it is assumed that a single transmitting unit and a single receiving unit are used.

Referring to FIG. 15, the controller 1501 that controls the data successive retransmission, the transmission/reception timing of a DL/UL HARQ-ACK after the data successive retransmission, a HARQ-ACK payload size, and the PUCCH transmission format may adjust a relationship of timing among physical channels with respect to a UE for which scheduling is to be performed based on the amount of data to be transmitted to the UE, the amount of available resources in a system, and the like, and may report the same to the scheduler 1503, the PDCCH block 1505, the PDSCH block 1516, the PHICH block 1524, the PUSCH block 1530, and the PUCCH block 1539. The control of the data successive retransmission, the relationship of transmission/reception timing of DL/UL HARQ-ACK after data successive retransmission, the HARQ-ACK payload size, and the PUCCH transmission format may be based on the method that has been described in the detailed embodiments of the present disclosure.

The PDCCH block 1505 configures control information under the control of the scheduler 1503 so as to trigger the successive retransmission of a PUSCH, as described in the embodiments of the present disclosure, and the control information may be multiplexed with other signals in the multiplexer 1515.

The PDSCH block 1516 generates data under the control of the scheduler 1503 so as to execute the successive retransmission of a PUSCH, as described in the embodiments of the present disclosure, and the data may be multiplexed with other signals in the multiplexer 1515.

The PHICH block 1524 generates a HARQ ACK/NACK with respect to a PUSCH received from the UE under the control of the scheduler 1503 as a HARQ-ACK with respect to the successive retransmission of a PUSCH, as described in the detailed embodiments of the present disclosure. The HARQ ACK/NACK may be multiplexed with other signals in the multiplexer 1515.

The multiplexed signals may be generated as an OFDM signal and may be transmitted to the UE.

When the successive retransmission of a PUSCH is triggered as described in the detailed embodiments of the present disclosure, the PUSCH block 1530 in the receiving unit obtains PUSCH data associated with a signal received from the UE. Whether a result of decoding the PUSCH data is erroneous is reported to the scheduler 1503 so as to adjust the generation of a DL HARQ ACK/NACK. The information associated with whether the result of decoding is erroneous is provided to the controller 1501 so that a DL HARQ ACK/NACK transmission timing may be adjusted.

The PUCCH block 1539 obtains a UL ACK/NACK or a CQI from a signal received from the UE based on a PUCCH transmission timing, or from a signal received from the UE through a HARQ-ACK payload signal and a PUCCH format when successive retransmission of a PDSCH is executed. The obtained UL ACK/NACK or CQI is provided to the scheduler 1503, and may be used for determining an MCS and whether to retransmit a PDSCH. The obtained UL ACK/NACK is provided to the controller 1501 so as to adjust a transmission timing of a PDSCH.

Figure 16:
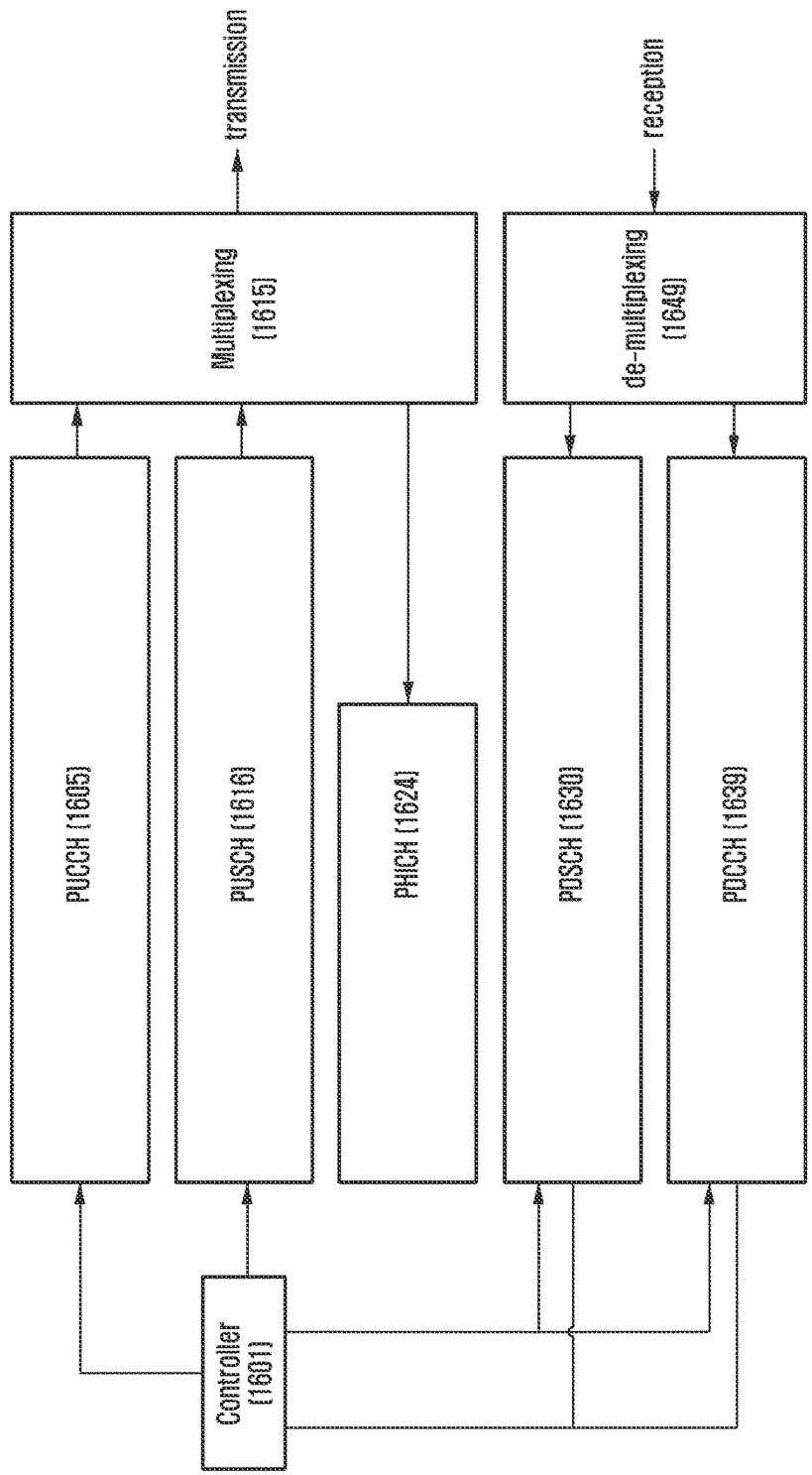
FIG. 16 is a view illustrating a UE device according to various embodiments of the present disclosure.

FIG. 16 is a diagram of a UE according to various embodiments of the present disclosure.

Referring to FIG. 16, a UE is formed of: a transmitting unit that is configured to include a PUCCH block 1605, a PUSCH block 1616, and a multiplexer 1615; a receiving unit that is configured to include a PHICH block 1624, a PDSCH block 1630, a PDCCH block 1639, and a de-multiplexer 1649; and a controller 1601 that controls data successive retransmission, a timing of transmission/reception of a DL/UL HARQ-ACK after data successive retransmission, a HARQ-ACK payload size, and a PUCCH transmission format. Although a plurality of transmitting units and receiving units may be used for transmission/reception in a plurality of cells, the description will be provided by assuming that a single transmitting unit and a single receiving unit are used.

The controller 1601 that controls the data successive retransmission, the timing of the transmission/reception of a DL/UL HARQ-ACK after data successive retransmission, the HARQ-ACK payload size, and the PUCCH transmission format may report the data successive retransmission, the timing of transmission/reception of a DL/L HARQ-ACK after data successive retransmission, the HARQ-ACK payload size, and the PUCCH transmission format to the PDSCH block 1630, the PDCCH block 1639, the PUCCH block 1605, and the PUSCH block 1616. The control of the data successive retransmission, the relationship of transmission/reception timing of DL/UL HARQ-ACK after data successive retransmission, the HARQ-ACK payload size, and the PUCCH transmission format may be based on the method that has been described in the detailed embodiments of the present disclosure.

The PUCCH block 1605 configures a HARQ ACK/NACK or CQI as uplink control information (UCI) under the control of the controller 1601 that controls storing DL data in a soft buffer, and the HARQ ACK/NACK or CQI may be multiplexed with other signals in the multiplexer 1615, and the PUCCH transmission method after data successive retransmission and PUCCH transmission format, according to the various embodiments of the present disclosure, are determined and transmitted to the BS.

The PUSCH block 1616 extracts data to be transmitted through the data successive retransmission according to the embodiments of the present disclosure, and the extracted data may be multiplexed with other signals in the multiplexer 1615. The multiplexed signals are generated as a single carrier frequency division multiple access (SC-FDMA) signal, and may be transmitted to the BS by taking into consideration a DL/UL HARQ-ACK transmission/reception timing.

The PHICH block 1624 in the receiving unit separates a PHICH signal through the de-multiplexer 1649 from a signal received from the BS based on the timing of transmission/reception of DL/UL HARQ-ACK after data successive retransmission, according to the present disclosure, and obtains a HARQ ACK/NACK with respect to a PUSCH.

The PDSCH block 1630 separates a PDSCH signal through the de-multiplexer 1649 from a signal received from the BS based on a data successive retransmission method, according to embodiments of the present disclosure, obtains PDSCH data, informs the PUCCH block 1605 of whether a result of decoding the data is erroneous so as to adjust the generation of a UL HARQ ACK/NACK, and provides the information associated with whether the result of decoding is erroneous to the controller 1601 so as to adjust the timing of transmission of a UL HARQ ACK/NACK.

The PDCCH block 1639 separates a PDCCH signal through de-multiplexer 1649 to trigger the data successive retransmission according to embodiments of the present disclosure, and obtains a DCI from a decoded signal obtained by decoding a DCI format.

Although the embodiment has been described in the detailed description of the present disclosure, the present disclosure may be modified in various forms without departing from the scope of the present disclosure. Therefore, the scope of the present disclosure should not be defined as being limited to the embodiments of the present disclosure, but should be defined by the appended claims and equivalents thereof.

Embodiment 2

The present disclosure relates to a method and apparatus for transmitting and receiving signals for device-to-device (D2D) communication in a wireless mobile communication system, and more particularly, to a resource allocation method and feedback information transmission method for transmitting feedback information between user equipments (UEs) that currently execute unicast communication in a D2D communication system, and a UE's device thereof.

As the types of services that use a wireless mobile communication system have varied, the demand for a new technology to efficiently support newly introduced services has also increased. Therefore, new methods and technologies in the wireless mobile communication system have been studied and developed.

D2D communication is a new technology that is developed as a solution for a new service in an existing communication system. Basically, it enables a UE to directly communicate with another UE that exists around the corresponding UE. Through the use of the D2D communication, a UE may discover which UEs exist around the UE, and may execute direct communication with a UE with which communication is needed.

When direct communication is executed between UEs, a relatively small amount of radio resources may be consumed compared to communication that is executed using a BS through an existing radio network. Thus, D2D communication may be highly advantageous from the perspective of the efficiency of radio resources. Also, D2D direct communication enables communication between UEs without using a BS, and thus, may be appropriate for a public safety network for communication during natural disasters, such as earthquake or Tsunami, accidents, or emergency situations where a BS abnormally operates for various reasons.

Currently, an LTE-A system of 3GPP requires support for the D2D technology, and the discussions associated with technical issues associated thereto are under way. In LTE-A, D2D communication based on Release-12 which is currently standardized, includes both discovering a UE and direct communication with a UE.

According to the D2D communication based on Release-12, the discovery of a UE and the direct communication with a UE use a UL, which is used when a UE transmits a signal to a BS from among frequency resources used in an existing cellular communication. The D2D direct communication may execute communication based on broadcasting and groupcasting. That is, a signal that a single Transmission (Tx) UE transmits through direct communication may be received by a plurality of UEs that exist in the coverage area, or may be received in parallel by UEs that have an identical group identification (group ID) that is set by the Tx UE.

However, from the perspective of the further advancement of LTE-A, the D2D direct communication should support D2D unicast communication in addition to the broadcast and groupcast communication so as to effectively use frequency resources and to provide reliable services. However, the current D2D broadcast and groupcast communication technology may not effectively provide the D2D unicast communication.

In the D2D broadcast and groupcast communication, a UE transmits a signal to a plurality of UEs. Accordingly, from the perspective of a Tx UE, it is difficult to transmit a signal reliably to all of the reception (Rx) UEs. From the perspective of an Rx UE, it is difficult to transmit feedback information to a Tx UE. Therefore, the broadcast and groupcast-based D2D communication may not use schemes for efficient communication that are currently used in an existing cellular system. For example, the D2D broadcast and groupcast communication may not use a HARQ. Also, this may not consider a radio channel state, the size of interference noise, or the like, and may be difficult to control transmission (Tx) power when determining a MCS of a D2D communication link.

Conversely, in D2D unicast communication, a Tx UE executes one-to-one communication with a single Rx UE and thus, it may execute a HARQ, an adaptive modulation scheme, and a Tx power control. However, the D2D unicast communication is an extended function of the D2D broadcast and groupcast communication, and has a high probability of being provided as a single service. Thus, the D2D unicast communication should be executed by maintaining the resource allocation and signal transmission method of the D2D broadcast and groupcast communication as much as possible. Therefore, the present disclosure provides a method of effectively providing the HARQ, the adaptive modulation scheme, Tx power controlling, and the like, for the D2D unicast communication.

The subject matter of the present disclosure is to provide a resource allocation method, a feedback information transmission method, a power control method, and an apparatus thereof, which is required when two UEs that execute communication in the unicast-based D2D communication system transmit feedback information to a partner UE.

According to a resource allocation method, a feedback information transmission method, a power controlling method, and an apparatus thereof, for unicast-based D2D communication in a wireless communication system, two UEs reflect feedback information in the transmission of a data channel and thus, effective D2D communication is executed.

Hereinafter, embodiments of the present disclosure will be described in detail with reference to the accompanying drawings. It is noted that, where possible, the same reference numerals are designated to the same components in the accompanying drawings. In the following description of the present disclosure, a detailed description of known functions or configurations incorporated herein will be omitted when it may make the subject matter of the present disclosure rather unclear. The terms which will be described below are terms defined in consideration of the functions in the present disclosure, and may be different according to users, intentions of the users, or customs. Accordingly, the terms should be defined based on the contents over the whole present specification.

Further, the detailed description of embodiments of the present disclosure is made mainly based on a wireless communication system based on OFDM, particularly 3GPP EUTRA standard, but the subject matter of the present disclosure can be applied to other communication systems having a similar technical background and channel form after a little modification without departing from the scope of the present disclosure and the above can be determined by those skilled in the art.

In the various embodiments of the present disclosure described hereinafter, a BS or a cell may have an identical meaning. Also, D2D communication may have a meaning that includes a UE discovery operation that discovers an adjacent UE and a direct communication operation that directly exchanges information between UEs. Also, although the embodiments of the present disclosure described hereinafter will be described from the perspective of a cellular system that uses a FDD as a duplexing method, the present disclosure may be equally applied to a cellular system that uses a TDD.

Figure 17:
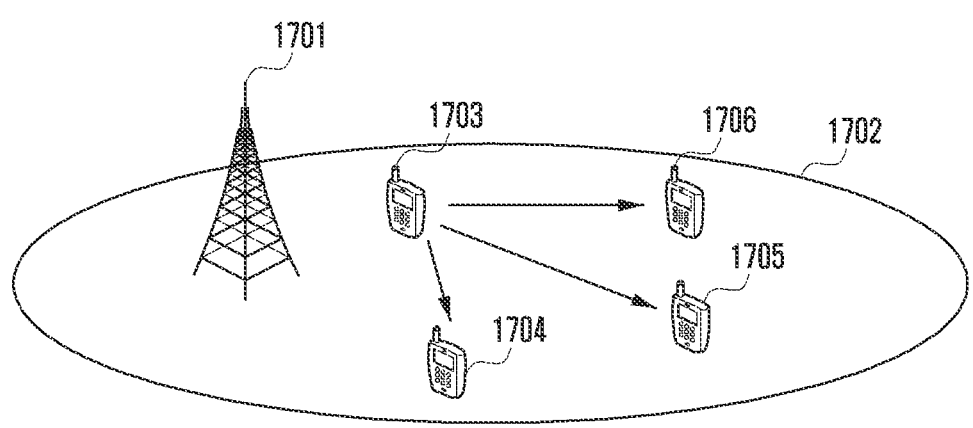
FIG. 17 is a view illustrating a form in which a device to device (D2D) broadcasting or group communication, which have been discussed in a long term evolution-advanced (LTE-A), are supported according to an embodiment of the present disclosure.

FIG. 17 is a diagram illustrating an example in which D2D broadcast or groupcast communication, which is currently discussed in LTE-A, is supported according to an embodiment of the present disclosure. Referring to FIG. 17, a BS 1701 manages a UE 1703, a UE 1704, a UE 1705, and a UE 1706 located within a cell 1702, which is a signal transmission range of the BS 1701. The UEs 1703, 1704, 1705, and 1706 may execute cellular communication with the BS 1701, and may simultaneously execute D2D communication.

Referring to FIG. 17, the D2D broadcast or groupcast communication that is based on LTE-A Release-12 may be currently divided into Mode 1, in which a BS directly allocates a resource that a UE is to use for D2D communication, and Mode 2, in which a BS configures only a D2D resource pool and a UE configures a D2D communication resource from the D2D resource pool without the assistance of the BS. When the D2D communication resource is given to a UE based on Mode 1 or Mode 2, the UEs 1703, 1704, 1705, and 1706 may execute D2D communication without passing the BS. A UE that has a D2D communication function may be included in a predetermined group based on the purpose of use, and a group ID and a broadcast identification (broadcast ID) are set in advance or may be allocated from a BS. Referring to FIG. 17, when the UE 1703 transmits a D2D communication signal that includes a broadcast ID, the UEs 1704, 1705, and 1706 execute D2D communication by simultaneously receiving the signal of the UE 1703. When the UE 1703 transmits a D2D communication signal that includes a group ID that designates a predetermined group, a UE included in a corresponding group from among the UEs 1704, 1705, and 1706 may receive the corresponding signal.

In a broadcast or groupcast-based D2D communication, a Tx UE that transmits a D2D communication signal executes D2D communication with a plurality of UEs or with a UE that is included a predetermined group. Therefore, due to the characteristics of the broadcast or groupcast communication, the Tx UE may not simultaneously receive information associated with a radio channel state, the size of an interference signal, or the like from a plurality of Rx UEs, and even when the Tx UE receives the information from an Rx UE, an adaptive modulation and coding (AMC) that satisfies the communication performance of all of the Rx UEs may not be applied.

Also, an HARQ that is used to efficiently improve the reliability of a communication link in an existing cellular system is a scheme that is applicable when a Tx UE and an Rx UE are capable of executing one-to-one transmission in association with a predetermined signal transmission. Therefore, the HARQ may not be applied to the current broadcast and groupcast-based D2D communication, which simultaneously transmits an identical signal to a plurality of UEs. For similar reasons, in the broadcast and groupcast-based D2D communication, a power control on a Tx UE, which is based on an Rx power measured by an Rx UE, may not be applied.

Figure 18:
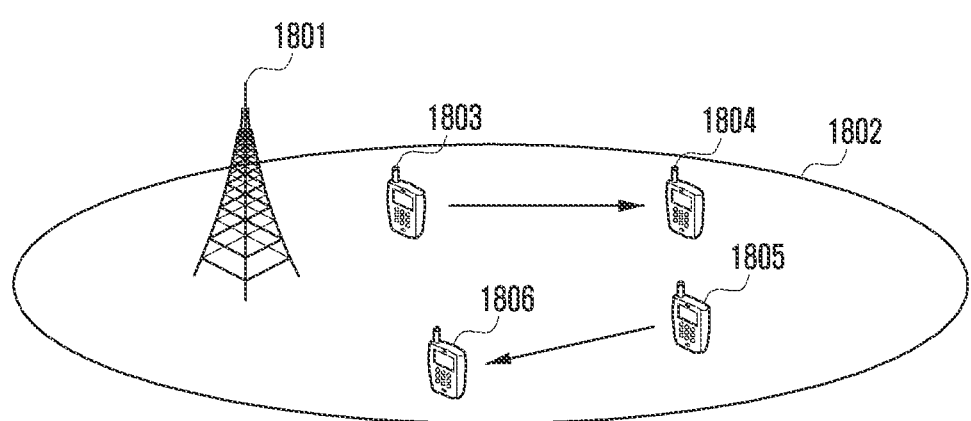
FIG. 18 is a view illustrating a form in which a D2D unicast communication is supported according to an embodiment of the present disclosure.

FIG. 18 is a diagram illustrating an example in which D2D unicast communication that the present disclosure considers is supported according to an embodiment of the present disclosure. According to FIG. 18, a BS 1801 manages a UE 1803, a UE 1804, a UE 1805, and a UE 1806 located within a cell 1802, which is a signal transmission range of the BS 1801. The UEs 1803, 1804, 1805, and 1806 may execute cellular communication with the BS 1801, and may simultaneously execute D2D communication. D2D unicast communication uses Mode 1 or Mode 2 for D2D resource allocation for a UE in the same manner as the D2D broadcast or groupcast communication. When the D2D communication resource is given, based on Mode 1 or Mode 2, to a UE that is to transmit a D2D signal, the UEs 1803, 1804, 1805, and 1806 may execute D2D communication without passing the BS. The UEs 1803, 1804, 1805, and 1806 may have a unicast identification (unicast ID) to distinguish a UE in addition to a group ID, which has been described above. The unicast ID may be a unique fixed value that is allocated to a UE, or may be a value that is allocated from a BS or is selected by a UE every time that the D2D unicast communication is required, and the present disclosure may not be limited to a predetermined method.

Referring to FIG. 18, when the UE 1803, as a D2D Tx UE, transmits a D2D communication signal that includes a unicast ID corresponding to the UE 1804, only the UE 1804 receives the corresponding signal, and UEs 1805 and 1806 may not receive the signal of the UE 1803. In the same manner, when another D2D Tx UE 205 in the cell transmits a D2D communication signal that includes a unicast ID corresponding to the UE 1806, only the UE 1806 receives the signal and other UEs 1803 and 1804 may not receive the signal of the UE 205. Here, the "Tx UE" indicates a UE that transmits data that is transferred from a higher layer; and the "Rx UE" indicates a UE that receives and demodulates the corresponding signal and transmits data to a higher layer. In the D2D unicast communication, a Tx UE includes a unicast ID of an Rx UE in a D2D communication signal and, thus, only an Rx UE that includes an identical unicast ID may receive the corresponding D2D communication signal. That is, in the unicast-based D2D communication, a one-to-one radio link may be established between a Tx UE and an Rx UE, and D2D communication is executed. For the above described reasons, unlike the D2D broadcast and groupcast communication, when a feedback associated with a radio channel state, the size of an interference signal, or an erroneous state of a Tx signal is received from an Rx UE, a Tx UE may apply an appropriate AMC to the Rx UE, or may apply a HARQ used in an existing cellular system. Also, based on an Rx power measured by an Rx UE, the power of a Tx UE may be controlled.

As described above, in order to operate the AMC, HARQ, and power controlling in the D2D unicast communication, the Tx UE 203 may need to receive a feedback signal from the Rx UE 204. In the case of the current D2D communication based on LTE Release-12, only the D2D broadcast and groupcast communication is possible and, thus, a method of transmitting a feedback signal required for the D2D unicast communication does not exist. Therefore, there is a desire for a method of allocating a resource when the Rx UE 204 transmits a feedback signal to the Tx UE 203 in the D2D unicast communication, a method for transmitting a feedback signal, and an apparatus thereof.

The existing D2D broadcast and groupcast communication of FIG. 17 and the D2D unicast communication of FIG. 18 that is considered in the present disclosure have described the D2D communication within a cell, which is the signal transmission range of a BS. However, the D2D communication should operate in the case of network fallback, which means that a BS does not operate due to natural disasters, accidents, a problem in a network operator, or should operate even in the case of an out-of-coverage, which means that a UE is located outside the cellular coverage. Therefore, the embodiments of the present disclosure may not be limited to the D2D communication in the cellular coverage, and may also be applied when the network does not operate and a UE exists outside the cellular coverage.

Figure 19:
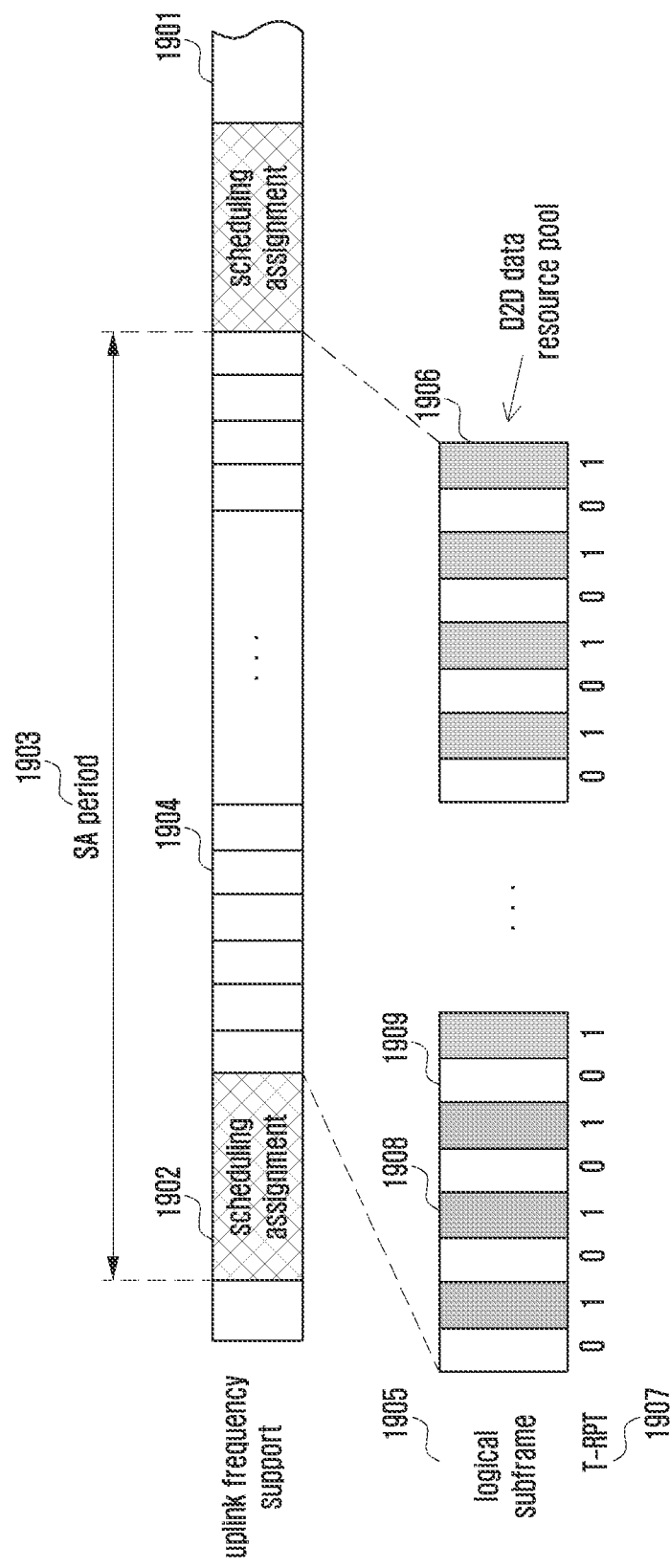
FIG. 19 is a view illustrating an example of a resource allocation structure for a mode 1 of a D2D communication according to an embodiment of the present disclosure.

FIG. 19 is a diagram illustrating an example of a resource allocation structure of mode 1 in which a BS directly allocates a physical layer resource for D2D communication in the D2D broadcast and groupcast communication that is currently discussed in LTE-A according to an embodiment of the present disclosure. D2D communication uses a UL frequency resource 1901 out of the frequency resources that are used in a cellular system. A physical layer channel for the D2D communication may be formed of a Scheduling Assignment (SA) 1902 and D2D data. The SA 1902 is a physical channel that includes information required when an Rx UE receives D2D data, and may include the location of frequency and time resources of D2D data, a MCS, an SA identification (SA ID), and the like. The SA 1902 may be transmitted based on an SA period 1903, when the Tx UE 1803 and 1805 has D2D data to be transmitted. The SA ID is a field used for transmitting an identifier that distinguishes a broadcast and a group of a UE. The description of transmitting and receiving SA in the below can be understood as the transmission and reception of the control information transmitted on the SA, and the description of transmitting and receiving D2D data can be understood as the transmission and reception of the data transmitted on D2D data (channel).

Referring to FIG. 19, the D2D data may be a physical channel that is used when a Tx UE transmits data received from a higher layer to an Rx UE, and the higher layer of the Tx UE may use voice over IP (VoIP) or a data channel to transmit other digital data. The data transferred in the higher layer of the Tx UE is transferred in a physical layer based on a unit that is generated based on a protocol data unit (PDU) format defined in a medium access control (MAC). Although embodiments of the present disclosure will be described from the perspective of a MAC PDU, the present disclosure may not limit data to be transmitted as D2D data to a predetermined format.

All of the subframes 1904 that are included in the SA period may be a D2D data resource pool 1906 through which the D2D data may be transmitted, and the D2D data may be transmitted in a subframe that is selected based on a rule out of logical subframes 1905 forming the D2D data resource pool 1906. A single D2D communication Tx UE may transmit a D2D communication signal only in a subframe allocated as a time resource pattern of transmission (T-RPT) 1907 out of the D2D data resource pool 1906. The T-RPT 1907 is a unique bitmap pattern that has a length of N bits, which is determined based on a T-RPT index included in the SA 1902. The bitmap may be repeated within the SA period 1903, and indicates a subframe allocated for the D2D data transmission of the Tx UE out of the D2D data resource pool. In the T-RPT bitmap, a subframe 1908 mapped to '1' may be used for D2D data transmission, and a subframe 1909 mapped to '0' may not be used for D2D data transmission. Therefore, the Tx UE transmits D2D data in only the subframe 1908 that is mapped to '1' in T-RPT bitmap, and in the same manner, an Rx UE receives D2D data in only the subframe 1908 that is mapped to '1' in T-RPT bitmap. The T-RTP index may be expressed by 7 bits and may have a total of 128 values, and may be one-to-one mapped to a T-RTP bitmap defined in advance. In D2D communication corresponding to Mode 1, a Tx UE is assigned with a T-RPT index from a BS, and uses the same to generate the SA 1902 and to transmit D2D data, and an Rx UE extracts a T-RPT index from the SA 1902, and uses the same to receive D2D data in a D2D data resource pool. Each subframe 1908 allocated to D2D data may be used to transmit a single MAC PDU. As described above, the broadcast and groupcast-based D2D communication may not use a HARQ and thus, may repeatedly retransmit a single MAC PDU in four successive subframes irrespective of the channel state of a D2D communication link or interference noise. A MAC PDU that is generated based on a previously defined RV is retransmitted, and thus, the MAC PDU does not include an RV or a NDI.

Figure 20:
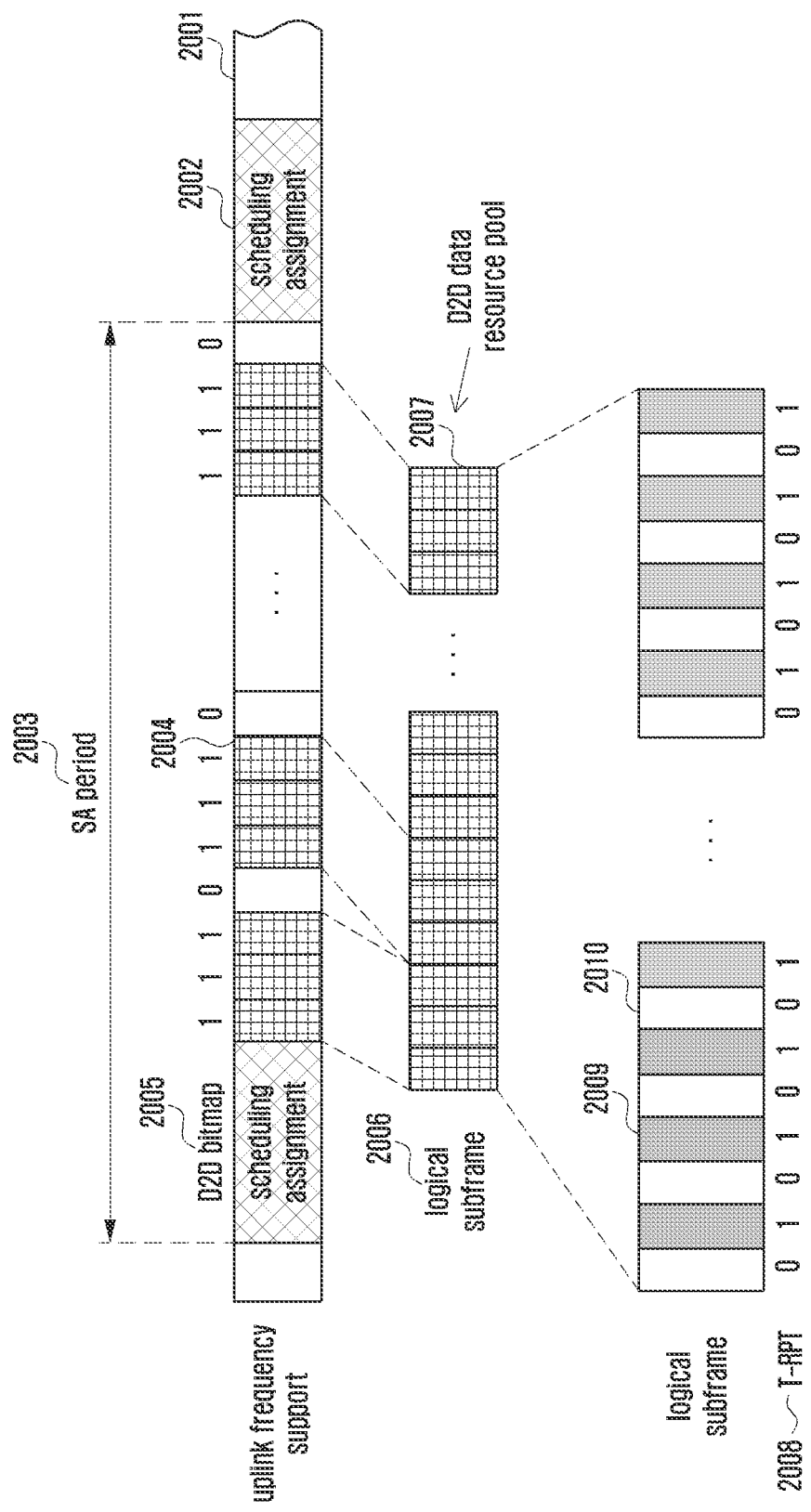
FIG. 20 is a view illustrating an example of a resource allocation structure for a mode 2 of a D2D communication according to an embodiment of the present disclosure.

FIG. 20 is a diagram illustrating an example of a resource allocation structure of mode 2 in which a UE selects a physical resource for D2D communication without the assistance of a BS, in the D2D broadcast and groupcast communication that is currently discussed in LTE-A according to an embodiment of the present disclosure. D2D communication uses a UL frequency resource 2001 out of frequency resources used in a cellular system. A physical layer channel for D2D communication is formed of an SA 2002 and D2D data.

Referring to FIG. 20, the D2D data may be transmitted in a logical subframe 2006 that is allocated for the D2D data out of all of the subframes 2004 included in an SA period 2003. In D2D communication corresponding to Mode 2, the logical subframe 2006 indicates a bundle of subframes which are selected to be '1' when a D2D bitmap 2005 that is allocated from a BS is repeatedly mapped in all of the subframes in the SA period 2003 and the logical subframe from a D2D data resource pool 2007. A D2D communication Tx UE may transmit a D2D communication signal only in a subframe that is allocated based on a T-RPT 408 out of the D2D data resource pool 2007. The T-RPT 2008 has a unique T-RPT bitmap that has a length of N bits defined based on a T-RPT index included in the SA 2002 and, thus, the T-RPT bitmap may be repeated within the SA period 2003, and may indicate a subframe that is allocated to the D2D data transmission of a Tx UE. In the T-RPT bitmap, a subframe 2009 mapped to '1' may be used for D2D data transmission, and a subframe 2010 mapped to '0' may not be used for D2D data transmission. Therefore, the Tx UE uses D2D data only in the subframe 2009 that is mapped to '1' in T-RPT bitmap, and an Rx UE receives D2D data only in the subframe 2010 that is mapped to '0' in the T-RPT bitmap. In the D2D communication corresponding to Mode 2, a Tx UE selects a T-RPT index and uses the same to generate the SA 2002 and to transmit D2D data, and an Rx UE obtains a T-RPT index from the SA 2002 and uses the same to receive D2D data in a D2D data resource pool 2007. In the T-RPT bitmap, k denotes a parameter indicating the number of '1's. As k of a T-RPT bitmap that is designated based on a T-RPT index has an increased value, the transmission rate of D2D communication may increase. Each subframe 2009 allocated to D2D data may be used to transmit a single MAC PDU. As described above, the broadcast and groupcast-based D2D communication may not use a HARQ and, thus, may repeatedly retransmit a single MAC PDU in four successive subframes irrespective of a channel state of a D2D communication link or interference noise. A MAC PDU that is generated based on a previously defined RV is retransmitted, and thus, an RV or an NDI may not be included in the MAC PDU.

Mode 1 of FIG. 19 and Mode 2 of FIG. 20 may configure the physical channel resource allocation structure for the D2D communication based on the identical method, except for the method of generating a D2D resource pool using a logical subframe. Therefore, the embodiments of the present disclosure which will be described below should be construed to be commonly applied to Mode 1 in which a BS allocates a D2D communication resource and Mode 2 in which a UE autonomously selects a D2D communication resource, unless the description is provided limitedly to one of Mode 1 and Mode 2.

As described in the examples of FIG. 19 and FIG. 20, in resource allocation for D2D communication, an SA may include information required to receive D2D data transmitted from a Tx UE, and the D2D data may be used when the Tx UE transmits a MAC PDU used for configuring data of a higher layer. That is, the SA that is a physical layer channel for D2D communication and D2D data, which have been described above, may be used when a Tx UE executes transmission, and an Rx UE may execute reception in the corresponding physical channel.

Unlike the description provided above, in the unicast based D2D communication, in order to obtain a gain of unicast communication in the communication between a Tx UE and an Rx UE, the "RX UE" may be capable of receiving an SA and D2D data transmitted from the Tx UE, and may be capable of transmitting various types of feedback information associated with the environment of reception through a feedback resource structure. Also, the "Tx UE" may be capable of transmitting an SA and D2D data, and simultaneously, may be capable of receiving the feedback information transmitted from the Rx UE and reflecting the same to D2D data transmission. However, the physical layer structure of the broadcast and groupcast-based D2D communication that is currently discussed in Release-12 does not include a resource structure for the transmission of feedback information between UEs and thus, the Rx UE has difficulty in efficiently transmitting feedback information.

For example, when the Rx UE is assigned with a new SA and D2D data like the Tx UE, for the transmission of the feedback information, and transmits feedback information, the amount of feedback information that the Rx UE needs to transmit is small but the size of the D2D data resource allocated in an SA section is relatively large and, thus, the D2D communication resource of the Rx UE may be inefficiently utilized. There is another drawback in the method in that the D2D communication executes transmission and reception using only a UL frequency and, thus, a half duplex constraint may occur in which a single UE transmits a D2D communication signal but may not receive a signal in parallel. When a subframe for transmitting a MAC PDU of a Tx UE is identical to a subframe for transmitting feedback information of an Rx UE in the D2D data resource pool, one of the Tx UE and the Rx UE may abandon the transmission in the corresponding subframe and thus, one of the MAC PDU and the feedback information may not be transmitted, which is a drawback.

For the reasons described above, the D2D unicast communication needs to provide a method for an Rx UE to efficiently transmit feedback information to a Tx UE, unlike the existing D2D broadcast and groupcast communication, and it is inevitable to change the current D2D broadcast and groupcast communication to achieve the above. However, the D2D unicast communication is an extended function of the D2D broadcast and groupcast communication and has a high probability of being provided as a single service and thus, the D2D unicast communication should be provided by maintaining the resource allocation and signal transmission method of the D2D broadcast and groupcast communication as much as possible. Therefore, the present disclosure provides a method that efficiently provides the D2D unicast communication by maintaining the D2D communication designed to be appropriate for the existing broadcast and groupcast communication as much as possible.

(2-1)St Embodiment

Method of Allocating Time and Resources for HARQ in Unicast D2D Communication

The (2-1)st embodiment of the present disclosure relates to the operation of a HARQ between a Tx UE and an Rx UE in D2D unicast communication. Particularly, the (2-1)st embodiment may include a method in which a Tx UE transmits a MAC PDU based on a HARQ process in a subframe allocated for D2D data, and a method in which an Rx UE transmits ACK/NACK feedback information based on whether a packet error in association with the corresponding MAC PDU occurs. Also, the (2-1)st embodiment may include a method in which the Tx UE transmits a new MAC PDU or retransmits an existing MAC PDU, based on ACK/NACK transmitted by the Rx UE.

The physical layer resource structure for the D2D unicast communication, according to the (2-1)st embodiment of the present disclosure, may be formed of an SA and D2D data in the same manner as the physical layer channel structure in the D2D broadcast and groupcast communication. However, in the D2D unicast communication, two physical channels may be used differently from the D2D broadcast and groupcast communication.

In the D2D unicast communication, according to the (2-1)st embodiment of the present disclosure, an SA is a physical channel that is transmitted by a Tx UE, and includes a MCS, an SA ID, a T-RPT index, and RB allocation information or the like, which is information required when an Rx UE receives a MAC PDU of the Tx UE from D2D data. The information may be used when the Rx UE transmits ACK/NACK feedback information to the Tx UE. The Tx UE may selectively operate a HARQ in the D2D unicast communication based on the settings of a BS or the autonomous determination of the UE, and may transmit information associated with whether an HARQ exists or not by including the information in an SA. The Tx UE and the Rx UE may execute a HARQ operation according to the (2-1)st embodiment only when a HARQ is used, and when the HARQ is not used, they may conform to a repetitive MAC PDU retransmission pattern in the same manner as the existing D2D broadcast and groupcast communication.

In the D2D unicast communication, according to the (2-1)st embodiment of the present disclosure, D2D data may be used when the Tx UE and the Rx UE transmit a MAC PDU and ACK/NACK feedback information, respectively. Time division multiplexing (TDM) may be executed on a subframe that is allocated for the unicast communication based on a T-RPT bitmap from the D2D data resource pool. The Tx UE may use the time division multiplexed-subframe for transmitting a MAC PDU and the Rx UE may use the time division multiplexed-subframe for transmitting ACK/NACK in association with a HARQ. As described above, in the case when the Tx UE and the Rx UE execute TDM on a subframe that is allocated for D2D data, so as to perform the D2D unicast communication, the Tx UE uses L successive subframes for transmitting a MAC PDU and the Rx UE uses 1 subsequent subframe for transmitting ACK/NACK feedback. The (2-1)st embodiment suggests to use a rule that repeatedly uses L subframes for the Tx UE and 1 subframe for the Rx UE in an SA period during subframes allocated for D2D data. Here, L indicates the size of bits of ACK/NACK that the Rx UE may transmit using a single subframe. When L is 1, the Rx UE may transmit ACK/NACK information with respect to a single MAC PDU of the Tx UE in a subframe that is allocated for the transmission of ACK/NACK feedback information from the D2D resource pool. When L is 2, the Rx UE may transmit ACK/NACK information with respect to two MAC PDUs of the Tx UE in a single subframe that is allocated for the transmission of ACK/NACK feedback information from the D2D resource pool. That is, the Rx UE may transmit ACK/NACK information with respect to L MAC PDUs of the Tx UE in a single subframe that is allocated for the transmission of ACK/NACK feedback information from the D2D resource pool.

Figure 21:
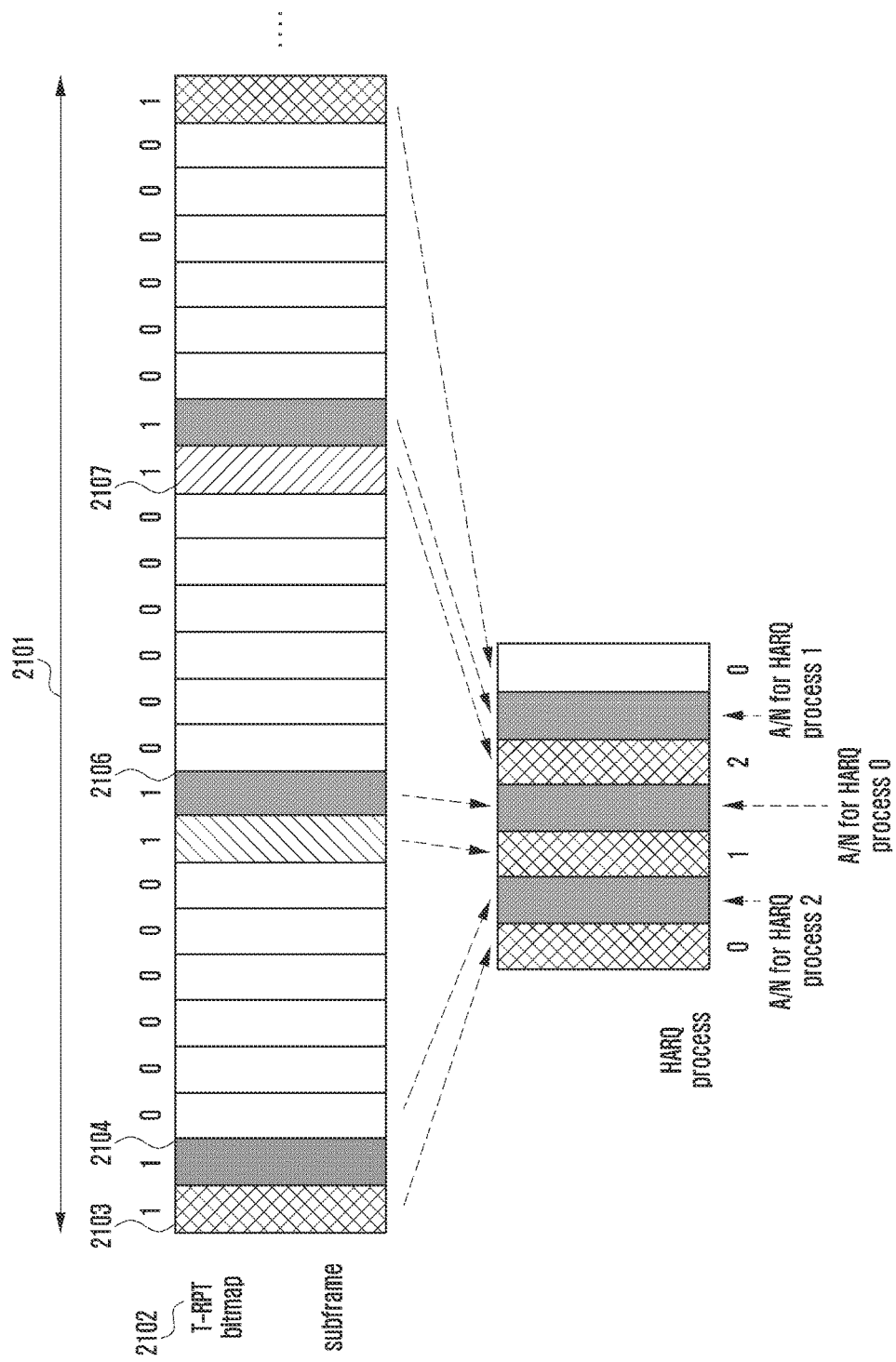
FIG. 21 is a view illustrating an example of a D2D data resource structure according to the 2-1 embodiment of the present disclosure.

FIG. 21 is a diagram illustrating an example of a D2D data resource structure of a Tx UE and an Rx UE, for D2D unicast communication according to the (2-1)st embodiment of the present disclosure. FIG. 21 illustrates an example when N=8, k=2, and L=1 according to an embodiment of the present disclosure. Here, N indicates the size of a T-RPT bitmap, and k indicates the number of Ts in a T-RPT bitmap. Referring to FIG. 21, a MAC PDU of a Tx UE and ACK/NACK of an Rx UE may be transmitted in subframes 2103 and 2104, which are mapped to '1' in a T-RPT bitmap 2102 which is allocated for the unicast communication from a D2D resource pool 2101. In FIG. 21, L=1 and thus, the Tx UE uses the subframe 2103 out of the allocated subframes for the transmission of a MAC PDU and the Rx UE uses the subsequent subframe 2104 for the transmission of ACK/NACK. A pattern in which the Tx UE and the Rx UE distinguish subframes through TDM and execute transmission may be repeated within an SA period.

Figure 22:
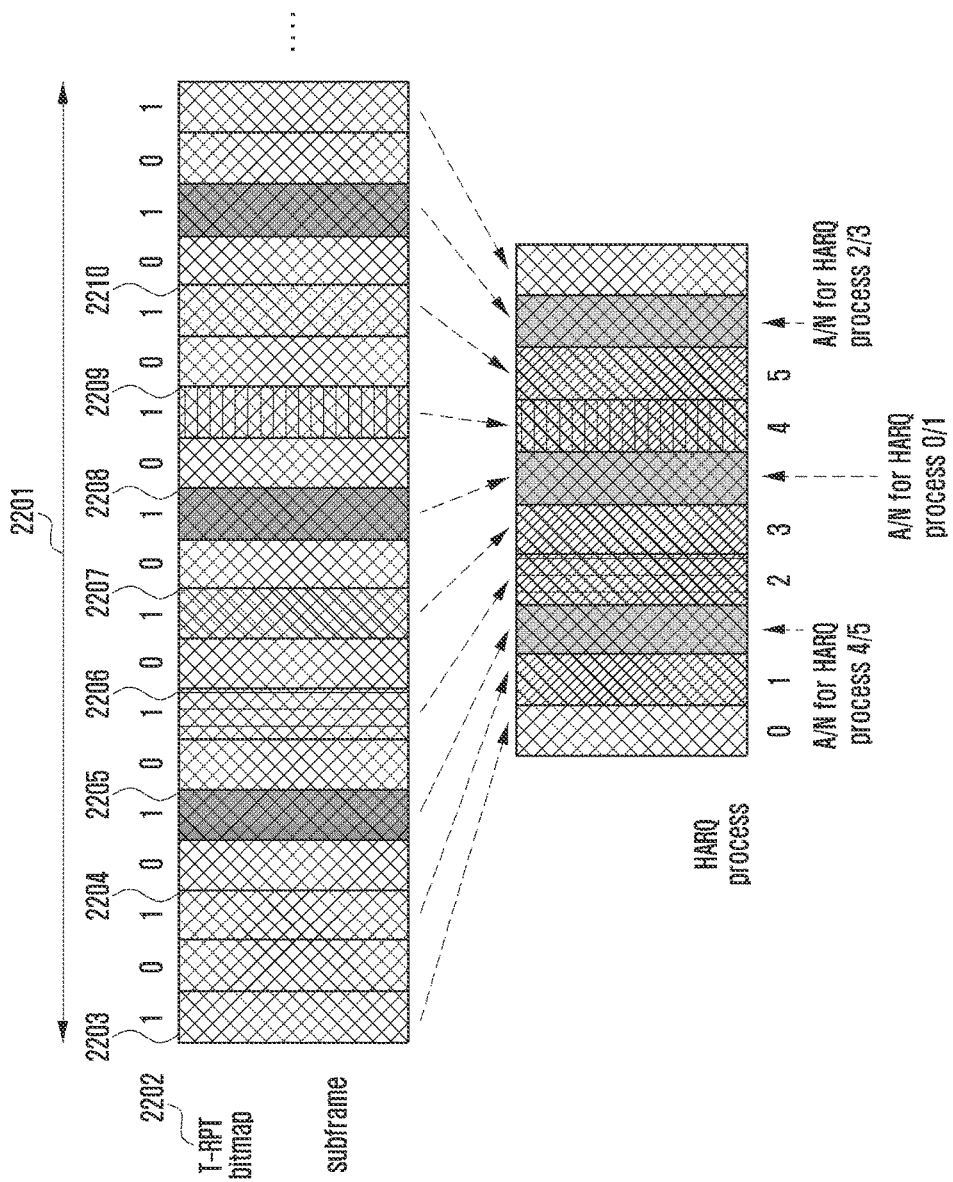
FIG. 22 is a view illustrating another example of a D2D data resource structure according to the 2-1 embodiment of the present disclosure.

FIG. 22 is a diagram illustrating another example of a D2D data resource structure of a Tx UE and an Rx UE, for D2D unicast communication according to the (2-1)st embodiment of the present disclosure. FIG. 22 illustrates an example when N=8, k=4, and L=2 according to an embodiment of the present disclosure. The number of '1's in the T-RPT bitmap is greater than the example when k=2, which is illustrated in FIG. 22 and thus, double the subframes may be used for D2D communication. Referring to FIG. 22, a MAC PDU of a TX UE and ACK/NACK of an RX UE may be transmitted in subframes that are mapped to '1' in a T-RPT bitmap 2202, which is allocated for the unicast communication from a D2D resource pool 2201. L=2 and thus, the Tx UE uses two successive subframes 2203 and 2204 out of the allocated subframes for the transmission of a MAC PDU and the Rx UE uses 1 subsequent subframe 2205 for the transmission of ACK/NACK. A pattern in which the Tx UE and the Rx UE distinguish subframes through TDM and execute transmission may be repeated within an SA period.

In the (2-1)st embodiment of the present disclosure, when the Rx UE transmits ACK/NACK and the Tx UE transmits a MAC PDU, a HARQ timing requirement needs to be considered. In LTE-A, a UE that receives, from a BS, a PDSCH in an $i^{th}$ subframe, may transmit ACK/NACK in an $(i+4)^{th}$ subframe by taking into consideration a PDSCH demodulating and decoding time. Also, in LTE-A, when a UE receives, from a BS, ACK/NACK feedback on a PDCCH in an $i^{th}$ subframe, the UE may transmit a PUSCH of a HARQ process in an $(i+4)^{th}$ subframe. The HARQ of the D2D unicast communication also needs a transmission timing requirement.

However, a subframe pattern that the Tx UE and the Rx UE are assigned with for the transmission of a MAC PDU and ACK/NACK may have various patterns based on a T-RPT index, and thus, a T-RPT index may exist, which does not allow the Tx UE and the Rx UE to transmit a MAC PUD and ACK/NACK at a physical four-subframe timing in subframes allocated based on the T-RPT index. For example, in FIG. 21, the subframe 2104 in which the Rx UE may transmit ACK/NACK feedback information with respect to the MAC PDU that the Tx UE transmits in the subframe 2103 does not satisfy the four-subframe timing requirement and thus, the Rx UE may not transmit ACK/NACK in the subframe 2104. Similarly, with respect to the ACK/NACK feedback information transmitted by the Rx UE in the subframe 2205, the Tx UE may not transmit a MAC PDU corresponding to the ACK/NACK in the subframes 2206 and 2207 due to the four-subframe timing requirement.

To overcome the drawback of the (2-1)st embodiment of the present disclosure, there are provided 1) a first method that defines a MAC PDU transmission timing of a Tx UE and an ACK/NACK transmission timing of an Rx UE, so as to satisfy a HARQ timing requirement with respect to all T-RPTs, and 2) a second method that limits a T-RPT bitmap pattern used in the D2D unicast communication to a T-RPT that satisfies the four-subframe requirement that the HARQ operation requires.

In the D2D unicast communication, according to the (2-1)st embodiment of the present disclosure, according to the first method that enables the MAC PDU transmission of a Tx UE and the ACK/NACK transmission of an Rx UE to satisfy the four-subframe timing requirement of a HARQ, the ACK/NACK, with respect to the MAC PDU, that the Tx UE transmits may be transmitted in a subframe that is allocated, for ACK/NACK, at least four subframes after the subframe that is allocated based on a T-RPT from the D2D resource pool. For example, when the Tx UE transmits a MAC PDU corresponding to HARQ process 0 in the subframe 2103, the Rx UE may transmit corresponding ACK/NACK information of one bit in the subframe 2106 that satisfies the four-subframe time requirement. Also, based on the ACK/NACK that the Rx UE transmits, the Tx UE may transmit a MAC PDU in a subframe that is allocated, for a MAC PDU, four subframes after the subframe allocated based on the T-RPT from the D2D resource pool 2101. That is, when the Rx UE transmits one-bit information indicating ACK in the subframe 2104, the Tx UE transmits a new MAC PDU in a subframe 2107. When the Rx UE transmits ACK, the Tx UE retransmits an existing MAC PDU in the subframe 2107.

In the example when N=8, k=4, L=2, as illustrated in FIG. 22, ACK/NACK with respect to a MAC PDU that the Tx UE transmits should be transmitted in a subframe allocated for ACK/NACK at least four subframes after the subframe that is allocated based on the T-RPT from the D2D resource pool 2201. For example, when the Rx UE receives MAC PDUs corresponding to HARQ process 0 and HARQ process 1 in subframes 2203 and 2204, and transmits corresponding ACK/NACK information of two bits in a subframe 2208. Also, based on the ACK/NACK that the Rx UE transmits, the Tx UE may transmit a MAC PDU in a subframe that is allocated for a MAC PDU four subframes after the subframe that is allocated based on the T-RPT from the D2D resource pool 2201. That is, when the Rx UE transmits two-bit information indicating ACK/NACK in the subframe 2205, the Tx UE transmits a new MAC PDU or retransmits an existing MAC PDU based on ACK/NACK information in subframes 2209 and 2210. In the D2D unicast communication as described above, a method in which the Tx UE and the Rx UE transmit signals based on the timing requirement of at least four subframes may be generalized as follows.

Out of the subframes that are allocated based on a T-RPT bitmap from a D2D resource pool, L successive subframes are allocated for the transmission of a MAC PDU of a Tx UE, and 1 subsequent subframe is allocated for the transmission of ACK/NACK of an Rx UE. The pattern is repeated within the D2D resource pool.

The Rx UE transmits ACK/NACK information in a second subframe out of the subframes allocated for ACK/NACK feedback, after the subframes in which the Rx UE receives L MAC PDUs.

Based on the ACK/NACK information received in a present ACK/NACK subframe, the Tx UE transmits a MAC PDU associated with a corresponding HARQ process in a subframe allocated for the transmission of a MAC PDU after a subsequent ACK/NACK subframe.

In the D2D unicast communication, according to the (2-1)st embodiment of the present disclosure, according to the second method that enables the MAC PDU transmission of a Tx UE and the ACK/NACK feedback information transmission of an Rx UE to satisfy the four-subframe timing requirement of a HARQ, a T-RPT used for the unicast-based D2D communication is limited to a T-RPT that satisfies four-subframe time requirement of a HARQ out of a maximum of 128 T-RPTs, which may be generated using 7 bits.

Figure 23:
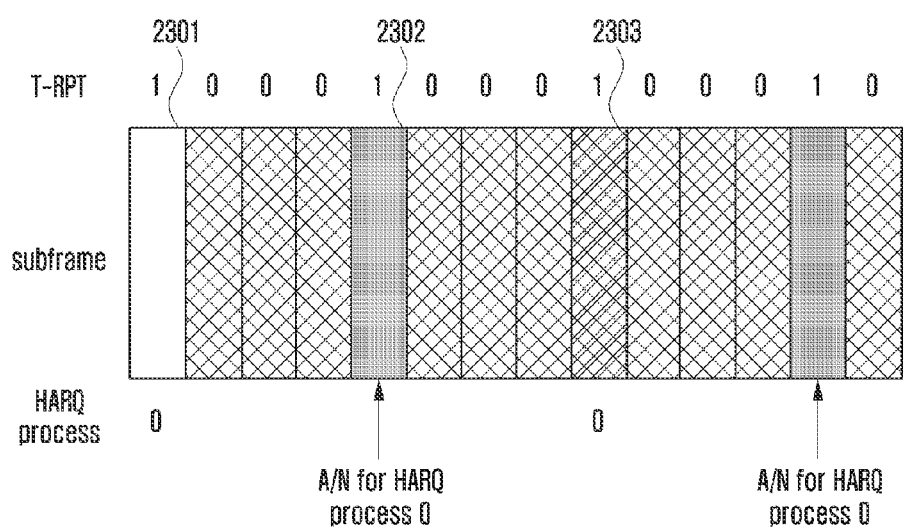
FIG. 23 is a view illustrating an example of a time resource pattern of transmission (T-RPT) which can satisfy a 4 sub-frame timing requirement condition for a hybrid automatic repeat request (HARQ) operation according to the 2-1 embodiment of the present disclosure.

FIG. 23 is a diagram illustrating an example of a T-RPT which satisfies a four-subframe timing requirement for a HARQ, from among a T-RPT bitmap according to the (2-1)st embodiment of the present disclosure. According to a T-RPT pattern of FIG. 23, when a Tx UE transmits a MAC PDU in a subframe 2301, an Rx UE may transmit ACK/NACK feedback with respect to the corresponding MAC PDU in a subframe 2302, which is a subframe located four subframes after the subframe 2301. Also, with respect to the ACK/NACK feedback transmitted by the Rx UE, the Tx UE may transmit a new MAC PDU or retransmits an existing MAC PDU based on the ACK/NACK in a subframe 2303, which is a subframe located four subframes after the subframe 2302.

Referring to FIG. 23, in the communication, a BS selects and allocates a T-RPT for D2D unicast communication based on Mode 1 and the BS may select a T-RPT that may satisfy the four-subframe time requirement of a HARQ and may allocate the same to a Tx UE. On the other hand, in the D2D unicast communication based on Mode 2, a Tx UE directly selects a T-RPT and thus, the D2D Tx UE determines whether the four-subframe requirement is satisfied for a HARQ, and selects a T-RPT. Alternatively, when a BS configures a bitmap associated with a T-RPT that satisfies four-subframe requirement for a HARQ as a system information block (SIB), a Tx UE may select a T-RPT for D2D communication out of T-RPTs selected to be 1 in the bitmap.

In the D2D unicast according to the (2-1)st embodiment of the present disclosure, when an Rx UE transmits ACK, a Tx UE may transmit a new MAC PDU in a subframe corresponding to a corresponding HARQ process. Conversely, when the Rx UE transmits NACK, the Tx UE may retransmit an existing MAC PDU in a subframe corresponding to a corresponding HARQ process, based on an RV. The Tx UE may include an NDI and a RV in a MAC PDU. The NDI is used as information indicating whether a MAC PDU that the Tx UE transmits corresponds to a new MAC PDU or corresponds to the retransmission of a MAC PDU that is previously transmitted. The Tx UE uses a fixed PV pattern when Non-adaptive HARQ is used and thus, the Tx UE may not need to transmit an RV in a MAC PDU. However, when an adaptive HARQ is used, the Tx UE may need to transmit a MAC PDU including an RV.

(2-2)Nd Embodiment

Method of Generating a HARQ Feedback Signal for D2D Unicast Communication

The (2-2)nd embodiment of the present disclosure relates to a method for an Rx UE to generate a signal for transmitting ACK/NACK information in D2D unicast communication.

According to a first method of the (2-2)nd embodiment of the present disclosure, a PUCCH may be used, which is used when a UE transmits ACK/NACK to a BS with respect to a PDSCH that the BS transmits to the UE in an existing LTE-A. The PUCCH may have various formats based on the purpose of use. In the D2D unicast communication, a PUCCH format may be different based on an L value. When L=1, PUCCH format 1a may be used, which is used for the transmission of 1 bit ACK/NACK. When L=2, PUCCH format 1b may be used, which is used for the transmission of 2 bit ACK/NACK. An orthogonal sequence index and a cyclic shift in the PUCCH signal generating process of the existing LTE-A may be determined based on a control channel element index of a PDCCH that informs the UE of the allocation information of a PDSCH. However, in the D2D unicast communication, according to the (2-2)nd embodiment of the present disclosure, the orthogonal sequence index and the cyclic shift for generating a PUCCH may be a value that is determined based on an SA ID included in an SA or may be a fixed value.

Figure 24:
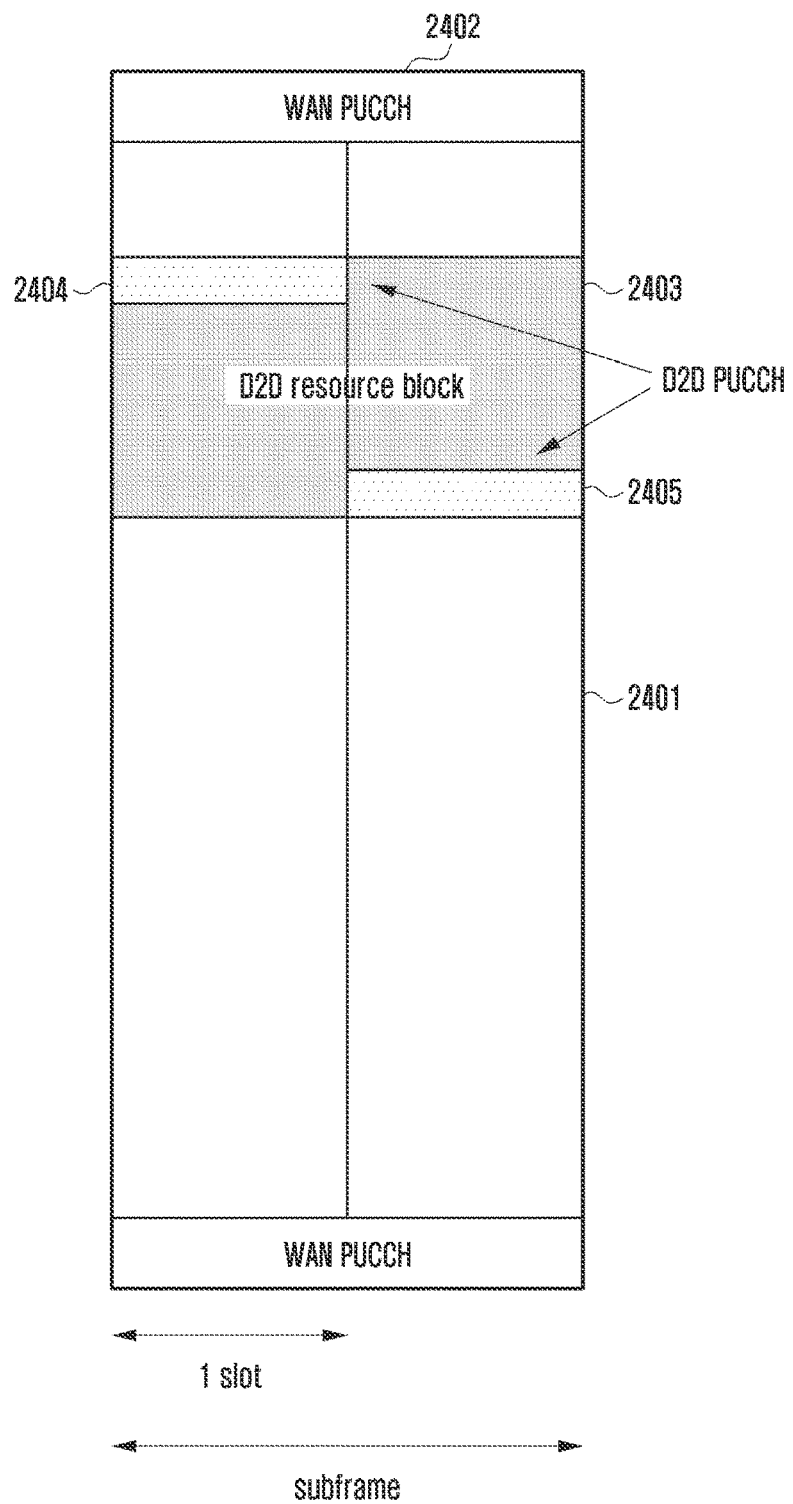
FIG. 24 is a view illustrating a method of transmitting a physical uplink control channel (PUCCH) to a transmission UE in a sub-frame which a reception UE uses for an acknowledgement (ACK)/negative acknowledgement (NACK) feedback transmission according to the 2-2 embodiment of the present disclosure.

FIG. 24 is a diagram illustrating a method in which an Rx UE transmits a PUCCH to a Tx UE in a subframe that is used for the transmission of ACK/NACK feedback, as an example of the first method according to the second embodiment of the present disclosure. A subframe 2401 for the transmission of ACK/NACK feedback may be formed of a plurality of RBs 2402 through which existing LTE-A UEs transmit a PUCCH to a BS for cellular communication, and a plurality of RBs 2403 allocated for D2D communication according to an embodiment of the present disclosure. The Rx UE repeatedly transmits an identical PUCCH for the transmission of ACK/NACK in all of the RBs allocated for D2D communication, or may transmit an ACK/NACK signal based on a method of transmitting a PUCCH using only a single RB, and not transmitting a signal in the remaining RBs. When only a single RB is used for the transmission of a PUCCH, each PUCCH 2404 and 2405 through which the Rx UE transmits ACK/NACK feedback may use one RB out of two slots including a single subframe as illustrated in FIG. 24, and may execute slot hopping in the plurality of RBs 2403 allocated for D2D communication.

Referring to FIG. 24, according to a second method of the (2-2)nd embodiment of the present disclosure, an Rx UE may use a signal generating method of a PUSCH in an existing UL so as to transmit ACK/NACK information. The Rx UE maps L ACK/NACK bits for the transmission of L MAC PDUs, and executes channel coding. In this instance, ACK is mapped to '1' and NACK is mapped to '0'. The Rx UE executes binary phase shift keying (BPSK) or quadrature phase shift keying (QPSK) with respect to the channel coded ACK/NACK bits, repeats a BPSK/QPSK symbol as the number of times as the number of Res of a D2D frequency resource allocated to a subframe for the transmission of ACK/NACK, and executes mapping so as to generate an SC-FDMA signal. In this instance, an MCS and a repetition factor of a symbol used when the Rx UE transmits ACK/NACK information, is fixed irrespective of a UE and thus, all of the Rx UEs use an identical value.

Figure 25:
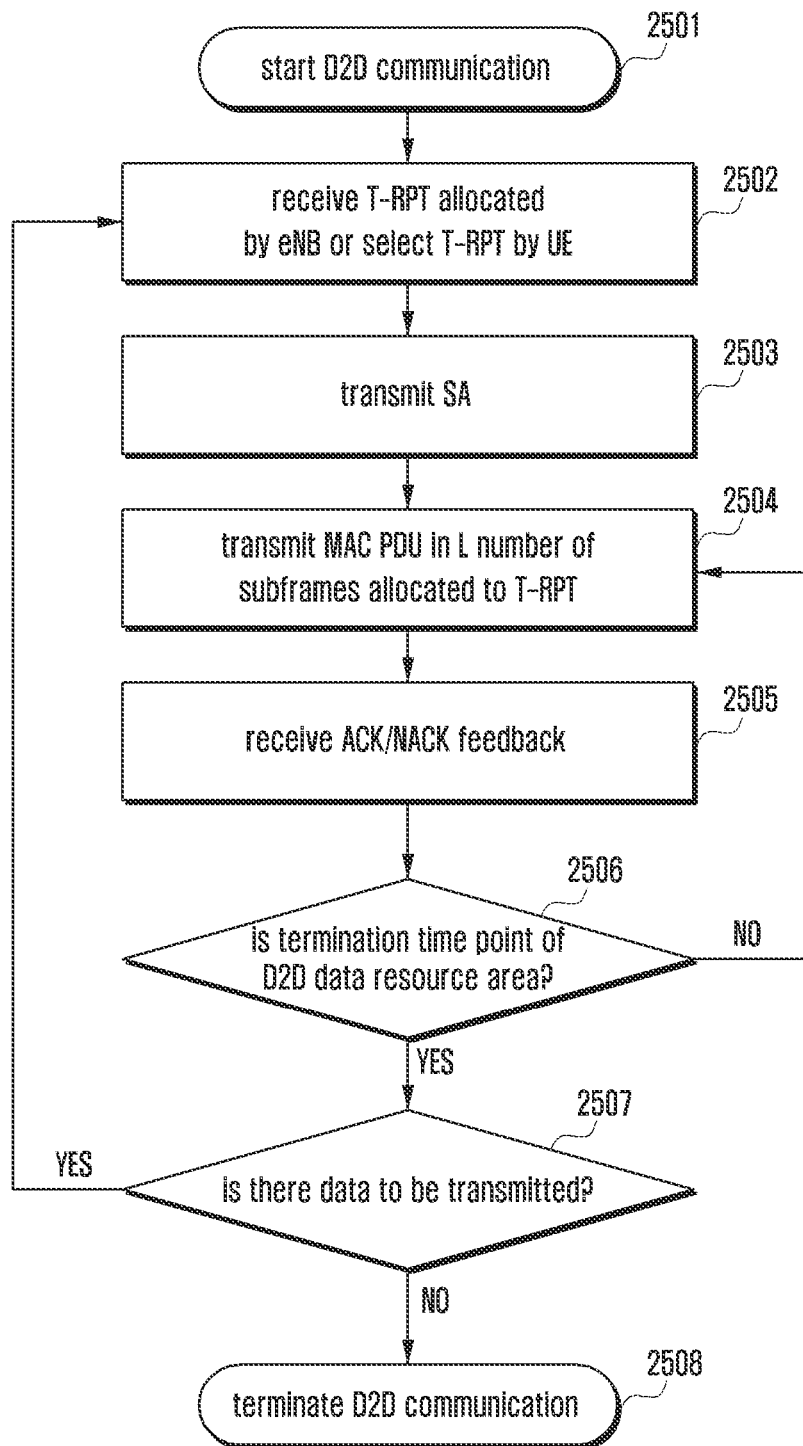
FIG. 25 is a view illustrating an operation of a transmission UE according to the 2-1 embodiment and the 2-2 embodiment of the present disclosure.

FIG. 25 is a diagram illustrating the operations of a Tx UE according to the (2-1)st embodiment and the (2-2)nd embodiment of the present disclosure.

Referring to FIG. 25, in operation 2501, a Tx UE starts D2D unicast communication. Subsequently, the Tx UE receives allocation information associated with D2D data, which includes a T-RPT, from a BS when the Tx UE executes D2D communication based on Mode 1, and the Tx UE selects a resource for D2D data, which includes a T-RPT index, when the Tx UE executes D2D communication based on Mode 2. In operation 2503, the Tx UE transmits an SA to an Rx UE in an SA resource pool. In operation 2504, the Tx UE transmits MAC PDUs having different HARQ processes in first L successive subframes out of the subframes allocated for D2D data based on a T-RPT. In operation 2505, the Tx UE receives ACK/NACK transmitted by an Rx UE in a subsequent subframe allocated for D2D data. When ACK/NACK is not received from the Rx UE, the Tx UE considers that NACK is transmitted in the corresponding subframe. In operation 2506, the Tx UE determines whether it is the end of the D2D resource pool, and when it is the end of the D2D resource pool, the Tx UE proceeds with operation 2507. Otherwise, the Tx UE proceeds with operation 2504. The Tx UE that proceeds with operation 2504 transmits a new MAC PDU with respect to a HARQ process corresponding to ACK of the Rx UE, and retransmits an existing MAC PDU with respect to a HARQ process corresponding to NACK in the L subframes allocated for D2D data. In operation 2507, the Tx UE determines whether data to be transmitted exists in a soft buffer for the current D2D unicast communication. When the data to be transmitted exists, the Tx UE proceeds with operation 2502, and when the data to be transmitted does not exist, the Tx UE proceeds with operation 2508 for suspending the D2D communication.

Figure 26:
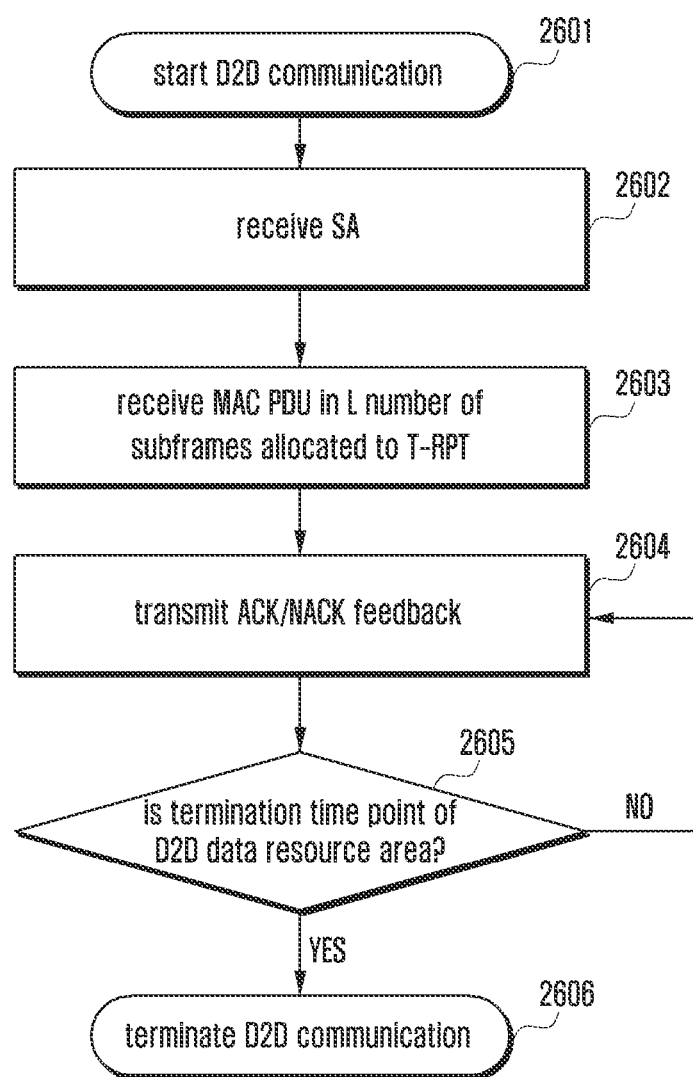
FIG. 26 is a view illustrating an operation of a reception UE according to the 2-1 embodiment and the 2-2 embodiment of the present disclosure.

FIG. 26 is a diagram illustrating the operations of an Rx UE according to the (2-1)st embodiment and the (2-2)nd embodiment of the present disclosure.

Referring to FIG. 26, in operation 2601, an Rx UE starts D2D unicast communication. Subsequently, the Rx UE receives an SA that includes a unicast ID that is identical to a unicast ID of itself in an SA resource pool in operation 2602. In operation 2603, the Rx receives MAC PDUs that are transmitted by a Tx UE in L successive subframes out of the subframes that are allocated for D2D data based on a T-RPT. In operation 2604, the Rx UE transmits ACK/NACK information in a subsequent subframe allocated for D2D data based on a T-RPT. In operation 2605, the Rx UE determines whether it is the end of the D2D resource pool, and when it is the end of the D2D resource pool, the Rx UE proceeds with operation 2603 and receives a MAC PDU transmitted by the Tx UE. Otherwise, the Rx UE proceeds with operation 2606 and terminates D2D communication.

(2-3)Rd Embodiment

Method of Transmitting Channel State Information in Unicast D2D Communication

A (2-3)rd embodiment of the present disclosure is a method for adaptively changing a data rate or the like in association with a MAC PDU that a Tx UE transmits based on a communication environment between a Tx UE and an Rx UE in D2D unicast communication, and includes a method in which an Rx UE transmits, to a Tx UE, channel state information (CSI) associated with an Rx channel environment. In the D2D unicast communication, according to the (2-3)rd embodiment of the present disclosure, CSI may include a CQI, a Precoding Matrix Indicator (PMI), and a Rank Indicator (RI), in the same manner as LTE-A. In the unicast-based D2D communication, when a multi-antenna scheme is not used, a PMI or an RI may be a randomly allocated value or may be reused as a field for transmitting another piece of information.

According to the (2-3)rd embodiment of the present disclosure, the Rx UE may: measure a radio channel and interference noise environment using an SC-RDMA symbol or an RX symbol for the transmission of data in a subframe that includes a MAC PDU transmitted by a Tx UE; calculate a CQI; and transmit the same to the Tx UE.

According to the (2-3)rd embodiment of the present disclosure, in a CSI transmission method of the Rx UE, the Rx UE transmits CSI together with ACK/NACK, in a subframe allocated for the transmission of ACK/NACK. Therefore, the Rx UE receives a MAC PDU from a Tx UE in first L successive subframes out of the subframes designated based on a T-RPT bitmap for unicast-based D2D communication, and transmits CSI together with ACK/NACK information in 1 subsequent subframe. The transmission and reception pattern may be repeated within an SA period. The CSI information that the Rx UE transmits in a single subframe may be CSI information that is at least four subframes before the corresponding subframe, and may indicate CSI information measured in a subframe that includes a MAC PDU indicated by the ACK/NACK information transmitted in the corresponding subframe.

According to another CSI transmission method of the Rx UE of the (2-3)rd embodiment of the present disclosure, the Rx UE transmits CSI information once in a single SA period. The Rx UE transmits CSI information at the last subframe of the SA period out of the subframes allocated based on a T-RPT. In this instance, the CSI information may be transmitted solely or by being multiplexed together with the ACK/NACK information. The Rx UE may measure an average CSI representative value with respect to all of the received subframes of a Tx UE within the SA period, and may transmit the same to the Tx UE.

According to the (2-3)rd embodiment of the present disclosure, as a method for the Rx UE to generate a signal for transmitting CSI, PUCCH format 2/2a/2b used for transmitting CSI in LTE-A may be used. The PUCCH format 2 may be used in the case of transmitting only the CSI in LTE-A, the PUCCH format 2 may be used when the D2D unicast communication transmits CSI solely without multiplexing the CSI with ACK/NACK. PUCCH format 2a is a format that may be used for the simultaneous transmission of 1 bit ACK/NACK information and CSI in a single subframe. PUCCH format 2a may be used when the D2D unicast communication with L=1 transmits CSI by multiplexing the CSI with ACK/NACK. PUCCH format 2b is a format that may be used for the simultaneous transmission of 2 bit ACK/NACK information and CSI in a single subframe. PUCCH format 2b may be used when the D2D unicast communication with L=2 transmits CSI by multiplexing the CSI with ACK/NACK. When a PMI or an RI is not used in the 20 bits defined in a PUCCH for the transmission of CSI, a field used for the PMI or the RI may be used for a Tx power control command that the Rx UE transmits, to the Tx UE, for a closed-loop power control of a Tx UE.

As another method for the Rx UE to generate a signal for transmitting CSI, according to the (2-3)rd embodiment of the present disclosure, a method of generating a PUSCH in LTE-A may be used. The Rx UE generates the CSI corresponding to 20 bits and executes channel coding. The Rx UE executes BPSK or QPSK with respect to the channel coded CSI bits, repeats a BPSK/QPSK symbol as the number of times as the number of REs of a D2D frequency resource allocated to a subframe for the transmission of CSI, and executes mapping, so as to generate an SC-FDMA signal. In this instance, an MCS and a repetition factor of a symbol used when the Rx UE transmits CSI information are fixed irrespective of a UE and, thus, all of the Rx UEs use an identical value.

The Tx UE may change a MCS based on an SA period in association with the CSI information that the Rx UE transmits. That is, when the CSI received from the Rx UE within a single SA period is better when compared to the current data rate, the Tx UE transmits an SA by increasing an MCS at a subsequent SA transmission point in time, and transmits D2D data to the Rx UE using the corresponding MCS.

Figure 27:
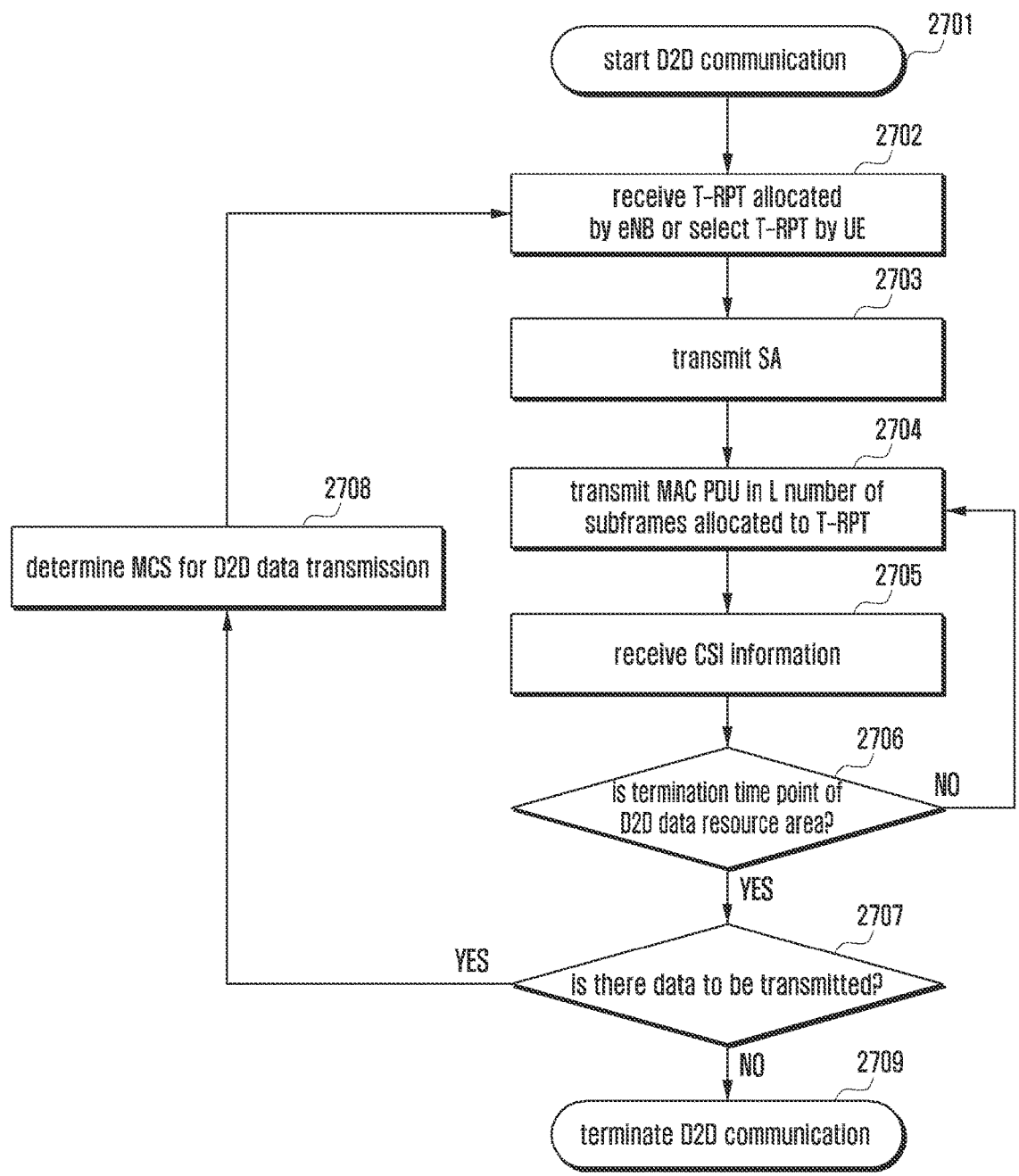
FIG. 27 is a view illustrating an operation of a transmission UE according to the 2-3 embodiment of the present disclosure.

FIG. 27 is a diagram illustrating the operations of a Tx UE according to the (2-3)rd embodiment of the present disclosure. Referring to FIG. 27, in operation 2701, a Tx UE starts D2D unicast communication. Subsequently, the Tx UE receives allocation information that is associated with D2D data, which includes a T-RPT from a BS or selects a resource for D2D data, which includes a T-RPT index by itself, in operation 2702. In operation 2703, the Tx UE transmits an SA to an Rx UE in an SA resource pool. In operation 2704, the Tx UE transmits MAC PDUs in first L successive subframes out of the subframes that are allocated for D2D data based on a T-RPT. In operation 2705, when CSI information is included in a subframe in which the Rx UE transmits feedback information, the Tx UE extracts and accumulates the same. When CSI information is transmitted once in the SA period, the Tx UE may not extract CSI information from the subframes remaining after excluding the subframe that includes the CSI. In operation 2706, the Tx UE determines whether it is the end of the D2D resource pool. When it is the end of the D2D resource pool, the Tx UE proceeds with operation 2707. Otherwise, the Tx UE proceeds with operation 2704. In operation 2707, the Tx UE determines whether data to be transmitted exists in a soft buffer for the current D2D unicast communication, and when the data to be transmitted exists, the Tx UE proceeds with operation 2708. In operation 2708, the Tx UE determines a new MCS for D2D data transmission, using the received CSI information. When the data to be transmitted does not exist in operation 2707, the Tx UE proceeds with operation 2709 and terminates D2D communication.

Figure 28:
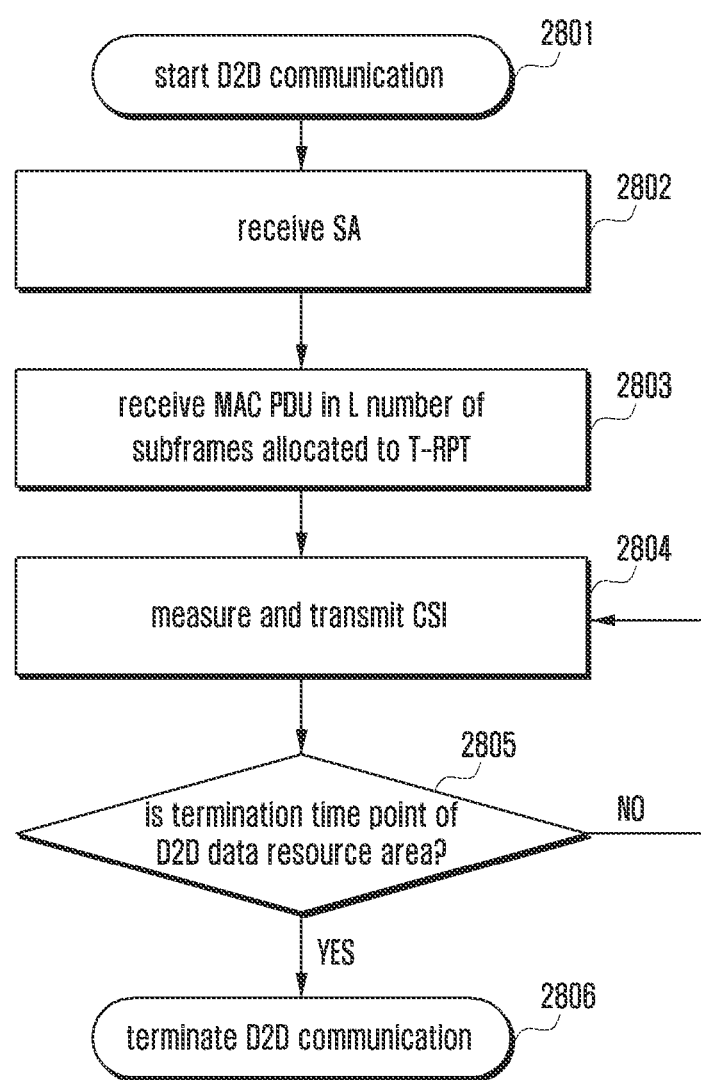
FIG. 28 is a view illustrating an operation of a reception UE according to the 2-3 embodiment of the present disclosure.

FIG. 28 is a diagram illustrating the operations of an Rx UE according to the (2-3)rd embodiment of the present disclosure.

Referring to FIG. 28, in operation 2801, an Rx UE starts D2D unicast communication. Subsequently, the Rx UE receives an SA including a unicast ID that is identical to a unicast ID of itself in an SA resource pool in operation 2802. In operation 2803, the Rx receives MAC PDUs transmitted by a Tx UE in L successive subframes out of the subframes allocated for D2D data based on a T-RPT. In operation 2804, the Rx UE measures CSI with respect to a subframe that the Tx UE transmits, and when a subsequent subframe allocated for D2D data as a T-RPT is a subframe that is capable of transmitting the CSI, the Rx UE transmits the CSI information. In operation 2805, the Rx UE determines whether it is the end of the D2D resource pool, and when it is the end of the D2D resource pool, the Rx UE proceeds with operation 2803 and receives a MAC PDU transmitted by the Tx UE. Otherwise, the Rx UE proceeds with operation 2806 and terminates D2D communication.

(2-4)Th Embodiment

Closed-Loop Power Control Between Tx UE Ad Rx UE in D2D Communication

In D2D broadcast and groupcast communication, a Tx signal of a Tx UE is received by a plurality of UEs in parallel, and thus, Tx power control between D2D UEs may not be executed, unlike the existing cellular system. Conversely, in the D2D broadcast and groupcast communication, a D2D UE in a cellular coverage may execute an open-loop transmit power control with a BS, so as to minimize interference affecting the existing cellular system. When all of the D2D Tx UEs existing in the cellular coverage use an identical Tx power, a D2D Tx UE that is adjacent to a BS may provide a significant interference noise to a UL reception of the BS. Therefore, by executing an open-loop Tx power control, the UE that is adjacent to the BS may transmit a D2D signal at a lower Tx power, and thus, may minimize the interference to the cellular system, which is caused by the D2D communication. However, in any event, a D2D Tx UE may not use a Tx power that exceeds a maximum Tx power set for D2D communication for transmitting a D2D signal. In the existing D2D broadcast and groupcast communication, a Tx power of an open-loop based Tx UE may be calculated as shown in Equation 1.

$$P_{D2D\_OL} = \min\{P_{CMAX\_D2D}, 10\log_{10}(M) + P_{O\_D2D\_eNB} + \alpha_{D2D\_eNB} \cdot PL_{D2D\_eNB}\}[\text{dBm}] \quad \text{Equation 1}$$

In Equation 1, $P_{D2D\_OL}$ denotes a Tx power of a D2D Tx UE, which is provided based on a dB unit and is calculated through an open-loop power control. $P_{CMAX\_D2D}$ denotes a maximum Tx power (dB) that is allowed for a D2D Tx UE. M denotes a value indicating the size of a frequency resource that the Tx UE uses for D2D communication, and has a value of a basic RB unit used in LTE-A. $P_{O\_D2D\_eNB}$ (dB) and $\alpha_{D2D\_eNB}$ are values that a BS sets for a UE to execute a UE power control, and indicates the target power of a BS and a pathloss compensation factor. $PL_{D2D\_eNB}$ (dB) is a pathloss value between a D2D Tx UE and a BS, and the UE may calculate the value by measuring a cellular signal.

When a Tx UE and an Rx UE are significantly close in the unicast-based D2D communication in which the Tx UE and the Rx UE execute one-to-one communication, the size of the Tx power of the Tx UE determined based on the open-loop power control may be sufficiently large so that the Rx UE may demodulate a D2D communication signal without an error. In this instance, the Tx UE may execute transmission by lowering a Tx power, and thus, the power consumption of the Tx UE may be decreased and the interference noise affecting the existing cellular system may also be decreased. Therefore, as a Tx power control method in the D2D unicast communication, according to the (2-4)rd embodiment of the present disclosure, it is suggested that a D2D Tx UE executes a closed-loop power control on a Tx power value determined based on an open-loop power control with a BS, based on a Transmit Power Control Command (TPC command) that an Rx UE transmits. Equation 2 is an equation indicating a method for the Tx UE to determine a Tx power based on a closed-loop power control according to a TPC command transmitted by the Rx UE in parallel with executing an open-loop power control with the BS.

$$P_{D2D\_CL} = \min\{P_{CMAX\_D2D}, 10\log_{10}(M) + P_{O\_D2D\_eNB} + \alpha_{D2D\_eNB} \cdot PL_{D2D\_eNB} + f_{D2D}(i)\}[\text{dBm}] \quad \text{Equation 2}$$

In Equation 2, $P_{D2D\_CL}$ denotes a Tx power of a D2D Tx UE, which is calculated through a closed-loop power control. In Equation 2, $f_{D2D}(i)$ denotes a closed-loop power control offset that the Tx UE calculates in a subframe i based on $\delta_{D2D}$ offset corresponding to the TPC command transmitted by the Rx UE. The Tx UE may calculate a closed-loop power control offset based on an absolute scheme and an accumulation scheme in the same manner as the closed-loop power control of the existing cellular system. The Tx power of the D2D Tx UE determined through the closed-loop power control may not exceed the Tx power determined through the open-loop power control and thus, a closed-loop power control offset $f_{D2D}(i)$ and a TPC command offset $\delta_{D2D}$ may be defined to be different from the existing cellular system.

When the closed-loop power control offset operates based on an absolute scheme, a method in which the Tx UE receives a TPC command $\delta_{D2D}$ from the Rx UE and calculates a closed-loop power control offset $f_{D2D}(i)$ may be defined as shown in Equation 3.

$$f_{D2D}(i) = \begin{cases} \delta_{D2D}(i - K_{D2D}), & \text{if } \delta_{D2D} \text{ exists in subframe}(i - K_{D2D}) \\ f_{D2D}(i-1), & \text{otherwise} \end{cases} \quad \text{Equation 3}$$

In Equation 3, $K_{D2D}$ indicate a value that is greater than at least 4, and $\delta_{D2D}(i-K_{D2D})$ indicates a TPC command that is most recently received from the Rx UE, from the perspective of the subframe i. According to Equation 3, when the Tx UE does not receive a TPC command $\delta_{D2D}$ from the Rx UE in a subframe ($i-K_{D2D}$) the Tx UE may maintain a closed-loop power control offset $f_{D2D}(i)$ as a value of a previous subframe. Unlike the closed-loop power control used in the existing cellular system, in D2D communication, the maximum Tx power of the Tx UE may not exceed the Tx power that is determined through an open-loop power control, so as to reduce cellular interference of D2D communication. Therefore, in the D2D unicast communication, $f_{D2D}(i)$ always needs to have a value that is less than 0 in Equation 3 for the closed-loop power control. For the above reasons, a TPC command offset $\delta_{D2D}$ that the Rx UE transmits in the closed-loop power control based on the absolute scheme needs to be defined as a value of less than 0. In the existing cellular system, a TPC command offset $\delta$ has both a positive value and a negative value, and thus, a TPC command offset $\delta_{D2D}$ in the closed-loop power control based on the absolute scheme of the D2D unicast communication, according to the (2-4)rd embodiment of the present disclosure, may be reconfigured using only negative values from the existing TPC command offset $\delta$, or may use a format identical to the existing cellular system. However, when the Tx UE receives a TPC command that is greater than 0, the Tx UE may disregard the same.

When the closed-loop power control offset operates based on an accumulation scheme, a method in which the Tx UE receives a TPC command $\delta_{D2D}$ from the Rx UE and calculates a closed-loop power control offset $f_{D2D}(i)$ may be defined as shown in Equation 4.

$$f_{D2D}(i) = \begin{cases} f_{D2D}(i-1) + & \text{if } \delta_{D2D} \text{ exists in} \\ \delta_{D2D}(i-K_{D2D}), & \text{subframe}(i-K_{D2D}) \\ & \text{and } f_{D2D}(i-1) + \\ & \delta_{D2D}(i-K_{D2D}) \leq 0 \\ f_{D2D}(i-1), & \text{otherwise} \end{cases} \quad \text{Equation 4}$$

In Equation 4, $K_{D2D}$ indicate a value that is greater than at least 4, and $\delta_{D2D}(i-K_{D2D})$ indicates a TPC command that is most recently received from the Rx UE from the perspective of the subframe i. According to Equation 4, when the Tx UE does not receive a TPC command in a subframe ($i-K_{D2D}$) the Tx UE may maintain a closed-loop power control offset $f_{D2D}(i)$ as a value of a previous subframe. Also, $f_{D2D}(i)$ should always have a value that is less than 0 and thus, the Tx UE in the closed-loop power control based on the accumulation scheme needs to maintain the closed-loop power control offset $f_{D2D}(i)$ as 0 dB when $f_{D2D}(i)$ is greater than 0 dB.

In the closed-loop Tx power control of the D2D unicast communication, according to the (2-4)rd embodiment of the present disclosure, the Tx UE may apply a closed-loop power control to D2D data from among an SA and the D2D data, which is a resource structure for D2D communication. The SA is a channel that the Rx UE needs to most securely receive and the D2D Tx UE needs to transmit the SA at the highest Tx power of the Tx UE, and thus, when the closed-loop Tx power control is applied, the SA may be transmitted at the Tx power $P_{D2D\_OL}$ determined based on the open-loop Tx power control with the BS. Conversely, it is efficient for D2D data to be transmitted at a Tx power that is optimized for each communication situation and, thus, the Tx UE may transmit the D2D data at the Tx power $P_{D2D\_CL}$ determined based on the closed-loop power control.

The Tx UE may transmit D2D data at a Tx power determined based on a closed-loop power control in a subframe located four subframes after a subframe where the Tx UE receives a TPC command $\delta_{D2D}$ transmitted from the Rx UE. Also, the Tx UE calculates a closed loop power control offset $f_{D2D}(i)$ during an SA period where D2D data is transmitted, and transmits D2D data at a new Tx power determined based on a closed-loop power control from when a new D2D data pool begins. The corresponding Tx power may be fixed during the SA period.

When the Tx UE changes an MCS for D2D data, the Tx UE may initialize a Tx power for D2D data transmission to a Tx power determined based on an open-loop Tx power control with a BS.

The Rx UE may generate a TPC command $\delta_{D2D}$ by measuring an Rx power of a symbol that includes an RS or a symbol used for data transmission from among Single-Carrier Frequency Domain Multiplexing (SC-FDM) symbols, which form a subframe that transmits D2D data. The Rx UE generates a TPC command $\delta_{D2D}$ for a closed-loop Tx power control with respect to all of the subframes in which the Tx UE transmits D2D data, and transmits the same in a subframe that the Rx UE is assigned with for HARQ ACK/NACK feedback. In this instance, the TPC command $\delta_{D2D}$ may be transmitted by being multiplexed with a PUCCH that may be used for the transmission of HARQ ACK/NACK, and may be transmitted in a new message type using a separately allocated RB. Alternatively, when the Rx UE reports CSI to a BS, the Rx UE may reuse an RI or PMI that is used for a multi-antenna for the transmission of a TPC command $\delta_{D2D}$.

Figure 29:
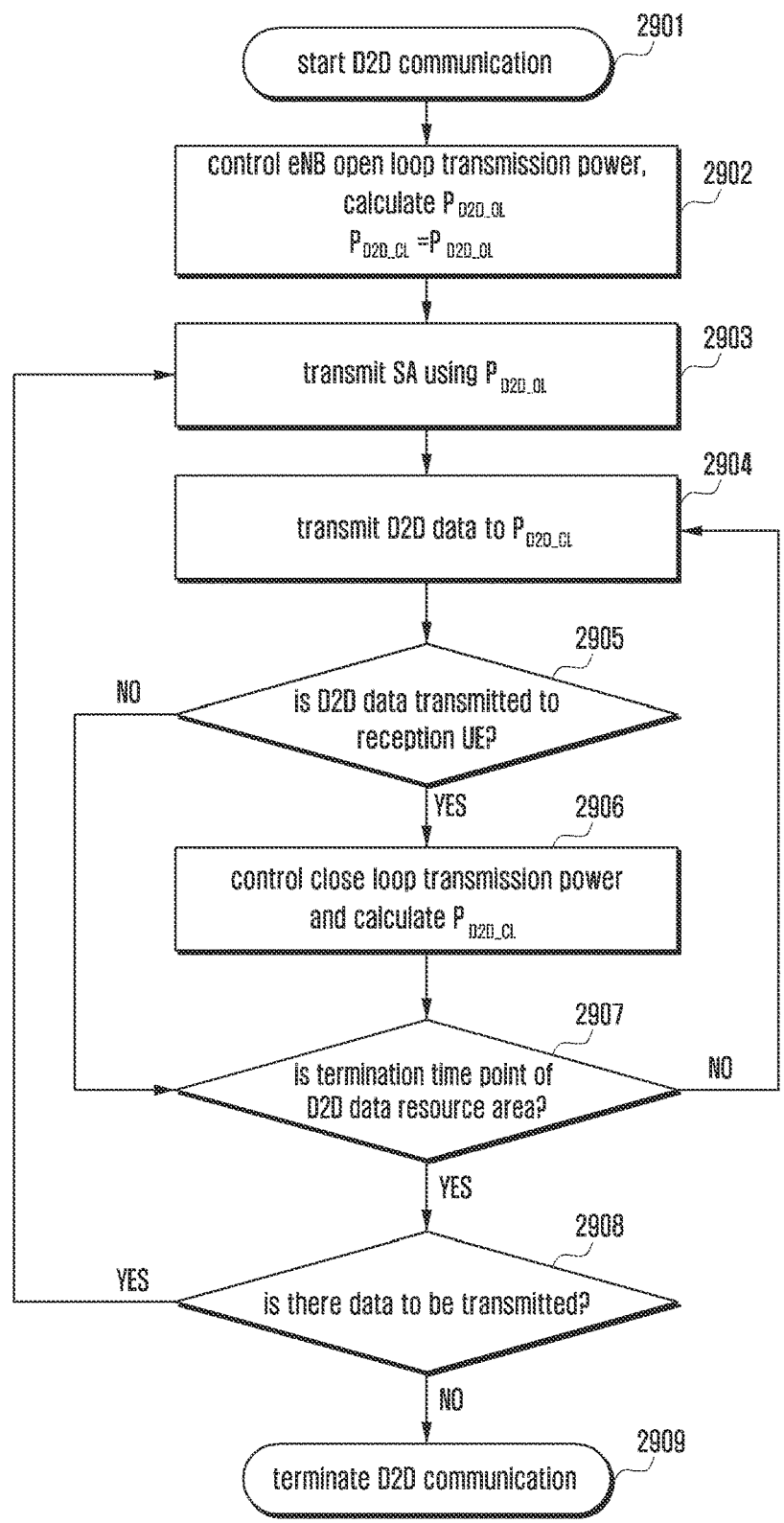
FIG. 29 is a view illustrating an operation of a transmission UE according to the 2-4 embodiment of the present disclosure.

FIG. 29 is a diagram illustrating the operations of a Tx UE according to the (2-4)rd embodiment of the present disclosure. Referring to FIG. 29, in operation 2901, a Tx UE starts D2D unicast communication. Subsequently, the Tx UE may execute an open-loop Tx power control with a BS, calculate a Tx power $P_{D2D\_OL}$, and initialize $P_{D2D\_CL}$ to $P_{D2D\_OL}$, in operation 2902. The Tx UE may transmit an SA using the Tx power $P_{D2D\_OL}$ determined based on the open-loop Tx power control in operation 2903. In operation 2904, the Tx UE transmits D2D data using $P_{D2D\_CL}$ determined based on the closed-loop Tx power control. When a TPC command $\delta_{D2D}$ received from the Rx UE exists in operation 2905, the Tx UE proceeds with operation 2906. When a TPC command received from the Rx UE does not exist, the Tx UE proceeds with operation 2907. In operation 2906, the Tx UE updates the closed-loop Tx power $P_{D2D\_CL}$, based on the TPC command $\delta_{D2D}$. In operation 2907, when it is the end of the D2D resource pool, the Tx UE proceeds with operation 2908. Otherwise, the Tx UE proceeds with operation 2904. In operation 2908, the Tx UE determines whether data to be transmitted exists in a soft buffer for the current D2D unicast communication, and when the data to be transmitted exists, the Tx UE proceeds with operation 2903. When the data to be transmitted does not exist in operation 2908, the Tx UE proceeds with operation 2909 and terminates D2D communication.

Figure 30:
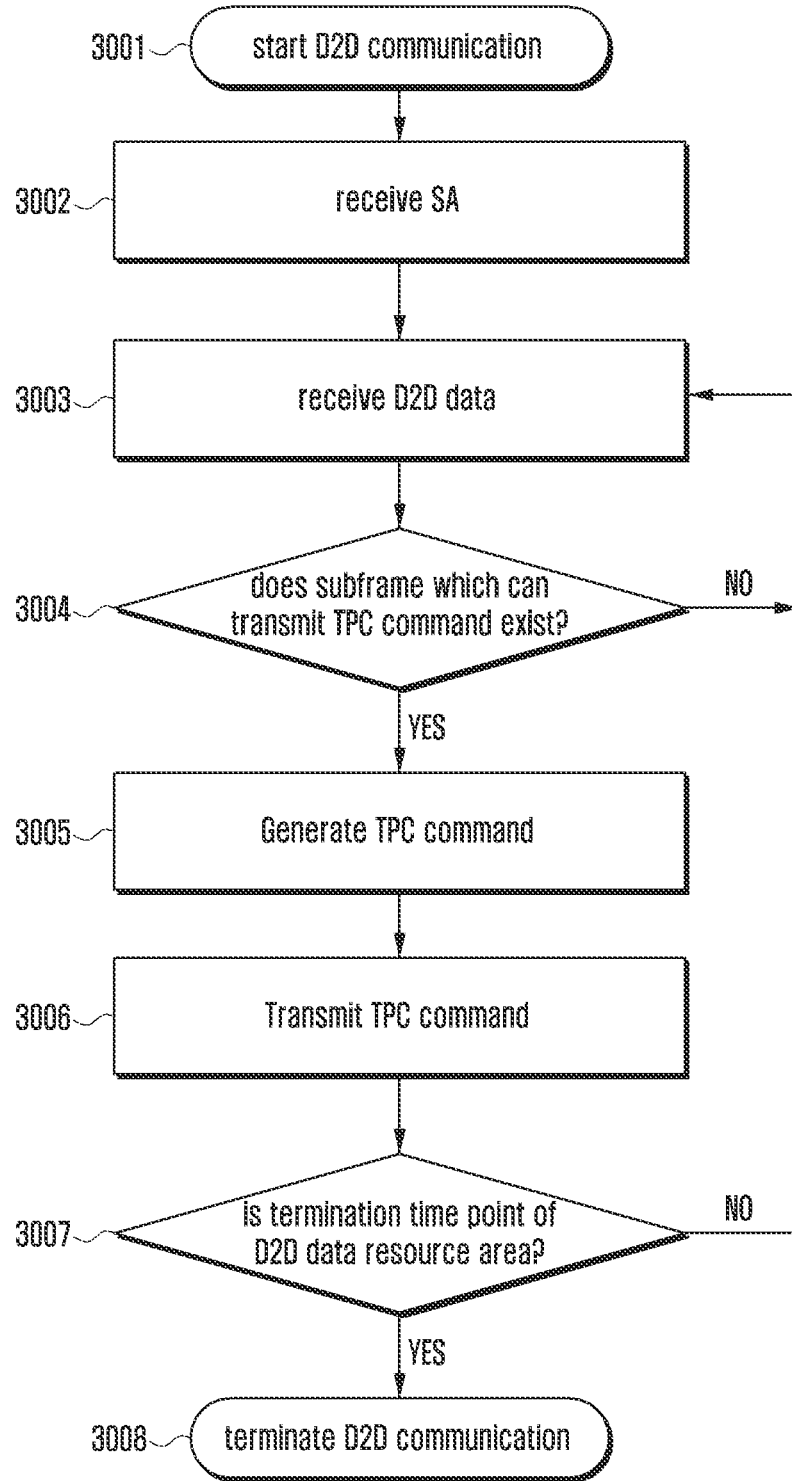
FIG. 30 is a view illustrating an operation of a reception UE according to the 2-4 embodiment of the present disclosure.

FIG. 30 is a diagram illustrating the operations of an RX UE according to the (2-4)rd embodiment of the present disclosure.

Referring to FIG. 30, in operation 3001, an Rx UE starts D2D unicast communication. Subsequently, the Rx UE receives an SA including a unicast ID that is identical to a unicast ID of itself in an SA resource pool in operation 3002. In operation 3003, the Rx UE receives D2D data of a Tx UE.

In this instance, the Rx UE may measure the Rx power of an SC-FDMA symbol or an RS symbol from a subframe transmitted by the Tx UE, and may use the same to use a TPC command. In operation 3004, the Rx UE proceeds with operation 3005 when a subframe exists, through which a TPC command is to be transmitted. Otherwise, the Rx UE proceeds with operation 3003. The Rx UE generates a TPC command in operation 3005, and transmits a TPC command to the Tx UE in operation 3006. In operation 3007, when it is not the end of the D2D data pool, the Rx UE proceeds with operation 3003. Otherwise, the Rx UE proceeds with operation 3008 and terminates the D2D communication.

(2-5)Th Embodiment

Transmission Timing of Rx UE in D2D Unicast Communication

In the existing D2D broadcast and groupcast communication, a UE of Mode 1 resource allocation scheme transmits a subframe based on a UL Tx timing for the transmission of D2D data, and a UE of Mode 2 resource allocation scheme uses a DL Tx timing Here, a DL timing indicates a reference timing that a UE obtains using a PSS and a SSS of a BS, and a UL timing indicates a timing that is obtained by applying, to a DL timing, a timing advance of a UE that a BS sets for each UE. For the reasons above, a UE that executes D2D communication based on Mode 1 needs to be connected with a BS (RRC_CONNECTED) to transmit a D2D communication signal at a UL timing, and a UE that executes D2D communication based on Mode 2 transmits a D2D communication signal at a DL timing and, thus, may transmit a D2D signal irrespective of the state of the connection with a BS.

In D2D unicast communication, according to the (2-5)th embodiment of the present disclosure, an RX UE needs to be able to transmit a D2D signal at a timing identical to the timing of a Tx UE. In the existing D2D broadcast and groupcast communication system, only a Tx UE may transmit a signal in a D2D data resource pool. However, in the D2D unicast communication, an RX UE as well as the Tx UE may transmit a signal in a D2D data resource pool. Therefore, in the case in which there is a large difference in time between a UL Tx timing and a DL Tx timing of the two UEs, when a subframe of the Tx UE and a subframe of the Rx UE are close to each other, signals may overlap. That is, in Mode 1 D2D communication, while the Tx UE transmits a subframe that includes a MAC PDU at a UL timing, when the Rx UE transmits a subframe for ACK/NACK at a DL timing, the reception of the ACK/NACK subframe may collide with the transmission of the MAC PDU at the Tx UE. For the reason above, the Tx UE and the Rx UE may need to transmit a signal at an identical timing in the D2D data resource pool. That is, in Mode 1, the Tx UE and the Rx UE may transmit a D2D data signal at an uplink timing. In Mode 2, the Tx UE and the Rx UE may transmit a D2D data signal at a DL timing A UE may be aware of a UL timing only when the UE is connected with a BS (RRC_CONNECTED), and thus, in Mode 1, a method of obtaining a UL Tx timing may be described as follows according to the state of an Rx UE.

An Rx UE connected with a BS: transmits an ACK/NACK subframe using a UL timing of the Rx UE, which is determined based on the distance between the Rx UE and a BS, or transmits an ACK/NACK subframe by calculating a UL timing based on a Timing Adjustment (or Timing Advance (TA)) that a Tx UE transmits through an SA. In this instance, the UL timing may be calculated by adding a TA and a DL timing of the Rx UE.

An Rx UE that is in an idle state with a BS: transmits an ACK/NACK subframe by calculating a UL timing based on a TA that a Tx UE transmits through an SA. In this instance, the UL timing may be calculated by adding the TA and a DL timing of the Rx UE.

In Mode 2, a Tx UE uses a DL timing for the transmission of D2D data and thus, an Rx UE may transmit an ACK/NACK signal at a DL timing of the Rx UE, irrespective of a state of a connection with a BS.

Figure 31:
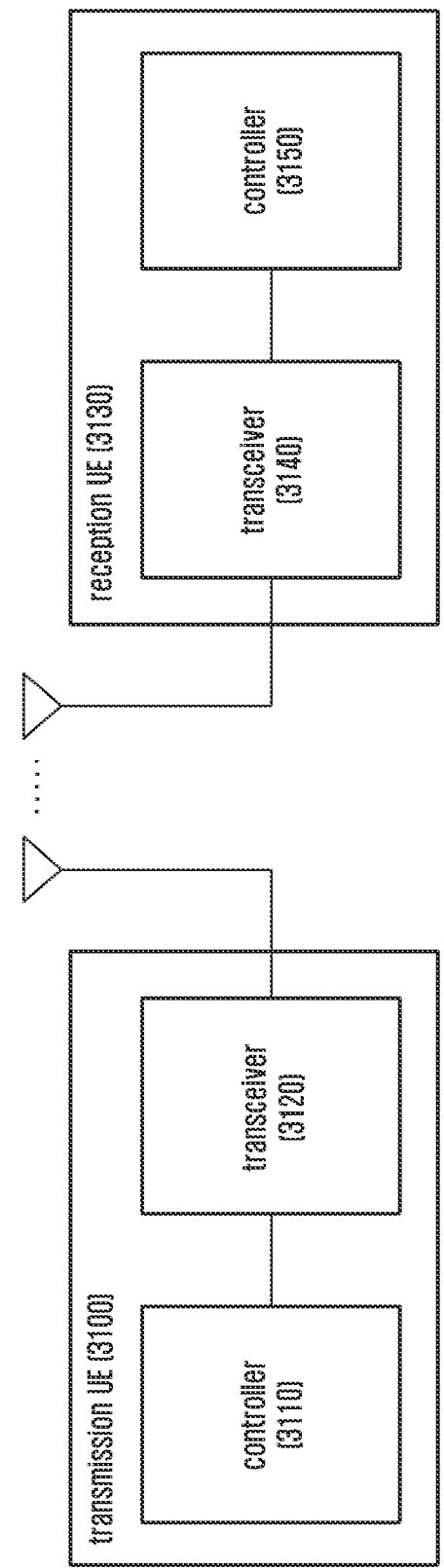
FIG. 31 is a block diagram illustrating a transmission UE and a reception UE which can perform the present disclosure.

FIG. 31 is a block diagram of a transmitting UE and a receiving UE capable of performing the present disclosure according to an embodiment of the present disclosure. According to FIG. 31, a transmitting UE 3100 includes a controller 3110 and a transceiver 3120, and the receiving UE 3130 includes a controller 3150 and a transceiver 3140.

Referring to FIG. 31, when a mode 1 is applied from the BS, a transceiver 3120 of the transmitting UE 3100 may receive the allocation information on D2D data including the T-RPT, transmit SA and D2D channel to the receiving UE 3130, and receive a signal including at least one of ACK/NACK information, CSI, TPC commands and TA information from the reception UE. The controller 3110 controls a transceiver to transmit/receive the above signals to/from the BS and the receiving UE 3130, and if the mode 2 is applied thereto, the controller 3110 selects the T-RPT, controls the transceiver so as to transmit MAC PDU, controls the HARQ process based on the ACK/NACK information to transmit or retransmit the MAC PDU, controls an MCS of SA, which will be transmitted, and data based on the received CSI, and controls the transmission power of the D2D data based on the received TPC commands.

The transceiver 3140 of the receiving UE 3130 may receive, from the transmitting UE 3100, SA and D2D channel, and transmit, to the transmitting UE 3100, at least one of ACK/NACK information, CSI, TPC commands and TA information. The controller 3150 may control the transceiver to transmit/receive a signal to/from the BS and the transmitting UE 3100, receive the MAC PDU, generate CSI to transmit the CSI to the transmitting UE 3100; generate a TPC command to transmit to the transmitting UE 3100; receive the TA information, and accordingly, control the transmission timing, such as ACK/NACK.

In the above embodiments of the present disclosure, all operations may be optionally performed or may be omitted. In addition, the operations in the each embodiment may not be sequentially performed, and a sequence of the operations may be changed.

Meanwhile, various embodiments of the present disclosure shown and described in this specification and the drawings correspond to specific examples presented in order to easily explain technical contents of the present disclosure, and to help comprehension of the present disclosure, but are not intended to limit the scope of the present disclosure. That is, it is obvious to those skilled in the art to which the present disclosure belongs that different modifications can be achieved based on the technical spirit of the present disclosure.

Embodiment 3

The present disclosure relates to a cellular wireless communication system, and particularly, to a method in which a BS transmits a control channel that includes data scheduling information to a UE, and the UE receives the corresponding control channel and data in a mobile communication system that supports CA.

A wireless communication system has developed to be a broadband wireless communication system that provides a high speed and high quality packet data service, like the communication standards, for example, high speed packet access (HSPA) and LTE of 3GPP, high rate packet data (HRPD) and ultra mobile broadband (UMB) of 3GPP2, and 802.16e of IEEE, or the like, beyond the voice-based service, which was provided at the initial stage.

An LTE system, which is a representative example of the broadband wireless communication system, employs an OFDM scheme for a DL, and a SC-FDMA scheme for a UL. The multiple access scheme described above may allocate or manage time-frequency resources through which data or control information is carried for each user in order to not overlap one another (that is, to have orthogonality), and thereby distinguishing data or control information of each user.

Also, when decoding fails at the initial transmission, the LTE system employs a HARQ that retransmits the corresponding data in a physical layer. The HARQ refers to a scheme that enables a receiver to transmit, to a transmitter, information (NACK) indicating the failure of decoding so that the transmitter retransmits the corresponding data in a physical layer. The receiver combines the data that is retransmitted from the transmitter and the data of which decoding fails, thereby increasing the performance of the reception of data. Also, when the data is accurately decoded, the receiver transmits information (ACK) that reports that decoding is successfully executed so that the transmitter transmits new data.

Figure 32:
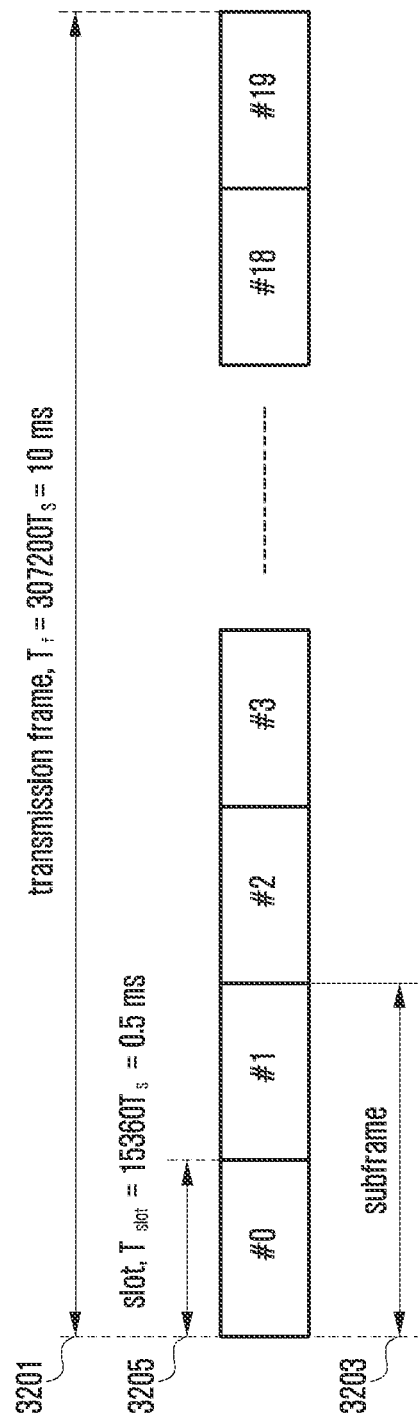
FIG. 32 is a view illustrating a transmission frame (radio frame) structure of an LTE-A system according to an embodiment of the present disclosure.

FIG. 32 illustrates the structure of a transmission frame (radio frame) 3201 of an LTE-A system according to an embodiment of the present disclosure. According to FIG. 32, a single transmission frame 3201 is formed of 10 subframes 3203, and each subframe 3203 is formed of two slots 3205. In the frame 3201, the subframes 3203 have indices from 0 to 9, and the slots 3205 have indices from 0 to 19.

Referring to FIG. 32, in the broadband wireless communication system, an important issue to providing a high-speed wireless data service is supporting a scalable bandwidth. For example, an LTE system may have various bandwidths such as 20 MHz, 15 MHz, 10 MHz, 5 MHz, 3 MHz, 1.4 MHz and the like. Therefore, a service operator may provide a service by selecting a predetermined bandwidth from among the various bandwidths. Various types of UEs may be used, such as a UE that may support a maximum bandwidth of 20 MHz, a UE that may support a minimum bandwidth of 1.4 MHz, and the like.

Next, an LTE-A system, which aims at providing a service at the level of the IMT-Advanced requirement, may provide a broadband service up to a maximum bandwidth of 100 MHz through the CA of LTE carriers. The LTE-A system requires a broadband that is broader than the LTE system for providing a high-speed data transmission service. At the same time, the LTE-A system considers the backward compatibility associated with LTE UEs as an importable issue, so that the LTE UEs may need to access the LTE-A system and receive service. To this end, the LTE-A system divides the entire system band into subbands or component carriers (CCs) through which an LTE UE may execute transmission or reception, and aggregates a few CCs. The LTE-A system generates and transmits data for each CC, and supports the high-speed data transmission of the LTE-A system through a transmission/reception process of the existing LTE system utilized for each CC.

Figure 33:
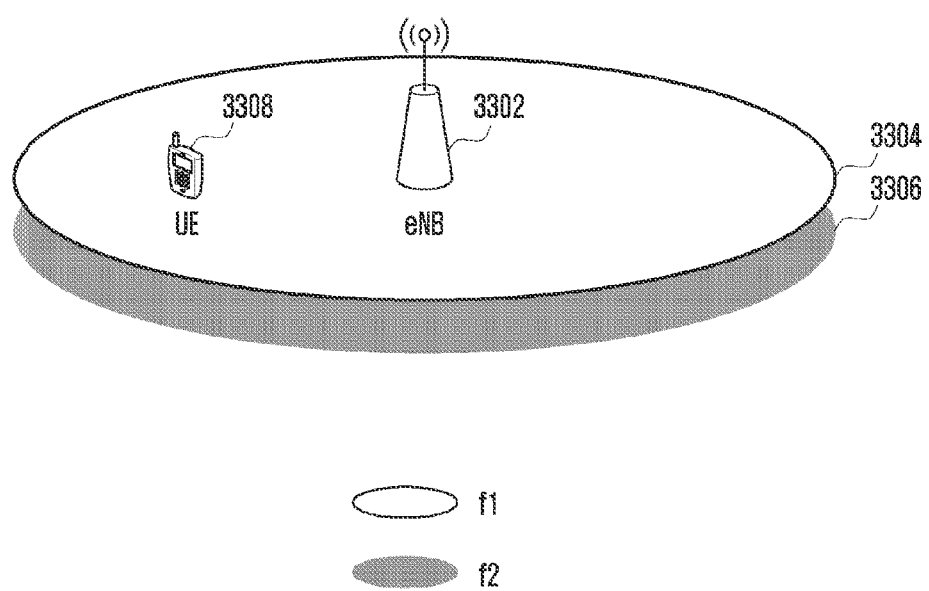
FIG. 33 is a view illustrating an example of a system configuration of an LTE-A system which supports a carrier aggregation (CA) according to an embodiment of the present disclosure.

FIG. 33 is a diagram illustrating an example of the configuration of a system of an LTE-A system that supports CA according to an embodiment of the present disclosure. FIG. 33 illustrates an example in which a BS 3302 which may be an evolved NodeB (eNB) supports two CCs (CC#1 and CC#2), and CC#1 is configured with f1 and CC#2 is configured with f2, which is different from f1. CC#1 and CC#2 are configured for an identical BS 3302. The BS 3302 provides coverages 3304 and 3306 that respectively correspond to the CCs. In the LTE-A system that supports CA, the transmission of data and the transmission of control information to support the transmission of data may be executed for each CC. In configuration of FIG. 33 may be equally applied to UL CA, in addition to the DL CA. A UL refers to a radio link through which a UE transmits data or a control signal to a BS, and a DL refers to a radio link through which a BS 3302 transmits data or a control signal to a UE 3308. A CC that is used as a reference from among the carrier aggregated CCs is referred to as a primary carrier (or primary component carrier (PCC)). A CC that is different from the primary carrier is referred to as a secondary carrier (or secondary component carrier (SCC)) or a non-PCC. A BS 3302 may report, to a UE 3308 through signaling, which CC is to be set and managed as a primary carrier and the number of CCs that are to be aggregated.

Referring to FIG. 33, in the case of a DL, a CC that is set as a PCC may transmit initial system information or higher signaling, and may be used as a reference CC that controls the mobility of a UE 3308. In the case of a UL, a CC that transmits a control channel that includes HARQ ACK/NACK with respect to data that a UE receives, or a CSI indicating a channel state between a BS 3302 and a UE 3308, or the like, may be determined to be a UL PCC. A cell that is formed of a DL PCC and a UL PCC is referred to as a PCell, and a cell that is formed of a DL SCC and a UL SCC is referred to as a SCell.

In the case of CA, a symmetric CA, in which the number of UL/DL CCs that are to be aggregated are identical, and an asymmetric CA, in which the number of UL/DL CCs are different from one another, may be possible.

As described above, the LTE-A system generates and transmits data for each CC. Scheduling information associated with the data transmitted for each CC may be reported to a UE through DCI. DCI defines various forms. A DCI format may be applied to be different based on whether scheduling information is for UL data (UL grant) or for DL data (DL grant), whether it is a compact DCI of which the control information is small, whether spatial multiplexing using multiple antennas is applied, whether it is used for controlling power, and the like. For example, DCI format 1, of which the scheduling control information (DL grant) is for DL data, is formed of the following pieces of control information.

Resource allocation type0/1 flag: indicating whether a resource allocation scheme is type 0 or type 1. Type 0 applies a bitmap scheme and allocates a resource based on a RB group (RBG) unit. In the LTE and LTE-A system, a basic unit of scheduling is a RB that is expressed as a time and frequency domain resource, and RBG is formed of a plurality of RBs and is used as a basic unit of scheduling in the type 0. Type 1 allocates a predetermined RB in an RBG.

RB assignment: indicating an RB that is allocated to data transmission. A resource is determined based on a system bandwidth and a resource allocation scheme.

MCS: indicating a modulation scheme and coding rate used for data transmission

HARQ process number: indicating a process number of HARQ

New data indicator: indicating whether it is HARQ initial transmission or retransmission Redundancy version: indicating a redundancy version of HARQ TPC command for PUCCH: indicating a power control command for PUCCH which is a UL control channel The DCI is transmitted through a PDCCH after a channel coding and modulation process.

Figure 34:
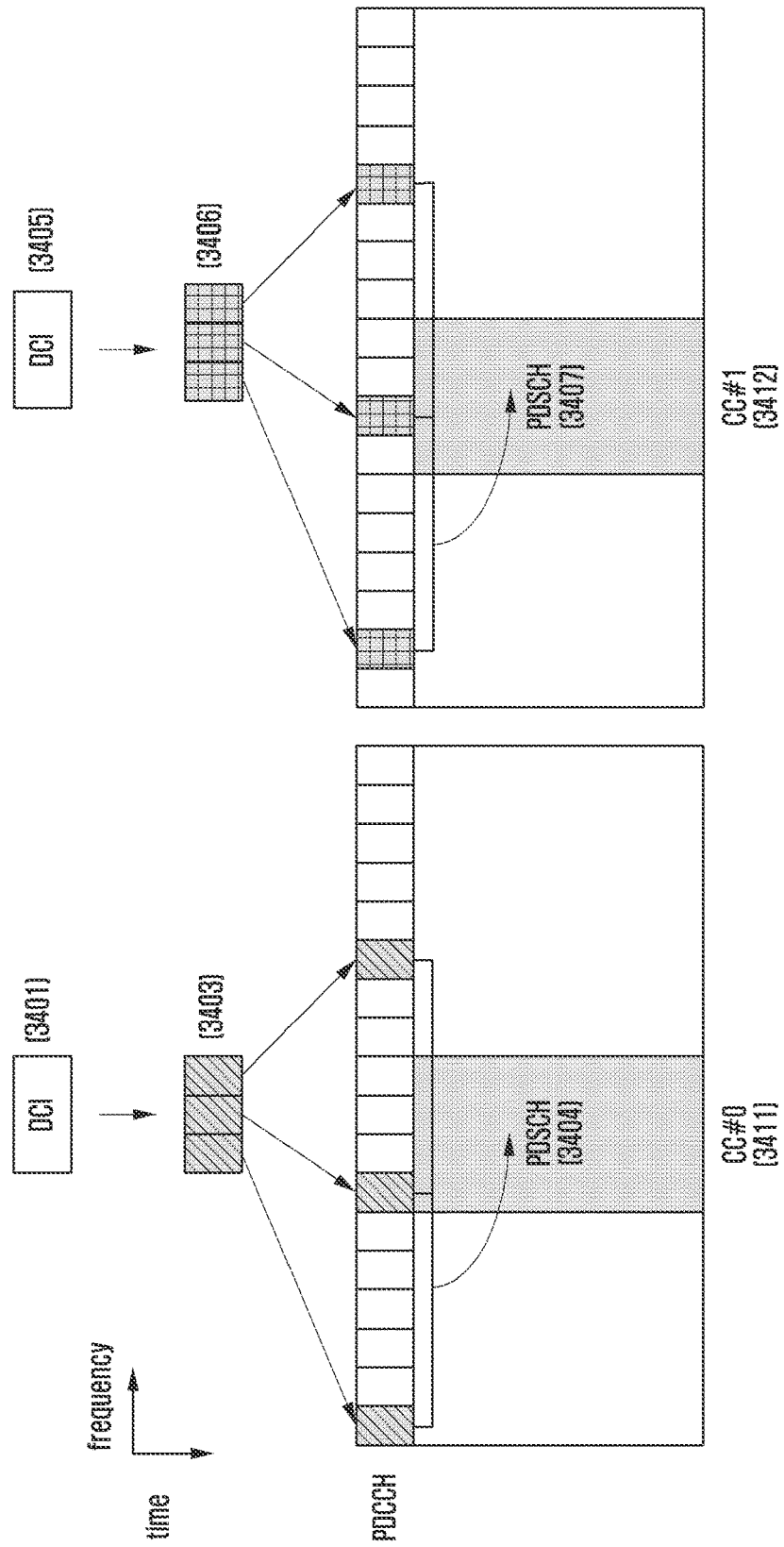
FIG. 34 is a view illustrating an example of scheduling, by a BS, DL data to a LTE-A UE in which two component carriers (CCs) are configured according to an embodiment of the present disclosure.

FIG. 34 illustrates an example in which a BS schedules DL data for an LTE-A UE configured with two CCs (CC#1 and CC#1) according to an embodiment of the present disclosure. FIG. 34 illustrates a situation in which a PDCCH 3403 and 3406 is operated for each CC, and a PDSCH transmitted to a corresponding CC is scheduled.

Referring to FIG. 34, a DCI 3401 transmitted in CC#0 3411 applies a format that is defined in the LTE-A system and passes through a channel coding and interleaving, and thus, a PDCCH 3403 is generated. The PDCCH 3403 reports, to a UE, scheduling information associated with a PDSCH 3404, which is a data channel allocated to the UE in CC#0 3411. A DCI 3405 that is transmitted in CC#1 3412 applies a format defined in the existing LTE, and passes through channel coding and interleaving and, thus, a PDCCH 3406 is generated. The PDCCH 3406 reports, to a UE, scheduling information associated with a PDSCH 3407 which is a data channel that is allocated to the UE in CC#1 3412.

Figure 35:
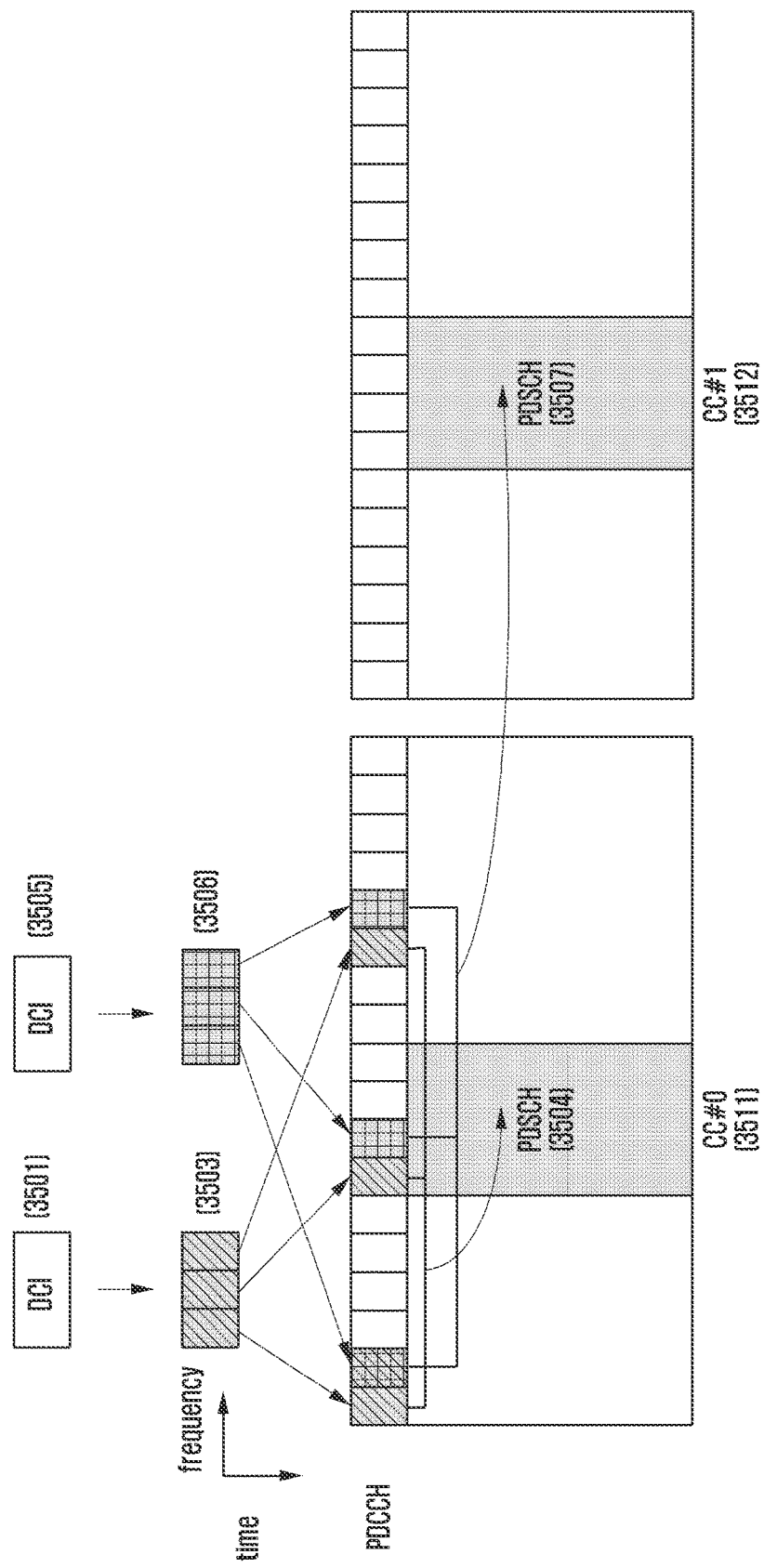
FIG. 35 is a view illustrating another example of scheduling, by a BS, DL data to a LTE-A UE in which two CCs are configured according to an embodiment of the present disclosure.

FIG. 35 illustrates another example in which a BS schedules DL data for an LTE-A UE configured with two CCs (CC#1 and CC#1) according to an embodiment of the present disclosure. FIG. 35 includes a situation in which a PDCCH region of a predetermined CC schedules a PDSCH that is transmitted in a different CC. That is, CC#0 3511 schedules a PDSCH 3504 that is transmitted on the corresponding CC#0 3511, and also schedules a PDSCH that is transmitted on CC#1 3512. As illustrated in FIG. 35, the case in which a PDSCH of a predetermined CC is scheduled in a PDCCH region of a different CC is referred to as cross-carrier scheduling. Whether cross-carrier scheduling occurs may be reported through a higher signaling. Through a higher signaling, a UE may determine that cross-carrier scheduling occurs, in which a PDSCH of a predetermined CC is scheduled through a PDCCH of a different CC.

Referring to FIG. 35, a first DCI 3501 transmitted in CC#0 3511 applies a format that is defined in the LTE-A system and passes through channel coding and interleaving, and thus, a single PDCCH 3503 is generated. The PDCCH 3503 reports, to a UE, scheduling information associated with a PDSCH 3504 which is a data channel allocated to the UE in CC#0 3511. Also, a second DCI 3505 transmitted in CC#0 applies a format that is defined in the existing LTE-A, and passes through channel coding and interleaving, and thus, a PDCCH 3506 is generated. The PDCCH 3506 reports, to the UE, scheduling information associated with a PDSCH 3507 which is a data channel allocated to the UE in CC#1 3512. FIG. 35 is the case in which the UE is informed, by a higher signaling, that PDSCH scheduling associated with CC#1 3512 is determined in the PDCCH region of CC#0 3511. Here, a resource pool of the PDCCH 3503 associated with the PDSCH 3504 that is transmitted in CC#0 3511 and a resource pool of the PDCCH 3506 that is associated with the PDSCH 3507 transmitted in CC#1 3512 are located in an identical CC. However, in order to define them as different regions, a PDCCH region for a PDSCH to which cross-carrier scheduling is applied is determined based on a function associated with an index of a CC through which the corresponding PDSCH is transmitted in LTE-A.

Equation 5 is an equation indicating a control channel resource index through which a PDCCH is transmitted in LTE-A. For reference, in LTE-A, a unit of a resource to which a control channel is mapped is referred to as a CCE, and $N_{CCE,k}$ denotes a total number of CCEs available in a predetermined subframe k. An index of each CCE is determined based on a scheme of sequentially assigning an index on a frequency axis in a first OFDM symbol, and sequentially assigning an index in a subsequent OFDM symbol. Refer to LTE-A standards for the details [TS 36.211].

$$L\{(Y_k+m') \bmod \lfloor N_{CCE,k}/L \rfloor\}+i, i=0, \ldots, L-1 \quad \text{Equation 5}$$

Equation 5 indicates the location of an index of each of L CCEs, when $L \in \{1, 2, 4, 8\}$ CCEs form a single PDCCH. Here, $Y_k$ denotes the starting point of a PDCCH with respect to a predetermined UE, and is determined to be different for each subframe index and an ID of a UE. m'=m when information for distinguishing an index of a CC is not included in a DCI for each UE, and $m'=m+M^{(L)} \cdot n_{CI}$ when information for distinguishing an index of a CC is included in a DCI for each UE. Here, m indicates an index of an available PDCCH region and m=0, . . . , $M^{(L)}-1$, and $n_{CI}$ denotes an index of the CC. $M^{(L)}$ may be defined as shown in Table 1 in association with L.

TABLE 1

| Aggregation level $L$ | Number of PDCCH candidates $M^{(L)}$ |
| --- | --- |
| 1 | 6 |
| 2 | 6 |
| 4 | 2 |
| 8 | 2 |

In the LTE-A system, when it is determined that N CCs are activated, a UE measures a DL channel state with respect to all of the N CCs, and feeds back the corresponding CSI information through an UL PCC. Also, in the LTE-A system, when it is determined that N CCs are activated, a UE attempts to detect N PDCCHs by assuming that each of the NCCs transmits a PDSCH for each subframe. Here, in the case of N PDCCHs, a predetermined CC may include PDCCHs of many CCs, as described above, according to the cross-carrier scheduling situation.

Therefore, in the existing LTE-A system, a UE is capable of estimating a channel with respect to N CCs and executing CSI feedback, and is also capable of detecting N PDCCHs, and is required to have a buffer that is capable of storing N PDSCH reception symbols in order to use N different CCs. This is designed by assuming that a frequency for the LTE-A service is significantly limited and N has a value of less than or equal to 5.

However, when the available frequency of the LTE-A system is extended, a situation may occur in which the number of CCs for which a UE is capable of executing channel estimation and CSI feedback is different from the number of CCs for which the UE is capable of detecting PDCCHs, and which is associated with the size of a buffer that is capable of storing PDSCH reception symbols. Also, when some of the available frequency is included in an unlicensed band, the channel state is unstable due to interference from the devices other than LTE-A, and thus, a situation may occur in which the number of CCs for feedback is different from the number of CCs that consider simultaneous PDSCH reception.

Therefore, in the present disclosure, when the number of CCs through which channel estimation and CSI feedback is executed is N, the number of CCs through which PDCCH detection and simultaneous PDSCH reception is executed is M, and M and N are different from each other, the transmission and reception of a control channel and the transmission and reception of a PDSCH, executed between a BS and a UE, will be described.

The present disclosure relates to a method and apparatus in which a BS transmits a control channel that includes data scheduling information to a UE, and the UE receives the corresponding control channel and data in a mobile communication system that supports CA. Particularly, in the situation where the number of carriers in which PDSCHs are simultaneously scheduled with respect to a UE in a single subframe is smaller than the total number of carriers that are activated for a predetermined UE, the present disclosure provides a method and apparatus in which a BS transfers higher information reporting the corresponding CA situation to a UE, generates/transmits a control channel at the location of a resource that is determined based on the corresponding situation, and transmits corresponding data to the UE, and a method and apparatus in which the UE determines higher information for determining the corresponding CA situation, detects/receives the control channel at the location of a resource determined based on the corresponding situation, and receives the corresponding data.

Hereinafter, embodiments of the present disclosure will be described in detail in conjunction with the accompanying drawings. In the following description of the present disclosure, a detailed description of known functions or configurations incorporated herein will be omitted when it may make the subject matter of the present disclosure rather unclear. Meanwhile, terms described later are defined in consideration of the functions of the present disclosure, but the meaning of the terms may be changed according to a user, intention of an operator, or convention. Accordingly, the terms should be defined based on the contents over the whole present specification.

Further, the detailed description of embodiments of the present disclosure is made mainly based on a wireless communication system based on OFDM, particularly 3GPP EUTRA standard, but the subject matter of the present disclosure can be applied to other communication systems having a similar technical background and channel form after a little modification without departing from the scope of the present disclosure and the above can be determined by those skilled in the art.

In the existing LTE-A system, when N DL CCs are activated, a UE operates by assuming that the UE is able to receive N PDSCHs in parallel. Here, each PDSCH is transmitted through each activated CC. That is, a UE for which N DL CCs are activated may be capable of simultaneously measuring N channels and generating/reporting a CSI, and is capable of simultaneously detecting N PDCCHs for each subframe, and is required to have a buffer that is capable of storing N received PDSCHs. This is designed by assuming that when an LTE-A system is employed in a predetermined frequency area, the corresponding frequency area is included in a licensed band and services only LTE-A and unpredictable interference from a different system does not occur. That is, CA in the existing LTE-A system is designed by assuming that a UE for which N CCs are activated is capable of stably using N CCs in each subframe.

Figure 36:
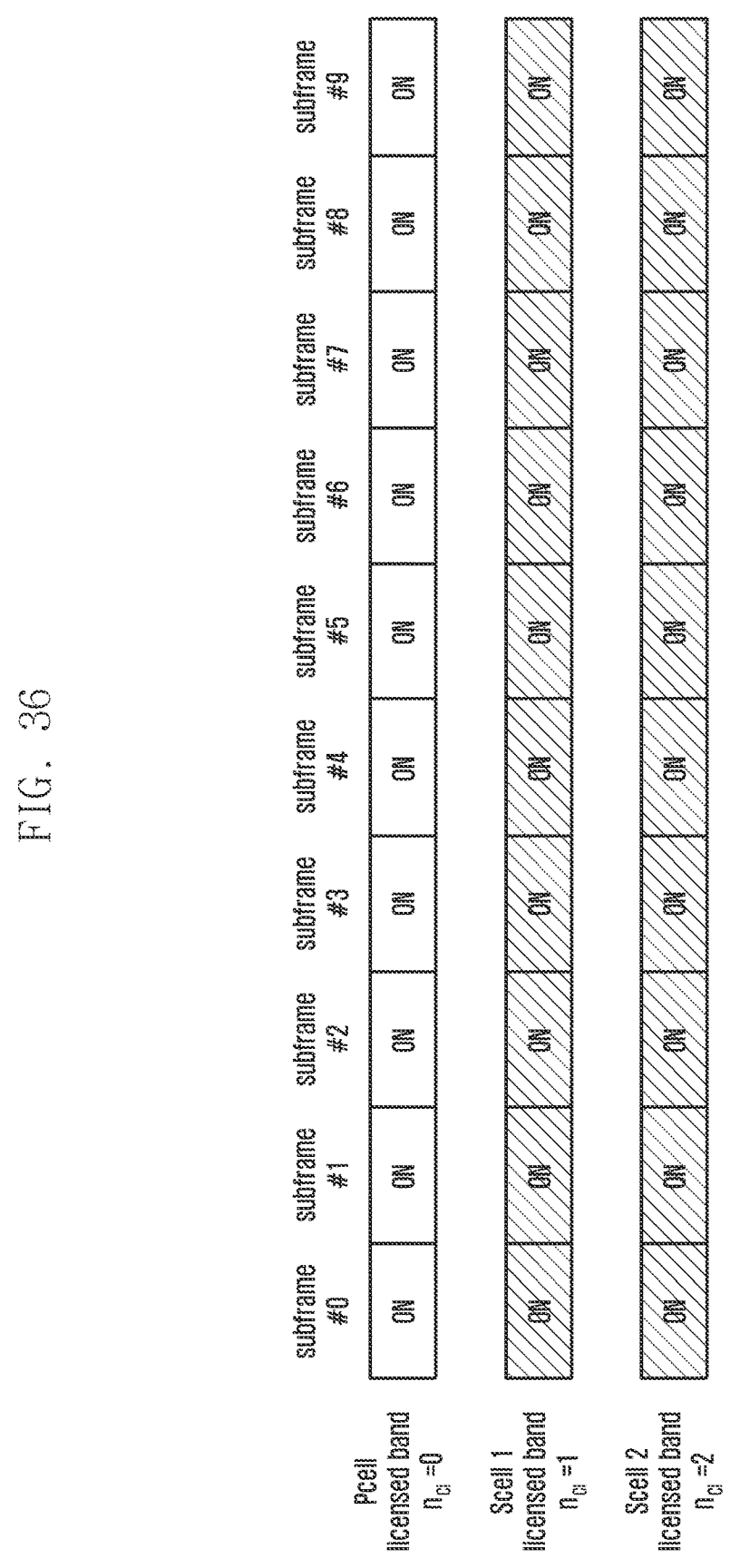

FIG. 36 illustrates the case in which a UE is assigned with three CCs and the CCs are all included in a licensed band under the current LTE-A CA situation according to an embodiment of the present disclosure. According to FIG. 36, from the perspective of a system, all of the subframes of all the CCs are available, and a UE operates under the assumption that a PDSCH is always transmitted in each of the three CCs.

Referring to FIG. 36, although, as described above, it is assumed that the current LTE-A system always operates in a licensed band, CA may be considerable, which allows a few CCs to operate in an unlicensed band so as to secure additional frequencies and increases the total capacity of the system.

Figure 37:
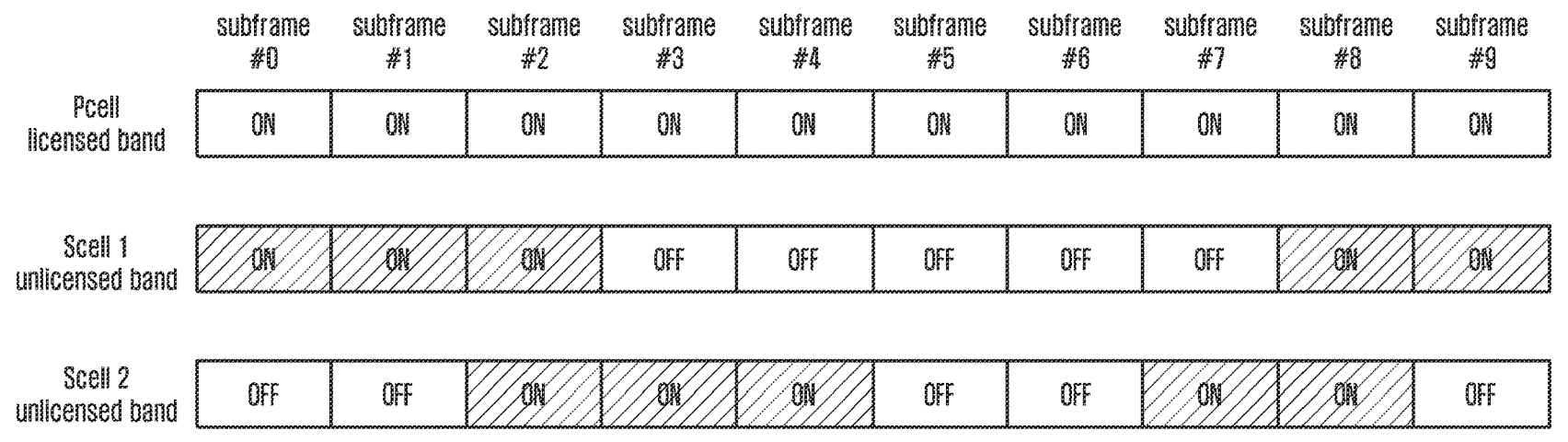

FIG. 37 illustrates the situation in which a few of CCs are included in an unlicensed band, and executes operations like LTE-A according to an embodiment of the present disclosure. In the case of the CCs that are included in the unlicensed band, occasionally, a few subframes cannot be used due to the transmission by Wi-Fi or other wireless devices, which share the unlicensed band.

Referring to FIG. 37, therefore, an embodiment of the present disclosure considers the situation in which an LTE-A system uses a licensed band and an unlicensed band together and an available frequency is extended, and a few of the CCs configured for a predetermined UE are included in the unlicensed band, and the channel state is unstable due to interference from devices other than LTE-A and, thus, the number of CCs that execute feedback is different from the number of CCs that consider simultaneous PDSCH reception. That is, in the situation of FIG. 37, a UE is configured with three CCs, and SCell 1 and SCell 2 are included in an unlicensed band that is unstable, and thus, the amount of resources that the UE is able to use is actually similar to a situation where a single SCell is configured in the existing licensed band. Therefore, there is a desire for a method that adjusts the complexity of the PDCCH detection and simultaneous PDSCH reception considered by the UE to not be greater than the case in which a single SCell is configured.

Therefore, in an embodiment of the present disclosure, when the number of CCs through which channel estimation and CSI feedback is executed is N, the number of CCs through which PDCCH detection and simultaneous PDSCH reception is executed is M, and M is smaller than N, the transmission and reception of a PDCCH and the transmission and reception of a PDSCH, executed between a BS and a UE, will be described.

That is, the embodiment of the present disclosure consider the situation in which N CCs configured for a predetermined UE are activated and the corresponding UE measures a DL channel with respect to N CCs and executes CSI feedback. However, the UE receives a control channel and a data channel by assuming that PDSCHs are transmitted through a total of M CCs out of N CCs for each subframe. Here, it is assumed that M is smaller than N.

Embodiment 3-1

As described above, the embodiment of the present disclosure considers the case in which a UE determines that PDSCHs are transmitted through a total of M CCs out of the N CCs and, thus, the corresponding UE expects the reception of a PDCCH and detects a PDCCH from M determined control channel regions for each subframe. In the existing LTE-A, when the UE is assigned with N CCs, a PDCCH reception region is separately defined for each CC as shown in Equation 5 and, thus, the UE attempts PDCCH detection in the corresponding N regions and the complexity of detecting all of the PDCCHs may increase in proportion to the total number of assigned CCs. However, the embodiment of the present disclosure expects the transmission of PDSCHs through M CCs out of the N assigned CCs, and thus, when an appropriate PDCCH reception region is configured, the complexity of detecting PDCCHs may increase in proportion to M as opposed to N.

To enable a BS to select M CCs out of the N CCs that are assigned to a predetermined UE, and to execute the transmission of PDSCHs, the embodiment of the present disclosure divides the entire CCs assigned to the UE into M subsets, and the UE operates by assuming that only one of the CCs included in each subset is scheduled for each subframe. In this instance, a CC that includes a PDCCH reception region and PDCCH resource indices available in the corresponding CC are defined for each subset and the UE attempts to detect PDCCHs from M PDCCH reception regions. When a PDCCH associated with a predetermined subset is detected from a corresponding region, the UE determines the index of a CC that is included in a detected DCI, and determines a CC that is associated with PDSCH scheduling, and receives a PDSCH through the corresponding CC. The embodiment of the present disclosure may not exclude the case in which a few of the subsets includes a single CC.

As a first example, there is the case in which a BS configures {CC#0, CC#1, CC#2} for a UE based on N=3, two subsets {CC#0} and {CC#1, CC#2} are configured based on M=2, and an index of each subset is set. The UE determines that two PDSCHs are simultaneously transmitted, and one of the PDSCHs is transmitted through CC#0 and the other PDSCH is transmitted through one of CC#1 and CC#2. The corresponding example is a situation in which the UE does not expect simultaneous transmission of PDSCHs through CC#1 and CC#2. The UE attempts to detect a maximum of two PDCCHs corresponding to two subsets for each subframe. A CC that includes each PDCCH is set for each subset in a predetermined subframe, and a PDCCH reception region in the corresponding CC may be determined based on an index of each subset. That is, an index of a control channel resource through which a PDCCH is transmitted for the UE, may be expressed as shown in Equation 6.

$$L\{(Y_k+m'')\bmod \lfloor N_{CCE,k}/L \rfloor\}+i, i=0,\ldots,L-1 \qquad \text{Equation 6}$$

Equation 6 is different from Equation 5 in that m" in Equation 6 is defined as m"=m+M^{(L)}·1_{CI}, and the other parameters are identical to the parameters of Equation 1. Here, $1_{CI}$ indicates an index of a subset of the CCs.

In the example, when a UE detects a PDCCH from a PDCCH reception region corresponding to a predetermined subset, the UE may additionally determine a CC index that is included in a DCI, and determines a CC through which PDSCH reception is to be executed out of the CCs included in the corresponding subset.

As another example, there is the case in which a UE is configured with {CC#0, CC#1, CC#2, CC#3, CC#4} based on N=5, three subsets {CC#0}, {CC#1, CC#2}, and {CC#3, CC#4} are configured based on M=3, and an index of each subset is set. Therefore, the UE determines that three PDSCHs may be simultaneously transmitted, and one of the PDSCHs is transmitted through CC#0, another PDSCH is transmitted through one of CC#1 and CC#2, and the other PDSCH is transmitted through one of CC#3 and CC#4. The UE attempts to detect a maximum of three PDCCHs corresponding to three subsets for each subframe. A CC that includes each PDCCH is set for each subset, and a PDCCH reception region in the corresponding CC may be determined based on an index of each subset, as shown in Equation 6.

As another example, there is a situation in which a UE is configured with {CC#0, CC#1, CC#2, CC#3} based on N=4, three subsets {CC#0}, {CC#1}, and {CC#2, CC#3} are configured based on M=3, and an index of each subset is set. Therefore, the UE determines that three PDSCHs may be simultaneously transmitted, and one of the PDSCHs is transmitted through CC#0, another PDSCH is transmitted through CC#1, and the other PDSCH is transmitted through one of CC#2 and CC#3. The UE attempts to detect a maximum of three PDCCHs corresponding to three subsets for each subframe. A CC that includes each PDCCH is set for each subset, and a PDCCH reception region in the corresponding CC may be determined based on an index of each subset, as shown in Equation 6. Here, as a method of distinguishing a subset, a BS may directly distribute, to a UE, CCs based a channel state of each CC, or a subset may be determined based on whether a predetermined CC is included in a licensed band. That is, in the corresponding example, CC#0 and CC#1 are included in a licensed band and CC#2 and CC#3 are included in an unlicensed band. The CCs included in the licensed band enable the transmission and reception of a PDSCH through each CC, whereas in the unlicensed band, one of the CCs enables the transmission of a PDSCH.

As another example, there is the case in which a UE is configured with {CC#0, CC#1, CC#2, CC#3} based on N=4, three subsets {CC#0}, {CC#1, CC#2, CC#3}, {CC#1, CC#2, CC#3} are configured based on M=3, and an index of each subset is set. That is, the present example considers the case in which the CCs included in a second subset and the CCs included in a third subset are identical. In this instance, the UE determines that three PDSCHs may be simultaneously transmitted, one of the PDSCHs is transmitted through CC#0, and other two PDSCHs are transmitted through two CCs out of CC#, CC#2 and CC#3. The UE attempts to detect a maximum of three PDCCHs corresponding to three subsets for each subframe. A CC that includes each PDCCH is set for each subset, and a PDCCH reception region in the corresponding CC may be determined based on an index of each subset, as shown in Equation 2. As a method of distinguishing a subset, a BS may directly distribute, to a UE, CCs based on a channel state of each CC, or a subset may be determined based on whether a predetermined CC is included in a licensed band. That is, in the corresponding example, CC#0 is included in a licensed band, and CC#1, CC#2 and CC#3 are included in an unlicensed band. The CCs included in the licensed band enable the transmission and reception of a PDSCH through each CC, whereas in the unlicensed band, a few of the CCs enable the transmission of a PDSCH. That is, the present example assigns two subset indices with respect to the CCs that are included in the unlicensed band so as to assign two PDCCH regions that are capable of simultaneously scheduling two CCs out of the three CCs.

As described above, a method of setting an index of each subset will be described in detail, in which N CCs between a BS and a UE are divided into M subsets and a PDCCH region for each subset is set, so that a single PDSCH scheduling is executed for each subset.

As a first method of setting an index of each subset, a BS configures CCs for a UE, sets subsets, and transfer index information through a higher signaling. That is, the BS directly sets the $l_{CI}$ value in Equation 6 for a UE, for each subset.

A second method of setting an index of each subset is to use the smallest value or the largest value among the CC indices included in each subset, as the $l_{CI}$ value of Equation 2. When the second method is used, a separate higher signaling is not needed, which is advantageous. When an intersection of the subsets exists, a subset index may be generated and thus, this method may not be used.

A third method of setting an index of each subset is to use a CC index for each of the CCs in a licensed band, and uses, as a subsequent index value, an index of a subset of the CCs included in an unlicensed band. By assuming that the largest value of the CC indices in a licensed band is n, the method sequentially assigns a subset index from n+1 with respect to the CCs included in the unlicensed band.

As described above, a method of configuring a CC where a PDCCH exists for each subset will be described in detail, in which N CCs between a BS and a UE are divided into M subsets and a PDCCH region for each subset is set so that a single PDSCH scheduling is executed for each subset.

As a first method of configuring a CC where a PDCCH exists for each subset, a BS configures CCs for a UE, configures subsets, and transfers CC index information associated with the corresponding PDCCH through a higher signaling. The UE may attempt to detect a PDCCH associated with a predetermined subset from a CC corresponding to an index set through a higher signaling. According to a second method, a UE and a BS determine that a PDCCH is to be transmitted in a CC that has the smallest value or the largest value from among the CC indices included in each subset. According to a third method, a UE and a BS determine that a PDCCH is to be transmitted in a CC that has the smallest value or the largest value from among CCs that are turned on in a corresponding subframe out of the CCs included in each subset. Referring to FIG. 37, the CCs that operate in an unlicensed band may be configured to turn off a predetermined subframe due to the transmission of other wireless devices in a certain circumstance, and thus, a PDCCH is configured to be transmitted through the CCs that are turned on in the third method. As the last method, a BS sets CC index information of one or more CCs where a PDCCH may exist for each subset, and a UE attempts to detect a PDCCH from a CC that has the smallest index and the largest index from among the CCs that are turned on out of the CCs corresponding to the one or more CC indices.

Figure 38:
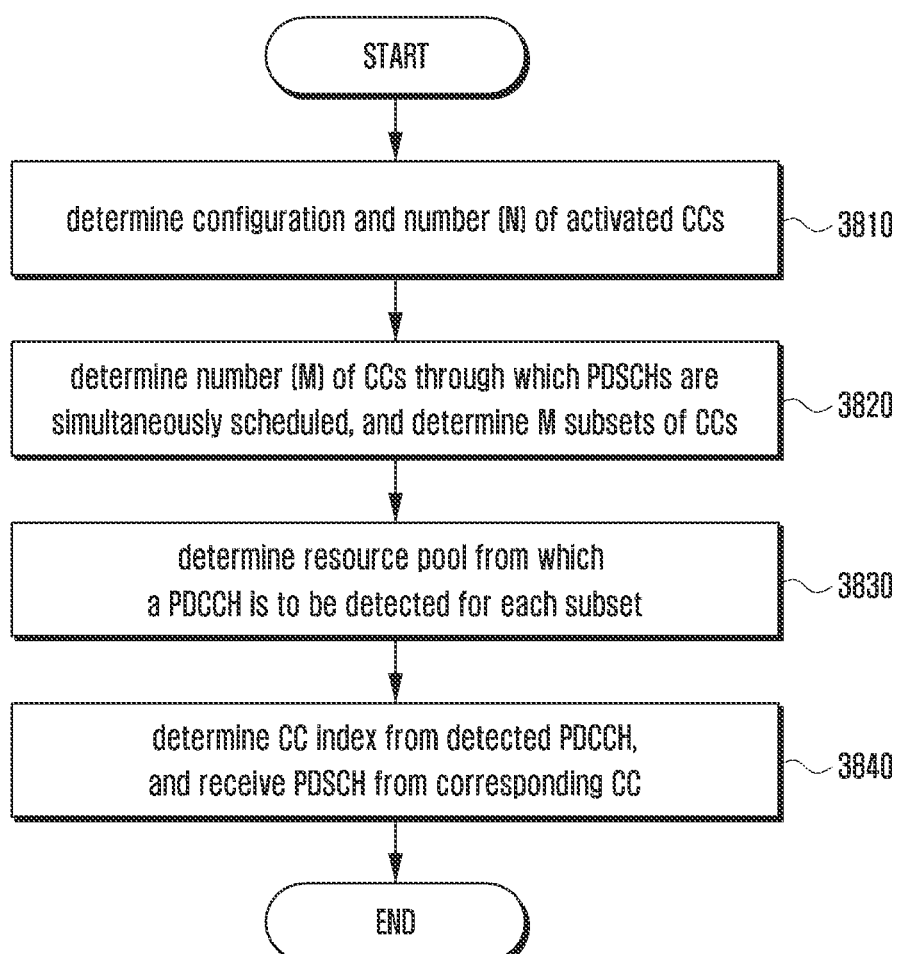
FIG. 38 is a flowchart illustrating an order of an operation of identifying CC configuration and an operation of receiving a control channel and a physical downlink shared channel (PDSCH) according to an embodiment of the present disclosure.

FIG. 38 is a flowchart illustrating a process in which a UE determines the configuration of CCs, and receives a control channel and PDSCH, according to an embodiment of the present disclosure.

Referring to FIG. 38, in operation 3810, a UE determines the configuration of CCs, determines activated CCs, and a total number of CCs. A total number of activated CCs is assumed to be N in the description of the embodiment of the present disclosure. In operation 3820, the UE determines that PDSCHs are simultaneously transmitted through only a maximum of M CCs out of N CCs, and determines M subsets of the CCs. Here, a BS separately configures the subsets for the UE, or the subsets may be determined based on whether each CC is included in a licensed band or in an unlicensed band. In operation 3830, the UE attempts to detect a PDCCH M times, and each attempt corresponds to PDSCH scheduling for each subset. A resource pool where a PDCCH is detected with respect to each subset is determined based on a CC that is used, and a subset index used when Equation 6 is applied, and the methods have been described in the above embodiments of the present disclosure. In operation 3840, the UE determines a CC index in the detected PDCCH and receives a PDSCH from the corresponding CC, and finishes determining the configuration of CCs and receiving a control channel and a PDSCH.

Figure 39:
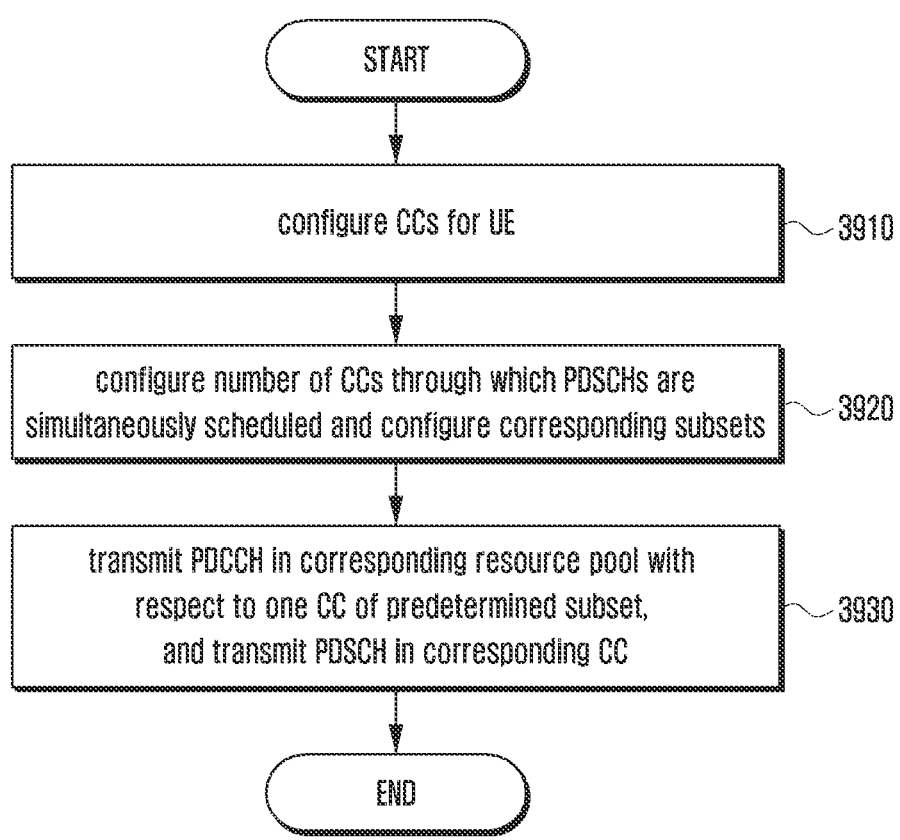
FIG. 39 is a flowchart illustrating an operation order of a BS according to an embodiment of the present disclosure.

FIG. 39 is a flowchart illustrating the operations of a BS according to an embodiment of the present disclosure.

Referring to FIG. 39, a BS configures at least one CC for a UE in operation 3910. In operation 3920, the BS sets the number of CCs through which PDSCHs are simultaneously scheduled, and configures M subsets of the CCs. Here, information associated with the configuration of each subset may include the information associated with the above described PDCCH detection region. In operation 3930, the BS transmits a PDCCH in a corresponding resource pool in association with one of the CCs included in a predetermined subset, transmits a PDSCH through the corresponding CC, and finishes configuring the CCs and transmitting a control channel and a PDSCH.

Figure 40:
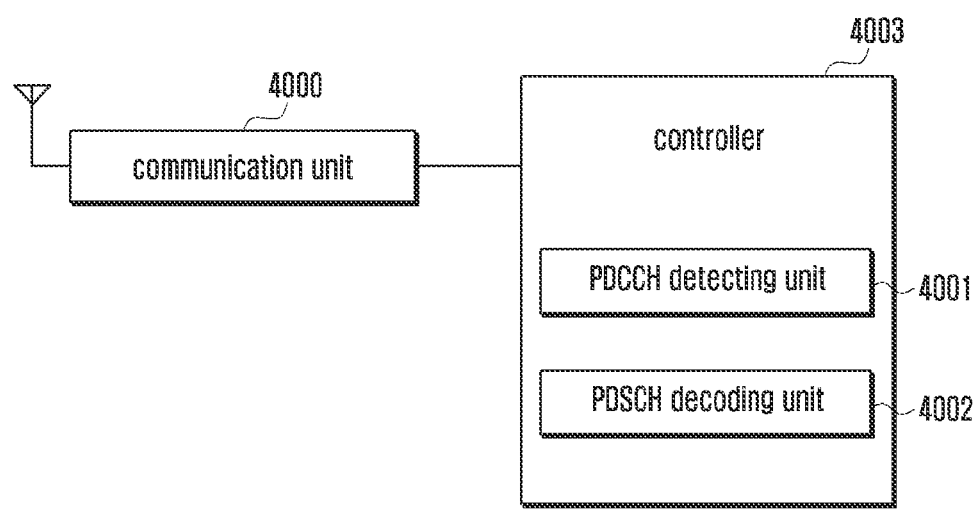
FIG. 40 is a view illustrating a device structure of a UE according to an embodiment of the present disclosure.

FIG. 40 illustrates the configuration of a UE according to an embodiment of the present disclosure.

Referring to FIG. 40, a UE is formed of a communication unit 4000 and a controller 4003. The communication unit transmits or receives control information and data from the outside (for example, a BS). Here, the communication unit 4000 may transmit, to a BS, UL data and CSI feedback information under the control of the controller 4003.

The controller 4003 controls the state and operations of all component elements that form the UE. Particularly, the controller 4003 determines a configuration situation of CCs and a PDCCH resource pool based on information allocated from the BS, receives control information, and receives a PDSCH based on the control information. To this end, the controller 4003 may be configured to include a PDCCH detecting unit 4001 and a PDSCH decoding unit 4002.

The PDCCH detecting unit 4001 determines a PDCCH resource pool based on the situation of CCs set by the BS and related information, and detects a PDCCH in a corresponding resource pool. When a predetermined PDCCH is detected, the PDCCH detecting unit 4001 transfers, to the PDSCH decoding unit 4002, PDSCH scheduling information that includes information indicating a CC through which a PDSCH is transmitted. The PDSCH decoding unit 4002 decodes a PDSCH by utilizing the scheduling information.

Although FIG. 9 describes the example in which the UE is formed of the communication unit 4000 and the controller 4003, the present disclosure may not be limited to the example, and may further include various components based on a function executed in the UE. For example, the UE may include a display to display the present status, an input unit through which a signal for executing a function is input from a user, a storage unit that stores data generated in the UE, or the like. Also, although it is illustrated that the controller 4003, the PDCCH detecting unit 4001, and the PDSCH decoding unit 4002 are configured as separate blocks, the present disclosure may not be limited thereto. For example, the controller 4003 may execute the functions that the PDCCH detecting unit and the PDSCH decoding unit 4002 execute.

Figure 41:
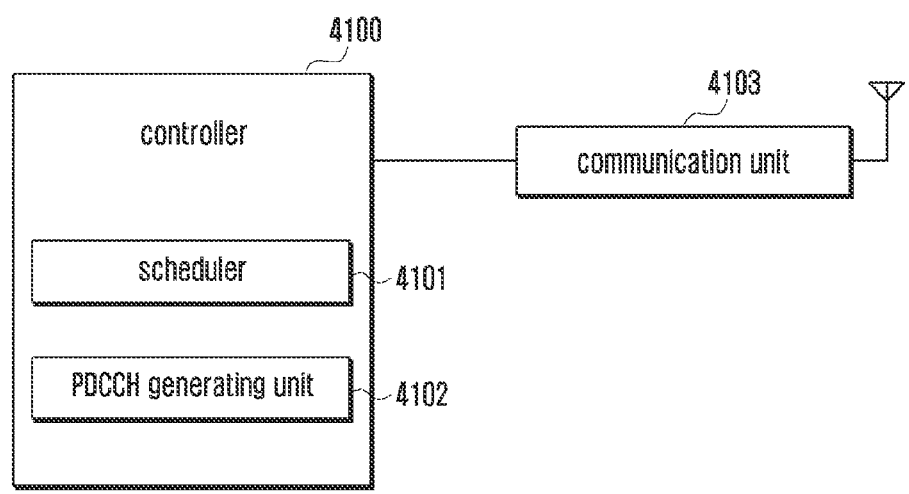
FIG. 41 is a block diagram illustrating an internal structure of a BS according to an embodiment of the present disclosure.

FIG. 41 is a block diagram of the configuration of a BS according to an embodiment of the present disclosure. Referring to FIG. 41, a BS is formed of a controller 4100 and a communication unit 4103.

Referring to FIG. 41, the controller 4100 controls the state and operations of all component elements that form the BS. Particularly, the controller 4100 determines the information for configuring and activating CCs for a UE, PDSCH scheduling information, related PDCCH control information, and a Tx resource for the corresponding information. To this end, the controller 4100 may further include a scheduler 4101 and a PDCCH generating unit 4102.

The scheduler 4101 determines which UE's data is to be transmitted in a predetermined subframe, a PDSCH transmission format to be transmitted to a UE, a CC to be transmitted, and related control information. Also, the PDCCH generating unit generates a PDCCH including PDSCH scheduling information determined in the scheduler, and may execute mapping onto a PDCCH resource according to the embodiment.

The communication unit 4103 may transmit the described configuration information, a PDSCH, and a PDCCH, to the UE. Here, the communication unit 4103 may receive, from the UE, the channel information under the control of the controller 4100.

Although it is illustrated that the controller 4100, the scheduler 4101, and the PDCCH generating unit 4102 are configured as separate blocks, the present disclosure may not be limited thereto. For example, the controller 4100 may execute the functions that the scheduler 4101 and the PDCCH generating unit 4102 execute.

Embodiment 4

The present disclosure relates to a method and an apparatus for transmitting a control channel for a CA system using the unlicensed band.

The mobile communication system has developed from the initial communication system for providing only a voice service into a high-speed and high-quality wireless packet data communication system for providing a data service and a multimedia service as well as the voice service. Recently, various mobile communication standards, such as high speed downlink packet access (HSDPA), high speed uplink packet access (HSUPA), LTE, and LTE-A of the 3GPP, HRPD of the 3GPP2, or IEEE 802.16, have been developed in order to support a high-speed and high-quality wireless packet data transmission service. In particular, the LTE system has been developed in order to effectively support the high-speed wireless packet data transmission, and can maximize the wireless system capacity by using various radio access technologies. The LTE-A system is an advanced wireless system of the LTE system, and has improved data transmission capability compared to the LTE system.

Recently, in order to efficiently provide the data service that is rapidly increasing, the technology to utilize the LTE/LTE-A system in an unlicensed band has been studied. For example, studies about the technology to further utilize the LTE/LTE-A system in the unlicensed band based on the LTE system that is currently used in the licensed band, the LAA, or the LTE-unlicensed (LTE-U) are in progress. The CA technology may be applied in the LTE-A in order to operate the licensed band and the unlicensed band as described above. That is, an LTE cell of the licensed band may be operated as a PCell, and an LTE cell (or an LAA cell, or an LTE-U cell) of the unlicensed band may be operated as an SCell (can be referred to as SCell, sub-cell, and the like, hereinafter, SCell). At this time, the above-mentioned system may be applied to a dual-connectivity environment, in which the licensed band and the unlicensed band are connected through a non-ideal backhaul, as well as a CA system.

In general, a plurality of devices uses the same radio resource in the unlicensed band. At this time, the devices that use the same unlicensed band may use the same system or different systems. For the coexistence of various devices, the devices generally operate in the unlicensed band as follows. A transmission device that requires a signal transmission including data or a control signal may perform an operation of determining the channel occupancy of other devices for one or more unlicensed bands including the band that the device wishes to occupy and use for a predetermined time, for an optionally selected time, or for a time that is configured by another device. In conducting the channel sensing operation {can be referred to as channel sensing, clear channel assessment (CCA), and the like, hereinafter, channel detection}, the amplitude or intensity of a signal that is received from other devices for the corresponding band may be measured, or at least one of the signals that are predefined and known to the devices may be received and the received signal may be descrambled or decoded in order to thereby determine whether or not other devices are in use. For example, a Wi-Fi device may receive and decode preambles that are transmitted by other Wi-Fi devices in the unlicensed band, and if it is determined that the preambles of other devices are being transmitted, a Wi-Fi device may determine that the corresponding band of other devices is occupied and used. Alternatively, the unlicensed band may be used after determining whether the unlicensed band can be used by using a specific reference that is predefined based on the intensity of the signal received from other devices, or a predetermined reception signal. For example, if the intensity of the reception signal from the other device is greater than a specific reference (for example, −62 dBm), the device may not use the corresponding band. If the intensity of the reception signal strength is less than the specific reference, the device may determine that the corresponding band is in the idle state, and may occupy the same to thereby transmit signals. At this time, the minimum time for the channel sensing operation to determine the channel occupancy, and a reference value for determining whether or not the band is available may be configured to be different depending on the unlicensed band or different regions. In addition, the minimum time for the channel sensing operation may be optionally configured, or may be configured in proportion to the configured channel occupancy time. Alternatively, it may be optionally configured by using a reference that is configured according to the channel occupancy time.

The channel occupancy time for which the devices that use the unlicensed band can occupy the unlicensed band as well as the channel sensing operation may be configured for the operation of the devices. At this time, the maximum available occupancy time (hereinafter, maximum channel occupancy time) may be pre-defined, or may be configured by other devices (such as the BS for the UE). In addition, the maximum channel occupancy time may be configured differently according to the unlicensed band or different regions. For example, in Japan, the maximum available occupancy time in the unlicensed band of a 5 GHz band is regulated to be 4 ms. Therefore, the devices using the unlicensed band may configure its own maximum occupancy time according to the regulation for the corresponding band in order to thereby transmit signals. At this time, the device of which the maximum occupancy time has expired may re-perform the channel sensing operation as described above, and may determine whether or not other devices are using the corresponding band to thereby re-occupy the corresponding channel, or may use another channel that is not used by other devices in order to thereby transmit signals. In addition to the channel occupancy time, an idle time may be configured. That is, the device may transmit signals for the channel occupancy time, and then may not conduct the signal transmission and the channel detection or may conduct only the channel sensing operation without the signal transmission for a predetermined idle time. At this time, the idle time may be configured to be different according to the channel occupancy time. In addition, the channel sensing operation may be performed within the idle time.

The present disclosure provides a method by which the LTE system is able to properly operate in the unlicensed band by reflecting the operating characteristics of the unlicensed band as described above.

Although the description will be made on the assumption of the CA environment for the convenience of explanation in the present disclosure, the present disclosure is not limited thereto, and may be applied to an environment in which the device operates only in the dual-connectivity or unlicensed band (stand-alone) as well.

In addition, although the present disclosure will be described based on the DL in which the BS generally transmits signals to the UE in the LTE system for the convenience of explanation, the present disclosure may be applied to the UL in which the UE transmits signals to the BS as well as the DL.

The present disclosure suggests an apparatus and a method for transmitting the first signal or the second signal according to the occupancy status of the unlicensed band.

Further, the present disclosure suggests an apparatus and a method by which a receiver determines the occupancy start of the unlicensed band.

According to the present disclosure, the devices that use the unlicensed band can transmit/receive different signals depending on the channel occupancy operation and the channel occupancy start time to thereby more effectively use the unlicensed band.

Hereinafter, various embodiments of the present disclosure will be described in detail with reference to the accompanying drawings. In describing the present disclosure, a detailed description of related functions or configurations known in the art will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Accordingly, the terms should be defined based on the contents over the whole present specification.

Although embodiments of the present disclosure are described based on a LTE system and an LTE-A system as an example in the present specification, the present disclosure can be applied without making any adjustment to other communication systems employing BS scheduling.

The OFDM transmission scheme is a data transmission scheme using a multi-carrier, and a kind of multi-carrier Modulation (MCM) scheme, in which serially input symbol strings are converted in parallel, and the respective converted symbol strings are modulated with a plurality of mutually orthogonal sub-carriers, that is, a plurality of mutually orthogonal sub-channels, and are then transmitted.

In the OFDM scheme, a modulation signal is located at a second-dimensional resource configured by the time and the frequency. Resources on the time axis are distinguished from each other by different OFDM symbols, which are orthogonal to each other. Resources on the frequency axis are distinguished from each other by different sub-carriers, which are also orthogonal to each other. That is, in the OFDM scheme, by appointing a particular OFDM symbol on the time axis and appointing a particular sub-carrier on the frequency axis, it is possible to indicate one minimum unit resource, which is referred to as an RE. Different REs are orthogonal even after passing a frequency selective channel. Therefore, signals transmitted through different REs can be received without causing interference with each other.

A physical channel is a channel of a physical layer for transmitting a modulation symbol obtained by modulating one or more encoded bit strings. In an OFDMA system, an information string is transmitted by configuring a plurality of physical channels according to the use of the information string or a receiver for receiving the information string. Which RE one physical channel should be located on for transmission should be promised in advance between a transmitter and a receiver, and a rule for the same is referred to as "mapping".

In an OFDM communication system, a DL bandwidth is configured by a PRB and each PRB may be configured by 12 sub-carries arranged along the frequency axis and 14 or 12 OFDM symbols arranged along the time axis. The PRB serves as a basic unit for resource allocation.

A reference signal (hereinafter, RS) is a signal that is received from a BS so as to allow a UE to perform channel estimation, and in an LTE communication system, includes a CRS and a DMRS as one of dedicated reference signals.

The CRS may be received by all UEs as a reference signal transmitted through overall DL bandwidth, and is used in a channel estimation, forming feedback information of the UE, or a demodulation of a control channel and a data channel. The DMRS is used in the demodulation of the data channel and the channel estimation of a specific UE, and is not used in forming the feedback information of the UE differently from the CRS. Therefore, the DMRS is transmitted through a PRB to be scheduled by a UE.

On the time axis, a sub-frame is configured by two slots each having a length of 0.5 msec, which include a first slot and a second slot. A PDCCH area, which is a control channel area, and a physical down link shared channel (hereinafter, PDSCH) area, which is a data channel area, are divided on the time axis and are then transmitted. This is intended to rapidly receive and demodulate the control channel signal. An EPDCCH is located in a data channel area. Moreover, the PDCCH area is located over the entire DL bandwidth, wherein one control channel is divided into control channels of a smaller unit, which are distributed over the entire DL bandwidth.

The UL is roughly divided into a PUCCH and a PUSCH. A response to a PHSCH and other feedback information, if there is no data channel, may be transmitted through the control channel, and if there is the data channel, may be transmitted through the data channel.

Hereinafter, the description of transmitting a control channel may be understood as transmitting acknowledgement/negative acknowledgement (can be referred to as ACK/NACK and A/N) for data and other feedback information through a control channel. In addition, the description of transmitting a data channel may be understood as transmitting corresponding data through a data channel.

Figure 42A:
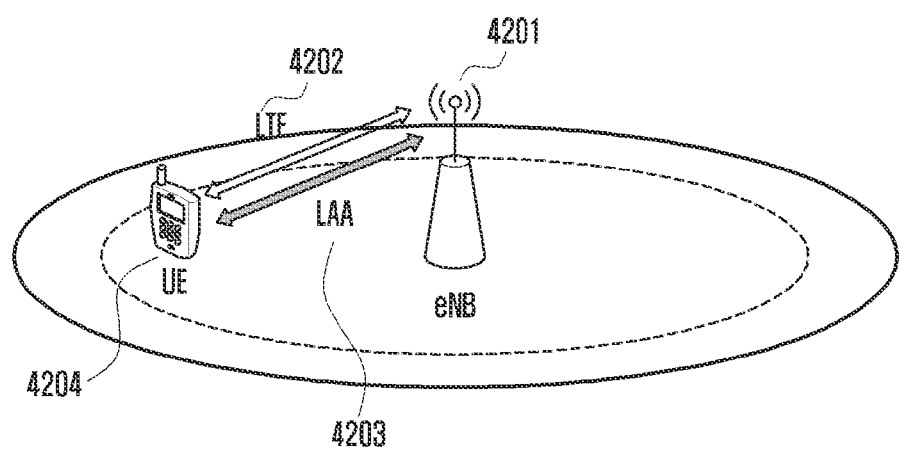
FIGS. 42A and 42B are views illustrating a communication system according to the present disclosure.
Figure 42B:
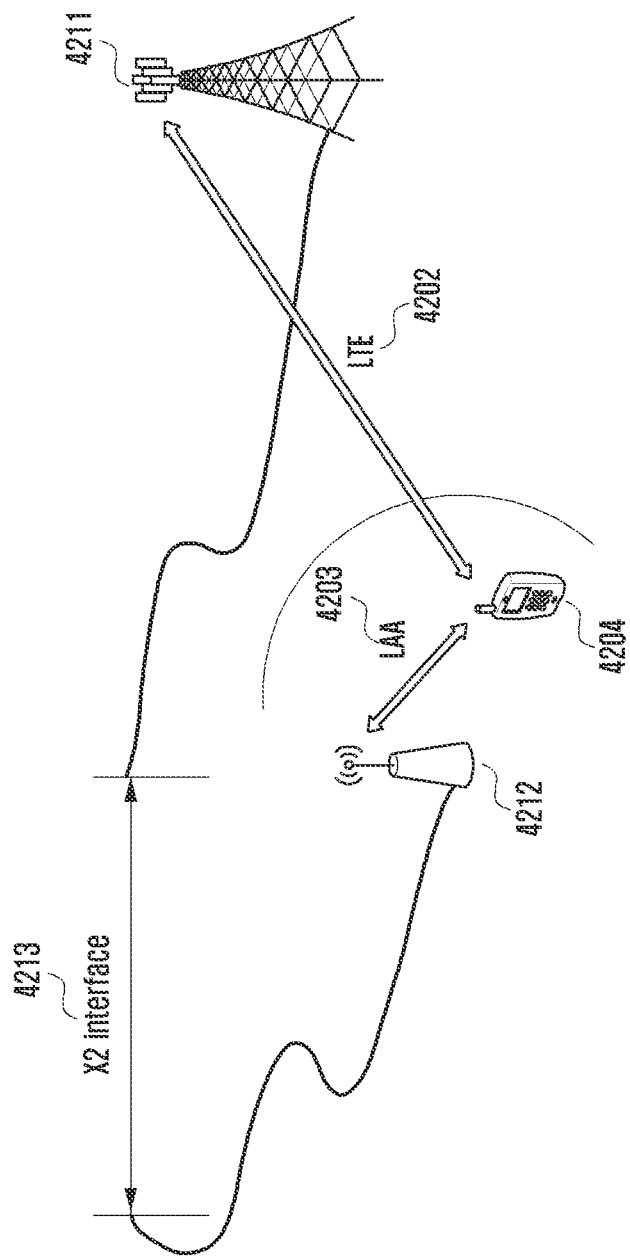

FIG. 42A and FIG. 42B illustrate a communication system according to an embodiment of the present disclosure.

Referring to FIG. 42A and FIG. 42B, FIG. 42A shows that an LTE cell 4202 and an LAA cell 4203 co-exist within a small BS 4201 which may be an eNB in the network, and the UE 4204 transmits/receives data to/from the BS through the LTE cell 4202 and the LAA cell 4203. In this case, a duplex method of the LTE cell 4202 or the LAA cell 4203 is not limited. However, the UL transmission is made only through the LTE cell 4202 in the case where the LTE cell 4202 is the PCell. FIG. 42B shows that a macro LTE BS 4211 for a wide coverage and a small LAA BS 4212 for the increase in the amount of data transmission are provided, and in this case, a duplex method of the macro LTE BS 4211 or the small LAA BS 4212 is not limited. However, the UL transmission is made only through the macro LTE BS 4211 in the case where the LTE BS is the PCell. At this time, it is assumed that the macro LTE BS 4211 and the small LAA BS 4212 have ideal backhaul networks. Therefore, the rapid X2 communication 4213 between BSs is possible, and even though the UL data is transmitted to only the macro LTE BS 4211, the small LAA BS 4212 can receive the related control information in real time from the macro LTE BS 4211 through the rapid X2 communication 4213.

The schemes suggested by the present disclosure can be applied to both the system of FIG. 42A and the system of FIG. 42B.

The operation of detecting and occupying the channel in the unlicensed band will be described with reference to the drawing below.

FIG. 43 shows an example in which the BS transmits the data or the control signal to the UE according to an embodiment of the present disclosure. Although FIG. 43 shows an example in which the BS transmits the data or the control signal to the UE, the present disclosure is not limited thereto, and may be applied to the case in which the UE transmits signals to the BS. That is, the present disclosure may be applied to all the signal transmission between the devices that use the unlicensed band.

The reference numeral 4360 in FIG. 43 refers to an LTE subframe that has a length of 1 ms, and the subframe 4360 may be comprised of a plurality of OFDM symbols 4300. At this time, the BS and the UE, which can communicate with each other through the unlicensed band, may occupy the corresponding channel to communicate with each other for a predetermined channel occupancy time 4370. If the BS, of which the configured channel occupancy time 4370 has expired, needs to transmit another signal in subframe #n, the BS may re-occupy the channel through the channel detection. That is, the BS performs the channel sensing operation 4320 in the configure channel sensing period 4325. At this time, the channel sensing period may be pre-configured between the BS and the UE, or may be configured by the BS to then be transmitted to the UE through a higher signal (can be referred to as a higher layer signaling, an RRC signaling and the like). In this case, the channel sensing period 4325 may be configured to be equal to or greater than the minimum sensing time that is specified in the regulation defined for each band or region. In addition, the channel sensing period 4325 may be configured to be proportional to the maximum channel occupancy time 4375. In addition, the channel sensing period 4325 may be optionally determined by using the information that is determined according to the maximum channel occupancy time 4375. For example, the channel sensing period 4325 may be optionally configured to be a value within the channel sensing period that is configured according to the minimum sensing time and the channel occupancy time. If other devices that use the unlicensed band are not detected in the channel sensing period 4325, that is, if it is determined that the channel is in the idle channel 4330, the BS may occupy and use the channel. At this time, the determination on the occupancy of other devices in the channel sensing period 4325 may be made by using a reference value that is pre-defined or pre-configured. At this time, if the other devices are determined to occupy the channel in the channel sensing period 4325, the BS may continuously perform the channel sensing operation, or may perform the channel sensing operation after the time that is pre-defined.

Thus, in the case where the BS performs the continuous channel sensing operation for the channel occupancy, as shown in FIG. 43, the BS may end the channel detection in a specific OFDM symbol period in the subframe, and may occupy the channel. Since the general LTE operation is made in a subframe unit, it is difficult to transmit data or control signals in some of the OFDM symbol period in the subframe. However, if the BS, which can end the channel detection in the channel sensing period 4325 and occupy the channel, uses the channel from the subframe #n+2 4355, other devices may occupy the channel from a sixth OFDM symbol to a fourteenth OFDM symbol 4345 in the period subframe #n+1. Therefore, the BS may transmit a signal (hereinafter, can be referred to as an occupancy signal and a reservation signal 4340) for the channel occupancy in the period 4345, that is, from the time when the channel sensing period 4325 ends to the time just before the first OFDM symbol transmission of the next subframe. In other words, the BS may transmit the second signal for the channel occupancy of the unlicensed band before transmitting the first signal. At this time, the second signal to be transmitted may not be transmitted in accordance with the end time of the channel sensing period. At this time, the time for the second signal to be transmitted may be included in the channel occupancy time. Therefore, since the channel sensing operation is to be performed in at least one subframe 4345 as shown in FIG. 43, at least one subframe cannot be used for data transmission during the channel occupancy time 4350. Therefore, the present disclosure provides a method for utilizing the sub-channel according to the channel sensing operation end time.

Embodiment 4-1

The channel sensing operation time of the transmitting device in the unlicensed band may vary depending on the channel occupancy of the neighboring devices using the band. In other words, the BS configures the necessary channel sensing operation time, and subtracts the time for which other devices do not occupy the band from the configured time. That is, if the configured time comes to be 0, the BS may occupy and use the band. If the BS determines that the other devices occupy the band before the configured time expires, the configure time may not be subtracted and the channel detection may continue. Afterwards, if it is determined that the other devices do not occupy the band, the BS subtracts the time again to then perform the channel sensing operation. Therefore, the time required for the channel sensing operation may vary depending on the operation of other devices that occupy the band. At this time, the method of configuring the channel sensing time and subtracting the same, as described above, is only an example, and the BS and the UE can perform the channel sensing operation in a variety of ways. Therefore, as described in FIG. 43, the end time of the channel sensing operation of the BS may vary. That is, the channel sensing operation end time in one subframe may change from the first OFDM symbol to the last OFDM symbol. If the channel sensing operation ends in the first OFDM symbol, the BS may transmit a signal for the channel occupancy in the remaining OFDM symbols (second OFDM symbol) of the subframe as shown in 4340 of FIG. 43, and the general data transmission/reception operation between the BS and the UE may be performed in the next subframe. However, the data transmission is not possible in the subframe in which the channel sensing operation and the channel occupancy start as described above. That is, if the maximum available occupancy time for the unlicensed band is set to be 4 ms as in Japan, the data signal cannot be transmitted in one subframe that requires a dual-channel sensing operation and thus a resource cannot be efficiently utilized.

Therefore, the present disclosure provides a method in which the BS can transmit a signal including at least one of control information and data to the UE in the subframe that requires the channel sensing operation, according to the channel sensing operation end time. Hereinafter, the signal described in the embodiment includes at least one of control information, data, and an occupancy signal.

In addition, for the convenience of explanation, Pcell or primary secondary cell (referred to as PSCell and the like, hereinafter, PSCell) means a CA (can be referred to as a carrier and the like) or a BS of the licensed band, and SCell means a CA or a BS of the unlicensed band. In addition, the subframe that requires the channel sensing operation as described above may be expressed as a detection subframe, a sensing subframe, or a sensing period. In addition, the BS, the PCell, the PSCell, or the UE may be expressed as a device.

When it is identified that the corresponding channel is in the idle state through the channel sensing operation as shown in 4320 of FIG. 43, the BS may immediately occupy the channel. If the BS can start the channel occupancy prior to the reference time that is pre-configured in the subframe as described above, the BS may transmit control information and data of the corresponding subframe to the UE by using a configured control channel. If the BS starts the channel occupancy after the configured reference time, the BS may transmit an occupancy signal before the next subframe begins without transmitting the control information and the data.

FIG. 44 illustrates embodiment 4-1 according to an embodiment of the present disclosure. Description will be made with reference to FIG. 44 below. If the SCell that has ended the channel occupancy in subframe #n 4400 needs to transmit another signal, the SCell performs the channel sensing operation 4410 for a configured time. If it is determined that the corresponding channel is in the idle state for a predetermined channel sensing time, the SCell may immediately occupy and use the channel. At this time, if the SCell is able to occupy and use the channel for a pre-configured reference time 4415, the BS, for example, may transmit an EPDSCH or a conventional PDSCH including data or control information etc., transmitted to a UE in the first signal transmission area 4430 by using the EPDCCH transmitted in the second control channel area 4420. At this time, the UE may monitor the second control channel area 4420, which can be received from the BS, based on the information on the second control channel, which is configured by the BS, in order to thereby receive the control information. For example, the BS transmits UE scheduling information for the corresponding area through the second control channel, and the UE blind-decodes/detects the second control channel reception-available area that is configured with the upper signaling in order to thereby identify its own scheduling information. If the UE obtains its own scheduling information through the second control channel reception, the UE detects the first signal in the transmission area 4430 of the first signal according to the scheduling information that is configured by the BS. If the UE does not obtain its own scheduling information through the second control channel reception, the UE may not detect the first signal in the transmission area 4430.

If it is determined that the corresponding channel is in the idle state for a predetermined channel sensing time, but the SCell is not able to occupy and use the channel for the pre-configured reference time 4415, the BS may transmit the first signal and the second signal for the channel occupancy until the next subframe start time. At this time, the second signal may be re-defined to include a CRS, a position reference signal (PRS), a PSS, an SSS, and the like. When the synchronizing signal is used as the second signal, the synchronization signal may be extended on the frequency axis in order for the synchronizing signal to occupy more than 80% of the overall bandwidth of the unlicensed band of the SCell. That is, with regard to the synchronization signal that is defined to be transmitted in the band width of 6 RB, in order for the synchronization signal to occupy 80% of the bandwidth of the unlicensed band, the same synchronization signal may be repeatedly configured in a 6 RB unit on the frequency axis, or may be additionally configured to be transmitted in a 6 RB unit on the frequency axis by using one or more synchronization signals that have different root sequences.

At this time, if it is determined that the corresponding channel is in the idle state for a predetermined channel sensing time, and if the SCell is able to occupy the channel before the pre-configured reference time 4415, the BS may transmit the second signal until the configured reference time 4415 to thereby occupy the channel.

If the subframe #n+2 4450 including a first signal transmission area 4430 is included in the configured channel occupancy time (this can be understood as a maximum occupancy time), the subframe #n+2 4450 may be occupied and used without a separate channel sensing operation. That is, in the subframe area within the channel occupancy time (this can be understood as a maximum occupancy time) except for the subframe that requires the channel sensing operation, the UE may receive the control information in the first control channel area 4440 or the second control channel area 4460. In other words, the UE may monitor the second control channel 4420 area in the subframe area where the channel sensing operation is performed in order to thereby receive the control information, and may monitor the first control channel 4440 area or the second control channel 4460 area, which are configured by the BS, in the subframe area where the channel sensing operation is not performed within the channel occupancy time in order to thereby receive the control information for the UE.

To this end, the BS may transmit, to the UE, SCell subframe status information that shows whether the corresponding subframe requires the channel sensing operation or does not require the channel sensing operation after the channel occupancy with respect to every subframe. At this time, the BS may transmit the status information about the SCell subframe to the UE by using the PCell of the licensed band or by using another SCell. Hereinafter, for the convenience of explanation, it will be described that the PCell transmits the status information of the SCell subframe, but the present disclosure is not limited thereto. The information may be separated into the subframe that requires the channel sensing operation and the subframe that does not require the channel sensing operation by using 1-bit information to then be transmitted to the UE. Alternatively, the information may further inform of the additional SCell status information, such as, an idle subframe, as well as the subframe that requires and does not require the channel sensing operation by using information of more than 2 bits for each subframe. In addition, if the UE recognizes the configured maximum occupancy time, the SCell subframe status information may be transmitted to the UE only in the first subframe among the subframes that do not require the channel sensing operation. In this case, the UE that obtains the information may infer the SCell subframe status information by using the configured channel occupancy time (or maximum occupancy time) even without receiving the SCell subframe status information for every subframe. In addition, the UE may obtain the status information about the SCell subframe without the SCell subframe status information.

If the PCell does not transmit the status information for the SCell subframe, the UE may monitor the available control information area from the SCell, and may identify the SCell subframe status information. In addition, the UE may identify the SCell subframe status information through the blind detection of the reference signal of the SCell. For example, the UE may perform the blind detecting operation for the Cell reference signal (CRS) in the SCell subframe in order to thereby determine whether or not the CRS exists, and may identify the channel occupancy of the BS with respect to the subframe. At this time, the channel occupancy of the subframe may be identified by using other references, such as DMRS, channel state information-RS (hereinafter, CSI-RS), or PRS as well as the CRS. That is, the UE may measure the reception signal intensity for the corresponding reference signal area in order to thereby determine whether or not the reference signal exists. In addition, the UE may descramble/detect the received signal and then determine whether the reference signal exists or not. In addition, the UE may determine whether or not physical control format indicator channel (PCFICH) information can be obtained from the SCell that provides the service in order to thereby identify the channel occupancy of the subframe. That is, if the PCFICH information is obtained from the SCell, the UE may determine that the corresponding subframe is occupied. The channel occupancy by the BS may be determined in various ways including the method above.

That is, as described above, the UE may determine the channel occupancy by the BS using a method such as determining the corresponding subframe is not occupied by the SCell, if it is determined that there is no reference signal, may determine that the SCell does not occupy the corresponding subframe. If it is determined that the reference signal exists through the determination above, the UE may determine that the SCell occupies the corresponding subframe.

Figure 45:
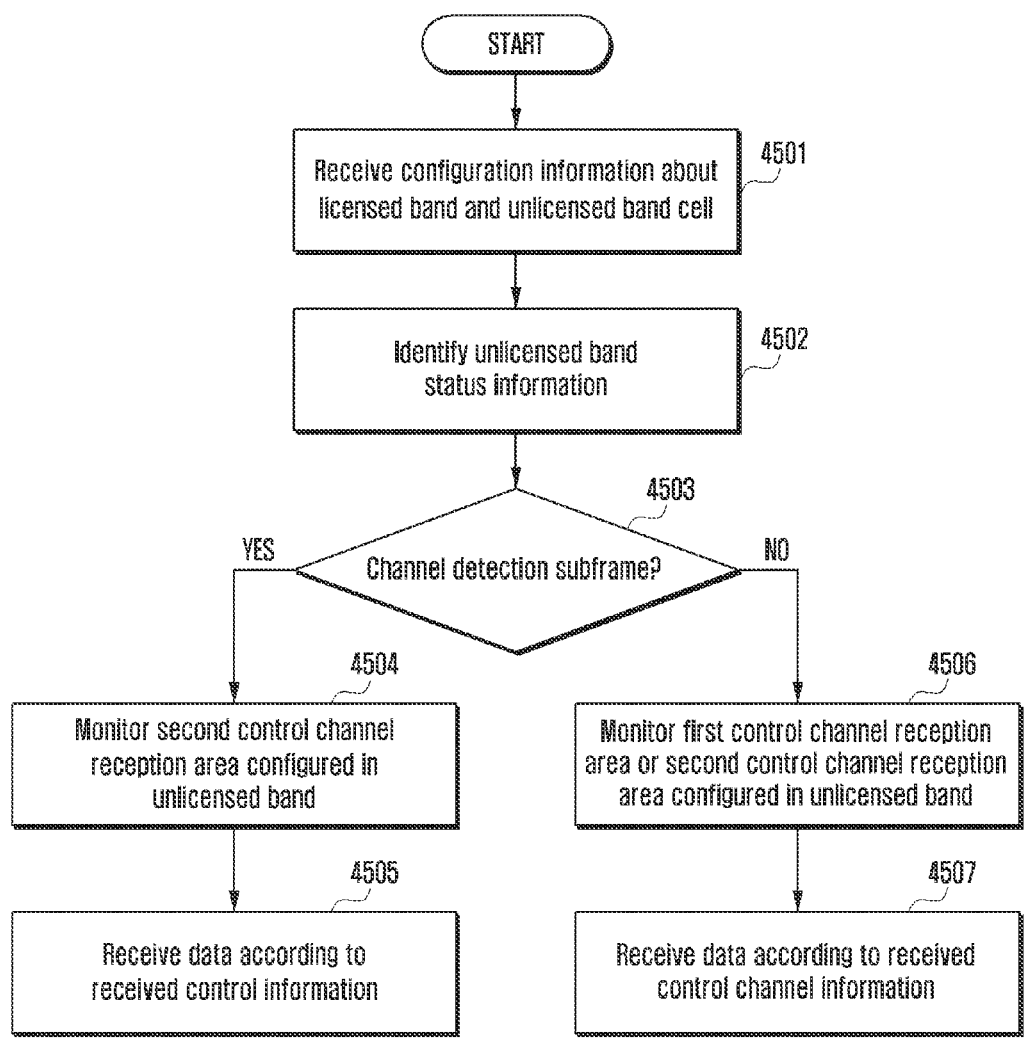
FIG. 45 is a view illustrating an operation of a UE according to sub-frame state information according to an embodiment of the present disclosure.

FIG. 45 illustrates an embodiment of the operation of the UE according to the subframe status information according to an embodiment of the present disclosure. According to FIG. 45, the UE receives the configuration information about the licensed band and the unlicensed band in operation 4501. In operation 4502, the UE receives specific unlicensed band status information from the licensed band or from another unlicensed band, or may determine the existence of the reference signal without the status information to thereby obtain the subframe status information. In operation 4503, if the subframe status of the unlicensed band obtained in operation 4502 corresponds to the subframe that requires the channel sensing operation, the monitoring of the second control channel reception area that is configured in the unlicensed band is performed in operation 4504. In operation 4505, the UE may receive the data according to the control channel information that is obtained in operation 4504. If the subframe status of the unlicensed band obtained in operation 4502 corresponds to the subframe that does not require the channel sensing operation, i.e., the channel occupancy period, in operation 4503, the UE may conduct an operation of monitoring the first control channel reception area or the second control channel reception area, which are configured in the unlicensed band in operation 4506, and may receive the data according to the received control channel information in operation 4507. If the subframe status of the unlicensed band obtained in operation 4502 corresponds to the idle state in operation 4503, the operations 4506 and 4507 may be omitted.

The reference 4415 for determining whether or not the transmission of the control information and data can be performed, as shown FIG. 44, may be configured as follows.

The BS may determine whether or not the transmission of the control information and data can be performed by using the second control channel transmission start symbol that is configured in the UE. That is, based on the second control channel transmission start OFDM symbol that is configured between the BS and the UE through the upper signaling, if the channel occupancy starts at the start OFDM symbol or before the start OFDM symbol, the SCell may perform the transmission operation of the second control channel and data in the corresponding subframe. Here, the second control channel may include an EPDCCH or may be understood as a scheme including a re-defined control channel, a conventional reference signal, and re-defined reference signal.

At this time, the BS and the UE may determine whether or not the transmission of the control channel and data can be performed based on the first control channel transmission area of the PCell. In other words, based on the first control channel transmission area that is configured through the upper signaling or the first control channel transmission area that is configured through the PCFICH of the PCell, if the channel can be occupied at the OFDM symbol just following the first control channel transmission area configured as described above, the transmission operation of the second control channel and data may be performed in the SCell subframe. Here, the first control channel may include the PDCCH or be a re-defined control channel.

Figure 46:
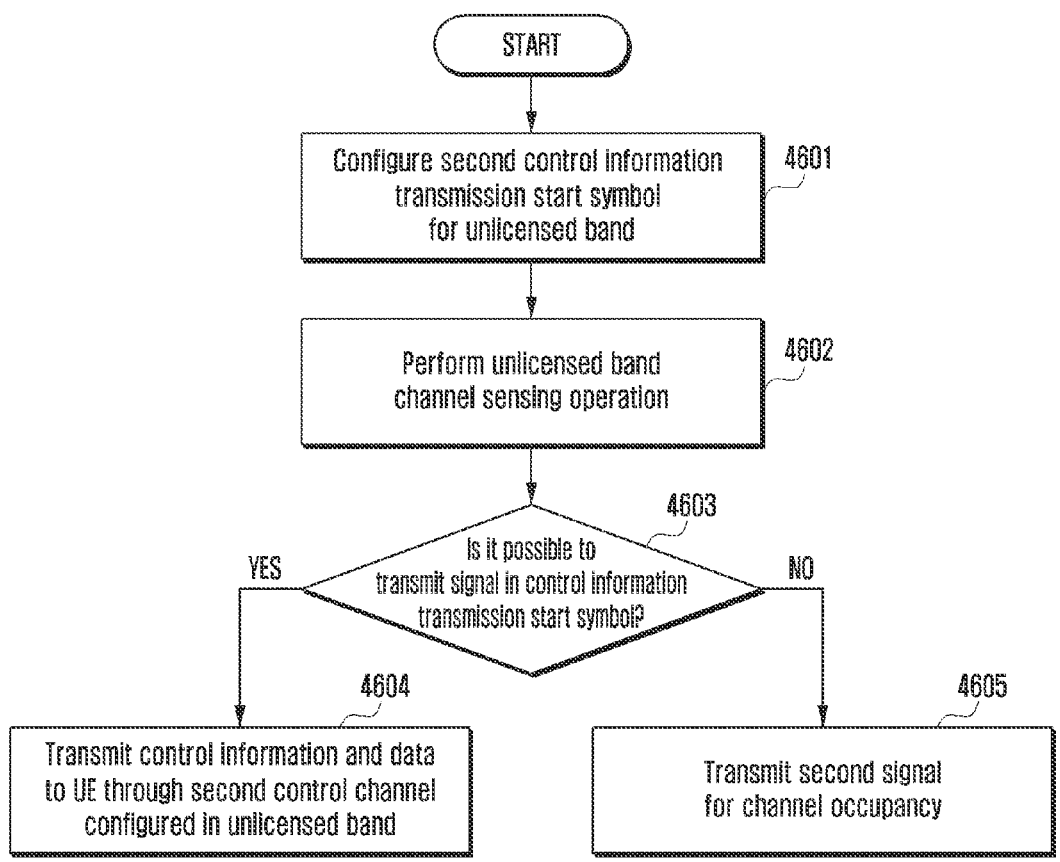
FIG. 46 is a view illustrating a BS operation of configuring a reference time point using a second control channel transmission start symbol according to an embodiment of the present disclosure.

FIG. 46 illustrates an embodiment of the operation of the BS that configures a reference time by using the second control channel transmission start OFDM symbol according to an embodiment of the present disclosure. According to FIG. 46, in operation 4601, the PCell or the SCell configures the second control information transmission start symbol for the unlicensed band. In operation 4602, the SCell performs the channel sensing operation of the corresponding channel for the channel occupancy. If it is determined that the channel is in idle state in operation 4602, the SCell may occupy the channel immediately. At this time, it is determined whether or not the control information can be transmitted in the control channel transmission start symbol that is configured in operation 4601 depending on the channel occupancy start time. If it is determined in operation 4603 that the channel occupancy is possible in the control channel transmission start symbol that is configured in operation 4601, the SCell may transmit the data including the second control channel to the UE in operation 4604. In operation 4603, if it is determined that the channel occupancy is not possible in the control channel transmission start OFDM symbol that is configured in operation 4601, the SCell may transmit the second signal for the channel occupancy until the next subframe in operation 4605.

Embodiment 4-2

The BS may identify that the corresponding channel is in the idle state through the channel sensing operation, and may immediately occupy the channel. At this time, if it is determined that the corresponding channel is in the idle state for a pre-configured channel sensing time, the UE may immediately occupy and use the channel, so the channel occupancy may start in any OFDM symbol in the subframe. Therefore, the BS may not inform the UE of the information about the channel occupancy according to the OFDM symbol position where the channel occupancy starts. That is, in the subframe that performs the channel sensing operation, the BS may not inform the UE of the channel occupancy information through the separate signaling when the OFDM symbol position in which the channel occupancy starts is in the PCell, the PDCCH of the SCell, or after the transmission start time of the EPDCCH. At this time, if the subframe that requires the channel sensing operation occupies the channel, the PCell of the licensed band may inform of the channel occupancy of the corresponding SCell with respect to subframes after the subframe. However, if the PCell is not able to inform of the channel occupancy of the corresponding SCell through the separate signaling, the UE may monitor the available control channel area from the SCell as described in Embodiment 4-1, and may identify the SCell subframe status information. In addition, the UE may identify the SCell subframe status information through the blind detection of the reference signal of the SCell. For example, the UE may perform the blind detection operation of the CRS in the SCell subframe in order to thereby determine whether or not the CRS exists, and may identify the channel occupancy of the subframe. At this time, the channel occupancy of the subframe may be identified by using other references, such as DMRS, PRS as well as the CRS. That is, the UE may measure the reception signal intensity for the corresponding reference signal area in order to thereby determine whether or not the reference signal exists. In addition, the UE may descramble/detect the reception signal for the reference signal to thereby determine whether or not the reference signal exists. In addition, the UE may determine whether or not PCFICH information can be obtained from SCell in order to thereby identify the channel occupancy of the subframe. That is, if the PCFICH information is obtained, the UE may determine that the corresponding subframe is occupied. The channel occupancy by the BS may be determined in various ways including the method above.

Figure 47:
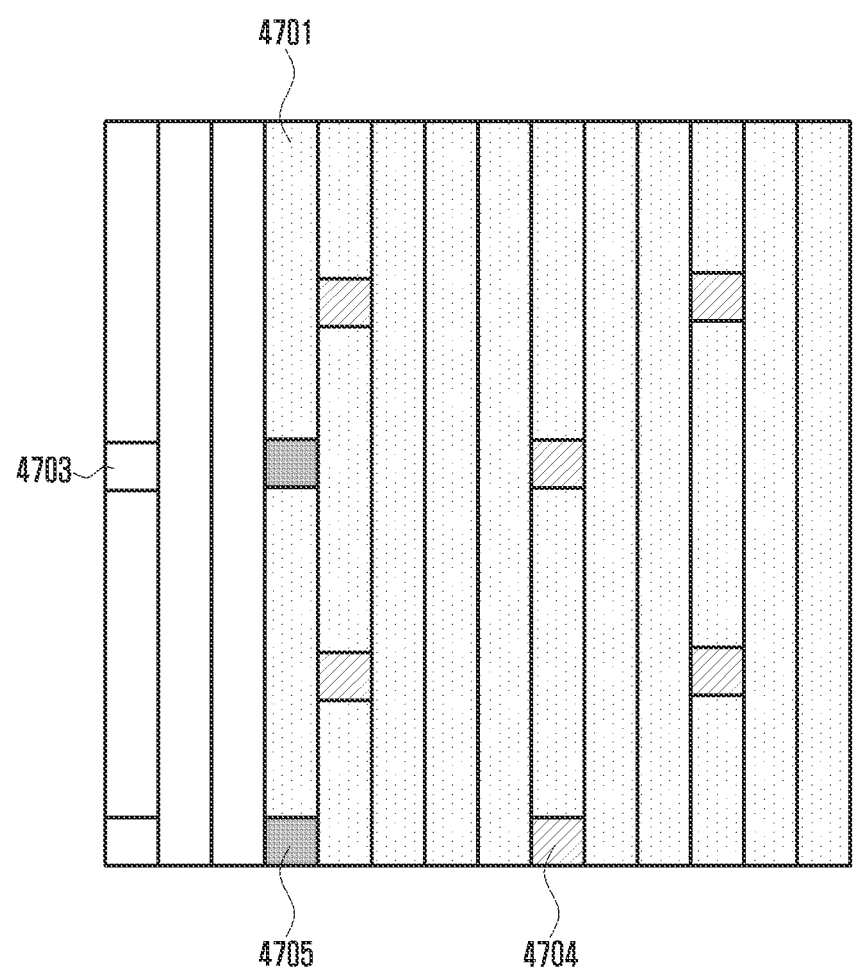
FIG. 47 is a view illustrating an example of identifying whether a channel of a BS is occupied using a signal previously used such as a reference signal according to the 4-2 embodiment of the present disclosure.

FIG. 47 illustrates an embodiment of the operation of identifying the channel occupancy of the BS by using the signal that is typically used, such as the reference signal according to an embodiment of the present disclosure. Hereinafter, the determination of the channel occupancy by the BS on the basis of FIG. 47 is described in more details. It is assumed that the BS ends the channel sensing operation at the third OFDM symbol through the channel sensing operation, and occupies and uses the channel from the fourth symbol 4701. The UE may determine the channel occupancy by using the typical reference signal (for example, the CRS 4703 or 4704). That is, the UE may determine the existence of the reference signal by using the reference signals 4703 and 4704, and if the reference signal exists, the UE may determine that the BS occupies the channel from the OFDM symbol (the fifth symbol) where the reference signal which can be occupied by the BS for the first time in available areas to be occupied exists. That is, if the SCell begins to occupy the channel in the symbol (the fourth OFDM symbol) in which the reference signal does not exist, the UE cannot correctly determine the same. In addition, since the reference signal 4703 is positioned in the period in which a channel detection operation is performed, the reference signal cannot be transmitted from the BS. Therefore, the present disclosure provides a method by which the UE can correctly determine the channel occupancy start time.

To this end, the BS may transmit the third signal that is pre-defined with the UE at the channel occupancy start time. The third signal may be a new signal that includes a signal of a preamble structure such as a synchronization signal, or a reference signal such as the CRS signal and may be a newly defined signal. The reference signal, such as the CRS, will be described as follows. At this time, the CRS is only an example, and other signals may also be applied to the third signal.

If the BS is able to occupy and use the channel from the OFDM symbol in which the CRS does not exist as described above in FIG. 47, the CRS may be added to the symbol in which the channel occupancy starts as shown by the reference numeral 4705 to then be transmitted. At this time, the added CRS 4705 may be the CRS 4703 that is closest to the channel occupancy start symbol among the CRS signals before the channel occupancy start symbol. That is, the corresponding signal can be applied intact to the CRS signal 4703, which has not been transmitted prior to the channel occupancy time, using the added CRS signal 4705. Alternatively, the CRS may be newly created by using a symbol index corresponding to the channel occupancy start symbol. That is, the CRS creation default value can create a signal using the corresponding channel occupancy start symbol index.

Figure 48:
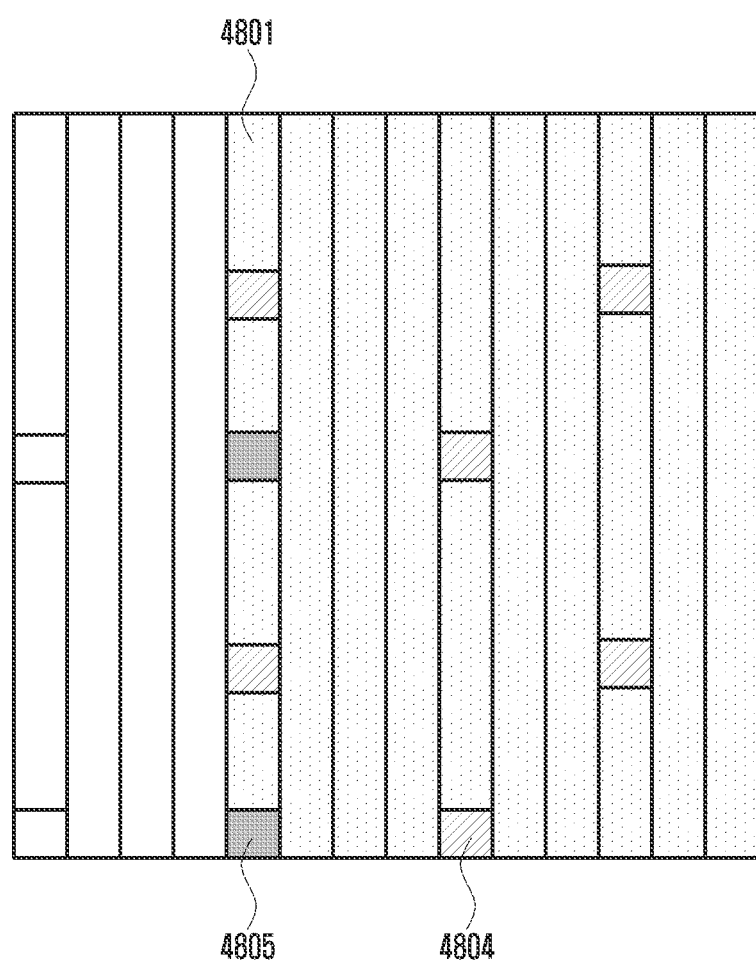
FIG. 48 is a view illustrating another example of identifying whether a channel of a BS is occupied using a signal previously used such as a reference signal according to the 4-2 embodiment of the present disclosure.

FIG. 48 illustrates another embodiment of the operation of determining the channel occupancy by the BS using the typical signal such as the reference signal. If the channel occupancy start symbol has the same position as the typical CRS symbol position, for example, in the case of the fifth OFMD symbol 4801 of FIG. 48, only the typical CRS(4804) may be transmitted without adding the new CRS 4805, or the new CRS 4805 may be additionally transmitted to the fifth OFDN symbol which is the channel occupancy start symbol.

Referring to FIG. 48, in order to perform the operation of the UE more effectively, the BS may transmit, to the UE, SCell subframe status information that shows whether the corresponding subframe requires the channel sensing operation or does not require the channel sensing operation after the channel occupancy with respect to every subframe. At this time, the BS may transmit the SCell subframe status information to the UE by using the PCell of the licensed band. The information may be separated into the subframe that requires the channel sensing operation and the subframe that does not require the channel sensing operation by using 1-bit information to then be transmitted to the UE, or the information may further show the additional SCell status information, such as, an idle subframe, as well as the subframe that requires the channel sensing operation and the subframe that does not require the channel sensing operation by using information of more than 2 bits for each subframe. In addition, if the UE recognizes the configured maximum channel occupancy time, the SCell subframe status information may be transmitted to the UE only in the first subframe among the subframes that do not require the channel sensing operation. In this case, the UE that obtains the information may infer the SCell subframe status information by using the configured channel occupancy time even without receiving the SCell subframe status information.

If the PCell does not transmit the SCell subframe status information, the UE may detect the third signal in the SCell subframe to thereby determine the SCell subframe status information and the channel occupancy start time. For example, if the CRS is configured as the third signal, the UE may perform the blind detection operation for the CRS in the SCell subframe in order to determine the channel occupancy of the BS. That is, the UE may detect the CRS signal that is added as the third signal, as well as the typical CRS signal to thereby determine the existence of the CRS. That is, the UE may measure the intensity of the corresponding reference signal and the reception signal of the third signal area in order to thereby determine the existence of the reference signal and the third signal. In addition, the UE may descramble/detect the received reference signal and the third signal in order to thereby determine the existence of the reference signal and the third signal. If it is determined that the reference signal and the third signal exist through the operation above, the UE may determine that the BS occupies the channel. In addition, the UE may determine the channel occupancy start symbol position of the BS through the symbol position where the reference signal or the third signal is determined to exist in the corresponding subframe. That is, the UE may determine, as the channel occupancy start symbol position, the lowest OFDM symbol position among the OFDM symbols in which the reference signal or the third signal is determined to exist.

At this time, the UE may identify the channel occupancy of the corresponding subframe and the channel occupancy start symbol as described above by using other reference signals, such as DMRS, CSI-RS, or PRS, as well as the CRS.

In addition, the UE may determine whether or not PCFICH information can be obtained from SCell in order to thereby identify the channel occupancy of the subframe. That is, if the PCFICH information is obtained, the UE may determine that the corresponding subframe is occupied from the first symbol. The UE may determine the existence of the reference signal, the channel occupancy, and the channel occupancy start symbol in various ways including the method above.

Although the embodiment has been described in the detailed description of the present disclosure, the present disclosure may be modified in various forms without departing from the scope of the present disclosure. Therefore, the scope of the present disclosure should not be defined as being limited to the embodiments of the present disclosure, but should be defined by the appended claims and equivalents thereof.

Figure 49:
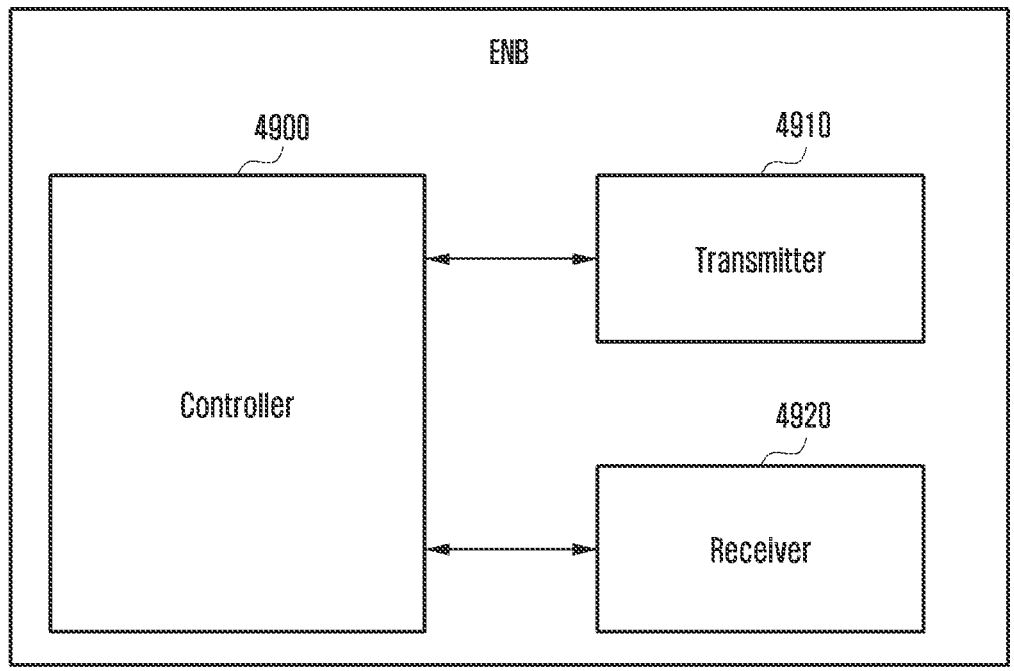
FIG. 49 is a view illustrating a BS device according to various embodiments of the present disclosure.

FIG. 49 is a block diagram of the BS that uses the unlicensed band and transmits the control channel, the subframe status information, and the channel occupancy start symbol to the UE in order for the UE to identify the band channel occupancy of the BS, according to the embodiment of the present disclosure.

A receiver 4920 of the BS may receive signals from the BS or the UE; measure the channel from the BS or the UE; or detect the unlicensed band channel by using a parameter for the channel sensing operation, which is configured through a BS controller 4900. The BS controller 4900 may determine whether or not the unlicensed band is in the idle state by using the unlicensed band information that is detected by the base station receiver 4920. If the unlicensed band is in the idle state, the BS controller 4900 may control a BS transmitter 4910 to transmit a signal for the channel occupancy, or the control channel and the data channel information for a specific UE. If the unlicensed band is not in the idle state, the BS controller 4900 may control the BS receiver 4920 to perform the channel sensing operation.

The BS controller 4900 may: configure control channel transmission parameters, such as PDCCH/EPDCCH for a specific UE; configure various reference signal transmission parameters; make a configuration between the BS and the UE with the PDSCH/EPDSCH scheduling; or determine all or some of the parameters that is required to be transmitted. The parameters between the BS and the UE, which are configured by the base station controller 4900, may be transmitted to the UE through the base station transmitter 4910.

Figure 50:
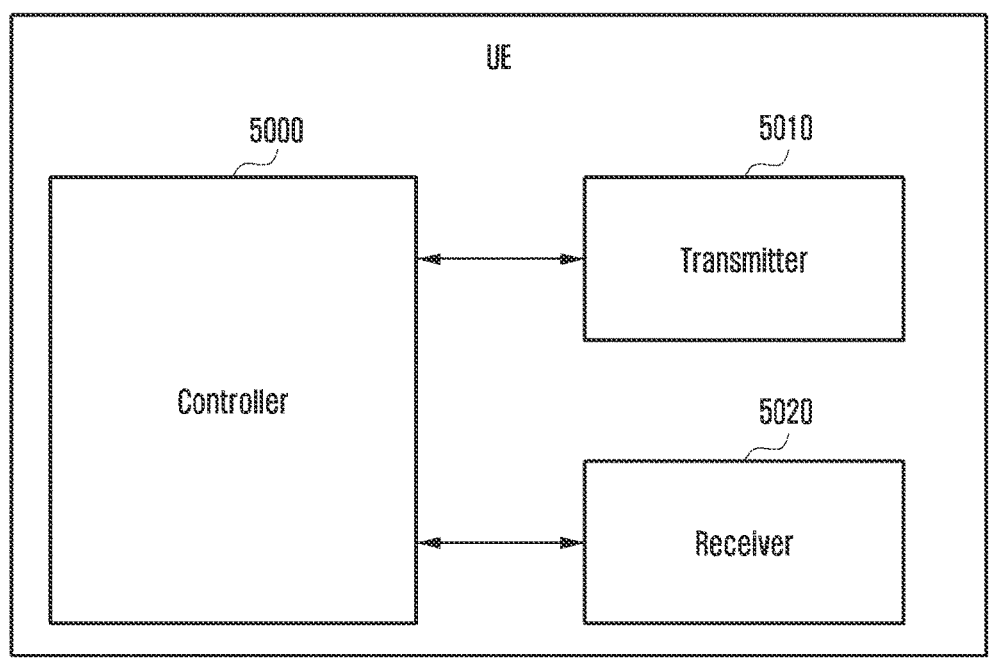
FIG. 50 is a view illustrating a UE device according to various embodiments of the present disclosure.

FIG. 50 is a block diagram of the UE for performing the determination of the channel occupancy of the BS, according to the embodiment of the present disclosure.

A controller 5000 of FIG. 50 may receive the configuration information between the BS and the UE for the signal transmission in the licensed band and the unlicensed band from the BS by using a receiver 5020, and may use the unlicensed band according to the received configuration value. The controller 5000 may obtain the status information of the corresponding unlicensed band by using at least one of: a configuration value to determine whether or not the scheduling can be made in the subframe that requires channel sensing operation, which is configured by the BS and received through the receiver 5020; a configuration value for the signal that is transmitted by the transmitter 5010 in the channel occupancy start symbol of the BS; and the unlicensed band status information that the BS transmits to the UE by using the licensed band or the unlicensed band. In addition, the controller 5000 may determine PDSCH/EPDSCH scheduling information from the control information that is received through the receiver 5020. In addition, the controller 5000 may include a decoder that receives the PDSCH/EPDSCH through the receiver 5020 and decodes the same.

Embodiment 5

The present disclosure relates to a method and apparatus for measuring interference in order to generate channel state information by a UE in a mobile communication system performing multiple input multiple output (MIMO) transmission by using evolved Node B (hereinafter, mixedly used with eNB) transmission antennas.

The mobile communication system has developed from the initial communication system for providing only a voice service into a high-speed and high-quality wireless packet data communication system for providing a data service and a multimedia service as well as the voice service. Recently, various mobile communication standards, such as HSDPA, HSUPA, LTE, and LTE-A of the 3GPP, HRPD of the 3GPP2, or IEEE 802.16, have been developed in order to support a high-speed and high-quality wireless packet data transmission service. In particular, the LTE system has been developed in order to effectively support the high-speed wireless packet data transmission, and can maximize the wireless system capacity by using various radio access technologies. The LTE-A system is an advanced wireless system of the LTE system, and has improved data transmission capability compared to the LTE system.

In general, the LTE refers to a BS and a UE corresponding to Release 8 or 9 of the 3GPP standardization organization, and the LTE-A means a BS and a UE corresponding to Release 10 of the 3GPP standardization organization. The 3GPP standardization organization has made the standardization of the LTE-A system, and after that the 3GPP standardization organization proceeds with the standardization for the subsequent Release with an improved performance based on the standard.

The existing 3rd and 4th generation wireless packet data communication systems, such as HSDPA, HSUPA, HRPD, or LTE/LTE-A, use technologies, such as an AMC method, or a channel sensitive scheduling method, in order to improve the transmission efficiency. By utilizing the AMC method, a transmitter may adjust the amount of transmission data according to the channel status. In other words, if the channel status is not good, the amount of data may be reduced in order to thereby maintain a reception error rate within a desired level, whereas if the channel status is good, the amount of transmission data may be increased in order to thereby effectively transmit a lot of information while maintaining a reception error rate within a desired level. Since the transmitter selectively provides a service to a user whose channel status is excellent among a plurality of users, the channel sensitive scheduling resource management method may increase the system capacity compared to the method in which a single channel is allocated to a single user for a service. Such an increase in the capacity is referred to as a multi-user diversity gain. In short, the AMC method and the channel sensitive scheduling method may receive the feedback of the partial channel status information from the receiver, and may apply an appropriate MCS at the time that is determined to be most effective.

The AMC method described above may include a function of determining the number of spatial layers or ranks of a transmitted signal when the AMC method is used together with the MIMO transmission method. In this case, the AMC method considers the number of layers through which the signals are transmitted by using the MIMO, as well as a coding rate and a modulation scheme, in order to determine an optimal data rate.

These days, studies about switching from the CDMA (Code Division Multiple Access) that was a multi-access scheme used in the 2G and 3G mobile communication systems to the OFDMA of the next generation system are in progress. The 3GPP and the 3GPP2 begin to proceed with the standardization of the evolved system using the OFDMA. It is known that the capacity may be increased in the OFDMA scheme rather than the CDMA scheme. One of the reasons why the capacity increases in the OFDMA scheme is that the frequency domain scheduling may be conducted. The capacity gain can be obtained through the channel sensitive scheduling method according to the characteristics in which the channel varies depending on the time. Likewise, the increased capacity gain can be obtained by utilizing the characteristic in which the channel varies depending on the frequency.

Figure 51:
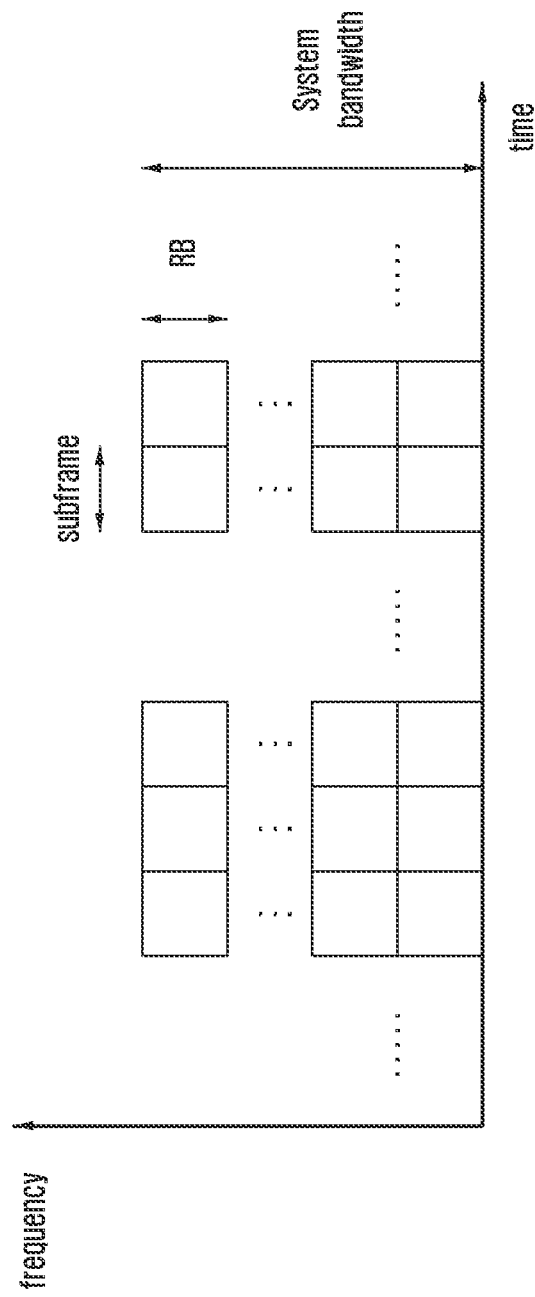
FIG. 51 is a view illustrating a time and a frequency resource in an LTE/LTE-A system according to an embodiment of the present disclosure.

FIG. 51 illustrates time and frequency resources in the LTE/LTE-A system according to an embodiment of the present disclosure.

Referring to FIG. 51, the radio resources transmitted from the BS (or 'eNB') to the UE are divided in an RB unit along the frequency axis, and are divided in a sub-frame unit along the time axis. The RB is normally comprised of 12 subcarriers in the LTE/LTE-A system, and it occupies the band of 180 kHz. On the contrary, the sub-frame is generally comprised of 14 OFDM symbol periods in the LTE/LTE-A system, and it occupies a time period of 1 msec. In the scheduling, the LTE/LTE-A system may allocate the resources in the sub-frame unit on the time axis, and may allocate the resources in the RB unit on the frequency axis.

Figure 52:
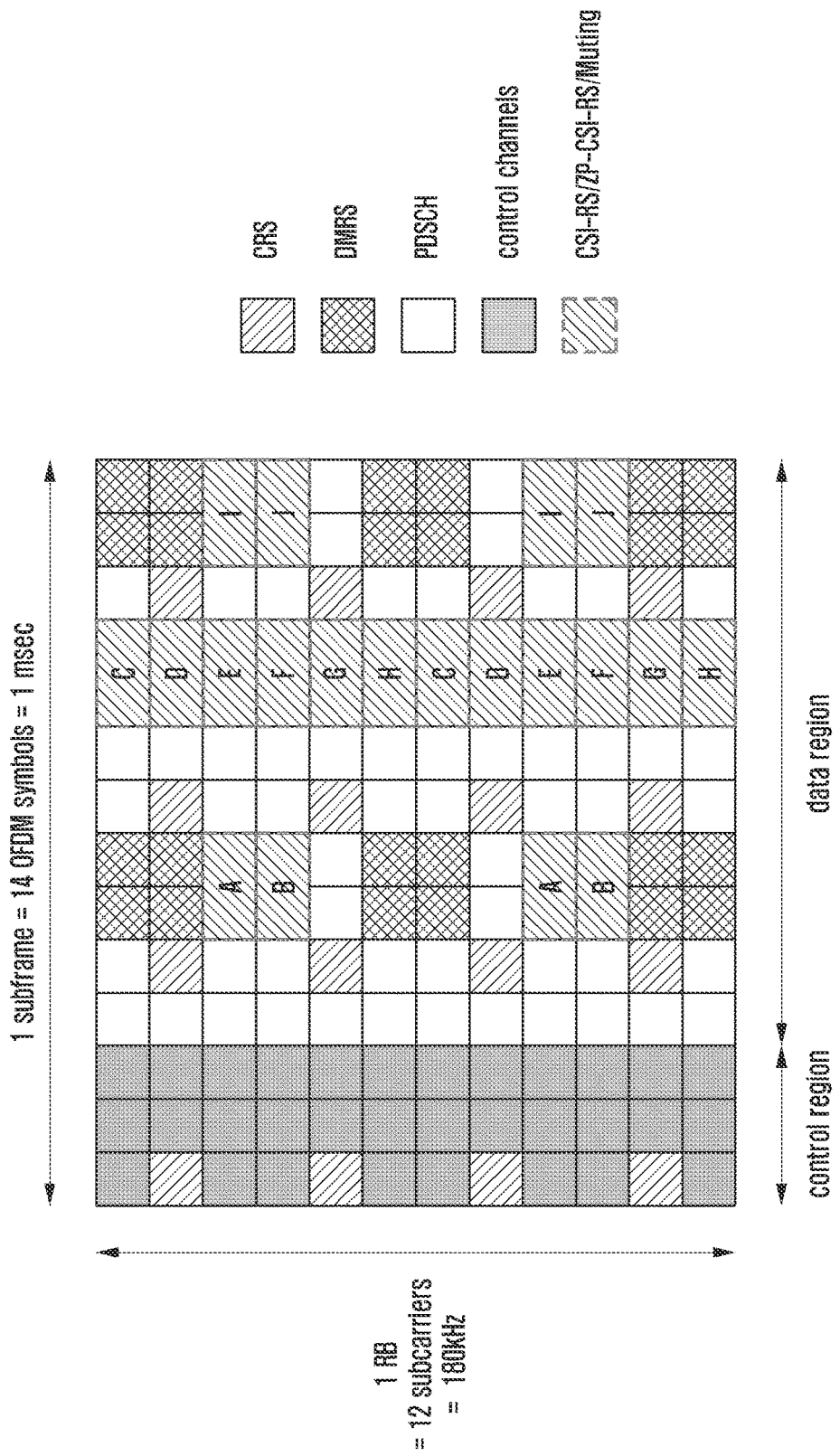
FIG. 52 is a view illustrating wireless resources of a 1 sub-frame and a first resource block (RB) which are minimum units and can perform a scheduling when a DL signal is transmitted in a LTE/LTE-A system according to an embodiment of the present disclosure.

FIG. 52 illustrates a radio resource of a minimum unit of 1 sub-frame and 1 RB that can be scheduled in the DL in LTE/LTE-A system according to an embodiment of the present disclosure.

Referring to FIG. 52, the radio resource of FIG. 52 is comprised of one sub-frame on the time axis and one RB on the frequency axis. Such a radio resource is comprised of 12 subcarriers in the frequency area and 14 OFDM symbols in the time area to thereby have in a total of 168 unique frequency and time positions. Each of the unique frequencies and time positions of FIG. 52 is referred to as an RE in the LTE/LTE-A system.

A plurality of the following signals that are different from each other may be transmitted through the radio resource shown in FIG. 52.

1. CRS: It is a reference signal that is transmitted to all of the UEs that belong to a single cell.

2. DMRS: It is a reference signal to be transmitted to a specific UE, and is used for performing the channel estimation in order to restore the information contained in the PDSCH. One DMRS port is applied with the same precoding as the PDSCH layer that is connected with the same to then be transmitted. The UE, which desires to receive a specific layer of the PDSCH, may receive the DMRS port connected with the corresponding layer and may perform the channel estimation in order to thereby restore the information contained in the layer.

3. PDSCH: It is a data channel transmitted through the DL, and is used for sending traffic to the UE by the BS. In addition, it is transmitted by using the RE through which the reference signal is not transmitted in the data region of FIG. 52.

4. CSI-RS: It is a reference signal that is transmitted to the UEs that belong to a single cell, and is used to measure the channel status. A plurality of CSI-RSs may be transmitted in one cell.

5. ZP-CSI-RS (zero power CSI-RS): It means that the actual signal is not transmitted at the position where the CSI-RS is transmitted.

6. IMR (interference measurement resource): It corresponds to the position where the CSI-RS is transmitted, and one or more of A, B, C, D, E, F, G, H, I, or J of FIG. 52 may be configured as the IMR. The UE may regard all signals received from the REs that are configured as the IMR as the interference to then measure the interference.

7. Other control channels {PHICH, PCFICH, or PDCCH}: It provides control information necessary for the UE to receive the PDSCH, or transmits ACK/NACK for operating a HARQ with respect to the data transmission of the UL.

In addition to the above-mentioned signals, the LTE-A system may configure the zero power CSI-RS in order for the UEs in the corresponding cell to receive the CSI-RSs that are transmitted by different BSs without the interference. The zero power CSI-RS (muting) may be applied to a position where the CSI-RS can be transmitted, and the UE generally skips the corresponding radio resource to receive a traffic signal. The zero power CSI-RS (muting) in the LTE-A system may be referred to as "muting" as well because the zero power CSI-RS (muting) is applied to the position of the CSI-RS due to its characteristic, and the transmission power is not transmitted.

The CSI-RS in FIG. 52 may be transmitted using some of the positions indicated by A, B, C, D, E, F, G, H, I, or J depending on the number of antennas that transmit the CSI-RS. In addition, the zero power CSI-RS (muting) may be applied to some of the positions indicated by A, B, C, D, E, F, G, H, I, or J as well. In particular, the CSI-RS may be transmitted by the REs of two, four, or eight according to the number of transmission antenna ports. The CSI-RS is transmitted through a half of a specific pattern in FIG. 52 in the case of two antenna ports, and the CSI-RS is transmitted through the whole of the specific pattern in the case of four antenna ports. In addition, the CSI-RS is transmitted using two patterns in the case of eight antenna ports. On the contrary, the zero power CSI-RS (muting) is always transmitted in one pattern unit. That is, the zero power CSI-RS (muting) may be applied to a plurality of patterns, but it cannot be applied to only some of one pattern in the case where the position thereof does not overlap the CSI-RS. However, only if the position of the CSI-RS overlaps the position of the zero power CSI-RS (muting), the zero power CSI-RS may be applied to some of one pattern.

In addition, the positions A, B, C, D, E, F, G, H, I, or J of FIG. 52 may be configured as the IMR. When the IMR is configured with respect to a specific UE, the UE takes signals received from the REs that belong to the configured IMR for interference signals. The IMR is used in order for the UE to measure the intensity of the interference. That is, the UE may measure the intensity of the signal received from the REs that belong to the configured IMR in order to thereby determine the intensity of the interference.

Figure 53:
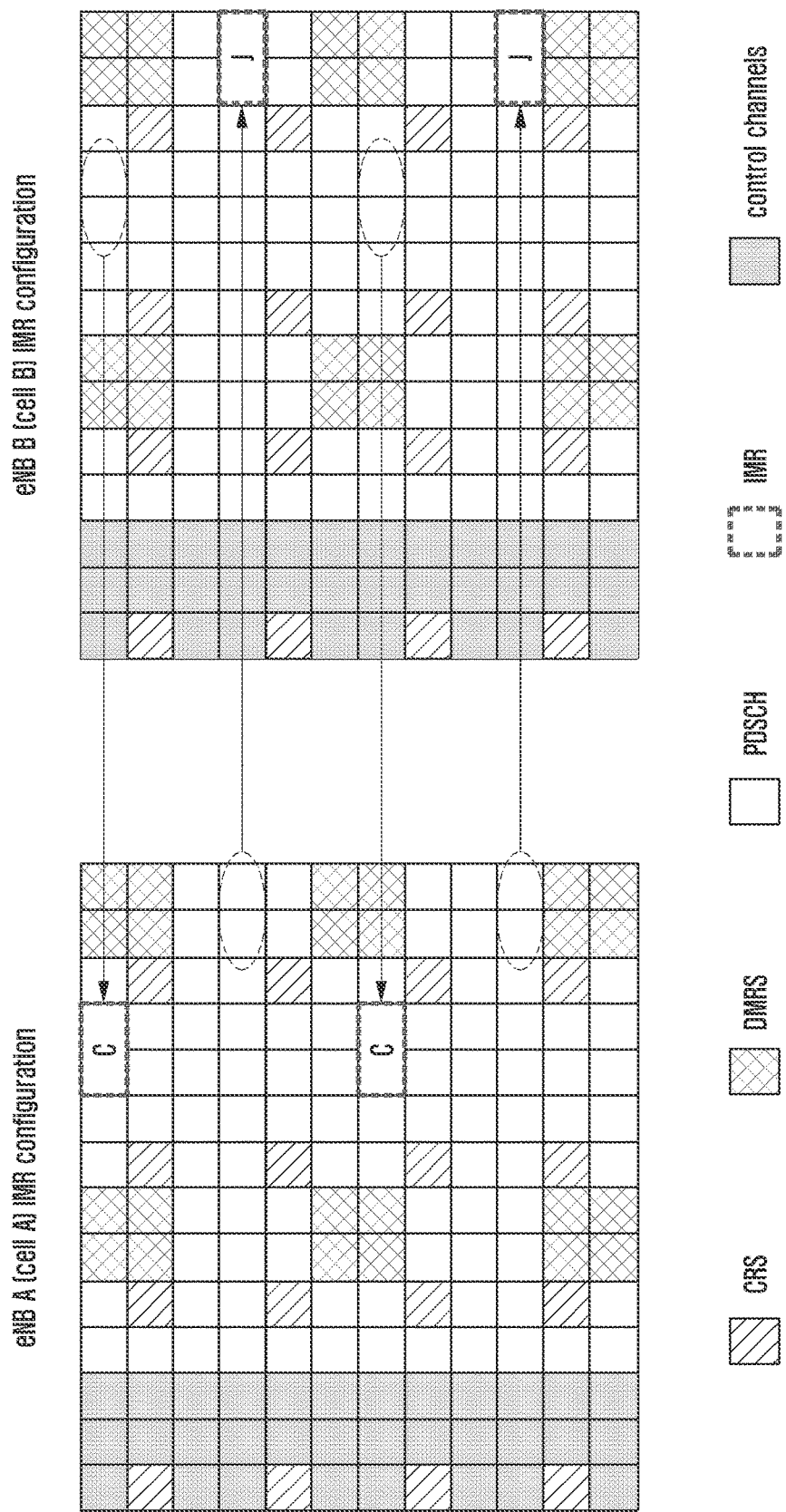
FIG. 53 is a view illustrating an operation principle of an interference measurement resource (IMR) according to an embodiment of the present disclosure.

FIG. 53 is a diagram to explain the operation of the IMR according to an embodiment of the present disclosure.

Referring to FIG. 53, FIG. 53 illustrates signals that are transmitted from two BSs to which the IMR is applied. In FIG. 3, the BS A configures the IMR C in to the UE that is located in the cell A. In addition, the BS B configures the IMR J in the UE that is located in the cell B. That is, the UEs located in the cell A may receive the PDSCH that is transmitted from the BS A, and to this end, the UEs are to report the channel status information to the BS. The UE is to measure Es/(Io+No) (signal energy-to-interference and noise intensity) of the channel to create the channel status information. The IMR is intended for the UE to measure the interference and noise intensity. In FIG. 3, when the BS A and the BS B simultaneously transmit signals, the BS A and the BS B may interfere with each other. That is, the signal transmitted from the BS B may interfere with the UE that receives the signal from the BS A. In addition, the signal transmitted from the BS A may interfere with the UE that receives the signal from the BS B.

In FIG. 53, the station A BSA configures the IMR C in the UE located in the cell A in order for the UE to measure the interference that is generated by the BS B. In addition, the BS A does not transmit a signal at the position of the IMR C. As a result, the UE receives signals 5300 and 5310, which are transmitted by the BS B, in the IMR C. That is, the UE receives only a signal that is transmitted from the BS B in the IMR C, and measures the reception intensity of the signal to thereby determine the intensity of the interference that is generated by the BS B. Likewise, the BS B configures the IMR J in the UE located in the cell B in order for the UE to measure the interference that is generated by the BS A. In addition, the BS B does not transmit a signal at the position of the IMR J.

By using the IMR as described in FIG. 53, it is possible to effectively measure the intensity of the interference generated by another BS or another transmitting point. That is, in a multi-cell mobile communication system in which a plurality of cells coexist or in a distributed antenna system, it is possible to effectively measure the intensity of the interference generated in the neighboring cells or the intensity of the interference generated in the neighboring transmitting points by using the IMR. On the contrary, the intensity of the MU-MIMO interference cannot be effectively measured even by using the IMR.

The LTE system supports the MIMO transmission by utilizing a plurality of transmission/reception antennas. The MIMO scheme spatially multiplexes the information in accordance with the instantaneous channel generated in a plurality of transmission/reception antennas, and transmits the same. Since the MIMO scheme may spatially multiplex a plurality of data streams in a single time and frequency resource to then be transmitted, the MIMO scheme can increase the data transmission rate several times compared to the existing non-MIMO transmission. LTE Release 11 supports the MIMO transmission between up to eight transmission antennas and up to eight reception antennas. In this case, up to 8 data streams may be spatially multiplexed to then be transmitted, and the maximum data transmission rate may be improved eight times compared to the non-MIMO scheme.

In general, the MIMO may be divided into the SU-MIMO in which a plurality of spatially multiplexed data streams is transmitted to a single UE and the MU-MIMO in which a plurality of spatially multiplexed data streams is transmitted to a plurality of UEs. In the SU-MIMO, a plurality of spatially multiplexed data streams is transmitted to a single UE, but in the MU-MIMO, a plurality of spatially multiplexed data streams is transmitted to a plurality of UEs. In the MU-MIMO, the BS transmits a plurality of data streams, and each UE receives one or more of the plurality of data streams transmitted from the BS. The MU-MIMO is particularly useful in the case where the transmission antennas of the BS are more than the reception antennas of the UEs. In the case of the SU-MIMO, the maximum number of data streams that can be spatially multiplexed is limited to min $(N_{Tx}, N_{Rx})$. Here, $N_{Tx}$ is the number of transmission antennas of the BS, and $N_{Rx}$ is the number of reception antennas of the UE. On the contrary, in the case of the MU-MIMO, the maximum number of data streams that can be spatially multiplexed is limited to min $(N_{Tx}, N_{MS} \times N_{Rx})$. Here, $N_{MS}$ refers to the number of the UEs.

In FIG. 53, the IMR may effectively measure the intensity of the interference generated in another BS or another transmitting point, whereas the IMR may not effectively measure the intensity of the MU-MIMO interference generated in the same BS or transmitting point.

In general, the received signal of the UE in a multi-cell mobile communication system may be expressed as the following equation.

$$\sum_i \sum_{j \in C_i^k} P_{i,j}^k \cdot h_{i,j}^k \cdot s_{i,j}^k \qquad \text{Equation 7}$$

In Equation 7, $P_{i,j}^k$ denotes transmission power that is allocated to the j-th UE by the i-th BS or transmitting point in the k-th subframe. In addition, $h_{i,j}^k$ denotes the result of combining the wireless channel between the i-th BS or transmitting point and the j-th UE in the k-th subframe with the antenna precoding for the MIMO transmission. In addition, $s_{i,j}^k$ refers to a transmission signal that is transmitted from the i-th BS or transmitting point to the j-th UE in the k-th subframe. Lastly, refers $C_i^k$ to a group of UEs to which the i-th BS or transmitting point allocates the DL resources in the k-th subframe. When the number of UEs included in $C_i^k$ is 1, the k-th BS or transmitting point may transmit signals in the SU-MIMO scheme, and when the size of $C_i^k$ is more than 2, the k-th BS or transmitting point may transmit signals in the MU-MIMO scheme. Equation 7 may be rewritten in terms of the 0th UE of the 0th BS as follows.

$$P_{0,0}^k \cdot h_{0,0}^k \cdot s_{0,0}^k + \sum_{\substack{j \in C_i^k \\ j \neq 0}} P_{i,j}^0 \cdot h_{i,j}^0 \cdot s_{i,j}^0 + \sum_{i \neq 0} \sum_{j \in C_i^k} P_{i,j}^k \cdot h_{i,j}^k \cdot s_{i,j}^k \quad \text{Equation 8}$$

In Equation 8, the signal component that the 0th BS transmits to the 0th UE $P_{0,0}^k \cdot h_{0,0}^k \cdot s_{0,0}^k$ and the interference component caused by another BS is $$\sum_{i \neq 0} \sum_{j \in C_i^k} P_{i,j}^k \cdot h_{i,j}^k \cdot s_{i,j}^k.$$

The interference component $$\sum_{k \neq 0} \sum_{i \in C_i^k} P_{t,i}^k \cdot h_{t,i}^k \cdot s_{t,i}^k$$

that is generated in another BS may be measured using the IMR of FIG. 53. On the contrary, $$\sum_{\substack{j \in C_i^k \\ j \neq 0}} P_{i,j}^0 \cdot h_{i,j}^0 \cdot s_{i,j}^0$$

that the 0th BS transmits to the UE other than the 0th UE may generate the MU-MIMO interference with respect to the 0th UE that receives the data from the BS.

Such MU-MIMO interference may not be measured using the IMR because the BS that generates the MU-MIMO interference does not send a signal to the IMR. That is, according to the driving principle of the IMR in FIG. 53, the BS A transmits signals to a plurality of UEs in the MU-MIMO scheme, but does not transmit a signal to the IMR C. In this case, the UE that determines the DL channel status information of the station A BSA can effectively measure the interference generated by the BS B in the IMR C, but cannot measure the MU-MIMO interference generated by the BS A.

In the case where the UE is not able to accurately measure the MU-MIMO interference in determining the channel status information, when the BS transmits the MU-MIMO signals to a plurality of UEs including the corresponding UE, the UE may obtain unoptimized system performance because the BS cannot effectively perform the link adaptation. The link adaptation means the operation of allocating a data rate to conform to the channel status of the UE, and this may be conducted based on the channel status information transmitted by the UE in the mobile communication system such as the LTE. The problem is that the channel status information transmitted to the BS is not suitable for the MU-MIMO transmission because the UE cannot measure the MU-MIMO interference, so it is difficult to make an effective link adaptation.

The problem, in which the severe performance degradation results from the channel status information that does not reflect the effect of the MU-MIMO interference, may occur in the mobile communication system, such as the Massive MIMO or the full dimension MIMO (FD-MIMO), that performs the MU-MIMO transmission to a plurality of UEs at the same time.

In the case of the Massive MIMO or the FD-MIMO, the BS has tens to hundreds of transmission antennas. In addition, the number of data streams that can be multiplexed is required to greatly increase in order to improve the system performance compared to the conventional LTE system. To this end, the mobile communication system for supporting the FD-MIMO is to perform the simultaneous transmission to a plurality of UEs by using the MU-MIMO.

Figure 54:
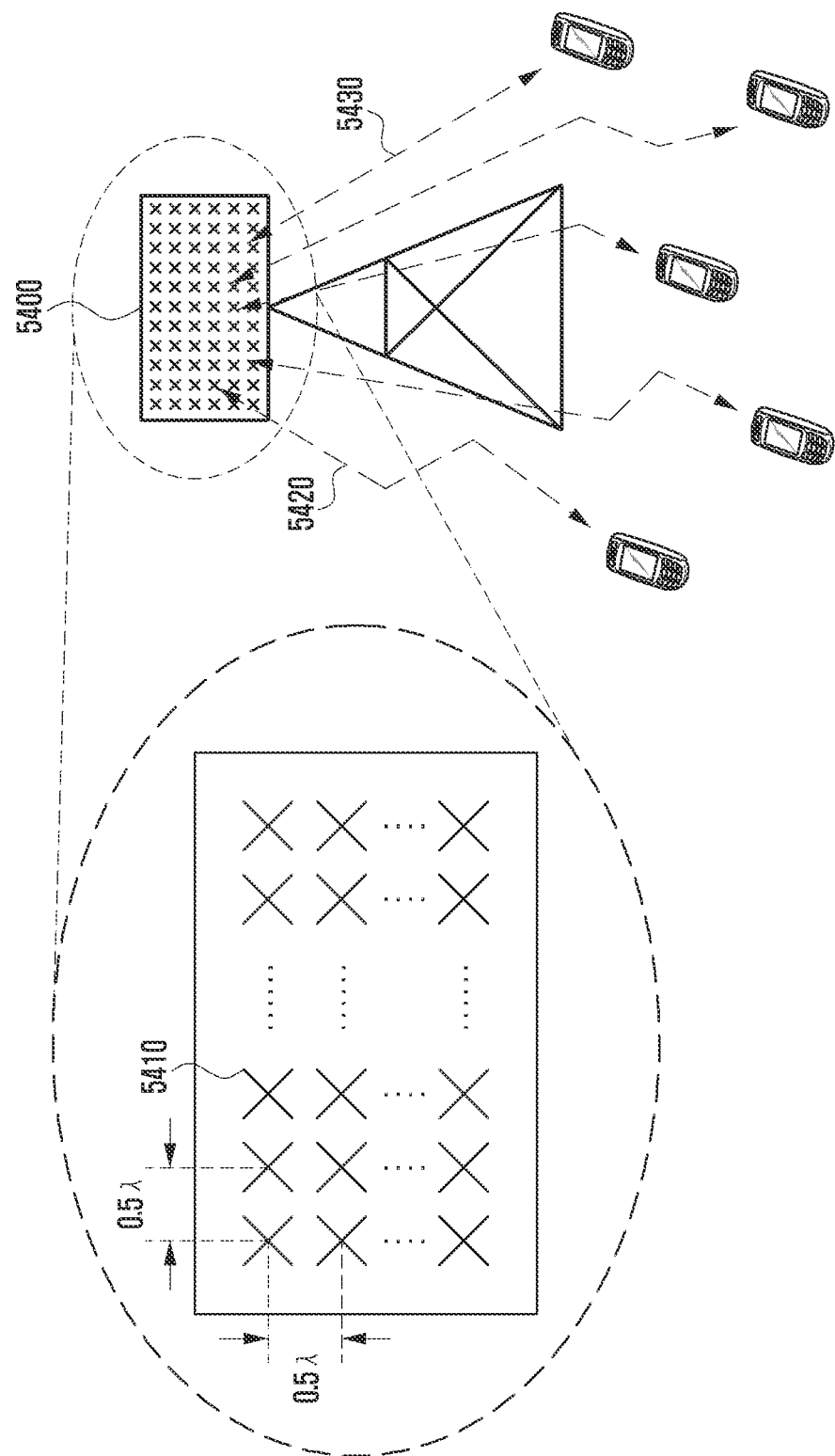
FIG. 54 is a view illustrating a BS supporting a full dimensional multiple input multiple output (FD-MIMO) according to an embodiment of the present disclosure.

FIG. 54 shows the BS that supports the FD-MIMO according to an embodiment of the present disclosure.

Referring to FIG. 54, the BS simultaneously transmits signals by using a plurality of transmission antennas to a plurality of UEs as indicated by the reference numeral 5400. The plurality of transmission antennas, for example, may be an antenna panel (2-D antenna array panel) that has a two-dimensional planar structure, and the antennas 5410 are arranged to be spaced from each other by a distance corresponding to a function of the wavelength. For example, the antennas may be spaced one half wavelength apart. The BS transmits signals to a plurality of UEs through the high order MU-MIMO by using a group 5400 of antennas. The high order MU-MIMO means that spatially separated transmission beams 5420 and 5430 are allocated to a plurality of UEs using a plurality of transmission antennas of the BS in order to thereby transmit the data. Since the high order MU-MIMO uses the same time and frequency resource, the performance of the system can be considerably improved.

Figure 55:
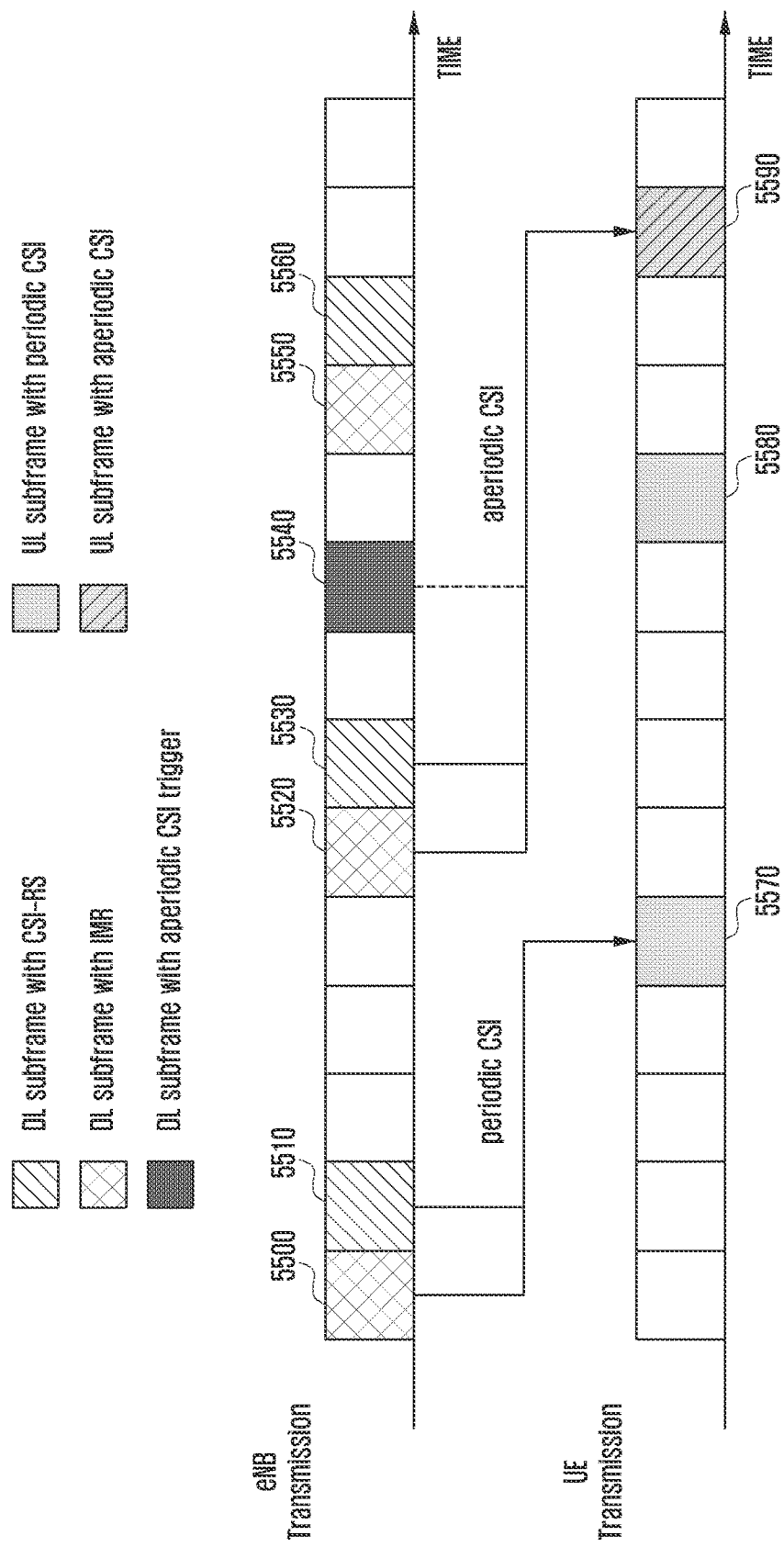
FIG. 55 is a view illustrating a DL signal and an uplink signal in a time area according to an embodiment of the present disclosure.

FIG. 55 illustrates the DL through which the BS transmits signals, and the UL through which the UE that has received the same transmits the channel status information back, in the time area, according to an embodiment of the present disclosure.

Referring to FIG. 55, the BS configures such that the IMR is periodically positioned in the subframes 5500, 5520, and 5550. That is, the BS reports to the UE by using the upper signaling in order for the UE to measure the interference at a specific IMR position of the subframe. The UE that has received the report measures the interference in the corresponding IMR and creates the channel status information. In addition, the BS transmits the CSI-RS in the subframes 5510, 5530, and 5560, and notifies the UE of the same using the upper signaling. The UE that has been notified receives the CSI-RS in the corresponding subframe and creates the channel status information. In general, Es/(No+Io) is to be measured in order to create the channel status information. The UE measures the intensity of the noise (No) and the intensity of the interference (Io) by using the IMR, and measures the signal energy by using the CSI-RS. In FIG. 55, the UE creates the channel status information by using the intensity of the noise and interference measured in the IMR and the signal energy measured in the CSI-RS. The channel status information may be the periodic channel status information that is periodically reported by the UE, or the aperiodic channel status information that is reported by the UE only when the BS instructs to do so. The periodic channel status information is periodically reported by the UE according to a period that is configured by the BS through the upper signaling. On the contrary, the aperiodic CSI is one-time channel status information that is reported by the UE to the BS only when the BS makes a request to the UE by using an aperiodic feedback indicator 5540. In LTE Release 11, the aperiodic feedback indicator 5540 is included in the UL DCI format 0 or DCI format 4, and is defined in one bit or two bits. In the case of the feedback indicator of one bit, if the aperiodic feedback indicator is configured to be "ON," the UE transmits the channel information about the "serving cell c" to the BS through the PUSCH aperiodic feedback. Here, the "serving cell c" refers to the DL CC through which the DCI is transmitted in a CA situation. On the contrary, in the case of the aperiodic feedback indicator 5540 of two bits, the UE performs the aperiodic feedback in a manner shown in Table 2 below.

TABLE 2

| Value of CSI request field | Description |
| --- | --- |
| '00' | No aperiodic CSI report is triggered |
| '01' | Aperiodic CSI report is triggered for serving cell $c$ |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

In Table 2, the "serving cell c" means the DL CC that is linked to the UL CC indicated by the CIF (carrier indication field) that is included in the DCI for the UL scheduling unlike the case where the aperiodic feedback indicator is one bit. That is, when the UE receives the aperiodic feedback indicator that is configured as "01", the UE transmits the feedback information of the DL CC in the UL CC indicated by the CIF, which is linked to the DL CC. On the contrary, when the UE receives the aperiodic feedback indicator that is configured as "10" or "11," the UE transmits the feedback information for the DL CC that is configured to be higher with respect to the UL CC indicated by the CIF.

The channel status information that the UE reports to the BS in 5570 and 5580 of FIG. 55 corresponds to the periodic channel status information. The UE measures the intensity of the signal energy, the noise, and the interference, respectively, in the CSI-RS and the IMR in creating the channel status information of 5570 and 5580. Likewise, in the case of creating the aperiodic channel status information of 5590, the UE measures the intensity of the signal energy, the noise, and the interference, respectively, in the CSI-RS and the IMR. According to the prior art, since the MU-MIMO interference is not able to be measured in the periodic channel status information and the aperiodic channel status information, the system performance may be deteriorated in the case of operating the high order MU-MIMO, such as the FD-MIMO system.

Figure 56:
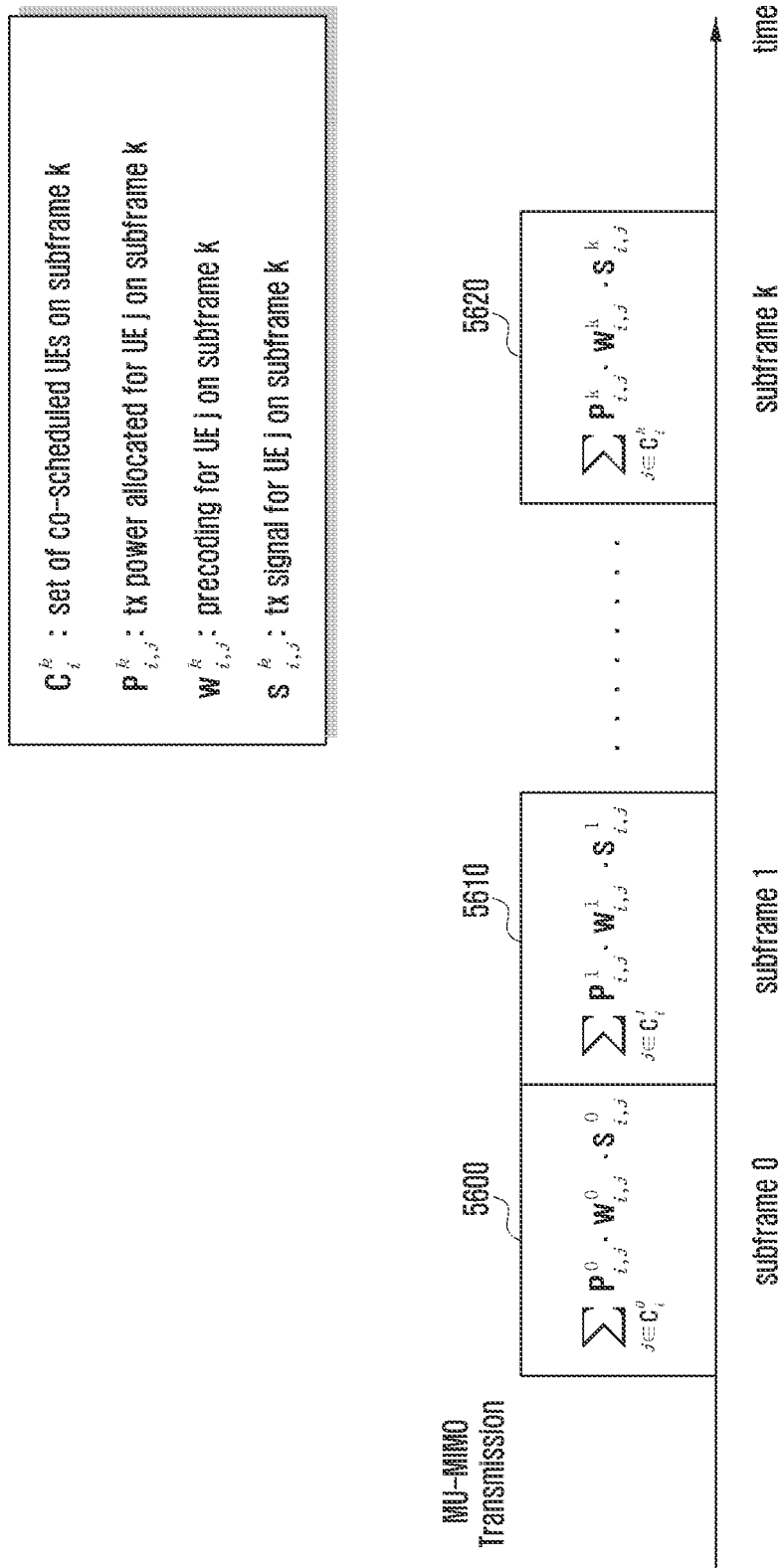
FIG. 56 is a view illustrating a multiple user MIMO (MU-MIMO) transmission performed in a BS for each sub-frame according to an embodiment of the present disclosure.

The MU-MIMO interference may change in the size and the characteristics thereof depending on the group of UEs to which the BS performs the MU-MIMO transmission. FIG. 56 shows that the BS performs the MU-MIMO transmission for each subframe.

FIG. 56 shows that the BS performs the MU-MIMO transmission with respect to different groups of UEs for each subframe according to an embodiment of the present disclosure. For example, in the subframe 0 5600, the BS i performs the MU-MIMO transmission to the UEs included in the group of $C_i^0$. On the contrary, in the subframe 1 5610, the BS i performs the MU-MIMO transmission to the UEs included in the group of $C_i^1$. The UE included in $C_i^k$ in the specific subframe 5620 may be determined by a scheduler of the BS, and may be usually changed for every subframe. Whenever the UE is changed as described above, the signal transmitted to the UE and the precoding that is applied to each UE are changed as well. The precoding means that a plurality of antennas is optimized with a weight in order to efficiently transmit signals to the UE. For example of the precoding, a weight is applied to a plurality of antennas in order to thereby form a beam in a specific direction for the UE.

Figure 57:
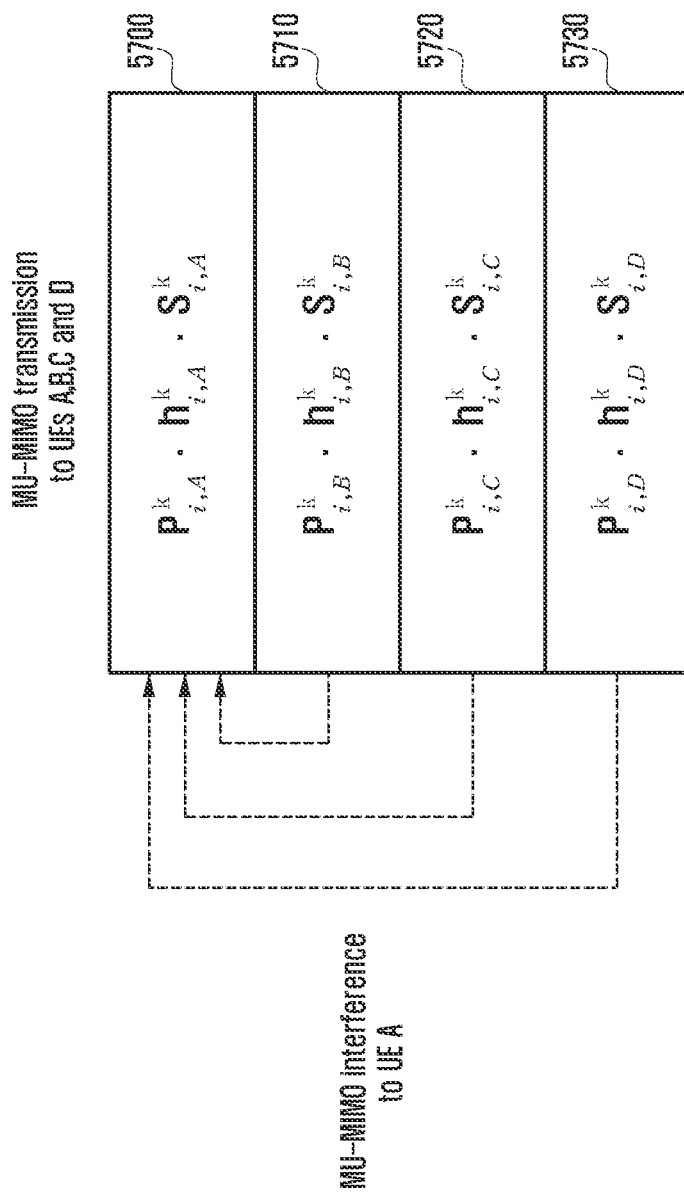
FIG. 57 is a view illustrating an MU-MIMO interference received by a UE A when a BS transmits an MU-MIMO to a polarity of UEs according to an embodiment of the present disclosure.

FIG. 57 illustrates the MU-MIMO interference with respect to the UE A when the BS i performs the MU-MIMO transmission to the UEs A, B, C, and D in the k-th subframe according to an embodiment of the present disclosure.

Referring to FIG. 57, the UE A receives the signal transmitted by the BS, as shown by reference numeral 5700. In FIG. 57, $P_{i,A}^k \cdot h_{i,A}^k \cdot s_{i,A}^k$ results from the operation in which the PDSCH signal, which is transmitted by the BS to the UE A, is processed through the precoding and passes through a radio channel to then be received by the UE A. $h_{i,A}^k$ of $P_{i,A}^k \cdot h_{i,A}^k \cdot s_{i,A}^k$ denotes the effect of the precoding and the radio channel. In FIG. 57, while the UE A receives its own signal $P_{i,A}^k \cdot h_{i,A}^k \cdot s_{i,A}^k$, the signals 5710, 5720, and 5730 that the BS transmits to other UEs B, C, and D may interfere with the UE A. If there is no accurate link adaptation in consideration of the intensity of the interference, it is difficult to optimize the performance of the mobile communication system that uses the MU-MIMO, such as the FD-MIMO.

In the case of the high order MU-MIMO, such as the FD-MIMO, the number of UEs that are simultaneously scheduled is to be considered as well. That is, when the BS performs the MU-MIMO transmission, the target UE may be a UE of another group for every subframe, and the number thereof may be different. That is, in FIG. 56, the number of UEs to which the BS transmits the MU-MIMO signal in the subframe 5600 may be different from the number of UEs to which the BS transmits the MU-MIMO signal in the subframe 5610.

In the mobile communication system supporting the FD-MIMO, the MU-MIMO is to be transmitted to a lot of UEs compared to the conventional LTE system. To this end, the MU-MIMO interference is to be considered in the operation of creating the channel status information that the UE reports to the BS. The present disclosure is intended to provide a method in which the UE measures the MU-MIMO interference that is received during the DL data transmission and reflects the same on the channel status information in the FD-MIMO system, and a device thereof.

Hereinafter, an embodiment of the present disclosure will be described in detail with reference to the accompanying drawings. In the following description of the present disclosure, a detailed description of known functions or configurations incorporated herein will be omitted when it may make the subject matter of the present disclosure rather unclear. The terms which will be described below are terms defined in consideration of the functions in the present disclosure, and may be different according to users, intentions of the users, or customs. Accordingly, the terms should be defined based on the contents over the whole present specification.

Further, the detailed description of embodiments of the present disclosure is made mainly based on a wireless communication system based on OFDM, particularly 3GPP EUTRA standard, but the subject matter of the present disclosure can be applied to other communication systems having a similar technical background and channel form after a little modification without departing from the scope of the present disclosure and the above can be determined by those skilled in the art.

The present disclosure suggests a new interference measuring method to measure the MU-MIMO interference when the UE creates the channel status information for the MU-MIMO. As mentioned in FIG. 52, FIG. 53, and FIG. 55, the BS may configure the IMR in a specific UE through the RRC in order for the RE to measure the intensity of the received signal to determine the intensity of the interference. Table 3 below shows an RRC field in which the typical CSI-Process and IMR are configured.

TABLE 3

```
-- ASN1START
CSI-Process-r11 ::=     SEQUENCE {
    csi-ProcessId-r11           CSI-ProcessId-r11,
    csi-RS-ConfigNZPId-r11  CSI-RS-ConfigNZPId-r11,
    csi-IM-ConfigID-r11     CSI-IM-ConfigId-r11,
    p-C-AndCBSRList-r11 SEQUENCE (SIZE (1..2)) OF P-C-AndCBSR-r11,
    cqi-ReportBothProc-r11   CQI-ReportBothProc-r11 OPTIONAL, -- Need OR
    cqi-ReportPeriodicProcId-r11   INTEGER (0..maxCQI-ProcExt-r11) OPTIONAL, -- Need
OR
    cqi-ReportAperiodicProc-r11  CQI-ReportAperiodicProc-r11 OPTIONAL, -- Need OR
    ...
}
P-C-AndCBSR-r11 ::= SEQUENCE {
    p-C-r11                 INTEGER (-8..15),
    codebookSubsetRestriction-r11 BIT STRING
}
-- ASN1STOP
```

TABLE 4

| CSI-IM-Config field |
|---|
| Resource Config |
| Subframe Config |

As shown in Table 3, the BS configures the CSI-Process in the UE, and configures the IMR resource through the CSI-IM-ConfigId-r11 field. The field is configured as shown in Table 4. In Table 4, 'Resource config' is a parameter that has a value of 0 to 9 in the case of a frequency division system and a value of 0 to 9 and 20 to 25 in the case of a time division system, and the values represent the IMR positions A to J of FIG. 52. 'Subframe config' is a parameter that has a value of 0 to 154, and a period of the IMR and the subframe offset may be configured according to each value thereof. As described above, the BS may configure such that the IMRs are positioned periodically, and may measure one or three pieces of MU-MIMO interference by using three IMRs on the basis of one CSI-process in the case of the transmission modes 1 to 9 or a plurality of CSI-processes in the case of the transmission mode 10 in the LTE Release 11. Since the UE is able to measure a single piece of interference by using a single IMR, the BS may receive the report on the channel status information regarding only one or three pieces of interference according to the transmission mode of the UE. However, such an interference-measurable situation is too limited to support the high order MU-MIMO operation. Therefore, the present disclosure suggests a new IMR by which a specific UE may measure the interference upon the reception of data, and may create the channel status information based on the actual interference. In the following description, a typical IMR and a new IMR shall be referred to as the IMR1 and the IMR2, respectively, for the convenience of explanation.

A method proposed in the present disclosure to define the IMR2 may be as follows.

- IMR2 Defining Method 1: The UE uses a DM-RS resource of the RB, by which the data is transmitted, through the scheduling.
- IMR2 Defining Method 2: The UE uses a specific IMR1 resource of the RB, by which the data is transmitted, through the scheduling.

In IMR2 Defining Method 1, the scheduled UE measures the interference by using the DM-RS resource that is used in the channel estimation for the DL data reception, and reports the channel status information. In IMR2 Defining Method 2, the scheduled UE measures the interference by using the resources used for the existing IMR1, and reports the channel status information. Both methods are common in that the interference is measured in the RB in which the DL data transmission is made.

In the case of the DM-RS, since the BS transmits the information on the DM-RS port through which the data is transmitted to the UE through antenna ports, a scrambling ID, and a layer number indication, the corresponding resource does not need to be additionally defined, and it is possible to measure the interference by using the DM-RS port. However, in the case of using the existing IMR1 resource, additional configuration is necessary in order to select one of the resources A to J in FIG. 52. To this end, the CSI-Process configuration may be made in the similar manner to the existing IMR configuration as shown in Table 5 and Table 6.

TABLE 5

```
-- ASN1START
CSI-Process-r13 ::=     SEQUENCE {
    csi-ProcessId-r13           CSI-ProcessId-r13,
    csi-RS-ConfigNZPId-r13  CSI-RS-ConfigNZPId-r13,
    csi-IM-ConfigId-r13     CSI-IM-ConfigID-r13,
    csi-IM2-ConfigId-r13    CSI-IM2-ConfigID-r13,
    p-C-AndCBSRList-r13         SEQUENCE (SIZE (1..2)) OF P-C-AndCBSR-r13,
    cqi-ReportBothProc-r13      CQI-ReportBothProc-r13 OPTIONAL, -- Need OR
    cqi-ReportPeriodicProcId-r13        INTEGER (0..maxCQI-ProcExt-r13) OPTIONAL, --
                                Need OR
    cqi-ReportAperiodicProc-r13         CQI-ReportAperiodicProc-r13 OPTIONAL, -- Need
                                        OR
    ...
}
```

TABLE 5-continued

```
P-C-AndCBSR-r13 ::= SEQUENCE {
    p-C-r13                INTEGER (−8..15),
    codebookSubsetRestriction-r13 BIT STRING
}
-- ASN1STOP
```

TABLE 6

| CSI-IM-Config field |
| --- |
| Resource Config |

Like Table 6 above, 'Resource config' is a parameter for selecting the IMR2 positions A to J. Since the IMR1 is configured periodically, a subframe period and an offset are to be configured by using 'Subframe config.' However, since the IMR2 is a resource that is aperiodically used and the subframe is transmitted through the DL scheduling, 'Subframe config' does not need to be configured.

If there is only one CSI-IM-Config or only one CSI-Process described in Table 5, the IMR2 for measuring the multi-user interference may be configured by the scheduling without additional configuration. However, if a plurality of CSI-IM2-Configs exists in the CSI-Process, or if the UE uses a plurality of CSI-Processes based on the TM10, it is necessary to select one from the plurality of CSI-Processes, and to this end, the corresponding IMR2 may be transmitted in methods as follows.

IMR2 Selecting Method 1: A method to inform of one of a plurality of fields through a new DCI field IMR2 Selecting Method 2: A method to inform of one of a plurality of fields in association with a typical DCI field IMR2 Selecting Method 1 configures a plurality of IMR2s in the same manner as the existing IMR1, and adds a field indicating the corresponding IMR2 in the DCI that is used for the DL data scheduling. Table 7 below illustrates the fields for IMR2 Defining Method 2.

TABLE 7

| CSI-IM2-Config field0 | CSI-IM2-vConfig field1 | CSI-IM2-Config field2 | CSI-IM2-Config field3 |
| --- | --- | --- | --- |
| Resource Config0 | Resource Config1 | Resource Config2 | Resource Config3 |

The fields 0 to 3 may be fields in a single CSI-Process, or may be each CSI-IM2-Config field that corresponds to each of different CSI-Processes 0 to 4. At this time, when it is assumed that a field for IMR2 scheduling is added to fields such as DCI formats 2C, 2D, etc. for scheduling assignment or a new DCI format for the corresponding operation is generated (for example, DCI Format 2E), the IMR2 indication field for the IMR2 definition method 2 included in a DCI can be configured in a manner represented in Table 8. Further, the manner represented in Table 8 can be used for the IMR2 selection method 1.

TABLE 8

| Bit | IMR2 indication field |
| --- | --- |
| 00 | IMR2 Config0 |
| 01 | IMR2 Config1 |
| 10 | IMR2 Config2 |
| 11 | IMR2 Config3 |

Although the bit for the DCI fields designates the IMR2 to conform to the corresponding number in Table 8 above, it may be configured by using a separate field in the RRC configuration. In addition, although four IMR2 configuration fields are shown in Table 8 above, a plurality of IMR2 configuration fields may be provided. In addition to the embodiment above, in case the multi-user transmission does not occur, one index of the field may be used for the case where the multi-user transmission does not occur, or additional one bit for turning on and off the IMR2 may be used.

In the case of the IMR2 selecting method 1, compared to the selecting method 1, an index according to the pre-configured RRC configuration field may be additionally transmitted through the control information in order to thereby measure the interference due to the pairing of various UEs. However, the additional DCI is to be transmitted to do so. An increase in pieces of DCI results in a decrease in a coverage transmittable by the corresponding DCI, it is difficult to use the method when a Signal-to-Noise Ratio of a channel between a BS and a UE is not sufficiently good.

According to IMR2 Selecting Method 2, a plurality of IMR2 positions that are configured in a single CSI-Process or a plurality of CSI-Processes is to be informed of in association with the whole or some of the typical DCI field. In order to explain IMR2 Selecting Method 2, Table 3 that was used in IMR2 Defining Method 1 will be referred to again. The UE in the existing DCI field may be informed of a plurality of frequency and time positions of the IMR2, which are configured as the IMR2 selecting Method 1, in conjunction with a field for providing scheduling-related information.

For example, it may be associated with a PQI (PDSCH RE Mapping and Quasi-Co-Position Indicator) that is transmitted by using the DCI Format 2D. The PQI has 2 bits. The UE may identify a parameter group, such as the number of CRS ports, frequency shift information, MBSFN subframe configuration information, a PDSCH start position, or CSI-RS and non-zero-power CSI-RS information, through the corresponding bits and the RRC configuration that is configured as Table 9 and Table 10, and may receive the DL data in association with a TP that receives the data through the same. The information corresponding to the IMR2 may be pre-configured in the PQI information as shown in Table 11, and then may be reported through a PQI bit in order to inform of the IMR2 resource positions. The corresponding CSI-IM2-Config field may be the same as Table 7 above.

TABLE 9

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

TABLE 10

```
PDSCH-RE-MappingQCL-Confiq-r11 ::=      SEQUENCE {
    pdsch-RE-MappingQCL-ConfigId-r11    PDSCH-RE-MappingQCL-ConfigId-r11,
    optionalSetOfFields-r11             SEQUENCE {
        crs-PortsCount-r11                  ENUMERATED {n1, n2, n4, spare1},
        crs-FreqShift-r11                   INTEGER (0..5),
        mbsfn-SubframeConfigList-r11        CHOICE {
            release                             NULL,
            setup                               SEQUENCE {
                subframeConfigList                  MBSFN-SubframeConfigList
            }
        }                                                       OPTIONAL, -- Need ON
        pdsch-Start-r11                     ENUMERATED {reserved, n1, n2, n3, n4, assigned}
    }                                                           OPTIONAL, -- Need OP
    csi-RS-ConfigZPId-r11               CSI-RS-ConfigZPId-r11,
    qcl-CSI-RS-ConfigNZPId-r11          CSI-RS-ConfigNZPId-r11 OPTIONAL, -- Need OR
    ...
}
```

TABLE 11

```
PDSCH-RE-MappingQCL-Config-r13 ::=      SEQUENCE {
    pdsch-RE-MappingQCL-ConfigId-r13    PDSCH-RE-MappingQCL-ConfigID-r13,
    optionalSetOfFields-r13             SEQUENCE {
        crs-PortsCount-r13                  ENUMERATED {n1, n2, n4, spare1},
        crs-FreqShift-r13                   INTEGER (0..5),
        mbsfn-SubframeConfigList-r13        CHOICE {
            release                             NULL,
            setup                               SEQUENCE {
                subframeConfigList                  MBSFN- SubframeConfigList
            }
        }                                                       OPTIONAL, -- Need ON
        pdsch-Start-r13                     ENUMERATED {reserved, n1, n2, n3, n4, assigned}
    }                                                           OPTIONAL, -- Need OP
    csi-RS-ConfigZPId-r13               CSI-RS-ConfigZPId-r13,
    qcl-CSI-RS-ConfigNZPId-r13          CSI-RS-ConfigNZPId-r13 OPTIONAL, -- Need OR
    qcl-CSI-IM-Aperiodic-r13            CSI-RS-ConfigNZPId-r13 OPTIONAL, -- Need OR
    ...
}
```

Although the parameter to configure the corresponding IMR2 is named CSI-IM-Aperiodic in Table 6, the name, the release and the field may be different. The parameter group to configure the IMR2 is similar to Table 1.

In addition, the DM-RS may be reported to the UE with the IMR2 by using a DCI field that provides an antenna port(s), a scrambling ID, and the number of layers. Table 7 shows fields of the antenna port(s), the scrambling ID, and the number of layers, which are used in LTE Rel.11.

TABLE 12

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, $n_{SCID} = 0$ | 0 | 2 layers, port 7-8, $n_{SCID} = 0$ |
| 1 | 1 layer, port 7, $n_{SCID} = 0$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 0$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

The UE transmits and receives data through the DM-RS as shown in FIG. 2. In LTE Rel.11, antenna ports 7 and 8 of the DM-RS may be separated from each other through the OCCs (orthogonal cover code) that intersect at the same resource, and up to four layers for the multi-user transmission may be supported using additional scrambling IDs in each port 7 or 8. Therefore, it is possible to measure the IMR2 on the basis of the DM-RS for measuring the multi-user interference by using the corresponding port information. In addition, the CSI-IM2 Config information described in the embodiment above may be used in association with the corresponding field. For example, four CSI-IM2 Configs may be mapped with cases 0, 1, 2, and 3, in which a single code word is used. According to this, the BS may configure the UE to measure the interference resulting from the data transmission of the multiple UEs through the IMR2 according to the antenna port 7 or 8, and the scrambling ID thereof. Although the bit of the DCI field specifies the IMR2 to conform to the corresponding index in the embodiment above, a separate field for the same may be provided in the RRC configuration as described in Method 2. In addition to the embodiment above, in case the multi-user transmission does not occur, one index of the field may be used for the case where the multi-user transmission does not occur, or additional one bit for turning on and off the IMR2 may be used. Even though the IMR2 selecting method 2 described above has lower flexibility than selecting method 1, the method 3 can configure the IMR2 without transmitting additional DCI.

Furthermore, in Table 8, the IMR2 may be specified by the calculation in the same manner of (C-RNTI mod 4) by using currently used information, such as C-RNTI, temporary C-RNTI, SPS-C-RNTI, or the like. At this time, the number 4 for the modular arithmetic may vary according to the number of IMR2 groups.

The IMR2 is aperiodic unlike the typical IMR1. In addition, since the scheduling situation varies, such as the change in the radio channel, introduction of new UEs, or handover of the existing UEs, the time of the IMR2 for the channel status information report needs to be limited. In the case of the existing channel status information report, the channel status information report in the N-th subframe is made using the latest channel status information before the N-4th subframe. Likewise, provided that a window for the IMR2 channel status information report is 'K,' the UE may measure the IMR2 interference that exists in the range of the N-4-K-th subframe to the N-4th subframe, and may report the channel status information for the N-th subframe. At this time, a value defined in the standard or a value configured through the RRC may be used as 'K.'

Figure 58:
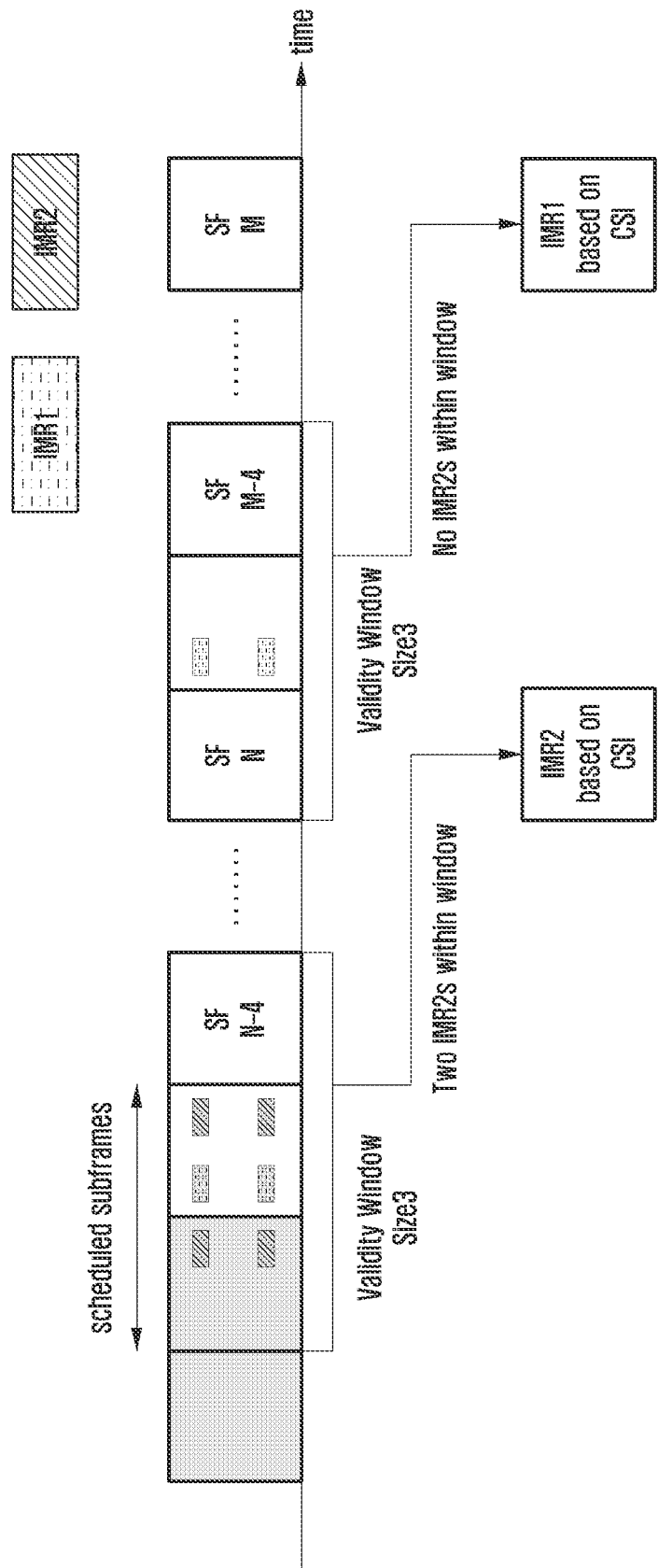
FIG. 58 is a view illustrating an IMR2 based periodic channel state report according to an embodiment of the present disclosure.

FIG. 58 illustrates a periodic channel status report on the basis of the IMR2 with K=3 according to an embodiment of the present disclosure.

Referring to FIG. 58, in order to report the channel status in the N-th subframe, the UE identifies whether or not the IMR2 exists in the range of the N-6th subframe to N-4th subframe, and measures the interference in the corresponding IMR2. Based on the multi-user interference measured using the same and the channel that is measured using the CSI-RS, the UE reports the channel status in the N-th subframe. Likewise, in order to report the channel status in the M-th subframe, the UE identifies whether or not the IMR2 exists in the range of the M-6th subframe to M-4th subframe. At this time, since the IMR2 does not exist in the corresponding subframe because it has not been scheduled, the UE creates the channel status information based on the IMR1 and reports the same in the M-th subframe. Although the periodic channel status report is described in the embodiment above, the aperiodic channel status report may be conducted in the same manner. That is, the UE measures the IMR2 interference in the range of the L-6th subframe to the L-4th subframe in order to thereby report the channel status information in the L-th subframe upon the reception of an aperiodic CSI trigger.

In addition, the IMR may be applied to be different depending on a wideband CQI and a subband CQI. For example, the IMR1 is used in the wideband CQI, whereas the IMR2 is used in the subband CQI. In this case, the wideband CQI measures the channel status information based on the IMR1 without the multi-user interference, and the subband CQI measures the channel status information based on the interference measured in the IMR2. Alternatively, the IMR1 may be used in the subband CQI, and the IMR2 may be used in the wideband CQI. In addition, it is possible to determine whether, based on the scheduled IMR2, the channel status information on the basis of the IMR1 is to be reported or the channel status information on the basis of the IMR2 is to be reported.

Figure 59:
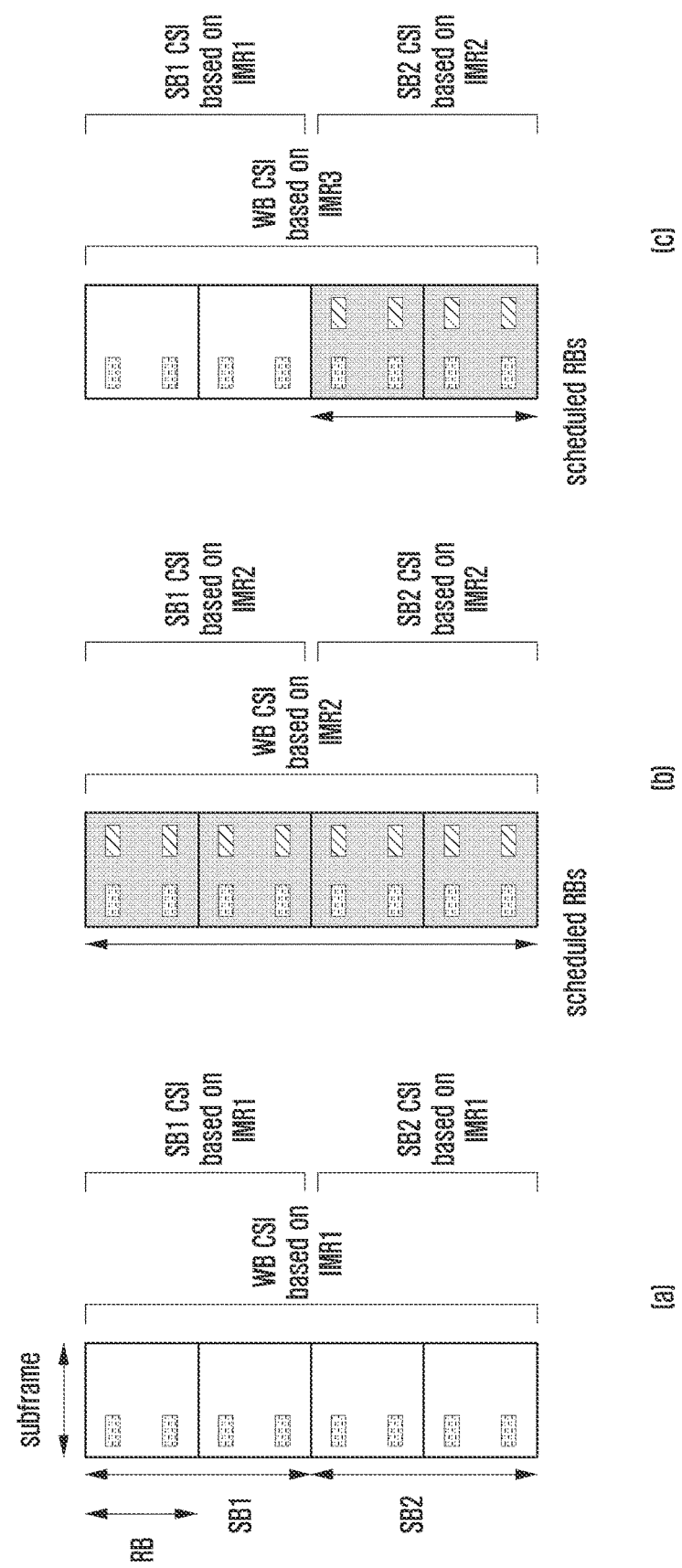
FIG. 59 is a view illustrating a case in which whether channel state information on the basis of an IMR1 is reported or whether channel state information on the basis of an IMR2 is reported is selected according to an embodiment of the present disclosure.

FIG. 59 illustrates a case where whether to report a channel state based on the IMR1 or a channel state based on the IMR2 according to an embodiment of the present disclosure.

Referring to portion [a] of FIG. 59, the UE, in the case where the IMR2 is not scheduled with respect to all resources and only the IMR1 exists, may report the channel status information through the IMR1. According to portion [b] of FIG. 59, the UE, in the case where the IMR2 is scheduled with respect to all resources, may report the channel status information by using the IMR2. As illustrated in portion [c] of FIG. 59, the IMR2 may be scheduled with respect to some of RBs. According to the current LTE standard, the BS can schedule DL data with respect to the UE in a RB unit. Thus, the IMR2 may exist only in a specific subband corresponding to some of widebands as well as the IMR2 may exist only in a specific RB corresponding to some of subbands. In this case, a determination standard on whether to generate channel state information necessary for the corresponding wideband or the corresponding subband on the basis of the IMR1 or on the basis of the IMR2 is necessary. At this time, the determination criterion may be Equation 9 as follows.

$$\alpha N^{DL}_{RB} \leq \text{the number of RBs that are scheduled with IMR2} \quad \text{Equation 9}$$

When the number of RBs, to which the IMR2 is scheduled, from among the corresponding band (wideband or subband) exceeds a predetermined percentage, the IMR2 is used otherwise the IMR1 is used in order to generate the channel state information. At this time, a value defined in the criterion may be adopted as a or a may be configured through an RRC signal.

The typical IMR1 always exists in all of the RBs in the corresponding period and at the offset time of the subframe. However, the IMR2 is intended to measure the multi-user interference occurring in the resources that are scheduled to the UE, so it may not be assumed that the IMR2 always exists in all of the RBs, like the typical IMR1. Therefore, in this case, in order for the wideband CQI to create the channel status information by using the IMR2, the following two methods may be used.

IMR2 Resource Defining Method 1: If the IMR2 is scheduled, it is assumed that the IMR2 always exists in all of the RBs, like the typical IMR1.

IMR2 Resource Defining Method 2: If the IMR2 is scheduled, it is assumed that the IMR2 exists in only the RB that is scheduled with the DL data.

IMR2 Resource Defining Method 1 is preferable because the UE measures, on average, the interference from the UEs that are scheduled by the BS to which the UE belongs in order to thereby create the channel status information. On the contrary, IMR2 Resource Defining Method 1 is undesirable because the UE measures the interference from which the UE suffers in the resources that are not received as well as the interference from which the UE directly suffers in receiving the data to thereby reflect the same on the creation of the channel status information.

IMR Resource Defining Method 2 has an advantage in that the UE may measure the interference from which the UE directly suffers in the scheduled resources, and may use the same to create the channel status information.

Since the existing IMR1 is assumed to always exist in all of the RBs, the UE measures the interference in all of the RBs, and creates and averages the channel status information of the corresponding RB to then be reported. However, since the new IMR2 does not always exist in all of the RBs, a new method of creating and reporting the channel status information is required. The new method of creating the channel status information is as follows.

Channel Status Information Creating Method 1 Using IMR2: If the IMR2 is scheduled, the UE measures the interference corresponding to all of the RBs, like the existing IMR1, through an interpolation method, an extrapolation method, or other methods with respect to the amount of interference in the RBs where the IMR2 exists.

Channel Status Information Creating Method 2 Using IMR2: If the IMR2 is scheduled, the UE does not reflect the RBs where the IMR2 does not exist in creating the channel status information.

In Channel Status Information Creating Method 1 using the IMR2, the UE estimates the amount of interference in the RBs where the IMR2 does not exist, and combine the same with the channel measured through the CSI-RS in the corresponding RB in order to thereby create the channel status information. In this case, the BS may estimate the multi-user interference for the resources that are not scheduled from the UE. However, the unscheduled resources are the resources that have been determined to be ineffective by the BS, so the CQI includes the information on the resources that are not desired to be scheduled.

In Channel Status Information Creating Method 2 using the IMR2, the UE estimates the amount of interference only in the RBs where the IMR2 exists, and creates the channel status information by using the CSI-RS in the corresponding RB. In this case, since the UE obtains the channel and interference information only from the resources that have been determined to be effective in order to thereby create the channel status information, the BS is able to determine the result of the scheduling itself, whereas it is difficult to make estimation for the resources that are not scheduled. In addition, since the estimation method, such as interpolation, or extrapolation, is not accurate in the case where the estimated sample does not exist in a long period, if the RBs, which are not scheduled with the IMR2, are consecutively positioned to exceed a specific number of RBs, it may not be included in the channel status information.

In addition, the channel status information creating method may be differently applied to the wideband CQI and the subband CQI. For example, Method 1 may be used for the wideband CQI, and Method 2 may be used for the subband CQI. In this case, the wideband CQI measures the channel status information on the assumption that the multi-user interference is introduced into all of the RBs, and the subband CQI measures the channel status information only in the RBs where the IMR2 exists, in order to thereby report the channel status information. Alternatively, Method 1 may be used in the subband CQI, and Method 2 may be used in the wideband CQI.

In the embodiment above, the channel status information is reported based on the IMR2 in the case where the IMR2 exists, and the channel status information is reported based on the IMR1 in the case where the IMR2 does not exist. However, if the channel status information is duplicated through the configurable DCI field or the RRC configuration, the priority is required. In this case, the channel status information may be reported in the following methods.

Channel Status Information Reporting Method 1 When IMR1 and IMR2 are duplicated: The channel status information on both the IMR1 and the IMR2 is to be reported.

Channel Status Information Reporting Method 2 When IMR1 and IMR2 are duplicated: The channel status information on one of the IMR1 or the IMR2 is to be reported.

In Channel Status Information Reporting Method 1, the channel status information on both the IMR1 and the IMR2 is to be reported. Since the IMR1 is intended to measure the interference from other BSs, the existing channel status information report is different from the channel status information report using the IMR2 in its characteristics. The existing channel status information report is intended for the SU-MIMO scheduling, whereas the new channel status information report is intended for the MU-MIMO scheduling. Therefore, the BS requires the information on the both, and the BS may select one of the MU-MIMO scheduling or the SU-MIMO scheduling by using the same to thereby transmit the DL data to the UE.

In Channel Status Information Reporting Method 2, the channel status information on one of the IMR1 or the IMR2 is to be reported when the IMR1 and the IMR2 collide with each other. As described above, the two pieces of the channel status information may be differently used due to its difference in the characteristics, and one piece of information may be reported earlier than the other information according to the importance.

An example thereof corresponds to a method preferentially transmitting information based on the IMR2 when channel state reports based on the IMR1 and the IMR2 collide with each other. Since the IMR1 is a periodically measured resource but the IMR2 is a resource allocated according to the necessity of a specific time, it is necessary that the IMR2 has a higher priority than the periodically measured resource. Thus, when the IMR1 and the IMR2 are duplicated, the IMR2 is preferentially measured, and thus, the information based on the IMR2 is preferentially reported.

As another example, there may be the following methods according to types of channel state information reports of the UE (periodic channel status information report and aperiodic channel status information report).

The periodic channel status information report is made through the IMR1, but the aperiodic channel status information report is not made with the IMR2.

The aperiodic channel status information report is made through the IMR1, but the periodic channel status information report is not made with the IMR2.

The periodic channel status report occurs frequently, and is transmitted by using the PUCCH. Therefore, the amount of channel status information report thereof is not much. The aperiodic channel status information report occurs by a trigger of the BS, and the amount of channel status information is relatively much. Accordingly, by using Method 1, it is possible to select the SU-MIMO through the periodic information and to select the MU-MIMO through the aperiodic information. Further, in a case of the periodic channel state information report, an amount of pieces of information which can be transmitted one according to the size limitation of a payload of a PUCCH is limitative, and thus, since RI/PMI/CQI, etc. necessary for the channel state information report are transmitted several times at various report time points, the IMR2 allocated at a specific time may be not suitable for the periodical channel state report.

In addition, a second method is to be used in order to select both the SU-MIMO and MU-MIMO through the aperiodic information. As mentioned above, since the aperiodic channel state report is performed by using the PUSCH, an amount of possible channel state report information is relatively high. Thus, information based on the IMR1 necessary for the SU-MIMO and information based on the IMR2 necessary for the MU-MIMO can be transmitted simultaneously. However, in this case, since a time and frequency resource necessary for the corresponding PUSCH transmission increases, it is possible to select which channel state information is selected, by enabling an RRC configuration. For example, in the case of information of 1 bit, "0" corresponds to the reporting of information on the basis of the IMR2 without overlappingly reporting the channel state information, and "1" corresponds to the reporting of the aperiodic channel status information and channel state information based on the IMR2 together with the IMR1 information. In the case of information of 2 bits, "0" may be configured as not reporting both the periodic/aperiodic channel state information with overlappingly reporting the cannel state information based on the IMR2; "1" may be configured as reporting of only the periodic channel state information overlappingly with the channel state information based on the IMR2; "2" may be configured as reporting of only the aperiodic channel state information overlappingly with the channel state information based on the IMR2; and "3" may be configured as reporting both the periodic/aperiodic channel state information overlappingly with the channel state information based on the IMR2.

When the channel state information based on the IMR1 and the IMR2 collide with each other, it is possible to select whether the corresponding information is based on the IMR1 or based on the IMR2 according to the number of IMR2s to which the UE is allocated. In the above-mentioned method, the periodic or aperiodic channel state report is transmitted by selecting the IMR1 or the IMR2 according to a previously defined priority or a configured bitmap. However, it can be determined through such selection whether to transmit information generated based on the IMR1 or to generate information generated based on the IMR2, using an equation similar to Equation 10.

$$\beta N^{DL}_{RB} \leq \text{the number of RBs that are scheduled with IMR2} \quad \text{Equation 10}$$

At this time, $\beta$ is a value defined in the criterion as above or configured through an RRC. The present method and the method using Equation 9 are different from each other in that the former mixedly uses information based on the IMR1/IMR2 in one channel state information report and the latter selects and uses one of the information based on the IMR1 or the IMR2. As an example, it is assumed that the wideband has the sufficiently large number of the IMR2s enough to satisfy Equation 9 and Equation 10. At this time, a small amount of IMR2s or no IMR2 may exist in a specific subband. In this case, in the method of Equation 9, information based on the IMR1 is transmitted to information of a specific subband, but in the method of Equation 10, without transmitting the corresponding information, and all information is transmitted based on the IMR2.

Figure 60:
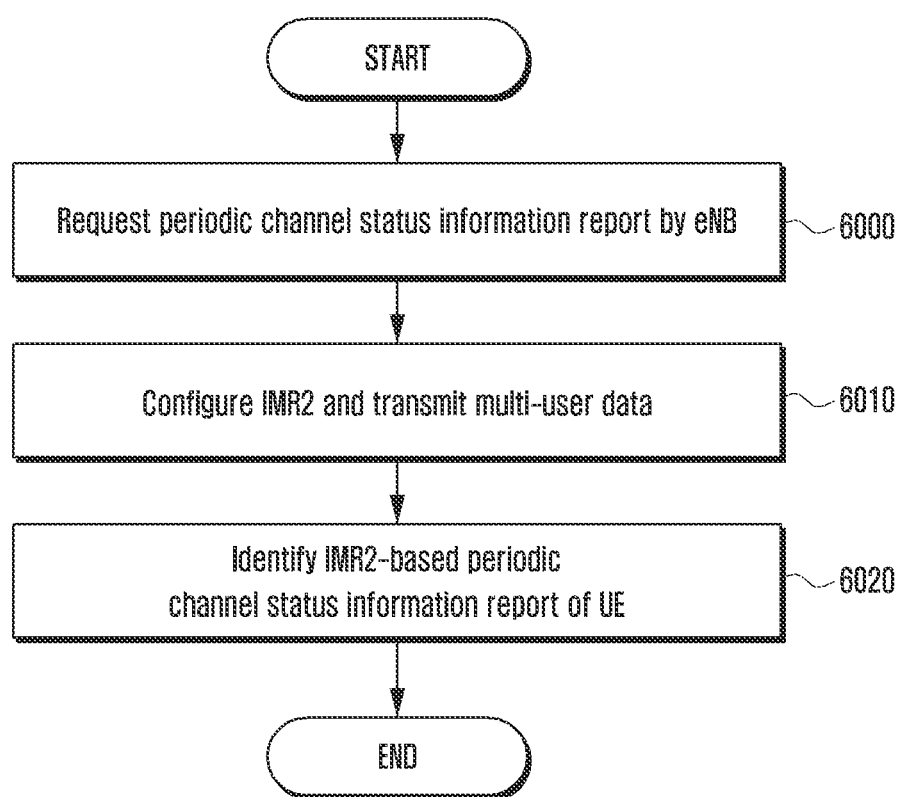
FIG. 60 is a view illustrating a method of receiving a report of periodic channel state information using an IMR2 from a UE by a BS according to an embodiment of the present disclosure.

FIG. 60 illustrates an operation of reporting periodic channel state information using an IMR2 from a BS to a UE according to an embodiment of the present disclosure. According to FIG. 60, in operation 6000 of FIG. 60, the BS identifies a situation in which a channel state information report configuring MU-MIMO interference is necessary, and configures and requests the position and frequency of the periodic channel status information report to the UE. Next, in operation 6010, the BS triggers the IMR2 of the UE through the DCI Format or the DL data transmission, and transmits the multi-user data for measuring the interference. Afterwards, in operation 6020, the BS identifies the channel status report that has been received on the basis of the IMR2 from the UE.

Figure 61:
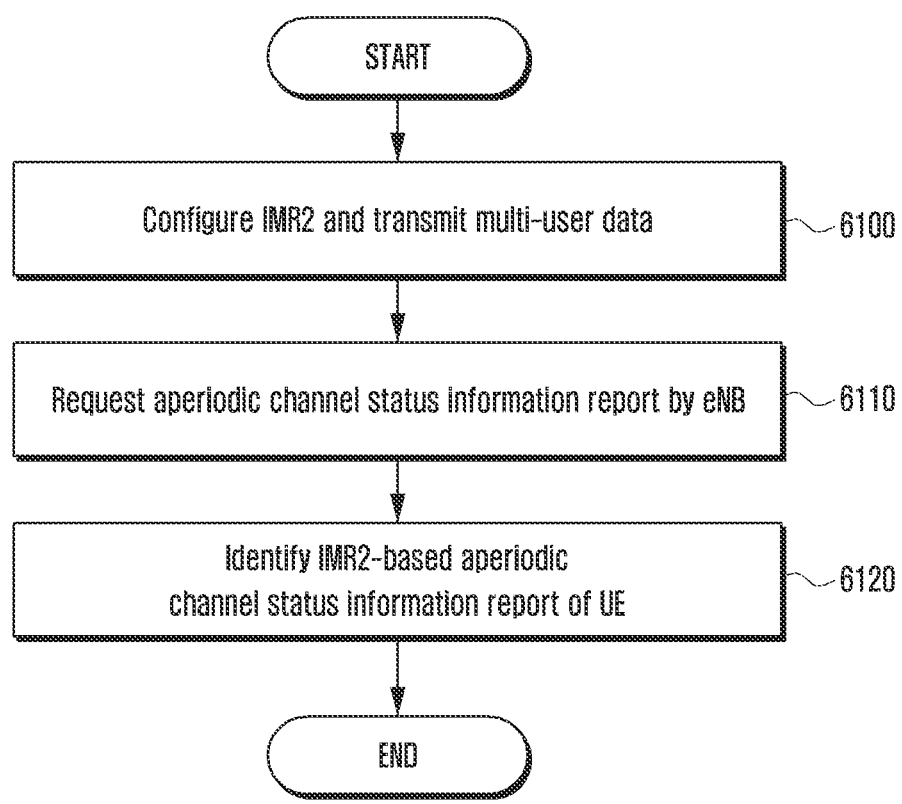
FIG. 61 is a view illustrating a method of receiving a report of non-periodic channel state information using an IMR2 from a UE by a BS according to an embodiment of the present disclosure.

FIG. 61 is a view illustrating a method of reporting aperiodic channel state information using an IMR2 from a BS to a UE according to an embodiment of the present disclosure. According to FIG. 61, in operation 6100 of FIG. 61, the BS configures the IMR2 together with data scheduling in the UE, and transmits multi-user data to other users. In operation 6110, the BS determines whether or not the aperiodic channel status information for the channel state information considering MU-MIMO interference is to be reported from the UE in consideration of various factors, such as the BLER of the UE DL data, the periodic channel status information report, the aperiodic channel status information report, the channel status information reports of other UEs, the loading of the current BS, or the like, and requests the aperiodic channel status report. In operation 6120, the BS receives, from the UE, the IMR2-based aperiodic channel status information configuring MU-MIMO.

Figure 62:
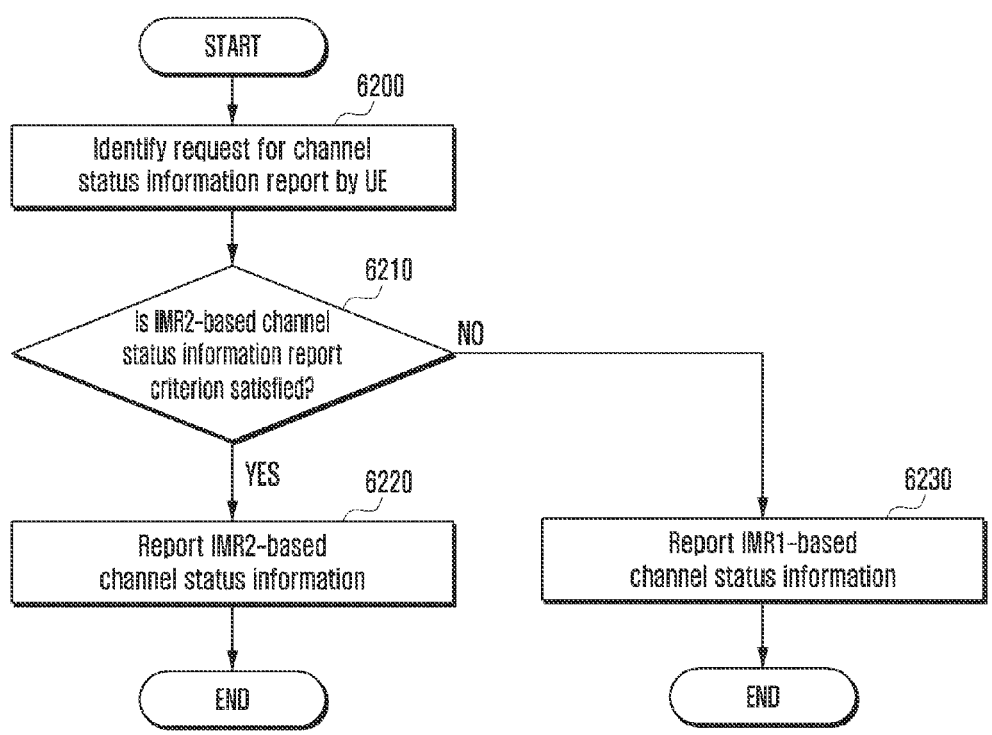
FIG. 62 is a view illustrating a method of reporting non-periodic channel state information using an IMR2 from a BS by a UE according to an embodiment of the present disclosure.

FIG. 62 is a view illustrating a method of reporting aperiodic channel state information using an IMR2 from a BS to a UE according to an embodiment of the present disclosure. In operation 6200 of FIG. 62, the UE receives a request for the periodic or aperiodic channel status information report from the BS according to an embodiment of the present disclosure. This operation may be performed through an RRC configuration or DCI. In operation 6210, the UE determines whether or not the criterion for the IMR2-based channel status information report is satisfied by considering the IMR2 trigger and the DCI parameters through the scheduling received from the BS. When the criterion is satisfied, the UE reports the IMR2-based channel status information according to the criterion in operation 6220. Otherwise, the UE reports the IMR1-based channel status information in operation 6230.

Figure 63:
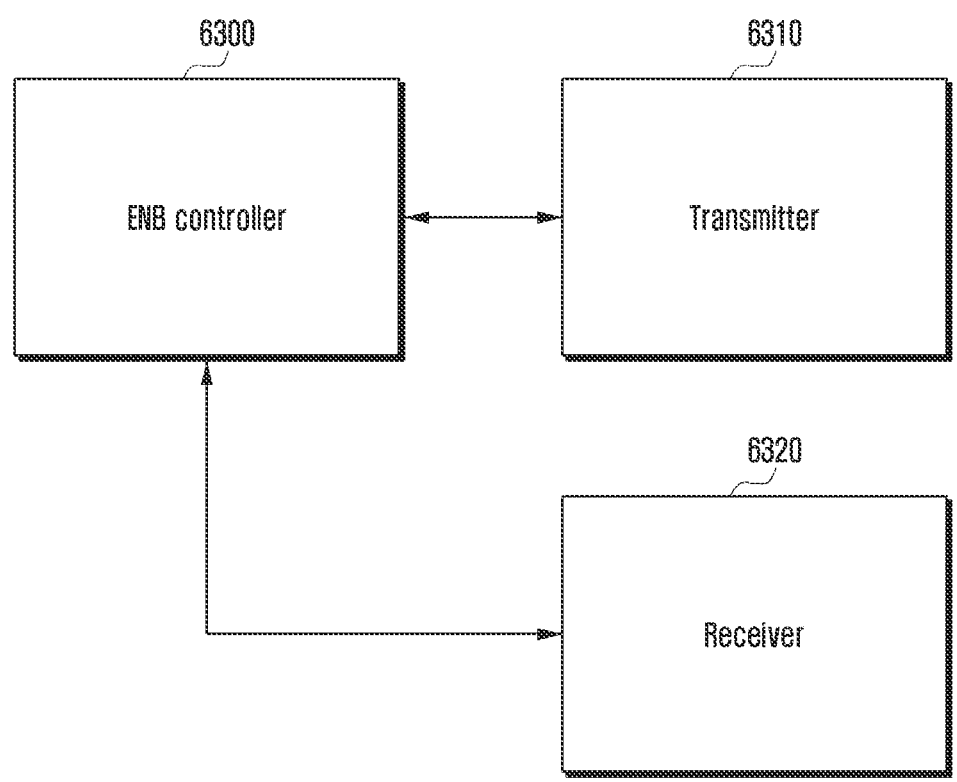
FIG. 63 is a block diagram illustrating a BS device which can perform the present disclosure according to an embodiment of the present disclosure.

FIG. 63 is a block diagram illustrating a BS according to an embodiment of the present disclosure.

Referring to FIG. 63, a BS controller 6300 configures the IMR2 information that is suitable for the MU-CSI in the UE through a transmitter 6310 by considering the periodic or aperiodic channel status information report, traffic, and the movement status of the UEs that are allocated to the BS. Afterwards, the BS controller transmits a channel status information report configuration and a trigger through the transmitter 6310. Thereafter, the BS notifies of the channel state information report configuration and the trigger using the transmitter 6310. The BS receives channel state information measured and reported by the UE, using a receiver 6320. The received channel status information is determined whether or not to be appropriate by the BS controller 6300, and then is utilized to manage the radio resources for the DL of the BS.

Figure 64:
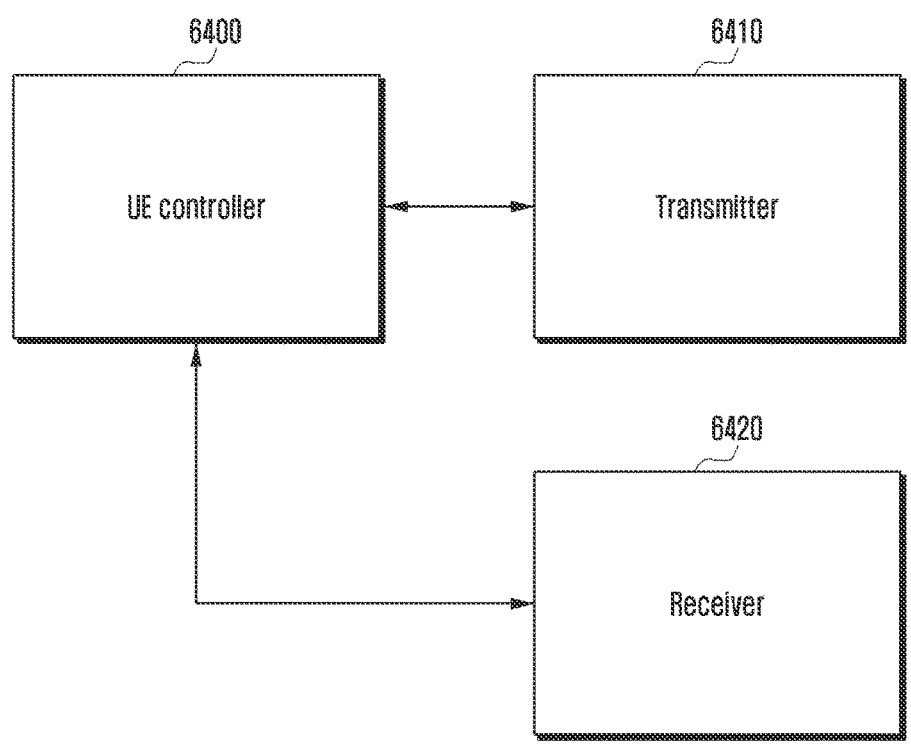
FIG. 64 is a block diagram illustrating a UE device which can perform the present disclosure according to an embodiment of the present disclosure.

FIG. 64 is a block diagram illustrating a UE according to an embodiment pf the present disclosure.

Referring to FIG. 64, a UE controller 6400 receives at least one of the scheduling information, the DCI, or the IMR2 information for the channel status information report from the BS by using a receiver 6420. Thereafter, the receiver 6420 of the UE receives the multi-user DL signal through the IMR2, and the UE controller 1400 creates the channel status information by using the same. The created channel status information is transmitted to the BS by using the transmitter 6410.

Embodiment 6

Access control technologies of UEs (mixedly used with a mobile station, a UE, etc.) according to the related art include ACM, SSAC, EAB, SCM, or the like. However, the conventional access control technologies cannot support an application-specific congestion control.

The present disclosure provides a method of sharing congestion control information between the UE and the network in order to make a congestion control for a specific application used in the UE. In addition, the present disclosure provides a method of defining a category for a specified application in order to thereby make a congestion control according to the category. In addition, the present disclosure provides a method for controlling the congestion for a specific application when the congestion control information is not shared between the UE and the network. In addition, the present disclosure provides a method of supporting the congestion control for a specific application in the roaming network when the UE is in the roaming mode. In addition, the present disclosure provides a method in which the congestion control for a specific application is not applied to a UE that has a high priority. In addition, the present disclosure provides a method in which the congestion control for a specific application is performed prior to the congestion control for each UE class. Furthermore, the present disclosure provides a method of controlling the congestion by applying the priority for a specific category, and a method of controlling the congestion for a specific application when sharing the network.

The congestion control for a specific application, in the present specification, may be determined according to the policy of a provider or local regulations. The congestion control is intended only to provide services in disasters, and the congestion control is able to control the congestion of the commercial services. The congestion control may be used as the similar concept to other functions capable of making a congestion control for each application, and the embodiments of the present disclosure may be used in a similar manner in overall wireless communications, such as WLAN, Bluetooth™, or Zigbee™, as well as the communication system described in the present disclosure.

In an embodiment of the present disclosure, the mobile communication provider may provide a UE with information on the congestion control for a specific application. This may be implemented by using the OMA standard of the management object (hereinafter, MO), or by using another method in which the network provider transmits configuration information to the UE.

The network provider may classify applications into at least five types in order to configure congestion control data that is to be transmitted to the UE, as shown in Table. 13

TABLE 13

| Application Type | Application Category |
|---|---|
| Public Safety | 1 |
| IMS service(e.g., VoLTE) | 2 |
| CS service (e.g., CSFB or SMSoSGs) | 3 |
| Normal Packet Data Service | 4 |
| Delay tolerant(e.g., MTC service) | 5 |

In the type of application, 'public safety' refers to applications that are used in disasters, or it may denote applications that are designated to be used through an emergency network. 'IMS service' refers to applications that use the VoLTE that is a voice/video call service using the LTE. 'Normal packet data service' refers to normal Internet services and D2D services for the UE, and it may include all packet data services that do not belong to the IMS service. 'Delay tolerant service' may include services that are not sensitive to a delay or services that have a low priority for the transmission, such as an MTC Service, applications that are used by a UE for the IoT or an MTC UE, or applications that are used by a UE that has a low priority class. In addition, other applications may be added. For example, a service that uses a CS domain, i.e., the CSFB service, an application that provides a service in which the UE, which uses a packet service, is able to make a call by using the circuit switched network, or an SMS (Short Message Service) may be added. The network provider may map the application category with the type of application, and may provide the configuration information thereof to the UE. Hereinafter, the provided information, in which the application category is mapped with the type of application by the network provider, is referred to as the "specific-application congestion control MO." The network provider may transmit the specific-application congestion control MO to the UE at any time, and if the internal policy or the local regulation is amended, the network provider may configure a new MO and may transmit the same for update. There may be the relative priority between the application categories. The sequence of the category shown in FIG. 1 indicates the relative priority between the applications (Category 1 has a highest priority). The information may be included in the NASMO to then be transmitted to the UE, or may be transmitted to the UE by using a separate MO, such as an ACDC MO.

Figure 65:
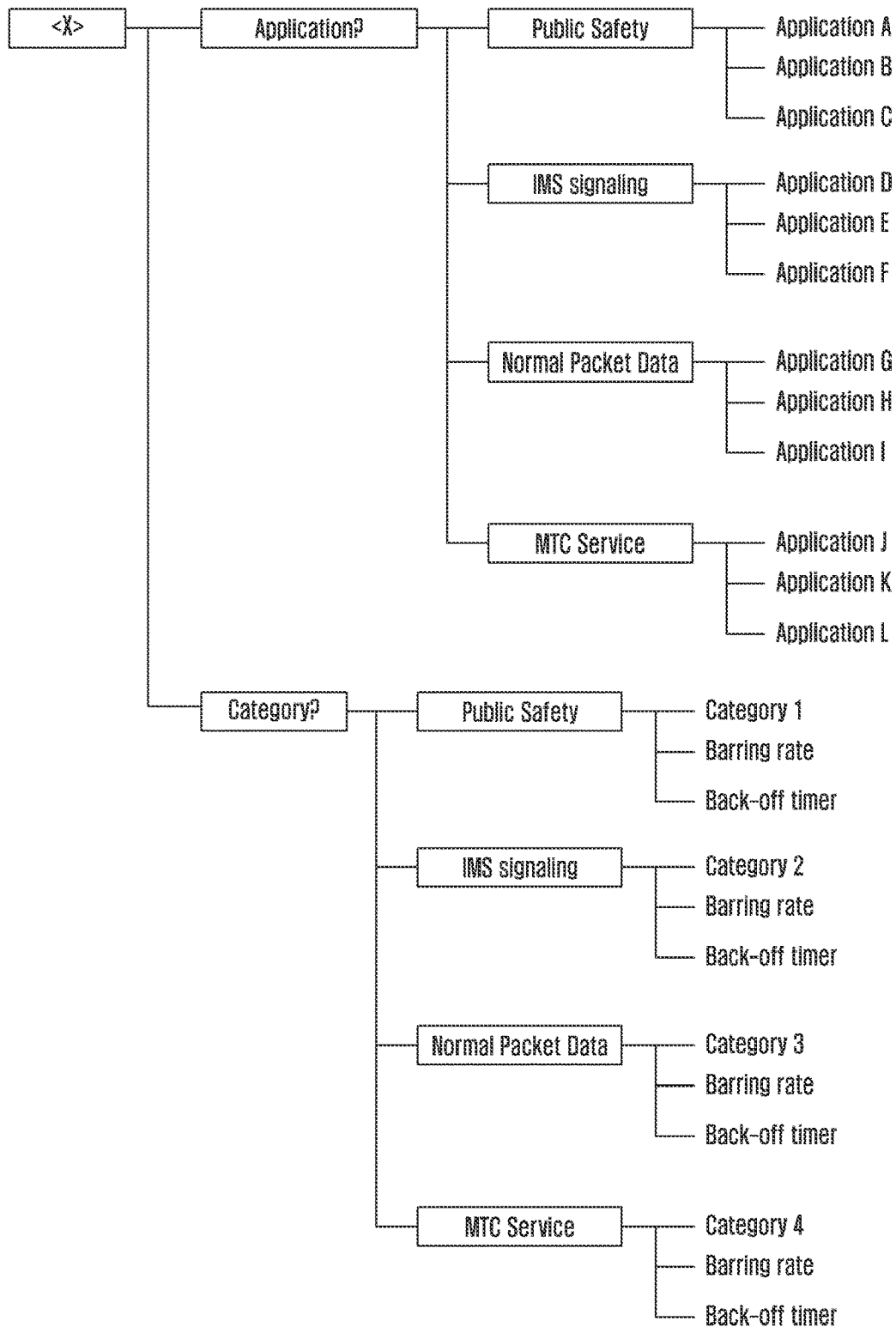
FIG. 65 is a view illustrating an example of a multiple output (MO) configuration for controlling congestion control for each specific application according to an embodiment of the present disclosure.

FIG. 65 is a view illustrating an example of an MO configuration for specific-application congestion control according to an embodiment of the present disclosure. The public safety, the IMS service, the normal packet data, the delay tolerant (hereinafter, referred to as an MTC Service), and the CS domain service of FIG. 65 may be replaced with each category name, and it is obvious that other application types and categories may be provided. The network provider may differentiate the congestion control level for each application category through an access barring rate (hereinafter, a barring rate) and a back-off timer (the Back-off Timer in the drawing). For example, Category 1 is allocated with a low barring rate, and Category 4 is allocated with a high barring rate so that the application corresponding to Category 1 is able to access the network with a higher probability. In addition, the back-off timer is provided together with the barring rate in order to thereby specify the time, for which the UE that has been barred from accessing the network is to wait for the next access trial, according to the category. The barring rate and the back-off timer may follow the policy of the network provider, the local regulation, or the policy of the corresponding country. The MO may determine the priority for each category as well. For example, Category 1 may be given the highest priority, and Category 4 may be given the lowest priority. According to this, if two or more applications of the UE try to access the network at the same time, it may be controlled such that the application of a higher priority is to be preferentially allowed. In this case, after the application of a higher priority performs the congestion control operation, the application of a next priority performs the congestion control operation.

Figure 66:
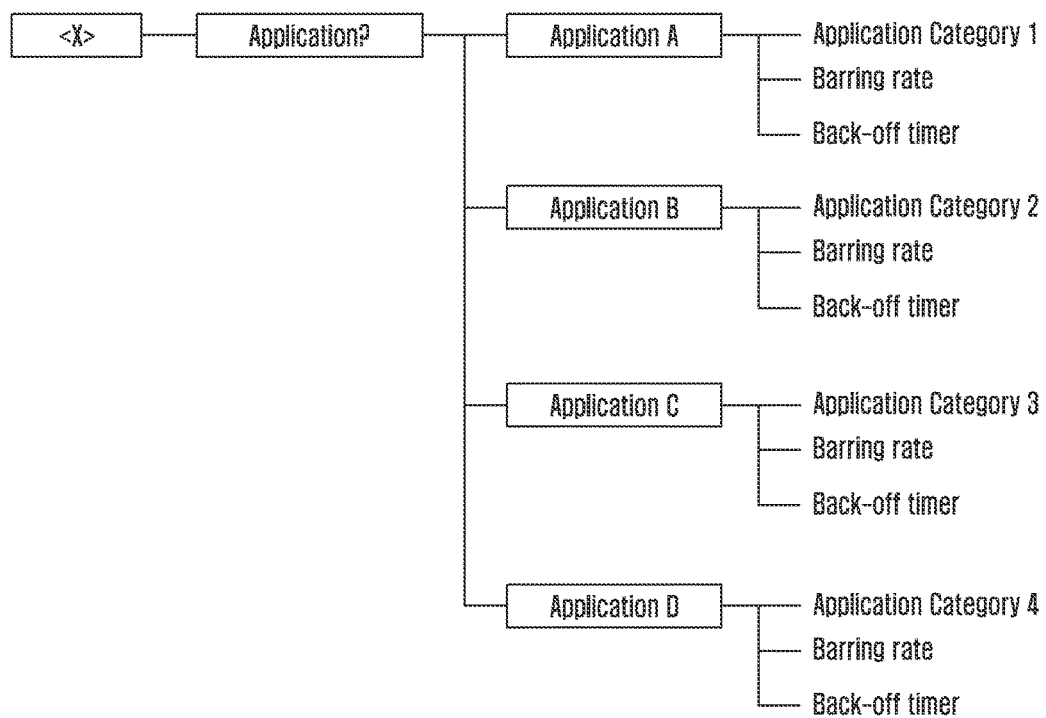
FIG. 66 is a view illustrating another example of an MO configuration for controlling congestion control for each specific application according to an embodiment of the present disclosure.

FIG. 66 is a view illustrating another example of an MO configuration for a specific application congestion control according to an embodiment of the present disclosure. According to the present disclosure, the network provider may express the type of application as an identifier for a specific application as shown in FIG. 66.

In the smart phone operating system (OS), all applications may have a unique identifier "OSAPP_ID" that is made by combining an OS ID and an application ID of the OS. For example, the application category information, in which the application "A" is specified with the "OSAPP_ID" of the application "A" in FIG. 66, may be included as an attribute in order to thereby provide the mapping information. It is obvious that the information is able to provide the barring rate or the back-off timer. Since the "OSAPP_ID" has a unique characteristic for each platform (or OS), the application identifier may be comprised of a pair of identifiers that indicate the platform or the OS as well as the "OSAPP_ID."

Figure 67:
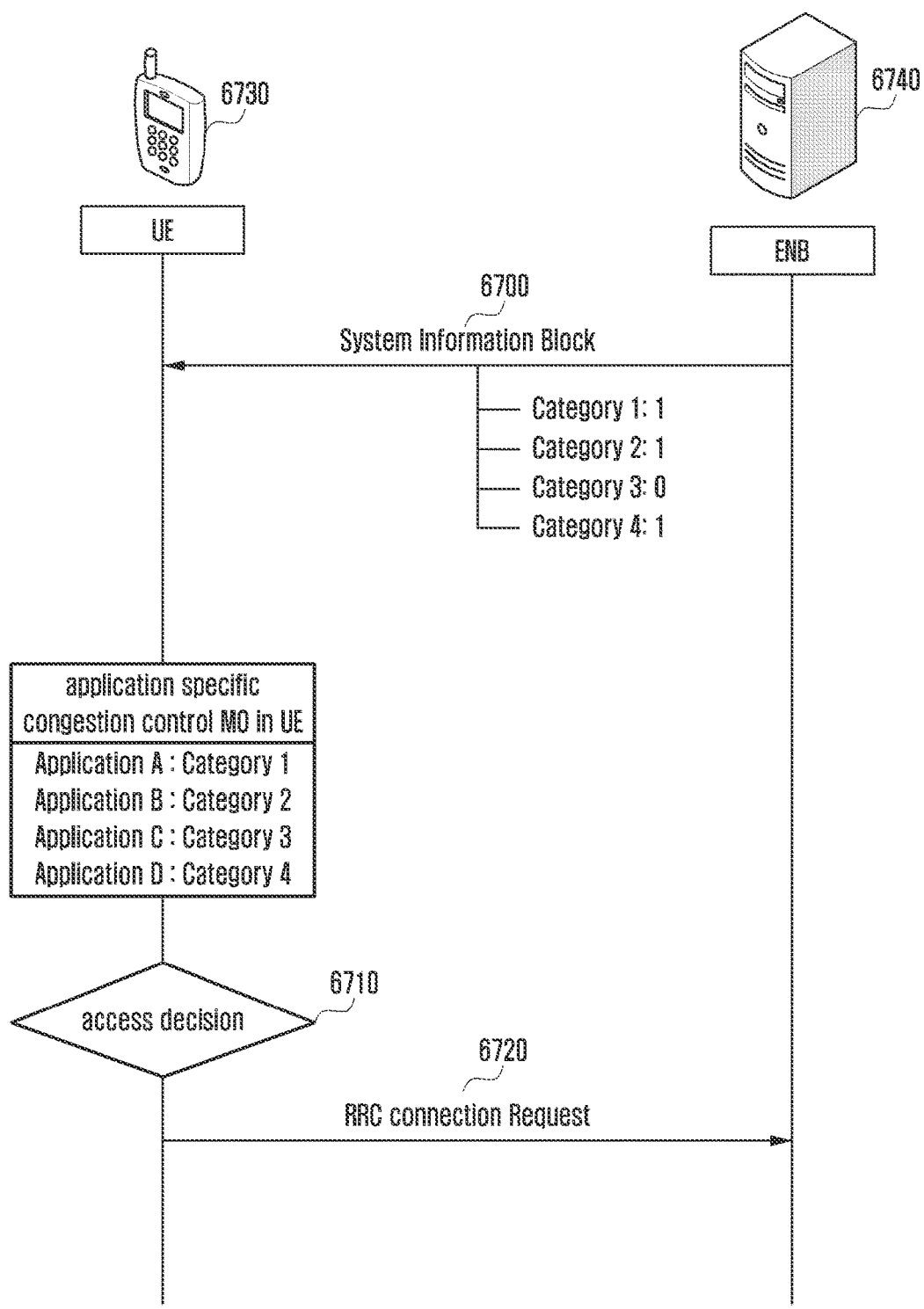
FIG. 67 is a flowchart illustrating an example of performing the present disclosure according to an embodiment of the present disclosure.

FIG. 67 is a flowchart illustrating an example according to an embodiment of the present disclosure.

Referring to FIG. 67, the network provider 6740 may recognize the congestion control information for each application category, by which the UE 6730 is controlled in the current cell, through system information 6700 that is broadcast by the BS 6740 (hereinafter, SIB). The SIB 6700 that is broadcast by the BS 6740 may express whether or not the congestion control for each application category is applied as a bit value of 0 or 1. The UE 6730 that has received the SIB 6700 may compare the same with the MO information received from the network provider, and if the application under the congestion control wishes to access the network, may make an access decision (as indicated by reference numeral 6710) by applying the barring rate in the MO information. If the UE 6730 fails to access the network, the UE 6730 triggers the back-off timer in the MO information, and does not try to access the network by the corresponding application until the timer expires. The operation of applying the barring rate is the operation in which the UE 6730 creates a random number and compares the same with the rate, and the access is determined to be allowed according to the result of the determination. For example, if the barring rate is 20%, and if a created random number that has a value between 0 and 1 is greater than 0.2, the access is determined to be allowed. Thereafter, when the access is allowed, the UE 6730 transmits an RRC connection request message 6720 to a BS 6740 (as indicated by reference numeral 6720).

Figure 68A:
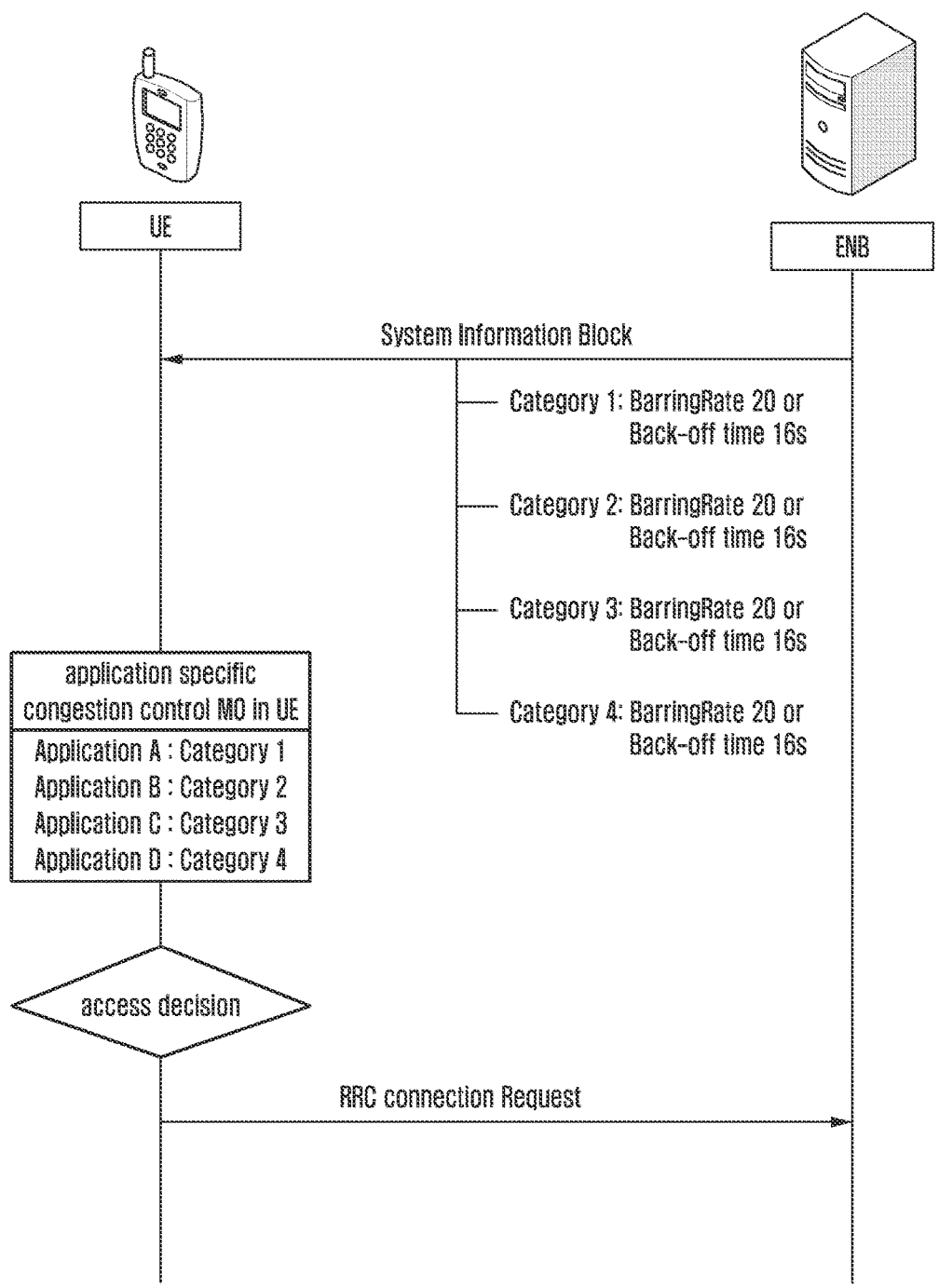
FIGS. 68A and 68B are flowcharts illustrating another example of performing the present disclosure according to an embodiment of the present disclosure.
Figure 68B:
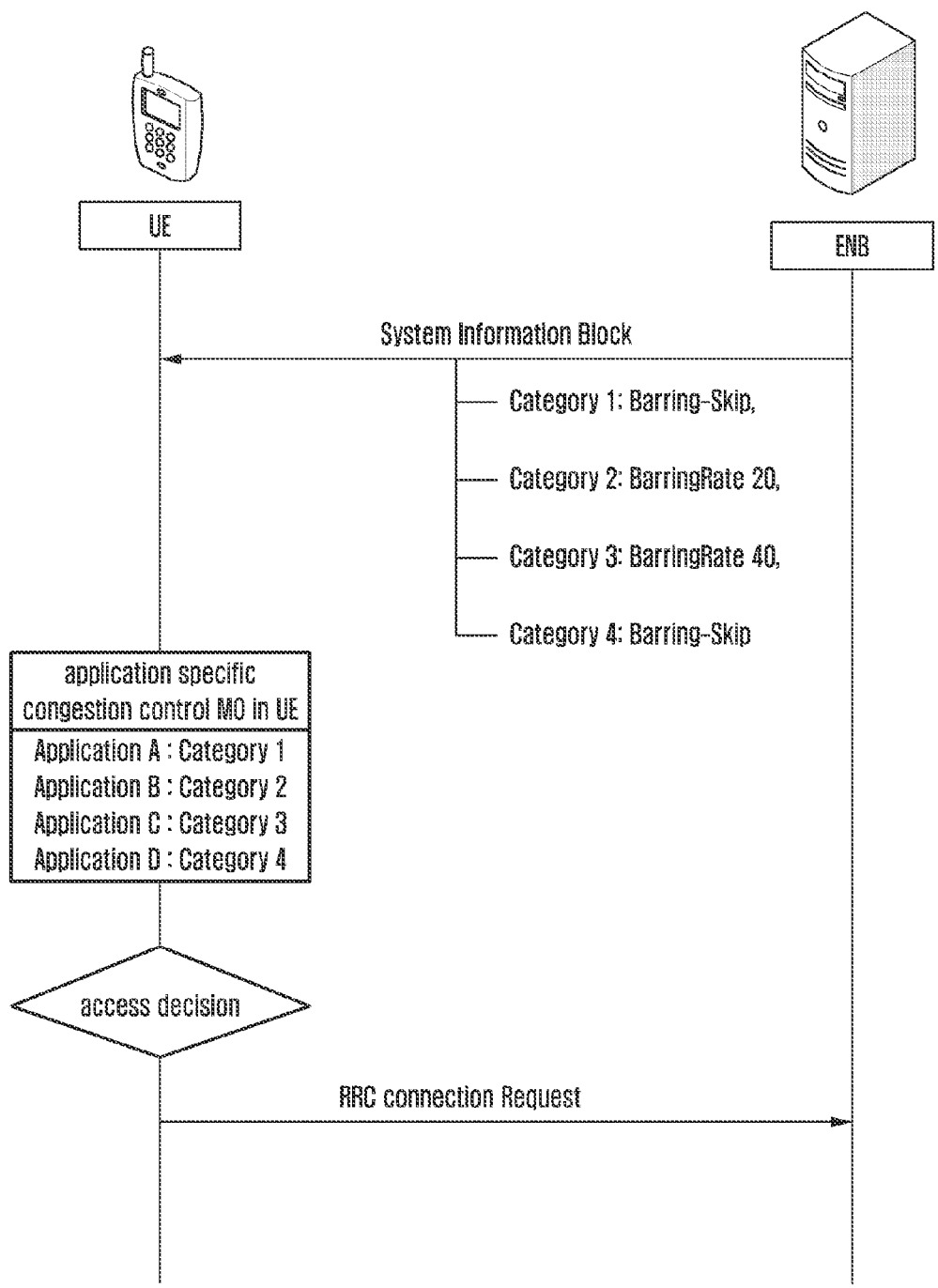

FIGS. 68A and 68B are flowcharts illustrating yet another example according to an embodiment of the present disclosure. According to the present disclosure, the network provider may not provide the access barring rate or the back-off timer to the UE. In this case, the UE may recognize the congestion control information for the category, which is received through the SIB information that is broadcast from the BS, by using only the application category information, in order to thereby make a congestion control as shown in FIGS. 68A and 68B. In this case, the congestion control information may be the barring rate or the back-off timer as shown in FIG. 68A, or may be an indication showing that the access barring is/is not conducted, such as the barring-skip of FIG. 68B. If the barring rate is given as CASE 1, the UE may identify the barring rate in the SIB information, which corresponds to the application category that the UE uses, to thereby create a random value, and may determine the network access according to the barring rate. If the indication showing that the access barring is/is not conducted is given as FIG. 68B, the UE may determine the network access according to the information on whether or not the congestion control is applied, which is contained in the SIB information that corresponds to the category of the application that the UE uses.

Figure 69:
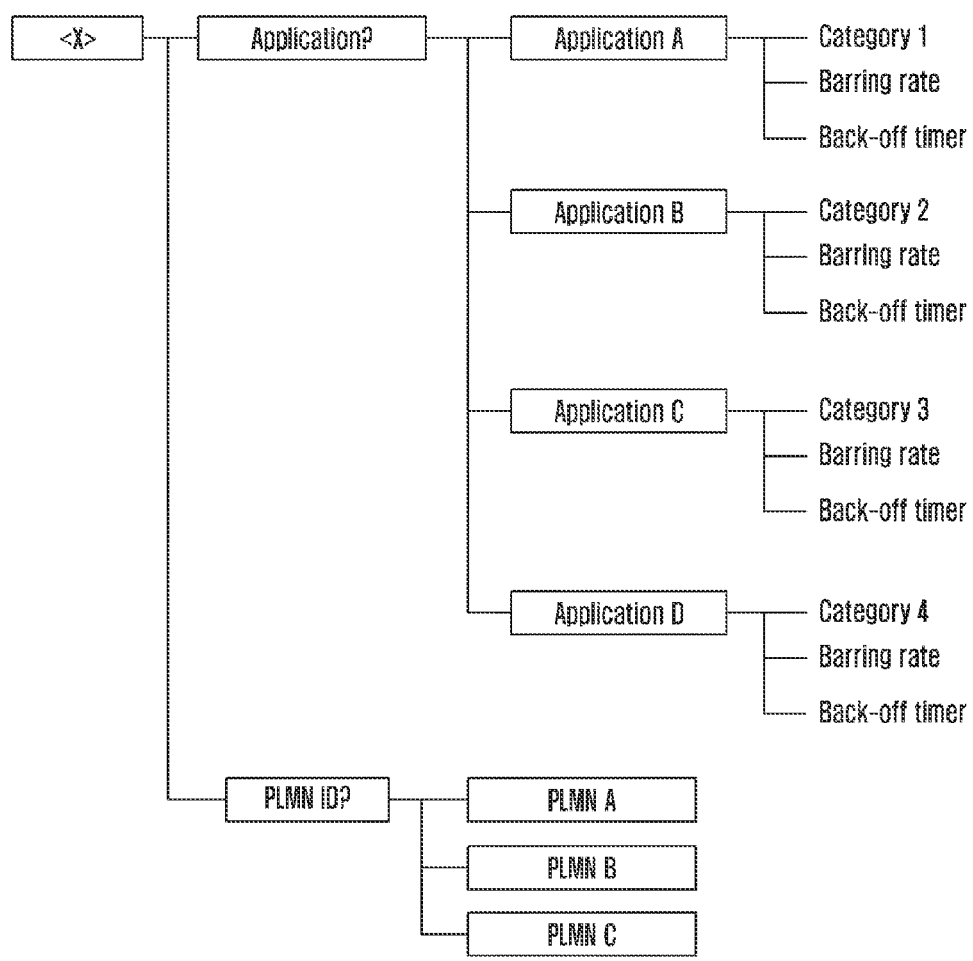
FIG. 69 is a view illustrating another example of an MO configuration for controlling congestion control for each specific application according to an embodiment of the present disclosure.

FIG. 69 is a view illustrating yet another example of an MO configuration for a specific application congestion control according to an embodiment of the present disclosure. According to the present disclosure, the network provider may provide the mapping information between the type of application and the application category together with public land mobile network (PLMN) information through the MO data as shown in FIG. 69. In this case, the UE may apply the MO information with respect to the network that has a PLMN ID provided together with the mapping information. For example, if a PLMN "A" network provider provides the UE with the category mapping information for the congestion control for a specific application together with the PLMN information, such as PLMN "B," or PLMN "C," the UE may use the corresponding information in the PLMN "B" network, or in the PLMN "C" network as well. It is obvious that the MO may include one or more pieces of category mapping information. The network provider may add an indication that shows whether or not the EPLMN is applied in order to use the same congestion control information in the EPLMN. Alternatively, the network provider may provide a PLMN ID for the EPLMN as well. In the case of the network provider that provides a shared network, the PLMN information that can be provided by the shared network may be included. If the network, to which the UE connects, does not belong to the PLMN "A," PLMN "B," or PLMN "C," the UE may determine that there is no specific-application congestion control MO, and the details thereof follow another embodiment of the present disclosure.

Figure 70:
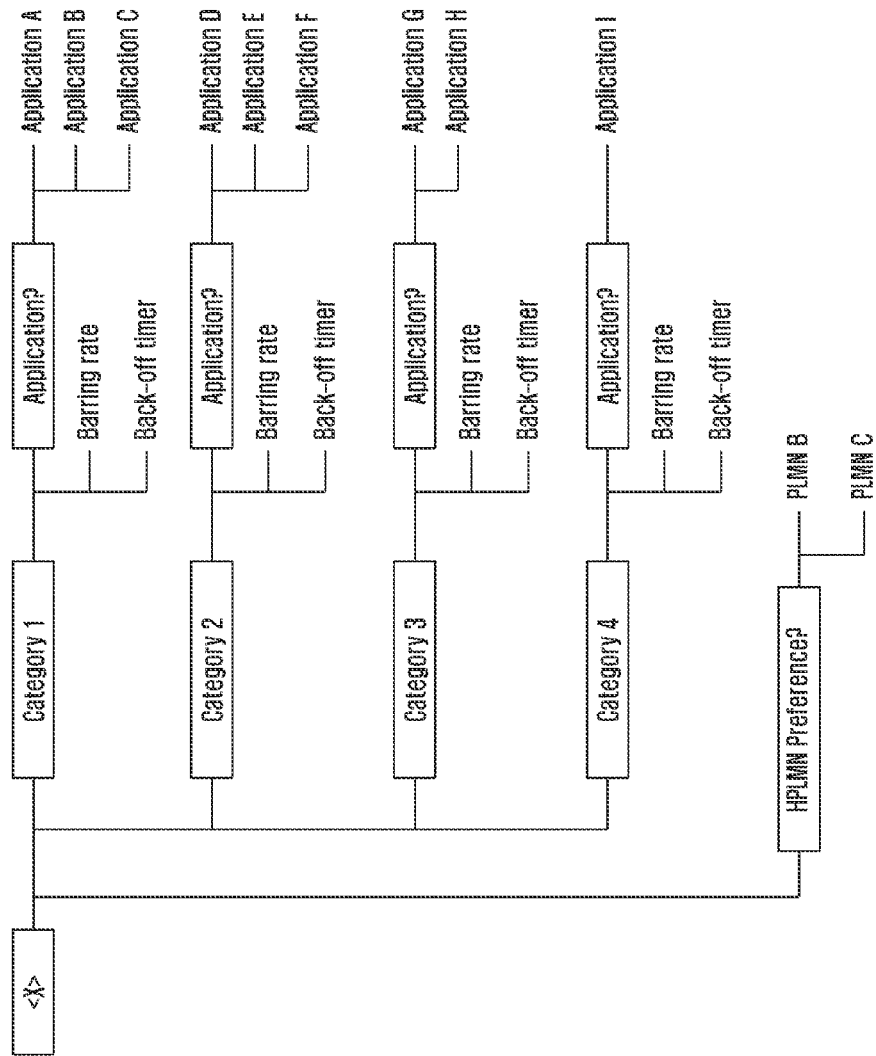
FIG. 70 is a view illustrating another example of an MO configuration for controlling a congestion control for each specific application according to an embodiment of the present disclosure.

FIG. 70 is a view illustrating yet another example of an MO configuration for a specific application congestion control according to an embodiment of the present disclosure. According to the present disclosure, the top-bottom relationship (or the node-leaf relationship) between the application ID and the application category may be configured to be changed in the specific-application congestion control MO, which is provided by the network provider, as shown in FIG. 70. The network provider may provide the application ID for each category, and the barring rate and the back-off timer for each category may be omitted. In addition, the network provider may provide information, such as a home PLMN (HPLMN) preference of FIG. 70 in order to use, in a visited PLMN (VPLMN), the information contained in the specific-application congestion control MO, which is provided by the HPLMN when the UE is in the roaming mode. The PLMN specified in the HPLMN preference means that the specific-application congestion control MO, which is received from the HPLMN, may be used in the network (e.g., the VPLMN) that provides the corresponding PLMN. If the HPLMN is not applied, it operates as if there is no specific-application congestion control MO in the network (e.g., the VPLMN) that uses another PLMN, and the details thereof follow another embodiment of the present disclosure. The HPLMN preference may be applied to the EPLMN as well, and in the case of the network provider that provides a shared network, it may represent that the same configuration is to be applied to the shared network. In addition, it is obvious that another indication rather than the HPLMN preference may be added.

Figure 71A:
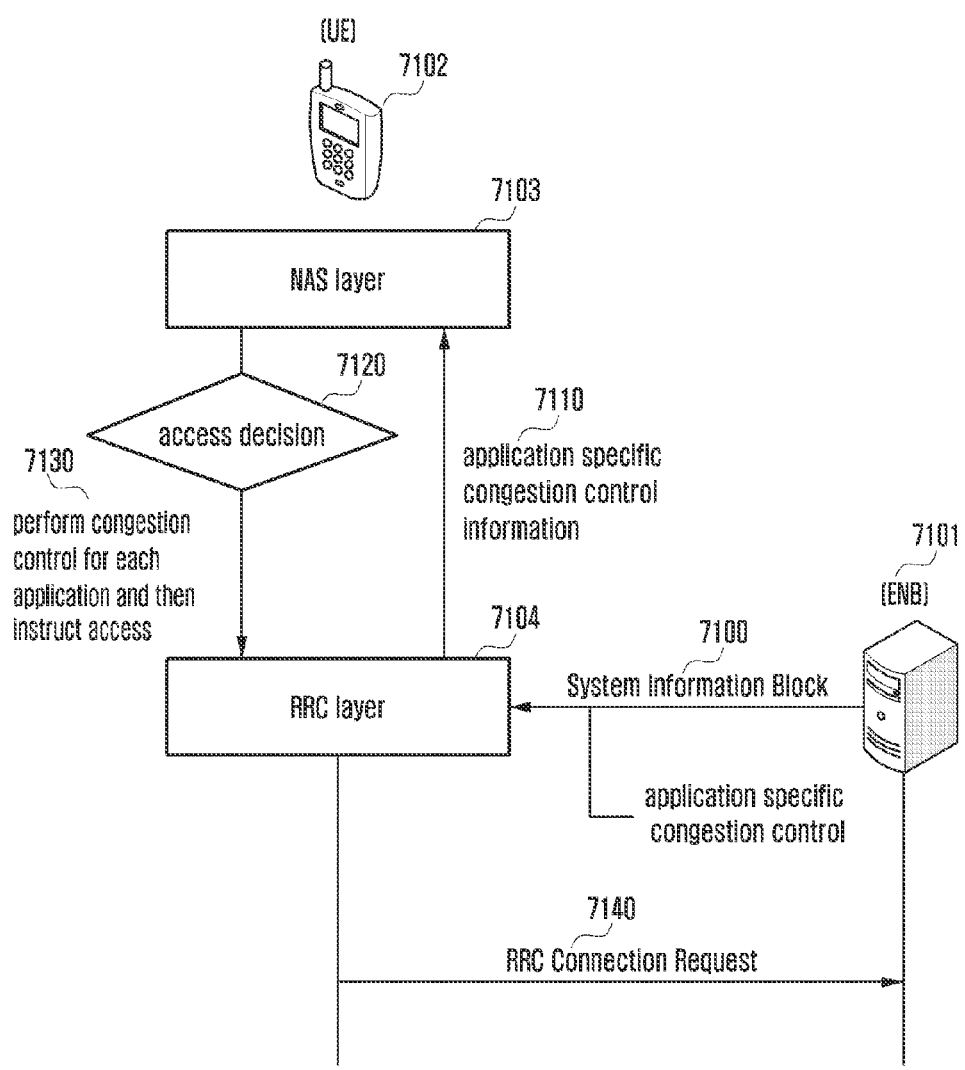
FIGS. 71A and 71B are views illustrating an internal operation of a UE applying a congestion control for each specific application according to an embodiment of the present disclosure.
Figure 71B:
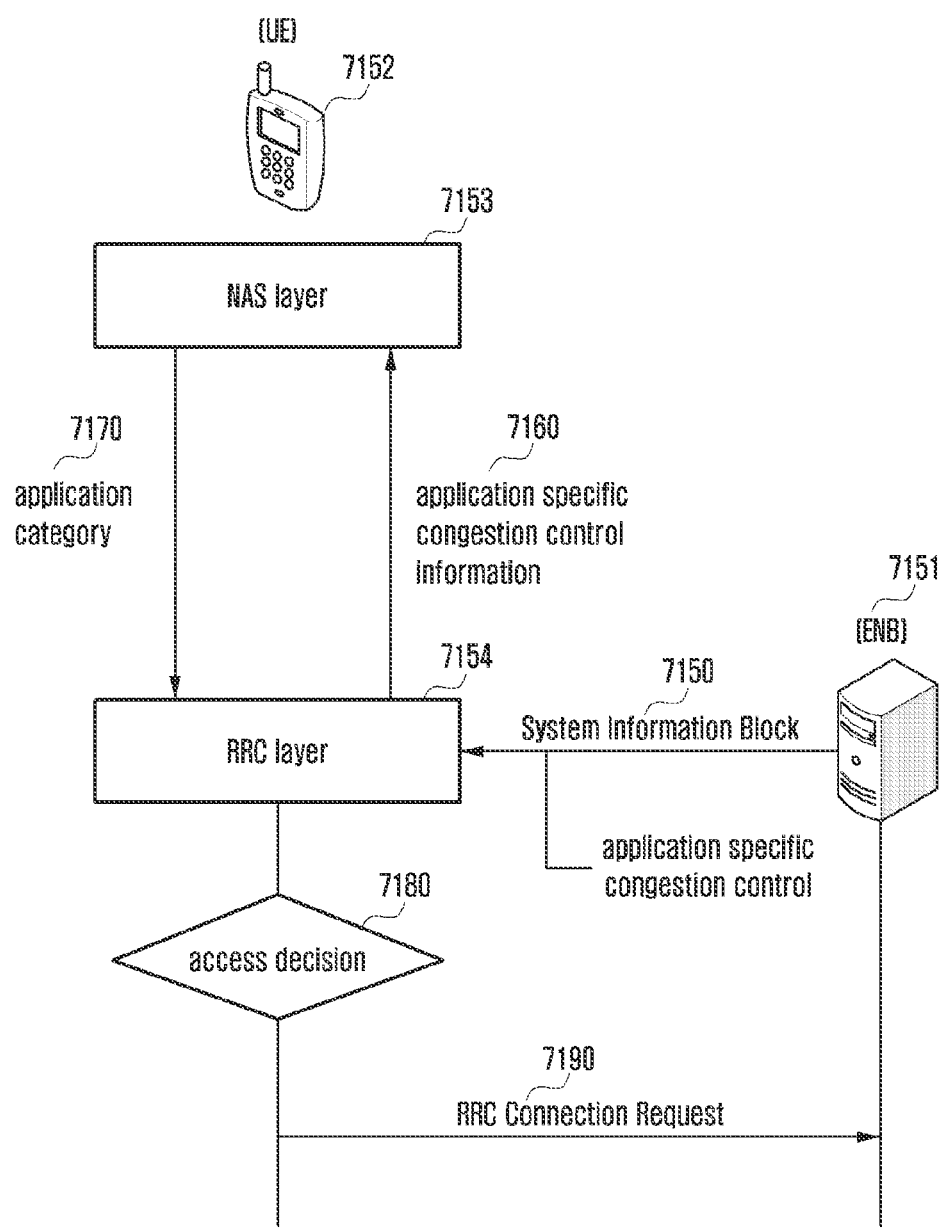

FIGS. 71A and 71B are views illustrating internal operations of a UE to which a specific application congestion control is applied according to an embodiment of the present disclosure. FIG. 71A shows an example in which the specific-application congestion control is performed in an NAS layer of the UE, and FIG. 71B shows an example in which the specific-application congestion control is performed in an RRC layer.

Referring to FIG. 71A, the RRC layer 7104, which has received the SIB information 7100 from the BS 7101 (as indicated by reference numeral 7100), transmits, to the NAS layer 7103, an indication stating that the specific-application congestion control is in progress in the BS 7101, or transmits, to the NAS layer 7103, the congestion control information for each application category, which is provided by the BS 7101 (as indicated by reference numeral 7110). The UE 7102 identifies the specific-application congestion control MO that is stored in the UE 7102 in the NAS layer 7103 that has received the same according to the application by which the user wishes to access the network, and makes an access decision (as indicated by reference numeral 7120). A random number is created according to the barring rate provided by the MO, and if the created random number satisfies the barring rate, the network access is performed. Alternatively, if the MO includes an indication that shows whether or not the network access is allowed without the barring rate, the network access follows the indication. When the UE 7102 fails to access the network according to the specific-application congestion control MO, the UE 7102 does not try to access the network for a specific period of time according to the back-off timer specified in the MO or according to back-off timer specified in SIB information 7100 that is transferred from the BS 7101 through the RRC layer 7104. The NAS layer 7103, which performs the network access according to the specific-application congestion control function and starts the network access, may transmit, to the RRC layer 7104, an indication stating that the network access is initiated after the specific-application congestion control is performed (as indicated by reference numeral 7130), and the indication may represent the category of the application by which the user wishes to access the network. In addition, this information may be transmitted to the RRC layer 7104 as the information of RRC Connection Establishment Cause. The RRC layer 7104 that has received the same may recognize the access request according to the specific-application congestion control, and may transmit an RRC Connection Request 7140 to the BS 7101 to thereby conduct the access operation.

Referring to FIG. 71B, the RRC layer 7154, which has received the SIB information 7150 from the BS 7151 (as indicated by reference numeral 7150), transmits, to the NAS layer 7153, an indication stating that the specific-application congestion control is in progress in the BS, or transmits, to the NAS layer 7153, the congestion control information for each application category that is provided by the BS 7151 (as indicated by reference numeral 7160). The NAS layer 7153 that has received the same recognizes the specific-application congestion control MO for the application requested by the user, and transmits the application category to the RRC layer 7154 (as indicated by reference numeral 7170). The RRC layer 7154 recognizes the application category received from the NAS layer 7153, and makes an access decision by applying the barring rate or the back-off timer, which is the congestion control information for each application category provided by the BS 7151 through the SIB 7150 (as indicated by reference numeral 7180). If the access is allowed, the RRC layer 7154 transmits an RRC Connection Request 7190 to the BS 7151, and if the access is failed, the RRC layer 7154 does not try to access the network according to the back-off timer, or follows the internal configured operation of the UE 7152. When the RRC layer 7104 transmits the RRC connection request 7140 to the BS 7101 in FIG. 71A or the RRC layer 7154 transmits the RRC connection request 7190 to the base station 7151 in FIG. 71B, the indication that indicates the RRC Connection resulting from the specific-application congestion control function may be transmitted. This may be an RRC Cause code, and may show the application category corresponding to the RRC Connection. If the BS 7101 or BS 7151 that has received the same refuses the corresponding RRC Connection due to the serious congestion, another back-off timer may be provided according to the application category indication that has been received together. For example, the BS 7101 or BS 7151 may not refuse the requested RRC Connection that includes an indication of the application category with respect to the public safety, and the BS 7101 or BS 7151 may refuse the requested RRC Connection that includes an indication of the application category with respect to the MTC and may provide the back-off timer of a large value. As described above, the differentiated services may be provided.

According to the present disclosure, a UE that supports the specific-application congestion control function may be applied with an operation in which the network performs the congestion control according to the access class of the UE, as well as the specific-application congestion control function. In this case, a method, in which the specific-application congestion control is carried out prior to the congestion control according to the access class and the congestion control according to the access class of the UE is not performed, follows the embodiment of the present disclosure. The provider network may provide numbers corresponding to the access class to each UE. In this case, numbers 0 to 9 are allocated to normal users, and numbers 11 to 15 are allocated to users of a high priority so that the user of a high priority is preferentially allowed to access the network in the congestion state. In the case of the normal user whose access class ranges from 0 to 9, the UE that performs the specific-application congestion control function may not apply the congestion control according to the access class, but may apply only the specific-application congestion control. In order to skip the congestion control according to the access class as set forth above, the UE determines whether the BS performs the access class congestion control or the congestion control for each application category on the basis of the SIB information that is broadcast by the BS. The access class congestion control information and the specific-application category congestion control information may be transmitted to the UE from the BS through different SIB information, respectively. If the SIB information that is broadcast by the BS contains the access class congestion control information and the specific-application category congestion control information, the UE may determine that the access class congestion control is not to be performed. More specifically, the UE recognizes the SIB information from the RRC layer, and informs the NAS layer that the specific-application congestion control function is in progress in the BS. According to the detailed embodiment 1, if the NAS layer performs the specific-application congestion control function, and if the network access is allowed, the NAS layer may transmit, to the RRC layer, an indication stating that the RRC Connection is to be initiated according to the execution of the specific-application congestion control function. The RRC layer that has received the indication may determine that the UE has already performed the specific-application congestion control function and does not perform the access class congestion control, and may skip the access class congestion control. Alternatively, according to the detailed embodiment 2, if the NAS layer transmits, to the RRC layer, an indication stating that the network access is to be conducted by using a specific application, the RRC layer, which recognizes that both the specific-application congestion control and the access class congestion control are applied to the BS, may perform the specific-application congestion control function based on the indication received from the NAS layer, and may not perform the access class congestion control. In addition, the RRC layer may not apply the specific-application congestion control function to the UE of a high priority. The high priority UE knows that the access class thereof ranges from 11 to 15, and may determine that both the access class congestion control and the specific-application congestion control are applied through the SIB information that broadcast by the BS. In this case, the high priority UE may apply only the access class congestion control function to enable the network access with a high priority, and may not perform the specific-application congestion control function. More specifically, since the RRC layer recognizes the access class of the UE, the RRC layer recognizes that the access class of the UE has a high priority (e.g., the access class of 11 to 15) and the BS applies both the access class congestion control function and the specific-application congestion control function, through the SIB information that is broadcast by the BS. The RRC layer may determine that the specific-application congestion control function is not performed because the UE has a high priority, and may apply only the access class congestion control in order to thereby access the network. In this case, the RRC layer may transmit, to the NAS layer that initiates a network access signal, an indication stating that the specific-application congestion control function has not been applied or an indication stating that the access class congestion control has been preferentially applied. In the embodiments above, the access class congestion control includes the 3GPP standard in the name of Access Class Barring.

Figure 72:
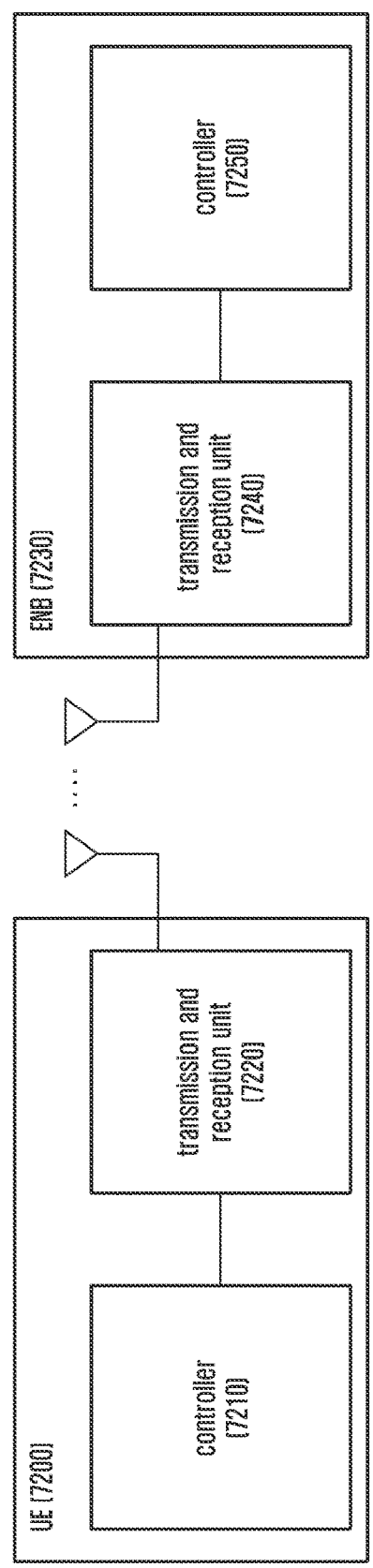
FIG. 72 is a block diagram illustrating a structure of a UE and a BS which can implement the preset disclosure according to an embodiment of the present disclosure.

FIG. 72 is a block diagram illustrating a structure of a UE and a structure according to an embodiment of the present disclosure. According to FIG. 72, a UE 7200 includes a controller 7210 and a transmission/reception unit 7220. The transmission/reception unit is controlled by the controller to transmit/receive a signal to/from the BS. The controller can control the transmission/reception unit to receive information for congestion control for a specific application included in the SIB information from the BS or receive information for a congestion control for a specific application from a server of a provider, and transmit an RRC connection request message for an RRC connection. Information relating to congestion control for a specific application between the RRC layer and the NAS layer and information relating to an access class can be transmitted. Further, whether to access a network can be determined on the basis of other pieces of other access blocking related information, such as the information relating to congestion control for a specific application and the information relating to an access class. Further, the detailed description accords with an embodiment of the present disclosure. The BS 7230 includes a transmission/reception unit 7240 and a controller 7250. The controller can control the transmission/reception unit to transmit SIB information and receive the RRC connection request message from the UE.

Embodiment 7

Hereinafter, various embodiments of the present disclosure will be described with reference to the accompanying drawings. It should be noted that the same elements are designated by the same reference numerals, if possible, in the accompanying drawings. Further, a detailed description of known functions and configurations which may make the subject matter of the present disclosure unclear will be omitted.

Further, although the following description of embodiments of the present disclosure will be directed to a radio access network (RAN) based on the 3GPP standard, and LTE and evolved packet core (EPC) that are core networks, it can be understood by those skilled in the art that the main gist of the present disclosure may also be applied to any other communication system having the similar technical background and channel format, with a slight modification, without substantially departing from the scope of the present disclosure.

Those skilled in the art can appreciate that it is possible to implement the present disclosure in other particular forms without changing the technical idea or the essential features of the present disclosure. Accordingly, it should be understood that the embodiments described herein are merely illustrative and are not limitative in all aspects.

In the various embodiments of the present disclosure, all operations and messages may be selectively performed or may be omitted. In addition, the operations in each embodiment do not need to be performed in sequence, and the order of the operations may vary. The messages do not also need to be delivered in sequence, and the order of delivery of the messages may vary. Each operation and each message transfer may be performed independently.

All or some of the matters illustrated in the embodiments are intended to help the understanding of the present disclosure by specifically showing embodiments of the present disclosure. Accordingly, the details of the matters can be considered the representation of a part of the method and apparatus proposed in the present disclosure. That is, a semantic approach to the matters illustrated in the embodiments may be preferred, rather than a syntactic approach. In other words, the embodiments of the present disclosure shown and described in the specification and the drawings are merely particular examples presented in order to easily explain the technical details of the present disclosure and to help the understanding of the present disclosure, and are not intended to limit the scope of the present disclosure. That is, it will be apparent to those skilled in the art that different modifications and changes may be made based on the technical idea of the present disclosure.

Multiple pieces of UE, referred to as mobile station or UE) can use a broadcasting resource considering the efficiency of resource usage, particularly when transmitting a message to the UE belonging to a certain group. For the message delivery using a broadcast resource (particularly, according to the 3GPP standards, message delivery through MBMS transmission), a UE needs to acquire MBMS-related information (MBMS service description), and a network needs to activate an MBMS bearer. The present disclosure sets forth a method of acquiring MBMS related information by UE and activating an MBMS bearer by a network.

Figure 73:
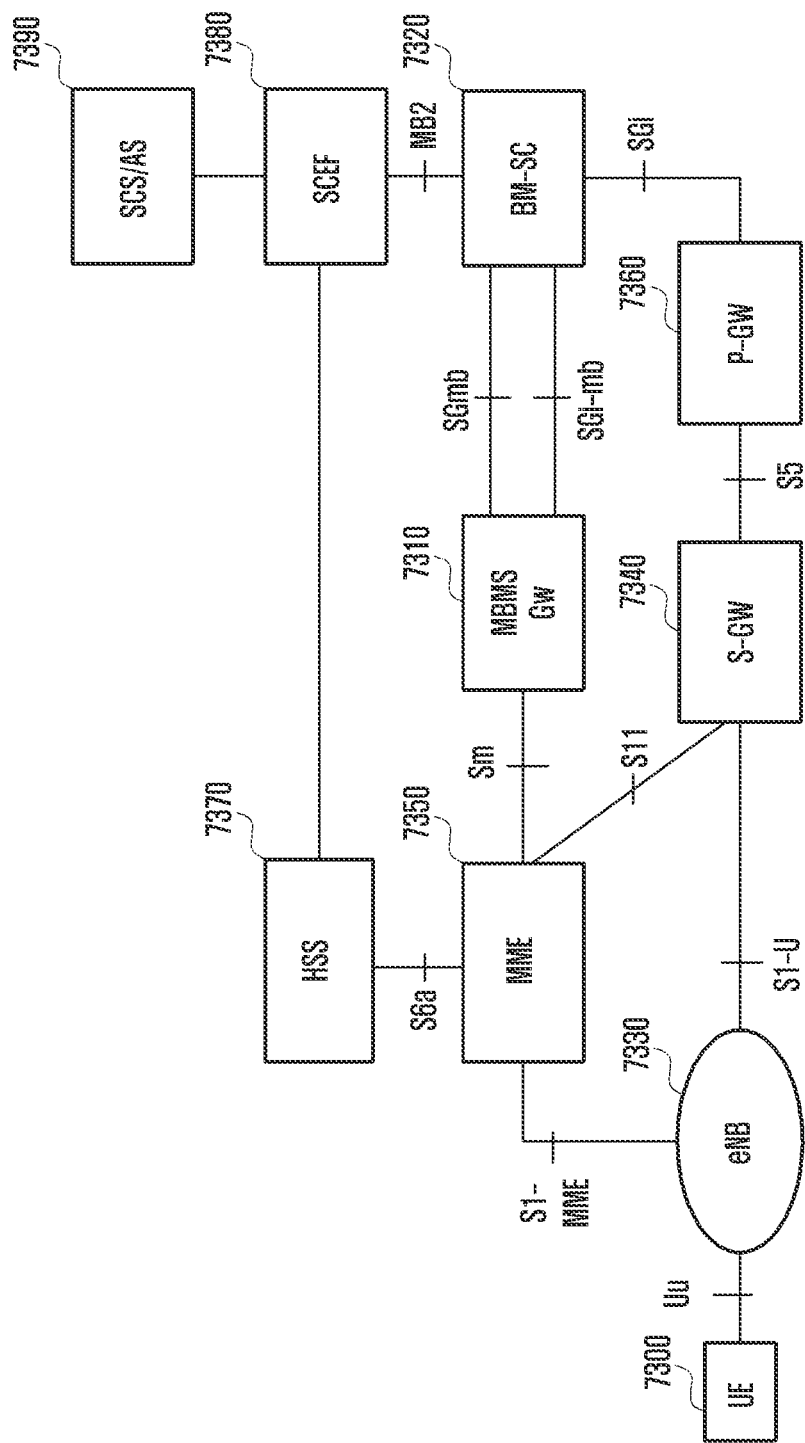
FIG. 73 is a view illustrating a network structure according to an embodiment of the present disclosure.

FIG. 73 illustrates a network structure according to an embodiment of the present disclosure. Referring to FIG. 73, as illustrated above, a radio access network comprises a next generation BS (referred to as evolved node B, BS, E-UTRAN, RAN node, and the like, hereinafter, eNB) 7330, a mobility management entity (MME) 7350, and a serving-gateway (S-GW) 7340. UE 7300 is connected to an external network through the eNB, the S-GW 7340, and the P-GW (packet data network (PDN)-gateway) 7360. The UE 7300 creates a packet data network (hereinafter, PDN) connection in order to transmit/receive data through the P-GW 7360, and a PDN connection is available through one or more evolved packet system (EPS) bearers.

The eNB 7330, the RAN node, corresponds to an RNC of a UTRAN system and a BSC of a GERAN system. The eNB 7330 is connected to the UE 7300 through a radio channel (Uu interface) and performs a similar role as the existing RNC/BSC. In LTE, since all the user traffic including a real-time service such as VoIP through Internet Protocol is serviced through a shared channel, a device which collects state information of UEs 7300 for scheduling is required and the eNB 7330 is responsible for this task.

The S-GW 7340 is a device for providing a data bearer, and creates or eliminates a data bearer according to the control of an MME 7350. The MME 7350, a device responsible for various control functions, may be connected to a plurality of eNBs 7330. A home subscriber server (HSS) 7370, the database of the network, stores key information for authorization of each UE 7300 and a profile of a subscriber.

At this time, when providing an MBMS service to UE 7300, a broadcasting/multicast service center (BM-SC) 7320 performs an authorization verification and a service start, and performs scheduling and transmission considering service quality for a MBMS content. The BM-SC 7320 may transmit an access broadcasting content through LTE network and may interwork with an external content provider to transmit the broadcasting content. The BM-SC 7320 is connected with the MBMS gateway (MBMS-GS) 7310 through the SGmb interface for control message transmission and connected through the SGi-mb interface for content (user traffic) transmission. The MBMS-GS 7310 transmits the content to the eNB 7330 using an IP multicast transmission scheme. The MBMS-GS 7310 is connected with the MME 7350 for control message transmission regarding a session and connected through an M1 interface for the content transmission to the eNB 7330.

Service capability exposure function (hereinafter, SCEF) 7380, which is a function for safely exposes 3GPP network to an external server, receives a message from an external server (SCS/AS, hereinafter, SCS/AS) and performs a task such as communicating with a 3GPP network object including the HSS 7370 and BM-SC 7320 etc., in order to control a UE 7300 group. In the present specification, the service capability exposure function (SCEF) may be refer to a machine type communication interworking function (hereinafter, MTC-IWF) and the SCEF above. The SCS/AS 7390 signifies an external server out of the 3GPP network. However, even when the SCS/AS 7390 is out of the 3GPP network, it is obvious that the present embodiment may be applied thereto. The SCS/AS 7390 may signify the MTC server.

Figure 74:
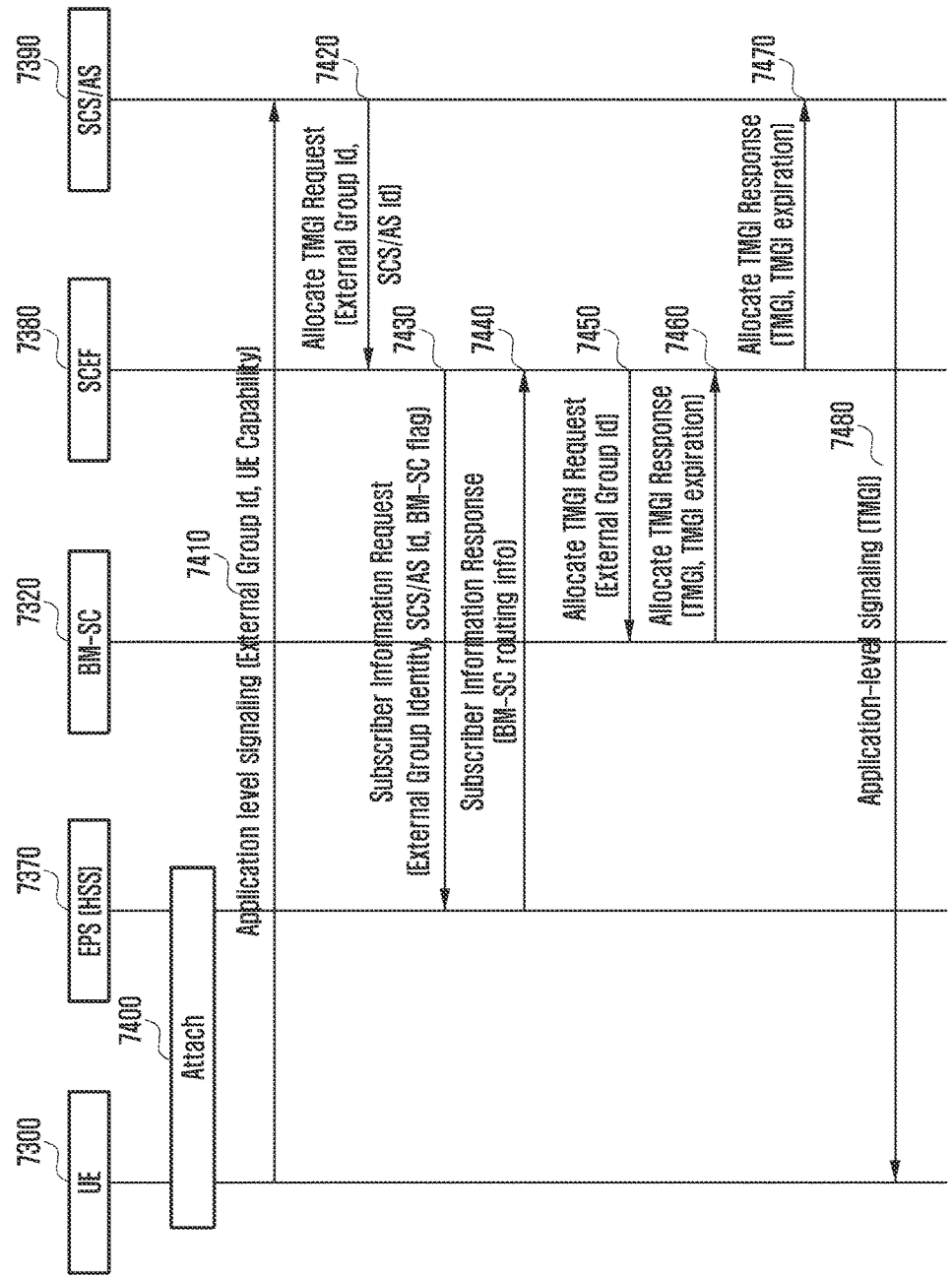
FIG. 74 is a view illustrating a method of previously sharing a multimedia broadcast multicast service (MBMS) group identifier to be received by a UE with a network when the network transmits a message to multiple UEs using an MBMS service according to an embodiment of the present disclosure.

FIG. 74 illustrates a method for pre-sharing MBMS related information to be received by UE 7300 with a network, when the network transmits a message to multiple pieces of UE using MBMS service according to an embodiment of the present disclosure.

Referring to FIG. 74, in operation 7400, UE 7300 can acquire PDN connectivity through an attach stage. Alternatively, the UE may acquire the PDN connectivity using other methods. For example, the UE may acquire the PDN connectivity through Wi-Fi. In operation 7410, the SCS/AS 7390 may acquire an identifier of a group in which the UE 7300 is included (hereinafter, an external group ID), position of the UE (cell identifier and/or MBMS service area identifier) and/or information on the UE capability through the UE 7300 and application level signaling (referred to as application signaling). The SCS/AS 7390 which identifies the support of the MBMS by the UE capability of one or more pieces of UE 7300 and identifies that the concentration of the UEs 7300 is significant enough for the message transmitted through MBMS transmission to a certain area to be efficient, may determine to perform to transmit the message through the MBMS transmission to the UE 7300 belonging to the corresponding group. Accordingly, allocation of a temporary mobile group identifier (TMGI) used during the MBMS transmission may be required in the operation hereinafter. In operation 7420, the SCS/AS 7390 may transmit a message requesting for TMGI allocation (allocate TMGI request message). If pre-allocated TGMI is provided, the SCS/AS 7390 may use the pre-allocated TMGI (in this case, operations 7420 to 7470 may not be required to be performed). The SCS/AS 7390 may perform a domain name system (DNS) query using an external group ID or use preconfigured information in order to determine Internet Protocol (IP) address and/or a port number of the SCEF 7380 to which the allocate TMGI request message is transmitted. The SCS/AS 7390 may store the external group ID, the IP address of the SCEF 7380, and/or the port number. The allocate TMGI request message may include the external group ID, priority information, and/or an SCS/AS identifier (SCS/AS ID). The priority information may be used to indicate the level of importance of a corresponding external group, and the SCEF 7380 may first process the TMGI allocation request with regard to the external group having a high priority. The SCEF 7380 may perform an authorization process using the SCS/AS ID. Said authorization process may include a process for determining whether the SCS/AS 7390 indicated by the SCS/AS ID is qualified to request the TMGI. In addition, an external group ID may be used in the authorization process. The authorization process may include a process to determine whether the group indicated by the external group ID is qualified to be allocated for TMGI.

The authorization process may include a process to determine the qualification of the corresponding entity which can be identified by the SCS/AS IS and/or the qualification of the corresponding group which can be identified by the external group ID. In addition, the HSS 7370 and/or a group management server may be involved in the authorization process. In more detail, the SCEF 7380 may transmit information necessary for the authorization process (SCS/AS ID and/or external group ID) to the HSS 7370 and/or the group management server. The HSS 7370 and/or the group management server which received the information may determine whether the corresponding SCS/AS 7390 and/or the corresponding external group are qualified to request the TMGI.

In operation 7430, SCEF 7380 transmits a subscriber information request message and transmits the external group ID, SCS/AS ID, and/or a BM-SC flag, to the HSS 7370. The BM-SC flag may be used to indicate that the subscriber information request message is a message for requesting routing information (for example, BM-SC identifier and BM-SC IP address) on the BM-SC 7320. If a new message for requesting the routing information of BM-SC is defined, the BM-SC flag may not be included.

Next, in operation 7440, the HSS 7370 may transmit, to the SCEF 7380, the BM-SC routing information included in a subscriber information response message as a response to the subscriber information request message In addition to the method of directly acquiring the BM-SC routing information through the HSS 7370 described above, the SCEF 7380 may determine the existence of the connectivity with the BM-SC 7320 on the basis of serving PLMN information of the UE 7300 belonging to the corresponding external group. The method of acquiring the serving network information by the SCEF 7380 may correspond to at least one of the followings:

First, the UE 7300 may provide serving network information to the SCS/AS 7390, and the SCS/AS 7390 may transmit the serving network information to the SCEF through the this operation.

Second, the SCEF 7380 may query the serving network information of the corresponding external group to the HSS 7370 and/or the group management server. For example, the HSS 7370 acquired the external group ID from the SCEF 7380 through operation 7430 may transmit, to the SCEF 7380 through operation 7440, information of the network in which the UEs 7300 corresponding to the external group ID and/or most of the UEs 7300 corresponding to the external group ID are served.

Third, the serving network information may be acquired using mapping information between the serving network and the external group ID, preconfigured in the SCEF 7380.

The SCEF 7380 may determine the existence of capability in usage of an MB2 interface which is the interface in the BM-SC 7320, the SCEF 7380, and the BM-SC 7320 associated with the corresponding network (PLMN), on the basis of the serving network information. For example, the SCEF 7380 may use mapping information between the serving network and the BM-SC routing information, preconfigured in the SCEF 7380.

In operation 7450, the SCEF 7380 may request TMGI allocation from the BM-SC 7320. At this time, the allocate TMGI request message may transmit the desired number of TMGI for allocation, the external group ID, the SCS/AS ID and/or priority information. The BM-SC 7320 may perform the authorization process for TMGI allocation. The authorization process may be performed associated with the corresponding SCEF 7380, the PLMN to which the corresponding SCEF 7380 belonging, the external group and/or the SCS/AS.

If the authorization process is successful, in operation 7460, the BM-SC 7320 may transmit the allocate TMGI response message including a set of at least one TMGI and/or TMGI expiration information corresponding to the TMGI as the response to the allocate TMGI request message. At this time, the external group ID and/or the priority information having been received may be considered. As the level of the priority is higher, the expiration period of the TMGI may be longer. On the basis of information received from the BM-SC 7320, the SCEF 7380 may store the set of the BM-SC routing information, one or more external group IDs corresponding to the BM-SC routing information, and mapping information between the TMGI.

In operation 7470, the SCEF 7380 may transmit the TMGI and/or TMGI expiration information received from the BM-SC 7320.

In operation 7480, the SCS/AS 7390 may transmit, to the UE 7300 through application level signaling, MBMS related information including the TMGI, service starting time, and/or service ending time. The SCS/AS 7390 may transmit the external group ID through the application level signaling. Accordingly, when the UE 7300 belongs to various external groups, the UE 7300 may find out the relationship between the external group ID and the TMGI. From that on, the UE 7300 may monitor an MBMS related channel when necessary and may receive data transmitted to the MBMS related channel when the corresponding TMGI is detected. The SCS/AS 7390 may transmit MBMS related information only to the UE 7300 positioned in a certain location. To this end, the SCS/AS 7390 may require information associated with the position of the UE 7300. The SCS/AS 7390 may acquire the position information of the US 7300 through various methods such as application level signaling.

Figure 75A:
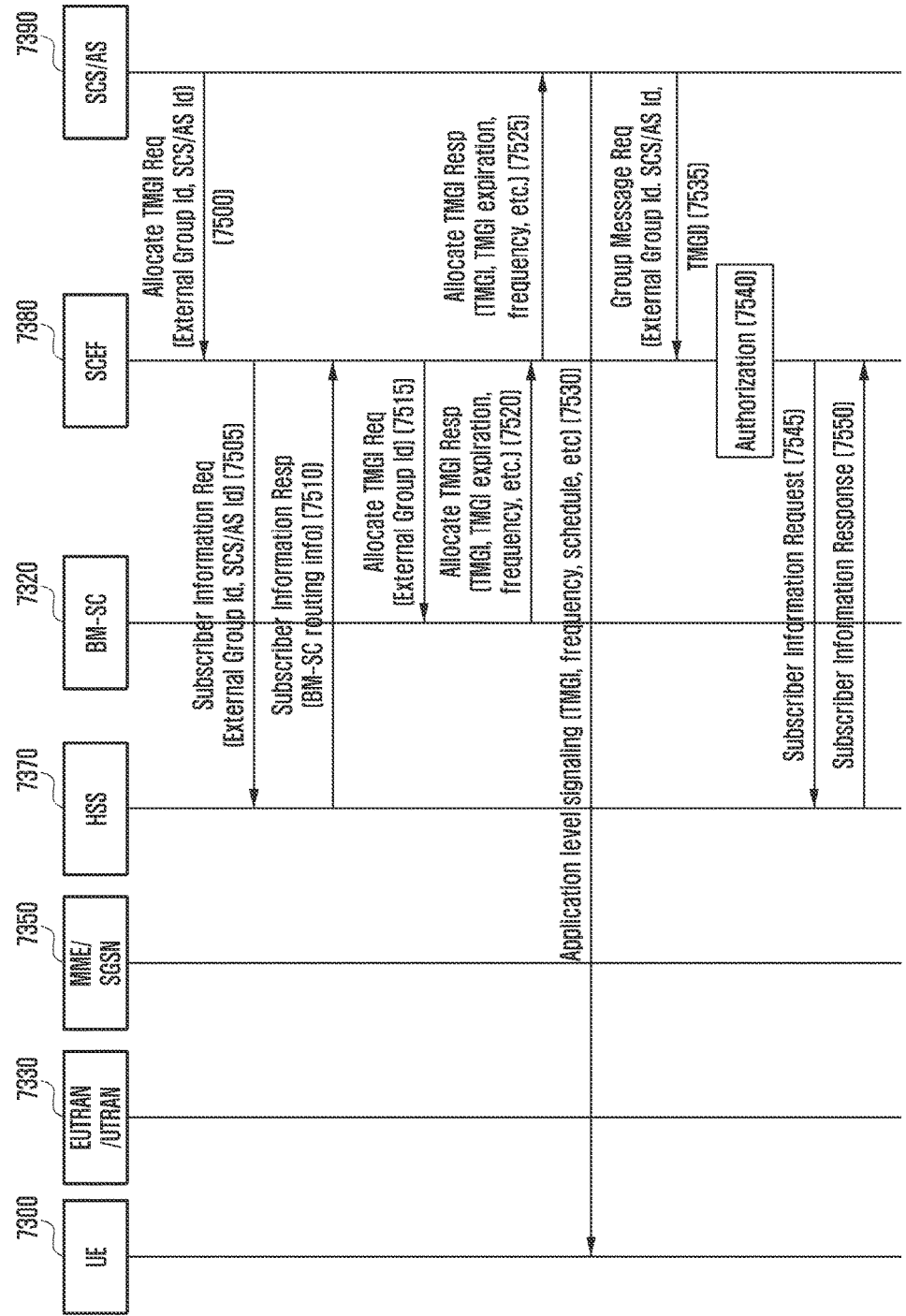
FIGS. 75A and 75B are views illustrating a method of activating an MBMS bearer for transmitting a group message and transmitting the group message transmission scheme according to an embodiment of the present disclosure.
Figure 75B:
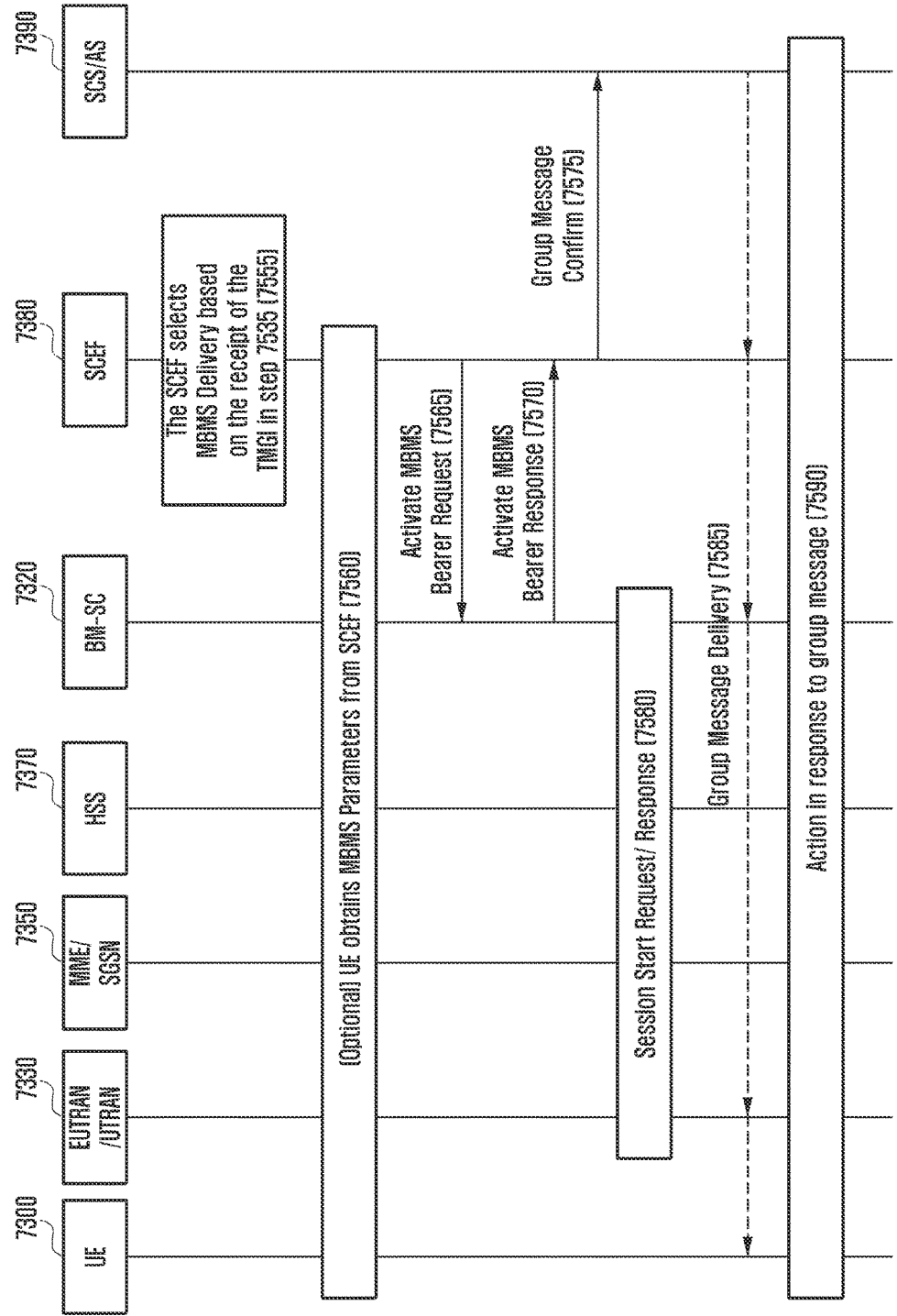

FIGS. 75A and 75B illustrate a method of activating an MBMS bearer for group message delivery and delivering a group message according to an embodiment of the present disclosure.

Referring to FIGS. 75A and 75B, operations 7500 to 7530 may correspond to operations 7420 to 7480 in FIG. 74, and a detailed description thereof will therefore not be repeated. However, this does not mean that operations 7400 and 7410 as described above should be omitted.

In operation 7535, an SCS/AS 7390 transmits a group message request message to an SCEF 7380. The group message request message may include an external group ID, an SCA/AS ID, a content to be delivered, location/area information, RAT(s) information, and/or a TMGI. To determine the IP address and/or port number of the SCEF where the group message request message is received, the SCS/AS may perform a DNS query using the external group ID, use predetermined information, or use information previously stored when the TMGI is allocated. The SCS/AS may store the external group ID and the IP address and/or port number of the SCEF. The location/area information may be a geographical information. As another example, the location/area information may include at least one cell identifier. The at least one cell identifier may be information that is generated using information received from UEs 7300.

In operation 7540, the SCEF 7380 performs authorization for group message delivery. The authorization may be performed for the SCS/AS 7390 identified by the corresponding SCS/AS ID and/or the external group identified by the corresponding external group ID. The authorization may be performed by the SCEF 7380 alone. Alternatively, the SCEF 7380 may transfer the SCS/AS ID and/or the external group ID to an HSS 7370 and/or a group management server, and the HSS 7370 and/or the group management server may perform the authorization and then inform the SCEF 7380 of the result of the authorization. This will be described in more detail in operations 7545 and 7550.

In operation 7545, the SCEF 7380 may transmit a subscriber information request message to the HSS 7370 and/or the group management server. The subscriber information request massage may include the external group ID and/or the SCS/AS ID. The HSS 7370 and/or the group management server may determine whether the corresponding SCS/AS 7390 and/or the external group is authorized to request the group message delivery.

In operation 7550, the HSS 7370 and/or the group management server may transmit a subscriber information response message. The subscriber information response message may include the result of the authorization and the cause thereof.

In operation 7555, the SCEF 7380 determines to deliver the group massage through an MBMS service.

In operation 7560, if necessary, the UE 7300 may acquire MBMS-related information. The MBMS-related information may be transmitted to the UE 7300 by the SCEF 7380, and may also be transmitted to the UE 7300 by the SCS/AS 7390.

- The SCEF 7380 may transmit the MBMS-related information after operation 7570 in this embodiment.
- The SCS/AS 7390 may have already transmitted the MBMS-related information through operation 7480/7530, and may also transmit the MBMS-related information after operation 7575.
  - When the MBMS-related information is transmitted through operation 7480/7530, the SCS/AS 7390 fails to acquire information on an MBMS service area, a radio frequency, and the like in time, and thus may not include this information in the MBMS-related information.
  - When the MBMS-related information is transmitted after operation 7575, the MBMS-related information may include information on the TMGI, an MBMS service area including the start and end points of the service, a radio frequency, and the like. The MBMS-related information may be transmitted after operation 7575 only when it is not transmitted through 7480/7530 or there is a change in the MBMS-related information that has been transmitted through operation 7480/7530.

In operation 7565, the SCEF 7380 may transmit an activate MBMS bearer request message to a BM-SC 7320. The activate MBMS bearer request message may include information on an MBMS service area, the TMGI, and the like. In addition, the activate MBMS bearer request message may further include at least one cell identifier. The SCEF 7380 may have acquired the MBMS service area and/o the cell identifier from the location/area information received in operation 7535. The area indicated by the MBMS service area and/or the cell identifier may be larger than the area indicated by the location/area information, and the SCEF 7380 may not need to separately derive a cell identifier when the location/area information includes at least one cell identifier. The BM-SC 7320 triggers MBMS bearer activation for MBMS downstream nodes. This will be described in more detail in operation 7580.

In operation 7570, the BM-SC 7320 transmits an activate MBMS bearer response message to the SCEF 7380.

In operation 7575, the SCEF 7380 may transmit a group message confirm message to the SCS/AS 7390. Through the group message confirm message, the SCEF 7380 may inform the SCS/AS 7390 of the result of the group message delivery request, and the group message confirm message may include information on the MBMS service area, the radio frequency, and the like. Further, if a group message content is not received in operation 7535, then the SCEF 7380 may transmit, on the message, the IP address and/or port number where the SCEF 7380 desires to receive the group message content from the SCS/AS 7390. Alternatively, the SCEF 7380 may transmit the IP address and/or port number received in operation 7570, where the BM-SC 7320 desires to receive the group message content. In this case, the SCS/AS 7380 may transmit the group message content directly to the BM-SC 7320 without passing through the SCEF 7380.

In operation 7580, the MBMS downstream nodes including an MBMS-GW 7310, an MME 7350, and an MBMS multi-cell/multicast coordination entity (MCE) activate an MBMS bearer.

In operation 7585, if the SCS/AS 7390 has not transmitted the group message content (in the previous operation) to the SCEF 7380 or has a content to be additionally transmitted, then the SCS/AS 7390 transmits the group message content the SCEF 7380 or the BM-SC 7320. Here, the SCS/AS 7390 may use the IP address and/or port number received in operation 7575. Alternatively, the SCEF 7380 may transmit the group message content to the BM-SC 7320. The BM-SC 7320 may transfer the group message content to the MBMS downstream nodes. Finally, the group message content may be transmitted to the UE 7300. Further, in order to prevent the UEs 7300, which have received the group message content, from transmitting responses at a time, the SCS/AS 7390 may include a response time window in the group message content. The UE 7300 may transmit a response by randomly selecting a time point in the response time window.

In operation 7590, the UE 7300 may appropriately make a response. As an example, the SCS/AS 7390 may transmit appropriate application level signaling or application user data.

Figure 76:
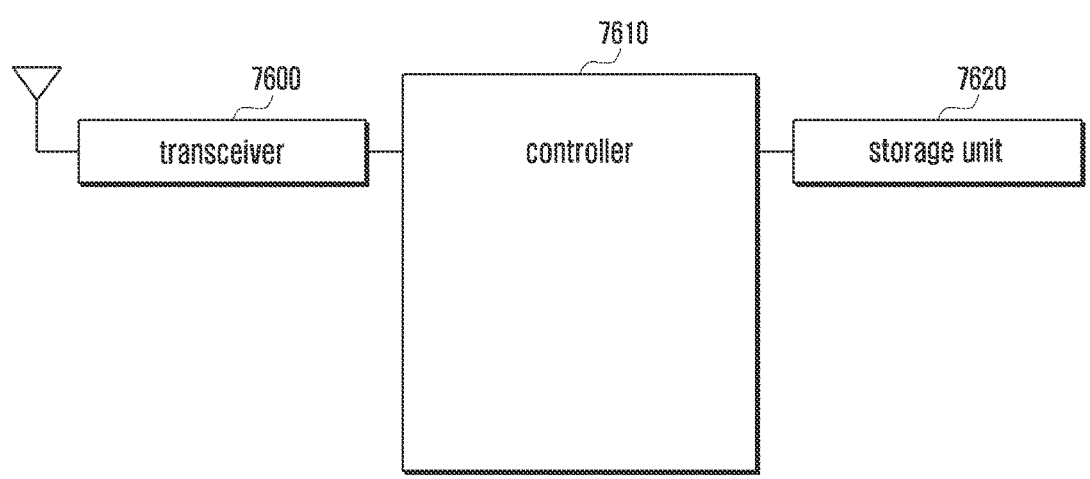
FIG. 76 is a block diagram illustrating an internal structure of an object according to an embodiment of the present disclosure.

FIG. 76 is a block diagram illustrating an internal configuration of an entity according to an embodiment of the present disclosure. Specifically, the entity according to this embodiment may include an SCEF 7380, an SCS/AS 7390, a BM-SC 7320, an HSS 7370, and a UE 7300. The entity includes a transceiver unit 7600, a controller 7610, and a storage unit 7620.

Referring to FIG. 76, in particular, when the entity of this embodiment is an SCS/AS, the controller may control the transceiver unit so as to transmit a TMGI request message to an SCEF and receive a response message to the TMGI request from the SCEF.

Further, in particular, when the entity of this embodiment is an SCEF, the controller may control the transceiver unit and the storage unit so as to receive a TMGI request message from an SCS/AS, check whether the SCS/AS having transmitted the request message is authorized to request the TMGI, on the basis of the request message, transmit a subscriber information request message to an HSS, receive a response message to the subscriber information request message, including routing information, from the HSS, transmit a TMGI request message to a BM-SC, receive a response message including the TMGI, and transmit the response message including the TMGI to the SCS/AS.

In particular, when the entity of this embodiment is a UE, the controller may control the transceiver so as to receive a TMGI and other MBMS-related information through application level signaling, receive a group message using an MBMS service, and perform operations according to the group message.

Also, it will be apparent that the SCEF, the SCS/AS, the BM-SC, the HSS, and the UE may perform the operations as described with reference to FIGS. 74, 75A, and 75B, in addition to the above operations.

Those skilled in the art can appreciate that it is possible to implement the present disclosure in other particular forms without changing the technical idea or the essential features of the present disclosure. Accordingly, it should be understood that the embodiments described above are merely and are not limited. The scope of the present disclosure is defined by the appended claims to be described later, rather than the detailed description. Accordingly, it should be construed that all modifications or changes derived from the meaning and scope of the appended claims and their equivalents fall within the scope of the present disclosure.

In the above embodiments of the present disclosure, all operations and messages may be selectively performed or may be omitted. In addition, the operations in each embodiment do not need to be performed in sequence, and the order of the operations may vary. The messages do not also need to be delivered in sequence, and the order of delivery of the messages may vary. Each operation and each message transfer may be performed independently.

It will be apparent that it is also possible to employ the SCFE 7380 and the SCS/AS 7390 from a point of view in which they are considered one entity. In this case, these two entities may be treated as one application server (e.g., group communication service application server).

All or some of the tables illustrated in the above embodiments are intended to help the understanding of the present disclosure by specifically showing embodiments of the present disclosure. Accordingly, the details of the tables may be considered the representation of a part of the method and apparatus proposed in the present disclosure. That is, it may be preferred that the details of the tables in the specification are approached semantically, rather than syntactically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a service capability server/application server (SCS/AS) in a wireless network, the method comprising:
    transmitting, to a service capability exposure function (SCEF), a first request message to request an allocation of a temporary mobile group identifier (TMGI) in a case that there is no allocated TMGI for a group message delivery, the first request message including an external group identifier and an SCS/AS identifier;
    receiving, from the SCEF, a first response message including the TMGI in a case that the SCS/AS is authorized to request the allocation of the TMGI;
    transmitting, to a user equipment (UE), an application-level signaling including the TMGI; and transmitting, to the SCEF, a request message including the TMGI and the external group identifier for requesting the group message delivery,
    wherein the SCEF checks whether the SCS/AS is authorized to request the allocation of the TMGI in a case that the first request message is received from the SCS/AS.

2. The method of claim 1, wherein the SCEF is configured to: transmit, to a home subscriber server (HSS), a second request message including the external group identifier and the SCS/AS identifier, and receive, from the HSS, a second response message including routing information for a broadcast/multicast service center (BM-SC).

3. The method of claim 2, wherein the SCEF is further configured to: transmit, to the BM-SC, a third request message including the external group identifier based on the routing information, and receive, from the BM-SC, a third response message including the TMGI.

4. The method of claim 2, wherein the routing information for the BM-SC comprises at least one of a BM-SC identifier or a BM-SC internet protocol (IP) address.

5. A method of a service capability exposure function (SCEF) in a wireless network, the method comprising:
    receiving, from a service capability server/application server (SCS/AS), a first request message to request an allocation of a temporary mobile group identifier (TMGI) in a case that there is no allocated TMGI for a group message delivery, the first request message including an external group identifier and an SCS/AS identifier;
    checking whether the SCS/AS is authorized to request the allocation of the TMGI in a case that the first request message is received from the SCS/AS;
    transmitting, to the SCS/AS, a first response message including the TMGI in a case that the SCS/AS is authorized to request the allocation of the TMGI; and
    receiving, from the SCS/AS, a request message including the TMGI and the external group identifier for requesting the group message delivery,
    wherein the TMGI is transmitted from the SCS/AS to a user equipment (UE) on an application-level signaling.

6. The method of claim 5, further comprising:
    transmitting, to a home subscriber server (HSS), a second request message including the external group identifier and the SCS/AS identifier; and receiving, from the HSS, a second response message including routing information for a broadcast/multicast service center (BM-SC).

7. The method of claim 6, further comprising:
    transmitting, to the BM-SC, a third request message including the external group identifier based on the routing information; and receiving, from the BM-SC, a third response message including the TMGI.

8. The method of claim 6, wherein the routing information for the BM-SC comprises at least one of a BM-SC identifier or a BM-SC internet protocol (IP) address.

9. A service capability server/application server (SCS/AS) apparatus for a wireless network, the apparatus comprising:
    a transceiver; and a controller coupled with the transceiver and configured to control the transceiver to:
    transmit, to a service capability exposure function (SCEF), a first request message to request an allocation of a temporary mobile group identifier (TMGI) in case that there is no allocated TMGI for a group message delivery, the first request message including an external group identifier and an SCS/AS identifier,
    receive, from the SCEF, a first response message including the TMGI in a case that the SCS/AS is authorized to request the allocation of the TMGI,
    transmit, to a user equipment (UE), an application-level signaling including the TMGI, and transmit, to the SCEF, a request message including the TMGI and the external group identifier for requesting the group message delivery,
    wherein the SCEF checks whether the SCS/AS is authorized to request the allocation of the TMGI in a case that the first request message is received from the SCS/AS.

10. The apparatus of claim 9, wherein the SCEF is configured to: transmit, to a home subscriber server (HSS), a second request message including the external group identifier and the SCS/AS identifier, and receive, from the HSS, a second response message including routing information for a broadcast/multicast service center (BM-SC).

11. The apparatus of claim 10, wherein the SCEF is further configured to: transmit, to the BM-SC, a third request message including the external group identifier based on the routing information, and receive, from the BM-SC, a third response message including the TMGI.

12. The apparatus of claim 10, wherein the routing information for the BM-SC comprises at least one of a BM-SC identifier or a BM-SC internet protocol (IP) address.

13. An apparatus having a service capability exposure function (SCEF) for a wireless network, the apparatus comprising:
- a transceiver; and a controller coupled with the transceiver and configured to control the transceiver to:
- receive, from a service capability server/application server (SCS/AS), a first request message to request an allocation of a temporary mobile group identifier (TMGI) in case that there is no allocated TMGI for a group message delivery, the first request message including an external group identifier and an SCS/AS identifier,
- check whether the SCS/AS is authorized to request the allocation of the TMGI in a case that the first request message is received from the SCS/AS,
- transmit, to the SCS/AS, a first response message including the TMGI in a case that the SCS/AS is authorized to request the allocation of the TMGI, and receive, from the SCS/AS, a request message including the TMGI and the external group identifier for requesting the group message delivery, wherein the TMGI is transmitted from the SCS/AS to a user equipment (UE) on an application-level signaling.

14. The apparatus of claim 13, wherein the controller is further configured to: transmit, to a home subscriber server (HSS), a second request message including the external group identifier and the SCS/AS identifier, and receive, from the HSS, a second response message including routing information for a broadcast/multicast service center (BM-SC).

15. The apparatus of claim 14, wherein the controller is further configured to: transmit, to the BM-SC, a third request message including the external group identifier based on the routing information, and receive, from the BM-SC, a third response message including the TMGI.

16. The apparatus of claim 14, wherein the routing information for the BM-SC comprises at least one of a BM-SC identifier or a BM-SC internet protocol (IP) address.

* * * * *